(12) United States Patent
Norimatsu et al.

(10) Patent No.: US 9,011,013 B2
(45) Date of Patent: Apr. 21, 2015

(54) SENSOR-EQUIPPED WHEEL BEARING

(75) Inventors: Takayuki Norimatsu, Iwata (JP); Kentarou Nishikawa, Iwata (JP); Toru Takahashi, Iwata (JP); Ayumi Akiyama, Iwata (JP)

(73) Assignee: NTN Corporation, Osaska (JP)

( * ) Notice: Subject to any disclaimer, the term of this patent is extended or adjusted under 35 U.S.C. 154(b) by 0 days.

(21) Appl. No.: 14/115,668

(22) PCT Filed: May 8, 2012

(86) PCT No.: PCT/JP2012/061713
§ 371 (c)(1),
(2), (4) Date: Nov. 5, 2013

(87) PCT Pub. No.: WO2012/153721
PCT Pub. Date: Nov. 15, 2012

(65) Prior Publication Data
US 2014/0086517 A1    Mar. 27, 2014

(30) Foreign Application Priority Data

| May 9, 2011 | (JP) | 2011-104181 |
| May 16, 2011 | (JP) | 2011-108949 |
| May 20, 2011 | (JP) | 2011-113534 |
| Aug. 3, 2011 | (JP) | 2011-169784 |
| May 1, 2012 | (JP) | 2012-104316 |
| May 1, 2012 | (JP) | 2012-104317 |

(51) Int. Cl.
*F16C 41/00* (2006.01)
*G01L 1/22* (2006.01)
(Continued)

(52) U.S. Cl.
CPC ............ *F16C 41/00* (2013.01); *B60B 27/0005* (2013.01); *B60B 27/0068* (2013.01);
(Continued)

(58) Field of Classification Search
USPC .................................. 384/448; 73/862.045
See application file for complete search history.

(56) References Cited

U.S. PATENT DOCUMENTS 7,216,551 B2    5/2007   Koyagi et al.
7,665,372 B2    2/2010   Ueno et al.
(Continued)

FOREIGN PATENT DOCUMENTS

CN    1723385 A    1/2006
CN    1748091 A    3/2006
(Continued)

OTHER PUBLICATIONS

International Search Report mailed Jul. 17, 2012, in corresponding International Application No. PCT/JP2012/061713.
(Continued)

*Primary Examiner* — Thomas R. Hannon

(57) ABSTRACT

A wheel support bearing assembly, including rolling elements interposed between raceway surfaces of an outer member and an inner member, one of the members serving as a stationary member, a plurality of sensor units, each including a strain generator member having at least two fixation contact segments and at least two sensors mounted on the strain generator member to sense strain in the strain generator member. The strain generator members are formed of a single band-shaped strain generator body continuously joining the plurality of sensor units. The at least two fixation contact segments are arranged at the same axial positions and spaced from each other along a circumferential direction of an outer diametric surface of the stationary member. Load on the wheel support bearing assembly is estimated by an estimator based on output signals of the at least two sensors.

19 Claims, 71 Drawing Sheets

(51) Int. Cl.

| | |
|---|---|
| *B60B 27/00* | (2006.01) |
| *B60B 35/18* | (2006.01) |
| *F16C 19/18* | (2006.01) |
| *F16C 19/52* | (2006.01) |
| *G01L 5/16* | (2006.01) |
| *G01L 5/00* | (2006.01) |

(52) U.S. Cl.
CPC ............... *B60B35/18* (2013.01); *F16C 19/186* (2013.01); *F16C 19/522* (2013.01); *G01L 5/161* (2013.01); *B60B 2380/12* (2013.01); *B60B 2380/32* (2013.01); *B60B 2380/75* (2013.01); *B60B 2900/112* (2013.01); *F16C 2233/00* (2013.01); *F16C 2326/02* (2013.01); *G01L 5/0019* (2013.01)

(56) References Cited

U.S. PATENT DOCUMENTS

| | | | |
|---|---|---|---|
| 8,528,391 B2 | 9/2013 | Norimatsu et al. | |
| 8,567,260 B2 | 10/2013 | Nishikawa et al. | |
| 8,581,457 B2 | 11/2013 | Takahashi et al. | |
| 8,596,146 B2* | 12/2013 | Ono et al. | 73/862.045 |
| 2002/0061148 A1* | 5/2002 | Salou et al. | 384/448 |
| 2006/0061352 A1 | 3/2006 | Koyagi et al. | |
| 2006/0278022 A1 | 12/2006 | Ono | |
| 2010/0310202 A1* | 12/2010 | Takahashi et al. | 384/448 |
| 2011/0125421 A1 | 5/2011 | Takahashi et al. | |
| 2011/0185823 A1 | 8/2011 | Nishikawa et al. | |
| 2011/0209562 A1 | 9/2011 | Ono et al. | |
| 2012/0229004 A1 | 9/2012 | Takahashi et al. | |
| 2013/0223778 A1* | 8/2013 | Takahashi et al. | 384/448 |

FOREIGN PATENT DOCUMENTS

| | | |
|---|---|---|
| CN | 1849516 A | 10/2006 |
| CN | 101166912 A | 4/2008 |
| JP | 6-32735 | 4/1994 |
| JP | 10-300561 | 11/1998 |
| JP | 2007-32705 | 2/2007 |
| JP | 2008-185496 | 8/2008 |
| JP | 2008-185497 | 8/2008 |
| JP | 2010-96565 | 4/2010 |
| JP | 2010-127744 | 6/2010 |
| JP | 2010-127750 | 6/2010 |
| JP | 2010-138958 | 6/2010 |
| JP | 2010-139303 | 6/2010 |
| JP | 2011-133101 | 7/2011 |
| WO | WO 2004/104545 A1 | 12/2004 |
| WO | WO 2006/118946 A1 | 11/2006 |
| WO | WO 2009/125583 | 10/2009 |
| WO | 2010/052864 | 5/2010 |
| WO | WO 2011/046095 | 4/2011 |

OTHER PUBLICATIONS

PCT International Preliminary Report on Patentability mailed Nov. 21, 2013 in corresponding International Application No. PCT/JP2012/061713.

Chinese Office Action issued on Aug. 26, 2014 in corresponding Chinese Patent Application No. 201280022558.9.

Extended European Search Report dated Nov. 6, 2014 in corresponding European Patent Application No. 12782455.5.

Japanese Notice of Reason(s) for Rejection issued Jan. 13, 2015 in corresponding Japanese Patent Application No. 2011-169784.

* cited by examiner

Fig. 2
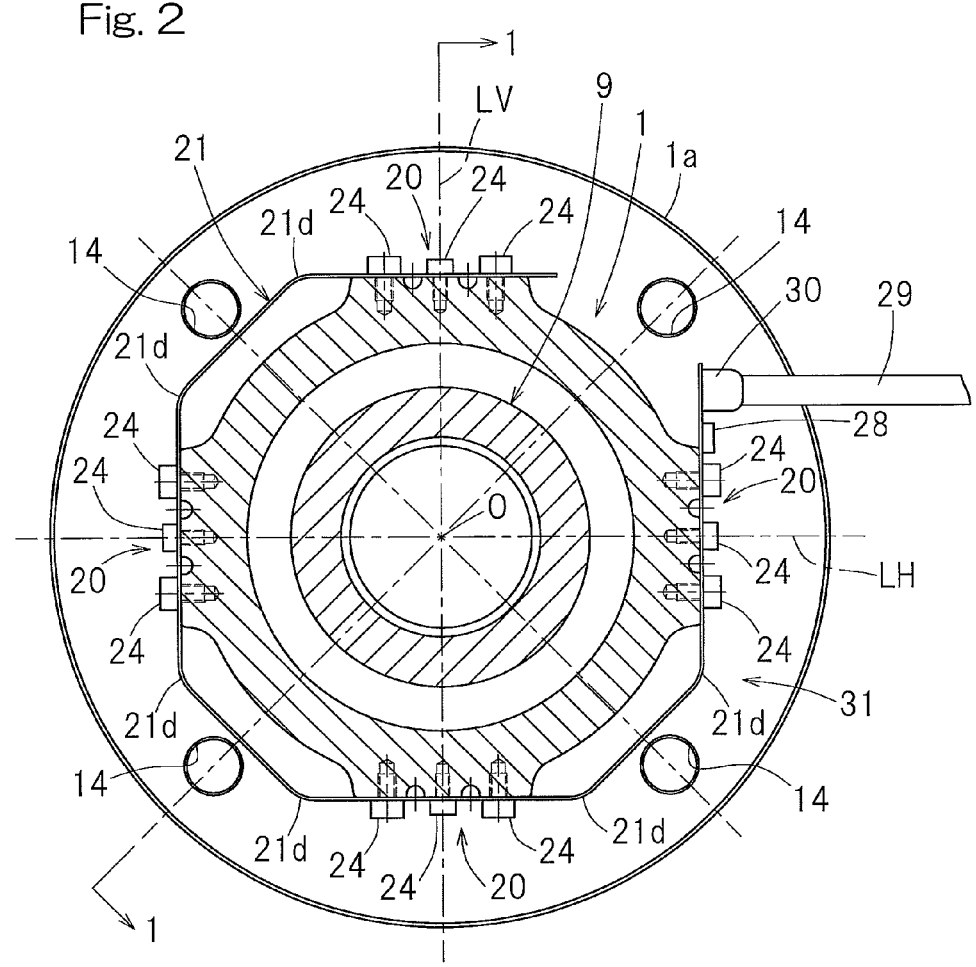
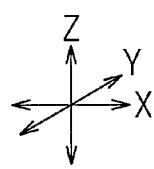

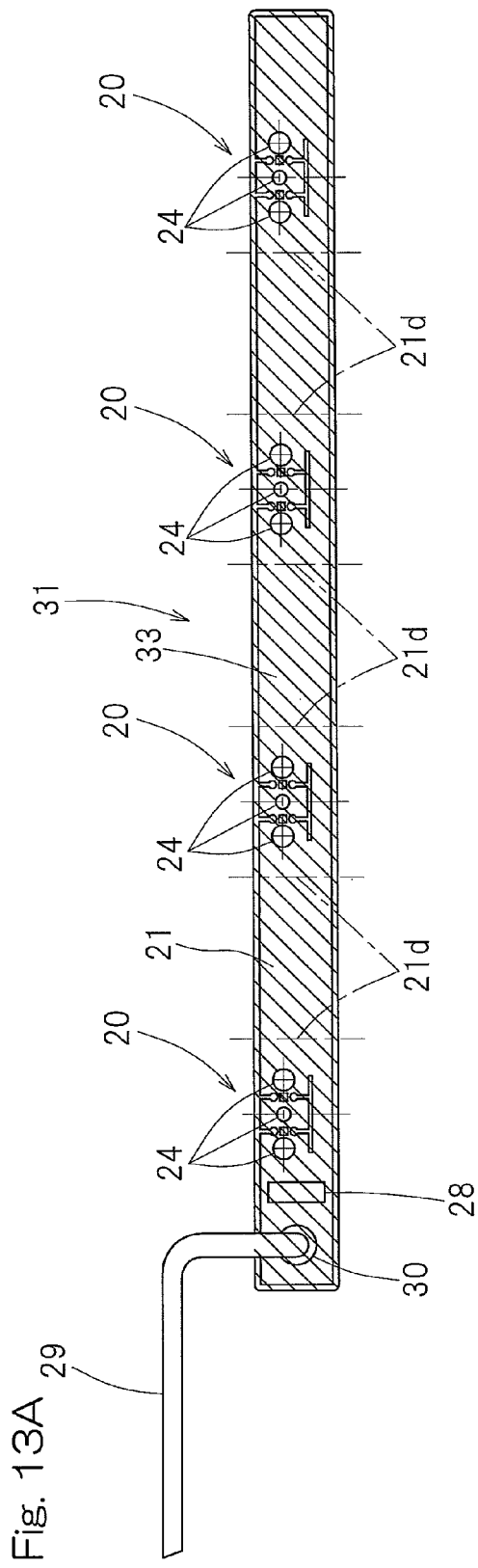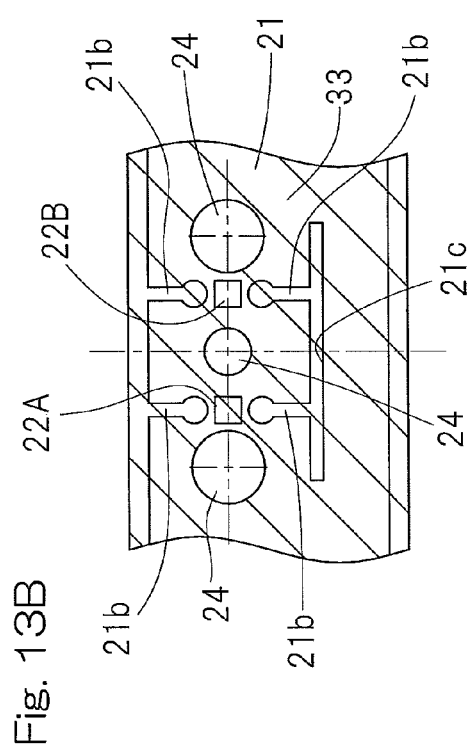
Fig. 13A
Fig. 13B

← OUTBOARD SIDE    INBOARD SIDE →

OUTBOARD SIDE ← → INBOARD SIDE

OUTBOARD SIDE ← → INBOARD SIDE

OUTBOARD SIDE ← → INBOARD SIDE

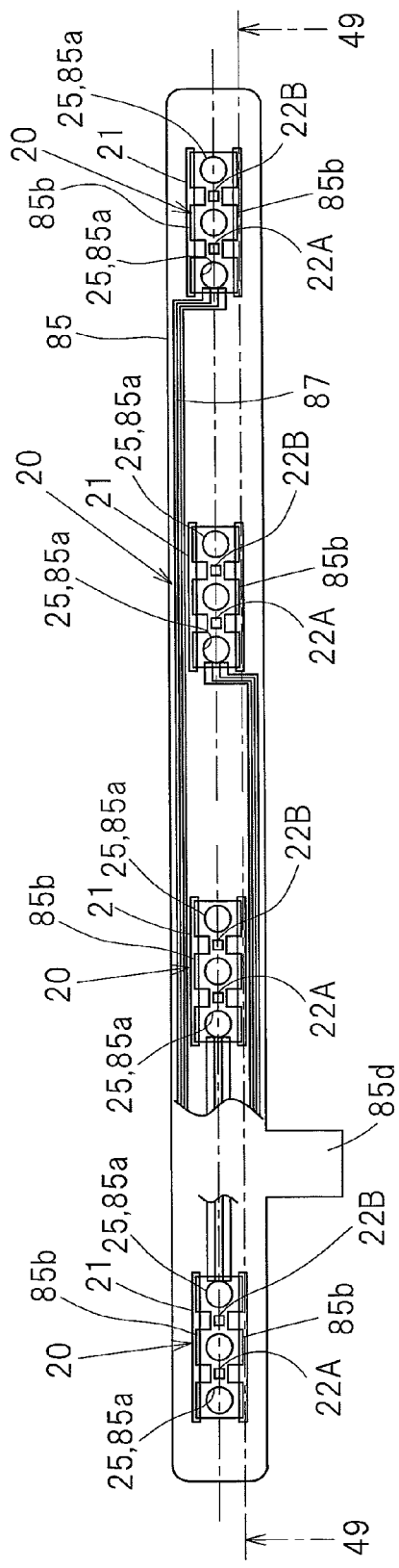
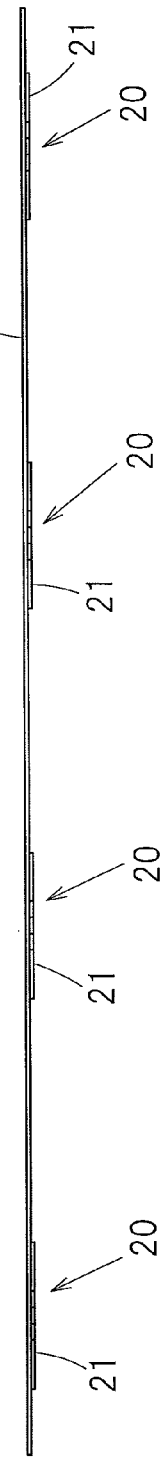
Fig. 49A
Fig. 49B

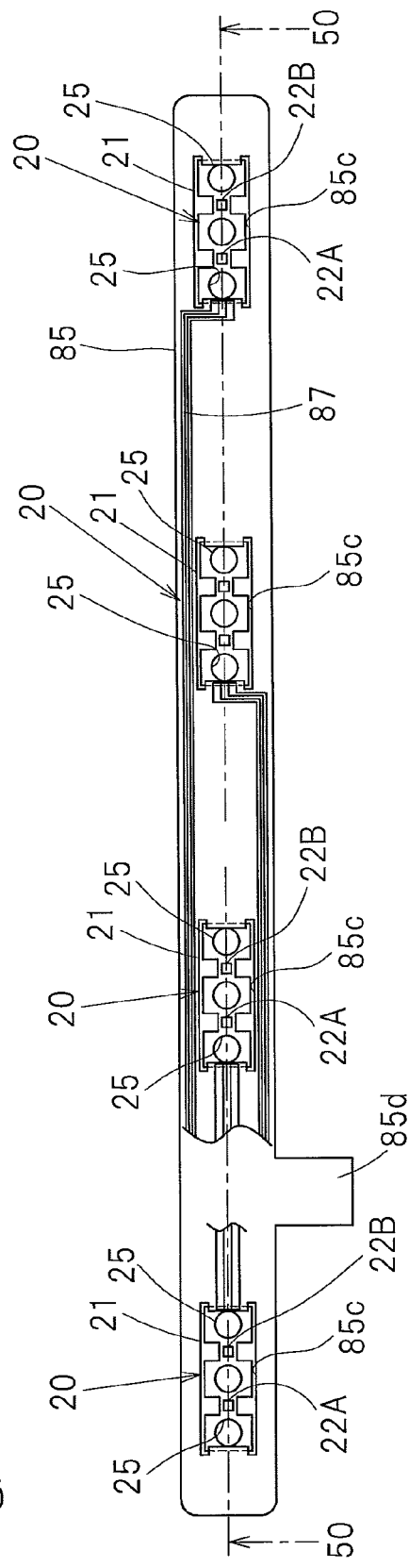
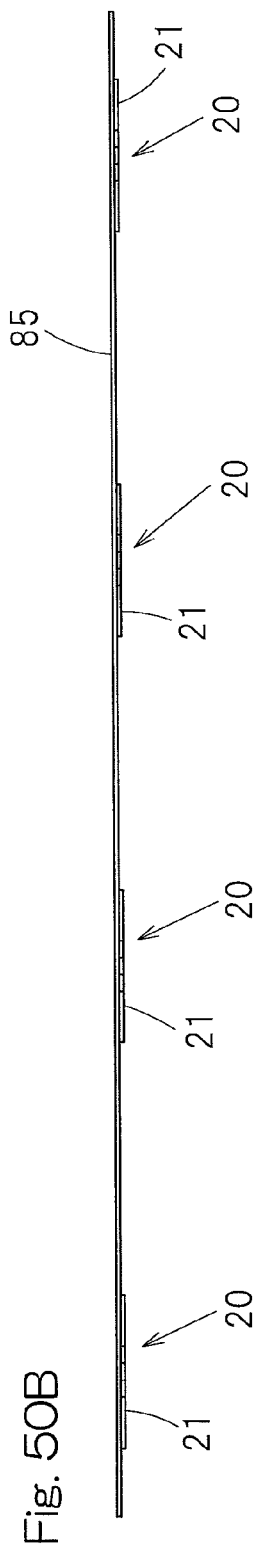
Fig. 50A
Fig. 50B

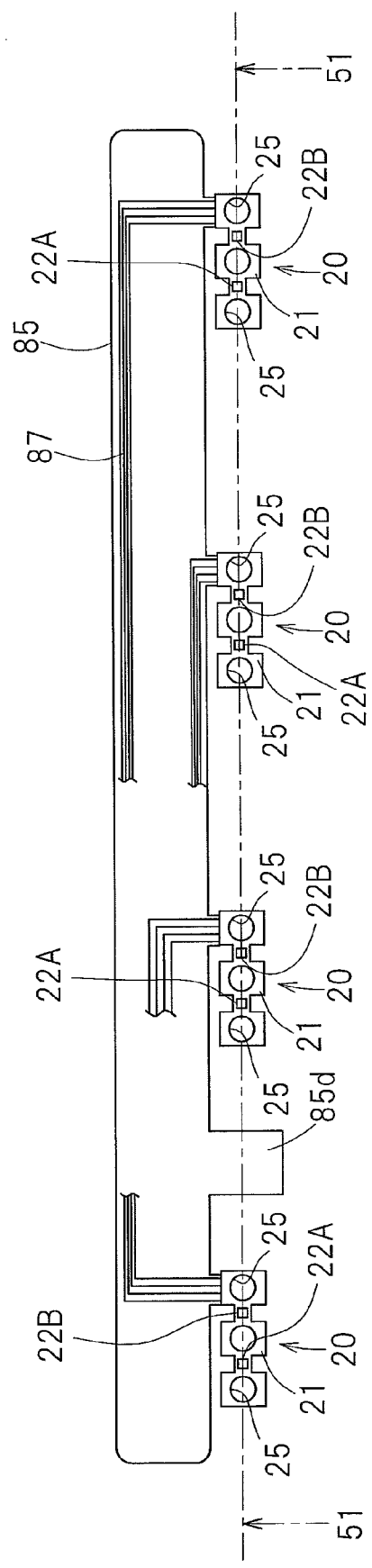
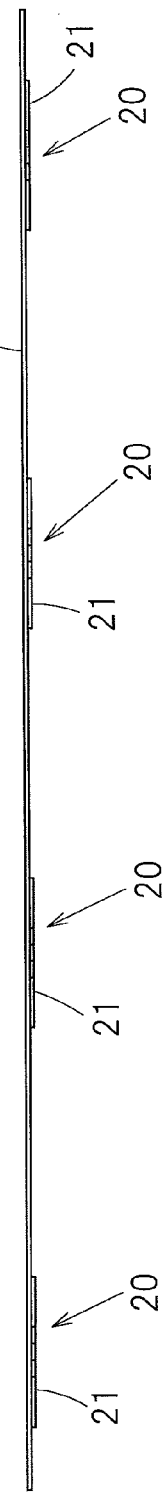
Fig. 51A
Fig. 51B

Fig. 59A
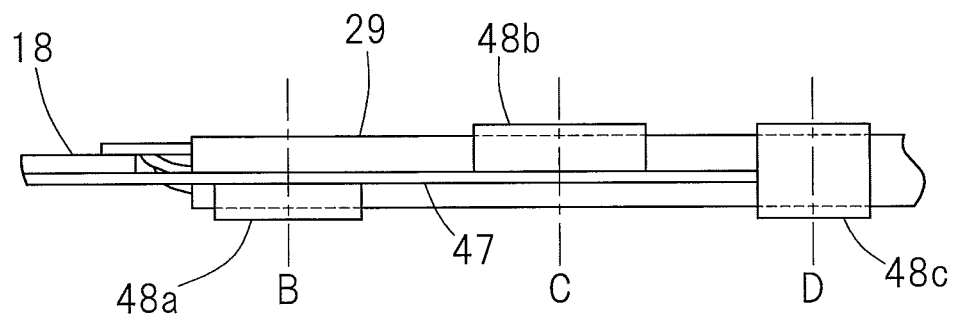
Fig. 59B  Fig. 59C  Fig. 59D
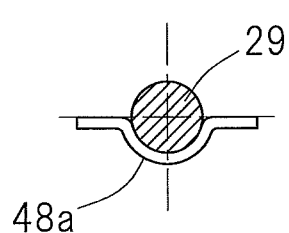 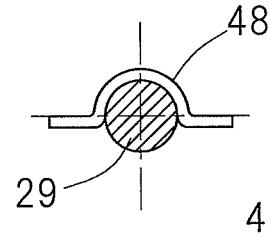 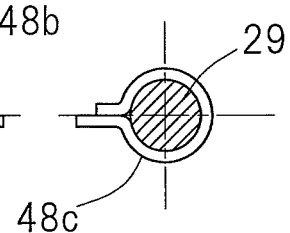

Fig. 62
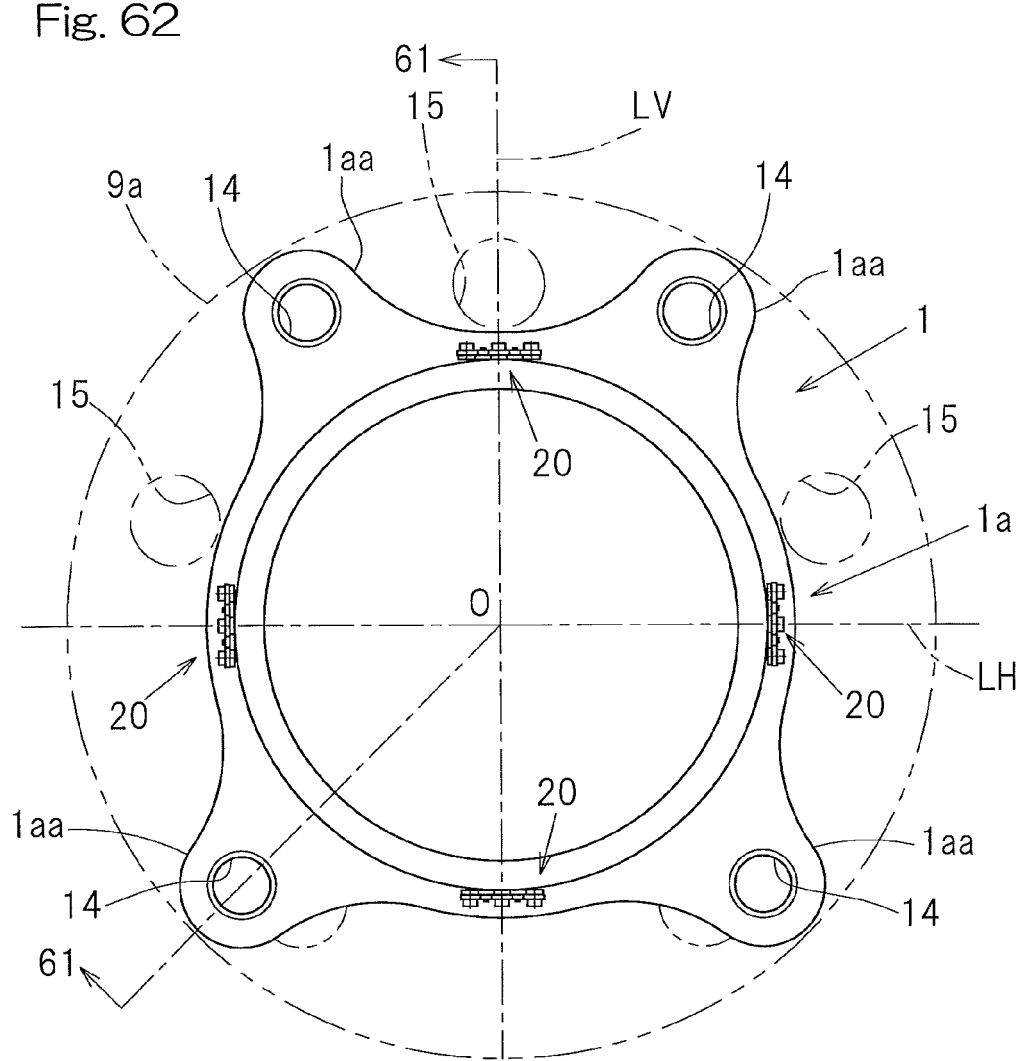
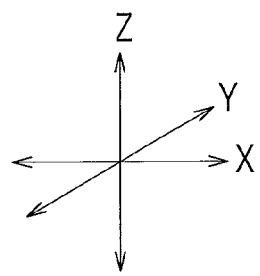

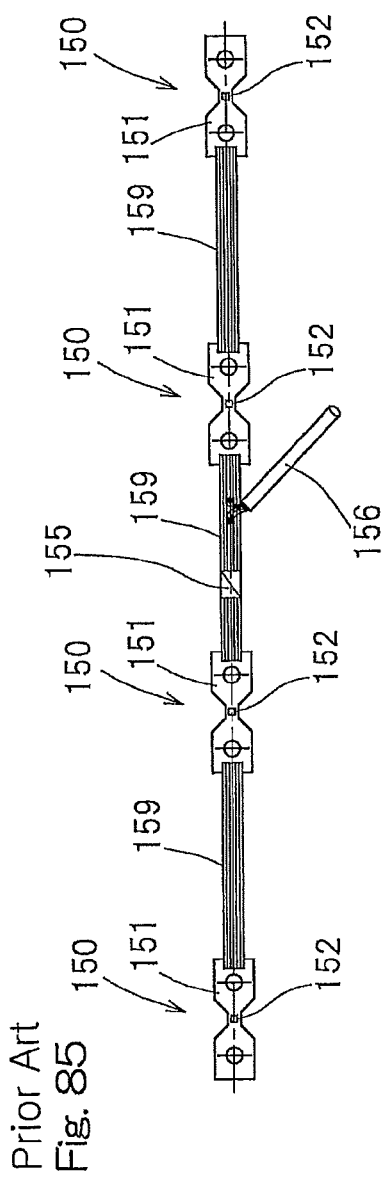
Prior Art Fig. 85
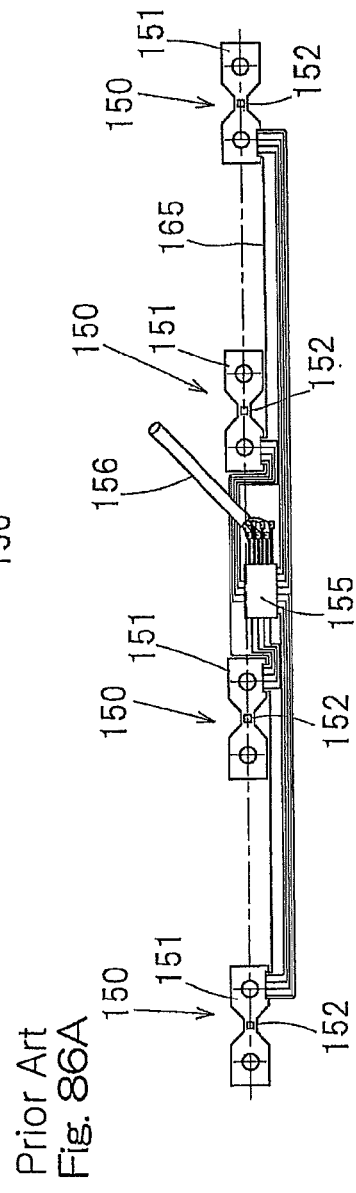
Prior Art Fig. 86A
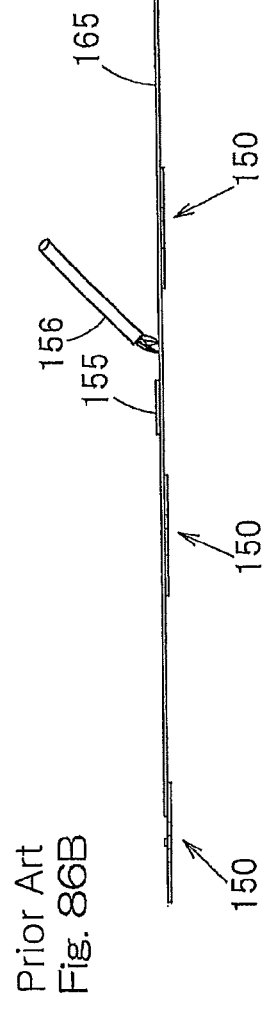
Prior Art Fig. 86B

SENSOR-EQUIPPED WHEEL BEARING

CROSS REFERENCE TO THE RELATED APPLICATIONS

This application is a U.S. national stage application under 35 U.S.C. 371 of international patent application No. PCT/JP2012/061713 filed May 8, 2012, and is based on and claims foreign priority benefit to a Japanese patent application No. 2011-104181, filed May 9, 2011, a Japanese patent application No. 2011-108949, filed May 16, 2011, a Japanese patent application No. 2011-113534, filed May 20, 2011, a Japanese patent application No. 2011-169784, filed Aug. 3, 2011, a Japanese Application No. 2012-104316 filed May 1, 2012, and a Japanese Application No. 2012-104317 filed May 1, 2012, the entire disclosures of which are herein incorporated by reference as a part of this application.

BACKGROUND OF THE INVENTION

1. Field of the Invention

The present invention relates to a sensor-equipped wheel support bearing assembly which may include a load sensor to determine a load that acts on a bearing structure for rotatably supporting a wheel.

2. Description of Related Art

As a technology to determine a load that acts on a given wheel of an automotive vehicle, a sensor equipped wheel support bearing assembly has been proposed in which an annular sensor assembly may be fitted through a sealing member to a peripheral surface of one of outer and inner members working as a stationary member in a fashion coaxial with the stationary member, with the sensor assembly including electronics complex of electronic components disposed inwardly of an annular protective covering (see, for example, the Patent Document 1 listed below). A developed view of FIG. 85 illustrates such an electronics complex. The illustrated electronics complex may include four sensor units 150 for load determination, each having a strain generating member 151 fixed to a peripheral surface of the stationary member, in contact therewith and a sensor 152 fitted to the strain generating member 151 for detecting a strain induced in the strain generating member 151, a signal processing IC 155 for processing an output signal from the sensor 152, and a signal cable 156 for transmitting the output signal so processed to the outside of the bearing assembly.

As another technique, the aforementioned sensor equipped wheel support bearing assembly may be modified to include an electronics complex which is illustrated in a developed view of FIG. 86A and a longitudinal cross sectional view of FIG. 86B. More specifically, an electronics complex as illustrated in FIG. 85 may be modified to further include a flexible substrate 165 having a wiring circuit that wires among the sensor units 150, the signal processing IC 155 and the signal cable 156 (see, for example, the Patent Document 2 listed below).

PRIOR ART DOCUMENTS

Patent Documents

[Patent Document 1] JP Laid-open Patent Publication No. 2010-138958
[Patent Document 2] JP Laid-open Patent Publication No. 2010-127750

SUMMARY OF THE INVENTION

In a sensor equipped wheel support bearing assembly disclosed in the Patent Document 1, a wiring circuit 159 may be soldered to four strain generating members 151 to establish wirings between the strain generating members 151. A wiring operation using such a wiring circuit 159 may be complex. This may result in cost increase.

Similarly, in a sensor equipped wheel support bearing assembly disclosed in the Patent Document 2, connections between four strain generating members 151 and a flexible substrate 165 may be established by soldering, in order to form the aforementioned electronics complex. A solder used in the wire connections, however, may cause cracking due to vibrations during the travel of a vehicle. In such a case, a sensor 152 may fail in normal detection.

Referring to FIG. 87, in a sensor equipped wheel support bearing assembly disclosed in the Patent Document 2, sensor units 150, each having a sensor 152 for detecting a strain induced in a corresponding strain generating member 151, may be arranged inwardly of an annular protective covering 157, and a molding material 158 may be filled in an outer diametric groove of the protective covering 157 to prevent possible corrosion of the sensors 152 due to dirt from an external environment. The protective covering 157 may include half-split shape components connected by means of a hinge 160 such as shown in FIG. 88A and FIG. 88B. This configuration may leave a room for improvement in terms of sealability, ease of assembly and cost. Note that FIG. 88A shows an opened configuration of the protective covering 157, while FIG. 88B shows a closed configuration of the protective covering 157. Furthermore, there is no provision of a metallic cover to protect the entirety of the protective covering 157 itself. Thus, the protective covering 157 may be damaged by flying stones during the travel of a vehicle. This may lead to failure of sensors 152 inside the covering 157 in performing normal detection.

An object of the present invention is to provide a sensor-equipped wheel support bearing assembly which may not require a complex wiring operation, thus providing for wire connections with improved quality and enabling cost reduction.

The present invention may provide a sensor-equipped wheel support bearing assembly for rotatably supporting a wheel relative to a vehicle body. The wheel support bearing assembly includes an outer member having an inner periphery formed with a plurality of raceway surfaces; an inner member having an outer periphery formed with a plurality of raceway surfaces opposed to the raceway surfaces of the outer member, one of the outer member and the inner member serving as a stationary member; a plurality of rows of rolling elements interposed between the raceway surfaces of the outer member and the raceway surfaces of the inner member; a plurality of sensor units, each of the sensor units including a strain generator member and at least two sensors mounted on the strain generator member to sense strain in the strain generator member, the strain generator member including at least two fixation contact segments fixedly in contact with the stationary member; and an estimator configured to estimate a load that acts on the wheel support bearing assembly, based on output signals of the at least two sensors; the strain generator members of the plurality of sensor units being formed of a single band-shaped strain generator body continuously joining the plurality of sensor units with each other, the at least two fixation contact segments of the band-shaped strain generator body being arranged at same axial positions on an outer diametric surface and spaced from each other along a circumferential direction of the outer diametric surface of the stationary member.

A load may act on the wheel support bearing assembly or between a tire of a wheel and a road surface. This will cause a load to be applied to a stationary member (e.g. outer member) of the wheel support bearing assembly, thus, in turn, causing deformation of the stationary member. The sensor units may sense the deformation to enable determination of the load. The at least two sensors of each sensor unit produces output signals, an amplitude of which may be affected by the passing-by of the rolling elements. The estimator may estimate a force (e.g., a vertical load component $F_z$, a load component $F_x$ that may serve as a drive force or a brake force, and/or an axial load component $F_y$) that acts on the wheel support bearing assembly or between a wheel and a road surface (i.e., on a tire tread), based on output signals of these sensors. Thus, possible effects induced by temperature as well as possible effects due to slips—for example, slips between a knuckle surface and a flange surface—on respective output signals of the at least two sensors may be cancelled. This may enable accurate determination of a load (e.g., a vertical load component $F_z$, a load component $F_x$ that may serve as a drive force or a brake force, and/or an axial load component $F_y$) that acts on the wheel support bearing assembly or between a tire of a wheel and a road surface, without being affected by possible effects induced by temperature as well as possible effects due to slips—for example, slips between a knuckle surface and a flange surface. Furthermore, the strain generator members of the plurality of sensor units are formed of a single continuous band-shaped strain generator body joining the plurality of sensor units with each other. This may not require a complex wiring operation, thus providing for wire connections with improved quality and enabling cost reduction.

In one embodiment of the present invention, the single band-shaped strain generator body may have, along a longitudinal direction thereof, a plurality of portions, where the single band-shaped strain generator body is bent, and the single band-shaped strain generator body may be fixed to the stationary member. Such a configuration in which a single band-shaped strain generator body joining the plurality of sensor units has a plurality of locations where the strain generator body is bent, may make it easier to mount the strain generator body to the stationary member.

In one embodiment of the present invention, the single band-shaped strain generator body may be coated with a mold material. Such a configuration of a single band-shaped strain generator body joining the plurality of sensor units being coated with a mold material may prevent corrosion of strain sensors of the sensor units that may be caused by dirt from an external environment. This may allow for providing a reliable sensor-equipped wheel support bearing assembly.

In one embodiment of the present invention, an outer diametric surface of the stationary member may include segment(s) in contact with the plurality of sensor units, and at least the segment(s) may be subjected to a surface treatment of anti-corrosion or corrosion prevention. The surface treatment may include a metal-plating, a paint or a coating. Such a configuration where an outer diametric surface of the stationary member is subjected to a surface treatment of anti-corrosion or corrosion prevention may prevent rust formation on an outer diametric surface of the stationary member. Rust formation may result in the rising of segment(s) of an outer diametric surface of the stationary member where the sensor units are mounted. Such a configuration may also prevent the sensor units from accidentally catching rust from an outer diametric surface of the stationary member. In this way, possible malfunctioning of strain sensors due to rust may be avoided, thus ensuring accurate determination of a load for a longer period of time.

In one embodiment of the present invention, a tubular protective cover covering the plurality of sensor units may be provided, with the protective cover being fitted to an outer diametric surface of the stationary member. Such a configuration where a tubular protective cover covering the plurality of sensor units is provided, with the protective cover being fitted to an outer diametric surface of the stationary member, may protect the plurality of sensor units from an external environment. In this way, possible failure of the sensor units due to an external environment may be avoided, thus ensuring a reliable determination of a load that acts on the wheel bearing assembly or on a tire tread for a longer period of time.

The protective cover may include a pressed product of an anti-corrosive steel plate. Such a configuration may prevent corrosion of the protective cover due to an external environment.

In one embodiment of the present invention, the estimator may be configured to compute, based on a difference between output signals of the at least two sensors, an amplitude value of the output signals or a value that corresponds to the amplitude value. An amplitude value of the output signals may be affected by the passing-by of the rolling elements and/or the positions of the rolling elements. Also, the output signals may exhibit fluctuations due to possible effects induced by temperature as well as possible effects due to slips—for example, slips between a knuckle surface and a flange surface. Hence, the aforementioned configuration of computing, based on a difference between those output signals, an amplitude value of those output signals or a value that corresponds to the amplitude value, may be able to at least cancel possible effects induced by temperature as well as possible effects due to slips—for example, slips between a knuckle surface and a flange surface—on respective output signals of the sensors, thus increasing the determination accuracy.

The "effects induced by temperature" used herein may indicate a shift in output signals of the sensors due to change in the bearing temperature. The "effects due to slips" used herein may indicate a shift in output signals of the sensors due to change in the load applied to the wheel support bearing assembly.

(1) If the change of such a shift-inducing factor with time is slow—i.e., if the change of such a shift-inducing factor with time is slower than the frequency of a signal component generated by the orbital motion of the rolling elements, the width of a computed amplitude of output signals of the sensors is virtually equal to the width of an apparent amplitude of the output signals. In other words, the center of an amplitude of output signals of the sensors has been shifted in one direction.

(2) If the change of such a shift-inducing factor with time is the same as the frequency of a signal component generated by the orbital motion of the rolling elements, the width of an apparent amplitude of the output signals is comprised by the sum of: (i) an actual amplitude value; and (ii) fluctuations caused by the shift-inducing factor.

(3) If the change of such a shift-inducing factor with time is faster than the frequency of a signal component generated by the orbital motion of the rolling elements, a frequency with which an apparent amplitude of the output signals changes is about the same as the frequency of fluctuations caused by the shift-inducing factor and does not resemble the frequency of a signal component generated by the orbital motion of the rolling elements.

The estimator may be configured to generate an absolute value of a signal of a difference (i.e., differential signal) between the output signals of the at least two sensors, and to define a peak value or a DC component of the absolute value as the value that corresponds to the amplitude value. The estimator may be configured to compute an effective value of a signal of a difference between output signals of the at least two sensors, and to define the effective value as the value that corresponds to the amplitude value. The estimator may be configured to compute a maximum value and a minimum value of a difference between output signals of the at least two sensors within time interval equal to or greater than one period of oscillation of the difference, and that value may be the value that corresponds to the amplitude value.

In one embodiment of the present invention, the at least two fixation contact segments may include two fixation contact segments located at respective opposite ends of arrangement along a circumferential direction of an outer diametric surface of the stationary member, and a space between those two fixation contact segments may be equal to arrangement pitch of the rolling elements. If, in such a configuration, two sensors are evenly distributed between those two fixation contact segments, a space between these two sensors as viewed along the aforementioned circumferential direction may be substantially equal to ½ of arrangement pitch of the rolling elements. In such a case, output signals of these two sensors will be 180° out of phase from each other. Hence, a difference between output signals of these two sensors may adequately cancel possible effects induced by temperature as well as possible effects due to slips—for example, slips between a knuckle surface and a flange surface—on the output signals of those two sensors. Thus, a force that acts on the wheel support bearing assembly or between a wheel and a road surface, as estimated by the estimator, may be more accurate because possible effects induced by temperature as well as possible effects due to slips—for example, slips between a knuckle surface and a flange surface—have been more significantly reduced.

In one embodiment of the present invention, a space defined between neighboring sensors of the at least two sensors along a circumferential direction of an outer diametric surface of the stationary member may be equal to or approximate to (½+n) times as much as arrangement pitch of the rolling elements, with n being an integer. If a space between two sensors of the at least two sensors as viewed along the aforementioned circumferential direction is equal to ½ of arrangement pitch of the rolling elements, output signals of those two sensors will be 180° out of phase from each other. Hence, a difference between output signals of those two sensors may cancel possible effects induced by temperature as well as possible effects due to slips—for example, slips between a knuckle surface and a flange surface—on the output signals of those two sensors. Thus, a force that acts on the wheel support bearing assembly or between a wheel and a road surface, as estimated by the estimator, may be more accurate because possible effects induced by temperature as well as possible effects due to slips—for example, slips between a knuckle surface and a flange surface—have been more significantly reduced.

In one embodiment of the present invention, each of the sensor units may include neighboring first, second and third fixation contact segments, and two neighboring sensors, each of the sensors mounted on a potion between the first and the second fixation contact segments and a portion between the second and the third fixation contact segments, whereby that sensor unit may include three fixation contact segments and two sensors. If, in such a configuration, a space between two far-end fixation contact segments (i.e., the first and third fixation contact segments) as viewed along the aforementioned circumferential direction is equal to arrangement pitch of the rolling elements, a space between the neighboring two sensors as viewed along the aforementioned circumferential direction will be equal to ½ of arrangement pitch of the rolling elements. Thus, a force that acts on the wheel support bearing assembly or between a wheel and a road surface, as estimated by the estimator, may be more accurate because possible effects induced by temperature as well as possible effects due to slips—for example, slips between a knuckle surface and a flange surface—have been reduced.

In one embodiment of the present invention, a space between the neighboring fixation contact segments or a space between the neighboring sensors defined along a circumferential direction of an outer diametric surface of the stationary member is equal to or approximate to (½+n) times as much as arrangement pitch of the rolling elements, with n being an integer. In such a configuration, taking a difference between output signals of those sensors may avoid possible effects induced by temperature as well as possible effects due to slips—for example, slips between a knuckle surface and a flange surface.

In the present invention, the strain generator member may include a sheet plate having a general shape of a band or a band having a uniform width, and the sheet plate may have a side formed with a cutout therein. Such a configuration where the strain generator member includes a sheet plate having a general shape of a band that may have a uniform width, may provide for a more compact and inexpensive strain generator member.

In one embodiment of the present invention, the sensor units may be disposed on upper, lower, right and left parts, respectively, of an outer diametric surface of the stationary member. The upper and lower parts may correspond to vertical regions relative to a tire tread, and the right and left parts may correspond to horizontal regions relative to a tire tread. Such a configuration may enable more accurate estimation of load components of a plurality of directions. More specifically, a vertical load component $F_z$ and an axial load component $F_y$ may be estimated based on respective output signals of two sensor units disposed on the upper and lower parts of an outer diametric surface of the stationary member. A load component $F_x$ that may serve as a drive force or a brake force may be estimated based on respective output signals of two sensor units disposed on the right and left parts of an outer diametric surface of the stationary member.

In one embodiment of the present invention, the estimator may be configured to also use a sum of output signals of the at least two sensors to estimate a load that acts on the wheel support bearing assembly. A sum of output signals of the at least two sensors may cancel the effects of the positions of the rolling elements on the output signals of the at least two sensors, thus enabling estimation of a load even when the vehicle is not moving. In addition, a difference between output signals of the at least two sensors may avoid possible effects induced by temperature as well as possible effects due to slips—for example, slips between a knuckle surface and a flange surface. Cancellation of the effects of the positions of the rolling elements, combined with reduction of possible effects induced by temperature as well as possible effects due to slips, may enable more accurate determination of a load. Cancellation of the effects of the positions of the rolling elements may also allow avoiding the provision of a low-pass filter, thus improving the response speed.

In one embodiment of the present invention, the stationary member may include, at an outer periphery thereof, a flange that attaches to a knuckle to mount to the vehicle body, and a shape of the flange, as viewed on a front elevational view, may have line symmetry with respect to an imaginary line perpendicular to an axis of the wheel support bearing assembly or have point symmetry with respect to the axis. Such a configuration where the flange that mounts to the vehicle body has the aforementioned shape may allow for simplification of the shape of the stationary member. Such a configuration may also reduce or minimize variation in temperature distribution of the stationary member as well as variation in the degree of expansion and shrinkage of the stationary member, that may be caused by the complexity of the shape of the stationary member. This may enable the sensor units to, with the effects of those factors being reduced or minimized, sense strain induced by application of a load.

In one embodiment of the present invention, each of the sensor unit may include neighboring first, second and third fixation contact segments. The three fixation contact segments in the band-shaped strain generator body may be arranged at the same axial positions of an outer diametric surface of the stationary member and spaced from each other along a circumferential direction. The sensors of that sensor unit may include neighboring sensors, each mounted between the first and the second fixation contact segments and between the second and the third fixation contact segments—whereby that sensor unit may include three fixation contact segments and two sensors. A space between the neighboring fixation contact segments or a space between the neighboring sensors may be, as viewed along a circumferential direction of an outer diametric surface of the stationary member, equal to or approximate to ($\frac{1}{2}$+n) times as much as arrangement pitch of the rolling elements, with n being an integer. The estimator may be configured to estimate a load that acts on the wheel support bearing assembly, based on a difference between output signals of the two sensors.

In other words, the present invention may provide a sensor-equipped wheel support bearing assembly for rotatably supporting a wheel relative to a vehicle body. The wheel support bearing assembly includes an outer member having an inner periphery formed with a plurality of raceway surfaces, an inner member having an outer periphery formed with a plurality of raceway surfaces opposed to the raceway surfaces of the outer member, and a plurality of rows of rolling elements interposed between the raceway surfaces of the outer member and the raceway surfaces of the inner member. One of the outer member and the inner member serves as a stationary member. The sensor-equipped wheel support bearing assembly also includes a plurality of sensor units, each of which includes a strain generator member and at least two sensors mounted on the strain generator member to sense strain in the strain generator member. The strain generator member includes at least two fixation contact segments. The sensor-equipped wheel support bearing assembly also includes an estimator configured to estimate a load that acts on the wheel support bearing assembly, based on a difference between output signals of the at least two sensors. The strain generator members of the plurality of sensor units are formed of a single continuous band-shaped strain generator body joining the plurality of sensor units with each other. The sensor units may include a sensor unit neighboring including first, second and third fixation contact segments. The three fixation contact segments in the band-shaped strain generator body may be spaced from each other along a circumferential direction of an outer diametric surface of the stationary member and arranged at the same axial positions on an outer diametric surface of the stationary member. The sensors of that sensor unit may include neighboring sensors, each mounted between the first and the second fixation contact segments and between the second and the third fixation contact segments—whereby that sensor unit may include three fixation contact segments and two sensors. And a space between the neighboring fixation contact segments or a space between the neighboring sensors may be, as viewed along a circumferential direction of an outer diametric surface of the stationary member, equal to or approximate to ($\frac{1}{2}$+n) times as much as arrangement pitch of the rolling elements, with n being an integer.

In such a configuration, a difference between output signals of those two sensors may cancel possible effects induced by temperature as well as possible effects due to slips—for example, slips between a knuckle surface and a flange surface—on the output signals of those two sensors. This may enable accurate determination of a load that acts on the wheel support bearing assembly or between a tire of a wheel and a road surface, without being affected by possible effects induced by temperature as well as possible effects due to slips—for example, slips between a knuckle surface and a flange surface. Furthermore, the strain generator members of the plurality of sensor units are formed of a single continuous band-shaped strain generator body joining the plurality of sensor units with each other. This may not require a complex wiring operation, thus providing for wire connections with improved quality and enabling cost reduction.

In the present invention, a tubular protective cover surrounding an outer periphery of the stationary member and covering the plurality of sensor units may be provided, with the protective cover having opposite ends, one of which is fitted to an outer periphery of the stationary member and the other of which has an opening rim that includes an annular seal member, with the seal member including an elastic material, and with the seal member being in contact with a surface of the stationary member or with a surface of the other of the inner member and the outer member, the other serving as a rotational member. The stationary member may be the outer member, and the rotational member may be the inner member. The seal member may include a seal lip or an O-ring.

In such a configuration, a sensor assembly that may include the aforementioned plurality of sensor units may be covered with a protective cover. This may protect the plurality of sensor units from an external environment. For example, the sensors may be protected from the impingement of flying stones during the travel of a vehicle. In this way, possible failure of the sensor units due to an external environment may be avoided, thus ensuring a reliable determination of a load that acts on the wheel bearing assembly or on a tire tread for a longer period of time. Also, in such a configuration, a seal member integral with the protective cover may furnish the protective cover with a sealing function. This may prevent external contaminants such as dirt from entering into sensing environment, thus further ensuring the sensing capability for a longer period of time.

In one embodiment of the present invention, the protective cover may have an outboard end and an inboard end. The stationary member may include a flange. The outboard end of the protective cover may be fitted to an outer peripheral surface of the stationary member. The inboard end of the protective cover may have an opening rim that is provided with the annular seal member made of an elastic material and extending along the opening rim. And the seal member may be in contact with an outboard oriented side surface of the flange of the stationary member or with an outer peripheral surface of the stationary member. In such a configuration, too, the sensors may be covered with a protective cover. In this way, possible failure of the sensor units due to an external environment may be avoided, thus ensuring accurate determination of a load that acts on the wheel bearing assembly or on a tire tread for a longer period of time. For example, the sensor units may be reliably protected from external contaminants such as flying stones, dirt and salt water. In such a configuration, the protective cover may be installed by fitting an outboard end of the protective cover to an outer peripheral surface of the stationary member. This may make it easier to perform installation of the protective cover. Such a configuration may also make it easier to perform wire routing of a signal cable as well as installation of the sensor units, thus enabling cost reduction. In a configuration where the stationary member is the outer member, the protective cover may be installed by fitting it to an outer peripheral surface of the outer member. This may make it much easier to perform installation of the protective cover, thus facilitating the protection of the sensor units by the protective cover.

In such a case, the inboard end of the protective cover may include a hole through which a signal cable is drawn from the protective cover to form a signal cable drawn segment of the signal cable, and the wheel support bearing assembly may further include a seal material applied to portion(s) of the signal cable drawn segment that is/are located at the hole. This may ensure protection from water and dust at the signal cable drawn segment of the signal cable.

The outboard end of the protective cover may extend beyond the stationary member in an outboard direction such that the outboard end of the protective cover and the rotational member defines a non-contact seal gap therebetween. In such a configuration, a non-contact seal gap may provide sealing for a space between the protective cover and the rotational member. This may result in improved sealability without accompanying torque increase.

In such a case, the outboard end of the protective cover may have a shape that extends along the rotational member. Such a configuration may further improve sealability of a non-contact seal gap that may be defined between an outboard end of the protective cover and the rotational member.

In one embodiment of the present invention, the protective cover may have an outboard end and an inboard end. The stationary member may include a flange that mounts to the vehicle body. The inboard end of the protective cover may be fitted to an outer diametric surface of the flange. The outboard end of the protective cover may have an opening rim that includes the annular seal member. The seal member may extend along the opening rim. The seal member may include an elastic material, and the seal member may be in contact with an outer peripheral surface of the stationary member or with a surface of the other of the inner member and the outer member, with the other serving as a rotational member. In such a configuration, the protective cover may be installed by fitting an inboard end of the protective cover to an outer diametric surface of a flange of the stationary member, that mounts to the vehicle body. This may make it easier to perform installation of the protective cover. Also, with such a configuration where a seal member is integral with the protective cover, the protective cover and a seal such as the aforementioned seal member may not have to be separately installed, thus simplifying the installation of the seal member. In a configuration where the stationary member is the outer member, the protective cover may be installed by fitting it to an outer periphery of the outer member. This may make it much easier to perform installation of the protective cover, thus facilitating the protection of the sensors by the protective cover.

In such a case, the seal member may have a shape having a free end. The free end may have a diameter that gradually decreases in an outboard direction, and the seal member may be in contact with an outer peripheral surface of the stationary member. Such a configuration may further ensure the prevention of external contaminants such as dirt and salt water from entering into the protective cover from an outboard end of the protective cover.

The seal member may include the seal member includes a segment extending to and encompassing a portion of an outer peripheral surface of the protective cover to form a cover outer peripheral surface overlay portion. In a configuration where the seal member includes segment(s) integrated with an outer peripheral surface of the protective cover to form such an overlay portion on an outer peripheral surface of the protective cover, the overlay may extend in an inboard direction beyond an intended area of an outer peripheral surface of the protective cover to be integrated with the seal member, in order to ensure a sufficient strength of the seal member for such integration. In such a configuration, a wall of the overlay will be formed on an outer peripheral surface of the protective cover, at an outboard end of the protective cover. Such a wall may form a radially outward projection, which may prevent external contaminants such as dirt and salt water from flowing towards an area of an outer peripheral surface of the protective cover that is integral with the seal member. Such a configuration may further ensure the prevention of external contaminants such as dirt and salt water from entering into the protective cover.

In one embodiment of the present invention, an outer peripheral surface of the cover outer peripheral surface overlay portion of the seal member may form an inclined surface having a diameter that increases in an outboard direction. Such a configuration may prevent external contaminants such as dirt and salt water from flowing towards an area of an outer peripheral surface of the outer member with which the seal member is in contact, thus further ensuring the prevention of external contaminants such as dirt and salt water from entering into the protective cover.

In one embodiment of the present invention, the outboard end of the protective cover may extend beyond the stationary member in an outboard direction such that the outboard end of the protective cover and the rotational member defines a non-contact seal gap therebetween. The "non-contact seal gap" used herein refers to a narrow gap of size that can, while there is a relative rotation between the stationary member and the rotational member, block incoming external contaminants such as water. In such a configuration, the seal between the protective cover and the stationary member may form a double-seal structure that includes a seal lip contacting with an outer peripheral surface of the stationary member and a non-contact seal defined between an outboard end of the protective cover and the rotational member. This may provide a more reliable outboard seal, thus more reliably avoiding possible failure of sensors due to an external environment and enabling accurate determination of a load.

In one embodiment of the present invention, the rotational member may include a hub flange that mounts to a wheel. And the seal member may be in contact with an inboard oriented side surface of the hub flange. In such a configuration, the seal member may provide sealing for a space between the hub flange of the rotational member and an outboard end of the protective cover. This may ensure the prevention of external contaminants such as dirt and salt water from entering into the protective cover from an outboard end of the protective cover.

In one embodiment of the present invention, electronic components may be provided which include the sensor units, a signal processor IC configured to process output signals of the sensor units, and a signal cable configured to send the processed output signals to an outside of the wheel support bearing assembly, with the electronic components being connected with each other in a ring shape to form a sensor assembly, with the sensor assembly being mounted to an outer peripheral surface of the stationary member coaxially with the stationary member, and with the protective cover covering the sensor assembly. In such a configuration, the protective cover may cover the electronic components by covering the sensor assembly.

The present invention may provide a wheel support bearing assembly with in-wheel motor integration, which includes a sensor-equipped wheel support bearing assembly having any one of the aforementioned configurations. The effects or advantages of the present invention may be more powerful when a sensor-equipped wheel support bearing assembly according to the present invention is incorporated into a wheel support bearing assembly with in-wheel motor integration.

The present invention encompasses any combination of at least two features disclosed in the claims, the specification and/or the drawings. In particular, the present invention encompasses any combination of at least two claims.

BRIEF DESCRIPTION OF THE DRAWINGS

In any event, the present invention will become more clearly understood from the following description of embodiments thereof, when taken in conjunction with the accompanying drawings. However, the embodiments and the drawings are given only for the purpose of illustration and explanation, and are not to be taken as limiting the scope of the present invention in any way whatsoever, as defined by the appended claims. In the accompanying drawings, like reference numerals are used to denote like parts throughout the several views, and:

FIG. 2 is a cross sectional view of FIG. 1, taken along the line II-II in FIG. 1;

FIG. 13A is a developed plan view of an electronics complex for the sensor-equipped wheel support bearing assembly;

FIG. 13B is an enlarged plan view of a sensor unit of the electronics complex;

FIG. 49A is a developed plan view of one possible arrangement of sensor units with respect to a flexible circuit board in the sensor-equipped wheel support bearing assembly;

FIG. 49B is a cross sectional view of FIG. 49A, taken along the line XXXXIX-XXXXIX in FIG. 49A;

FIG. 50A is a developed plan view of another possible arrangement of sensor units with respect to a flexible circuit board in the sensor-equipped wheel support bearing assembly;

FIG. 50B is a cross sectional view of FIG. 50A, taken along the line XXXXX-XXXXX in FIG. 50A;

FIG. 51A is a developed plan view of yet another possible arrangement of sensor units with respect to a flexible circuit board in the sensor-equipped wheel support bearing assembly;

FIG. 51B is a cross sectional view of FIG. 51A, taken along the line XXXXXI-XXXXXI in FIG. 51A;

FIG. 59A is a side view of a circuitry securement stay in the sensor-equipped wheel support bearing assembly, showing how a signal cable may be fastened at the stay;

FIG. 59B is a longitudinal cross sectional view of FIG. 59A, taken along the line indicated by a symbol B;

FIG. 59C is a longitudinal cross sectional view of FIG. 59A, taken along the line indicated by a symbol C;

FIG. 59D is a longitudinal cross sectional view of FIG. 59A, taken along the line indicated by a symbol D;

FIG. 62 is a front elevational view of an outer member of the sensor-equipped wheel support bearing assembly, as viewed from an outboard direction;

FIG. 85 is a developed plan view, showing a construction of an electronics complex in a conventional apparatus;

FIG. 86A is a developed plan view, showing a construction of an electronics complex in another conventional apparatus;

FIG. 86B is a longitudinal cross sectional view of FIG. 86B;

DESCRIPTION OF THE EMBODIMENTS

The first embodiment of the present invention will now be described in connection with FIG. 1 to FIG. 10. In the following discussion, the first embodiment is applied to a wheel support bearing assembly of a third generation type, for rotatably supporting a drive wheel, in which an inner member serves as a rotational member. It is to be noted that hereinafter in this specification, terms "outboard" and "inboard" represent one side of the vehicle body away from the longitudinal center of the vehicle body and the other side of the vehicle body close to the longitudinal center of the vehicle body, respectively, when assembled in the vehicle body.

Figure 1:
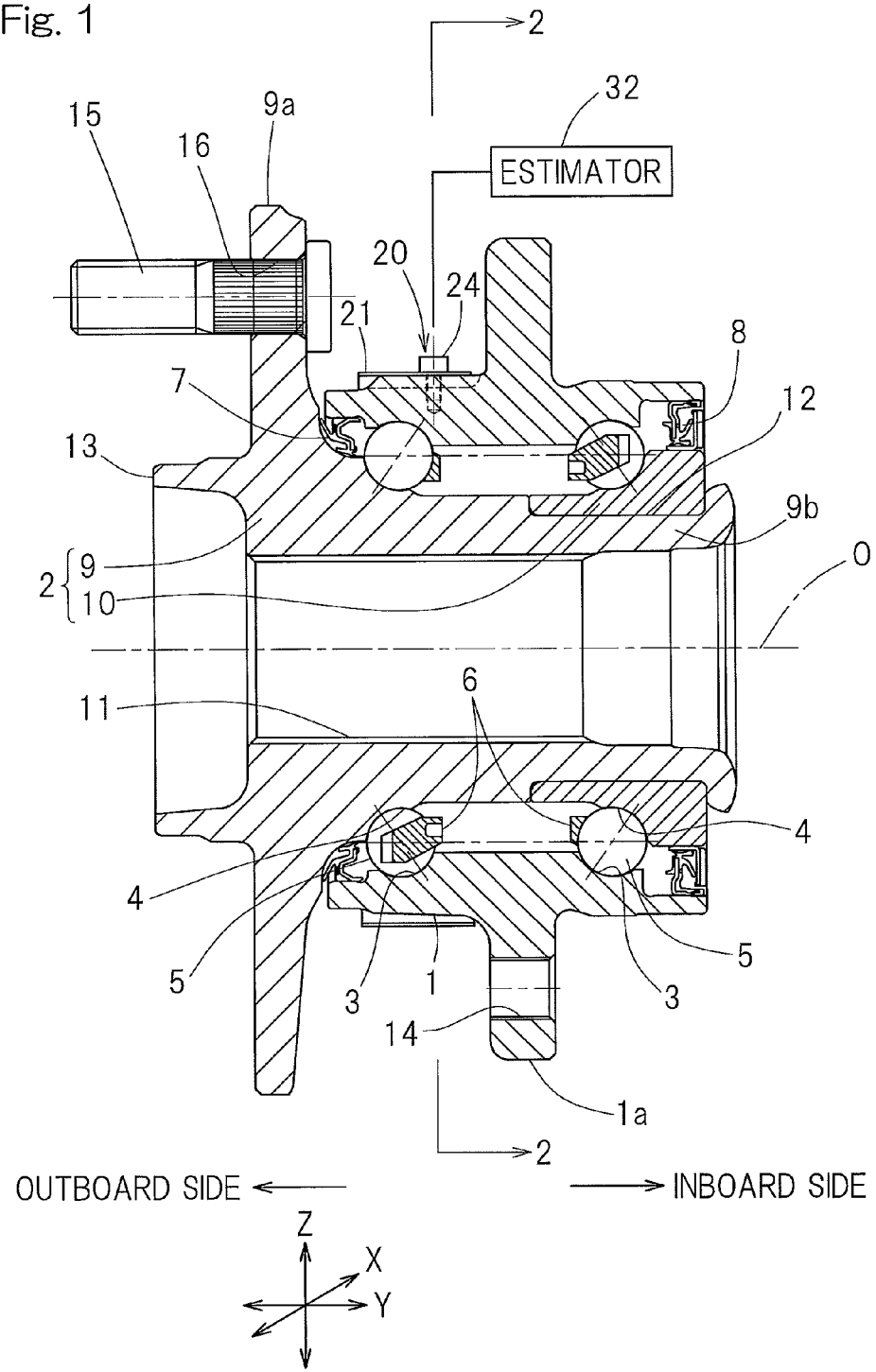
FIG. 1 illustrates a longitudinal cross sectional view of a sensor-equipped wheel support bearing assembly according to the first embodiment of the present invention, together with a block diagram of a schematic configuration of a sensing system for the sensor-equipped wheel support bearing assembly.
Figure 3:
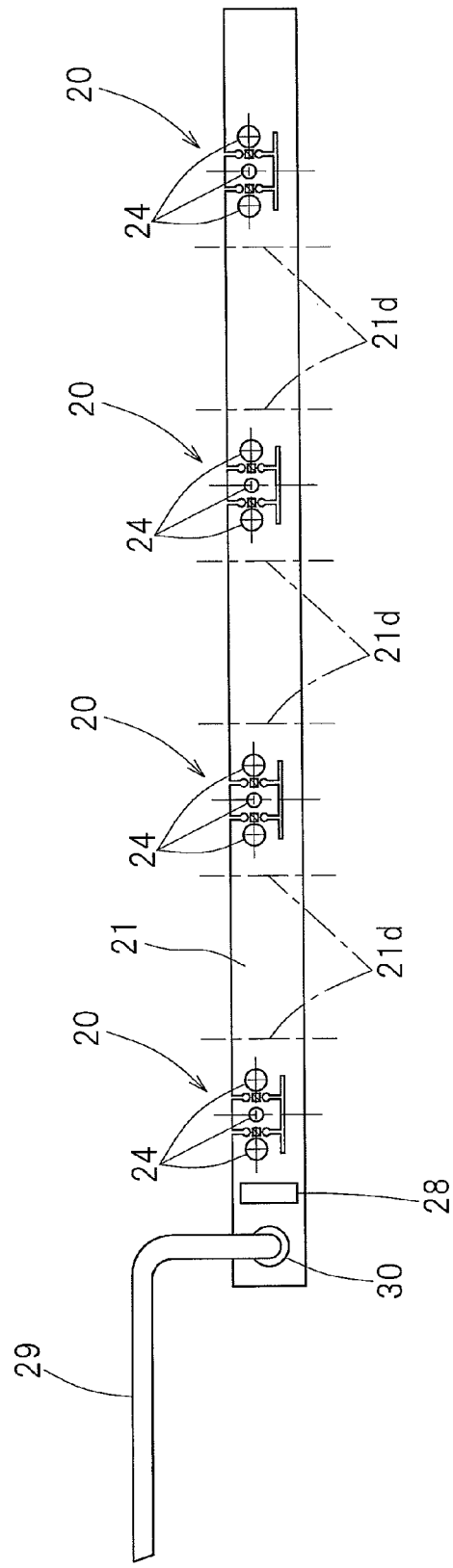
FIG. 3 is a developed plan view of an electronics complex for the sensor-equipped wheel support bearing assembly.

Referring to a longitudinal cross sectional view of FIG. 1, a sensor-equipped wheel support bearing assembly of the first embodiment provides a bearing structure that includes an outer member 1 having an inner periphery formed with a plurality of raceway surfaces 3, an inner member 2 having an outer periphery formed with a plurality of raceway surfaces 4 opposed to the raceway surfaces 3 of the outer member 1, and a plurality of rows of rolling elements 5 interposed between the raceway surfaces 3 of the outer member 1 and the raceway surfaces 4 of the inner member 2. The wheel support bearing assembly may be configured as a double-row angular contact ball bearing assembly as illustrated. The rolling elements 5 may be in the form of balls. Each row of the balls may be retained by a retainer 6. The raceway surfaces 3, 4 may have arcuate cross sections. The raceway surfaces 3, 4 may have respective contact angles held in back-to-back relation with each other. A pair of seal units 7, 8 may seal respective opposite ends of a bearing space defined between the outer member 1 and the inner member 2.

The outer member 1 may serve as a stationary member. The outer member 1 may be of one-piece construction that includes, on an outer periphery thereof, a flange 1a. The flange 1a may attach to a knuckle (not shown) of a suspension system associated with a vehicle body, to mount to the vehicle body. The flange 1a may have a plurality of circumferential locations formed therein with respective bolt holes 14 for attachment to the knuckle. The flange 1a may be attached to the knuckle by inserting knuckle bolts (not shown) into bolt insertion holes (not shown) formed in the knuckle, from an inboard side of the knuckle holes, and screwing the knuckle bolts in the bolt holes 14.

The inner member 2 may serve as a rotational member. The inner member 2 may include a hub unit 9 and an inner ring 10. The hub unit 9 may include a hub flange 9a that mounts to a wheel and may also include an axle portion 9b. The inner ring 10 may be mounted onto an outer periphery of the axle portion 9b at an inboard end of the axle portion 9b. The hub unit 9 and the inner ring 10 may be formed with the respective rows of the aforementioned raceway surfaces 4. The hub unit 9 has an inboard end, an outer periphery of which may be stepped to form a reduced diametric surface that defines an inner ring mount surface 12, to which the inner ring 10 may be fitted. The hub unit 9 has a center that may be formed therein with a through bore 11. The hub flange 9a may have a plurality of circumferential locations formed therein with respective holes 16 for force-fitting hub bolts 15. The hub unit 9 may also include a cylindrical pilot portion 13 protruding towards an outboard direction from a root of the hub flange 9a. The pilot portion 13 may guide a wheel (not shown) and brake components (not shown). The arrow O in the figures indicates an axis of the wheel support bearing assembly.

FIG. 2 is a cross sectional view of FIG. 1, taken along the line II-II in FIG. 1. In other words, FIG. 1 is a cross sectional view of FIG. 2, taken along the line I-I in FIG. 2. The vehicle body mounting flange 1a has a shape that may have, as viewed on a front elevational view, line symmetry with respect to an imaginary line (e.g., an imaginary vertical line LV or an imaginary horizontal line LH in FIG. 2) perpendicular to the axis O of the wheel support bearing assembly or may have, as viewed on a front elevational view, point symmetry with respect to the axis O. In the illustrated example, the vehicle body mounting flange 1a has a circular shape, as viewed on a front elevational view.

Four sensor units 20 may be disposed on an outer diametric surface of the outer member 1, when the outer member 1 serves as a stationary member. In the illustrated example, the sensor units 20 are disposed on upper, lower, right and left parts, respectively, of an outer diametric surface of the outer member 1, with the upper and lower parts corresponding to vertical regions relative to a tire tread and with the right and left parts corresponding to horizontal regions relative to a tire tread.

Figure 4:
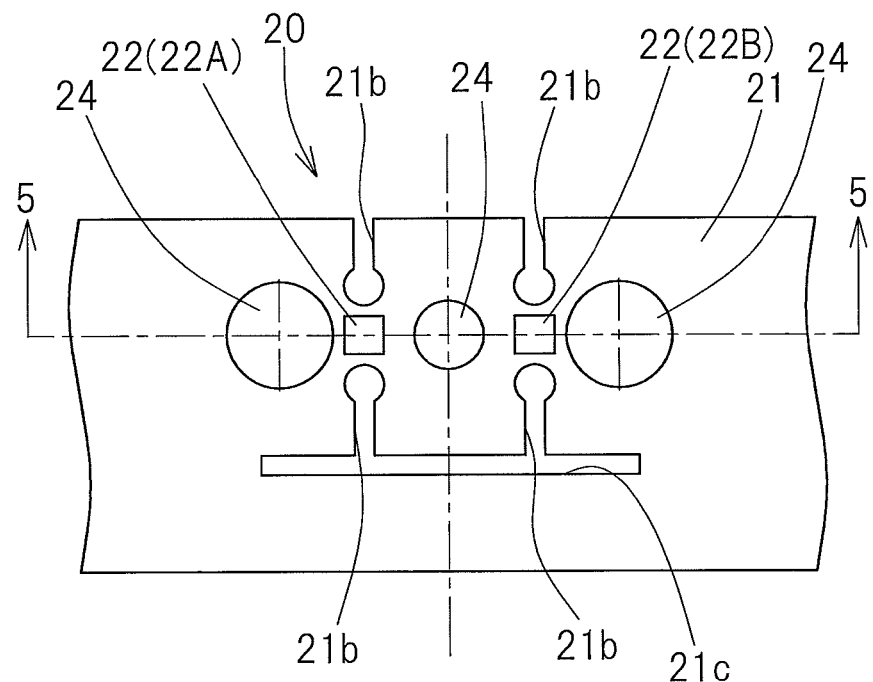
FIG. 4 is an enlarged plan view of a sensor unit for the electronics complex.
Figure 5:
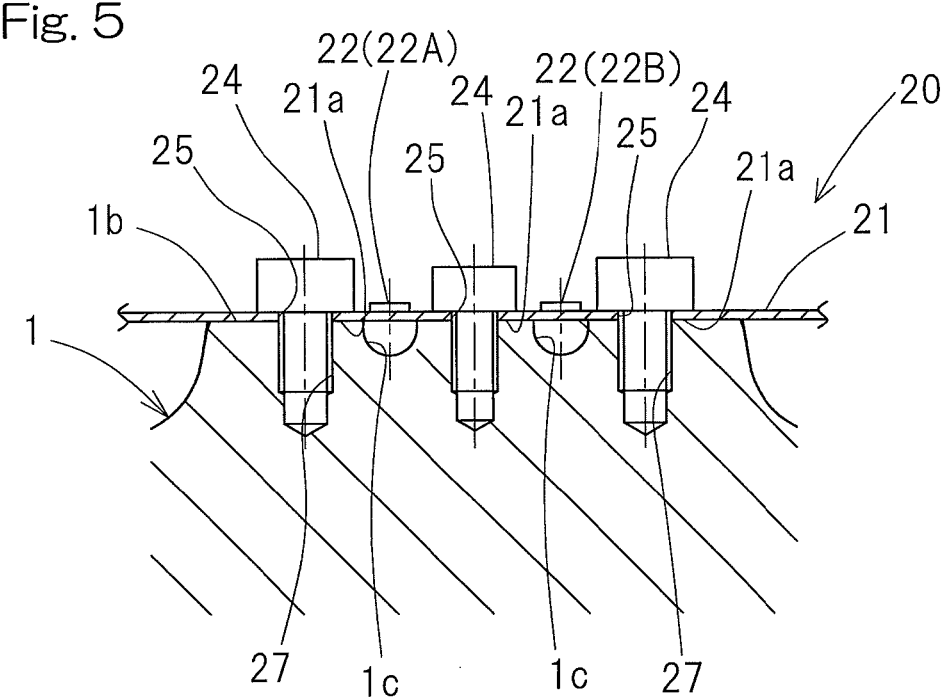
FIG. 5 is a cross sectional view of FIG. 4, taken along the line V-V in FIG. 4.

Referring to an enlarged plan view of FIG. 4 and to an enlarged longitudinal cross sectional view of FIG. 5, each of the sensor units 20 may include a strain generator member 21 and at least two strain sensors 22 (in the illustrated example, two sensors (22A, 22B)) mounted on the strain generator member 21 to sense strain in the strain generator member 21. As shown in a developed plan view of FIG. 3, the strain generator members 21 of the sensor units 20 may be formed of a single band-shaped strain generator body continuously joining the sensor units with each other. The sheet plate may be in the form of a thin sheet plate member made of an elastically deformable metal such as steel and having a thickness of 2 mm or smaller. The sheet plate has a general shape of a band that has a uniform width along a length of the sheet plate and has a side formed with a cutout therein. Two of such a cutout 21b, that may be in the form of slits extending in a widthwise direction of the sheet plate and parallel to each other, may be formed in each of opposite sides of the sheet plate. In the illustrated example, the cutouts 21b on one of the opposite sides of the strain generator member 21 extend in a widthwise direction of the sheet plate to directly open at the edge of the corresponding side. On the other hand, the cutouts 21b on the other of the opposite sides of the strain generator member 21, which also extend in a widthwise direction of the sheet plate, branch from a slit 21c that is formed so as to extend in a longitudinal direction of the strain generator member 21. A cutout 21b may have a corner that may have an arcuate cross sectional shape.

The strain generator member 21 may include, for each position of the sensor units 20, at least two fixation contact segments (in the illustrated example, three fixation contact segments) 21a that may be fixedly in contact with an outer diametric surface of the outer member 1. The illustrated three fixation contact segments 21a (FIG. 5) may be aligned in a row along a longitudinal direction of the strain generator member 21.

The illustrated two strain sensors 22 (22A, 22B) may be affixed on the strain generator member 21 at locations where larger strain occurs in response to application of load components of various directions. In particular, the illustrated two sensors 22 (22A, 22B) may be placed on an outer face of the strain generator member 21 such that each of them is arranged between neighboring fixation contact segments 21a. More specifically, as shown in FIG. 5, one strain sensor 22A may be arranged between a left end fixation contact segment 21a and a central fixation contact segment 21a while the other strain sensor 22B may be arranged between the central fixation contact segment 21a and a right end fixation contact segment 21a. As shown in FIG. 4, the cutouts 21b may be formed in each of the opposite sides of the strain generator member 21 at locations corresponding to the illustrated two strain sensors 22A, 22B. In this way, the strain sensors 22 may sense strain along a longitudinal direction of the strain generator member 21 that occurs in the vicinity of the cutouts 21b. Preferably, the strain generator member 21 does not plastically deform even when a maximum possible external force is applied to the outer member 1 (i.e., a stationary member) and/or when a maximum possible force acts between a tire of a wheel and a road surface. This is because a strain generator member 21, if plastically deformed, may be unable to transmit the deformation of the outer member 1 to the sensor units 20. This may have undesirable effects on strain measurement.

Referring to FIG. 5, for each of the sensor units 20, the illustrated three fixation contact segments 21a of the corresponding strain generator member 21 may be arranged at respective positions with respect to axial direction of the outer member 1 and spaced from each other along a circumferential direction of an outer diametric surface of the outer member 1. Those fixation contact segments 21a may be fixed with a fastener in the form of a bolt 24 to an outer diametric surface of the outer member 1. The outer member 1 has an outer diametric surface that may include a flat segment 1b with which those fixation contact segments 21a may be fixedly in contact. This may enable a sensor unit 20 to be fixed with increased stability to an outer diametric surface of the outer member 1. Each of the bolts 24 may be inserted into a bolt insertion radial through hole 25 that may be formed in each of those fixation contact segments 21a, and may be screwed into the corresponding one of bolt holes 27 that may be formed in an outer periphery of the outer member 1. The outer diametric surface may be formed therein with grooves 1c. The grooves 1c may be formed at respective centers between the locations in the outer diametric surface of the outer member 1 with which the illustrated three fixation contact segments 21a may be fixedly in contact.

By fixing, in the aforementioned manner, fixation contact segments 21a to an outer diametric surface of the outer member 1, the portions of the sheet plate of the strain generator member 21 where the cutouts 21b are formed may be separated a distance from an outer diametric surface of the outer member 1. This may facilitate, in the vicinity of the cutouts 21b, strain-induced deformation of the strain generator member 21. In the illustrated example, the fixation contact segments 21a are positioned on respective axial locations that are in the vicinity of an outboard side raceway surface 3 of the outer member 1. The vicinity of an outboard side raceway surface 3 of the outer member 1 used herein refers to an area accommodating an outboard side raceway surface 3 itself and extending to the center between an inboard side raceway surface 3 and the outboard side raceway surface 3.

Figure 6:
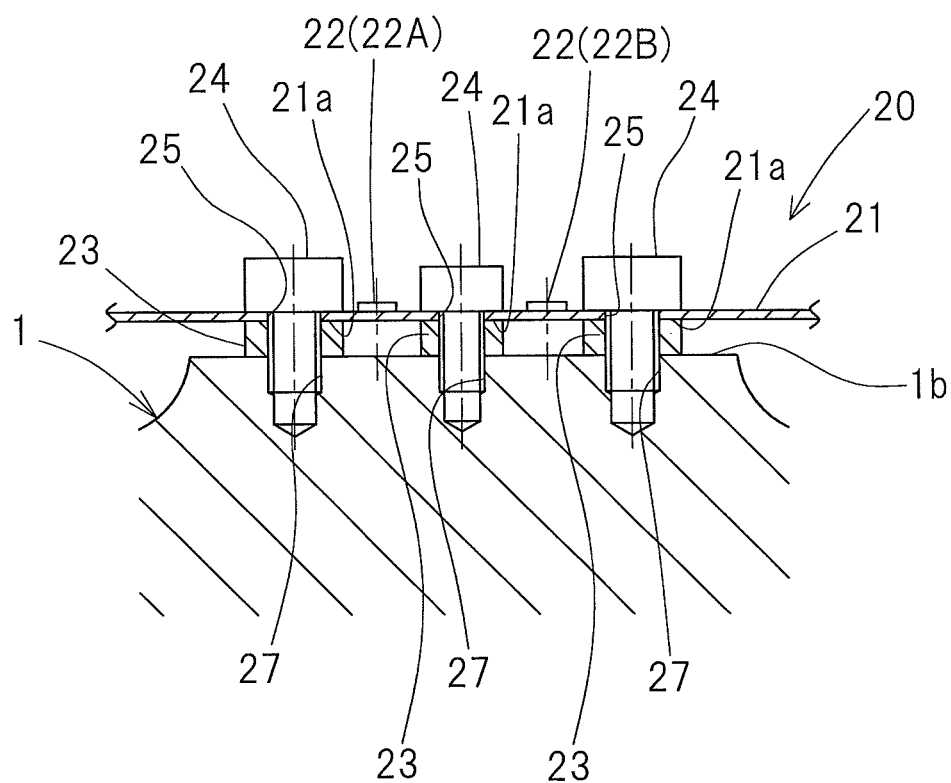
FIG. 6 is a longitudinal cross sectional view showing another example of how a sensor unit may be installed.

Referring to a longitudinal cross sectional view of FIG. 6, in a variant, each of the illustrated three fixation contact segments 21a of a strain generator member 21 may be fixedly in contact, through a spacer 23 and using a bolt 24, with an outer diametric surface of the outer member 1. With such a configuration, too, the portions of the strain generator member 21 where the cutouts 21b are formed may be separated a distance from an outer diametric surface of the outer member 1. In this way, grooves 1c (FIG. 5) formed in an outer diametric surface of the outer member 1 may be omitted.

Various types of strain sensors 22 (22A, 22B) may be used. For example, the stain sensors 22 (22A, 22B) may include a metal foil strain gauge. In such a case, the strain sensors 22 (22A, 22B) are typically glued or fixedly adhered to the strain generator member 21. The strain sensors 22 (22A, 22B) may include a thick film resistor formed on the strain generator member 21.

Referring to FIG. 2, the strain generator members 21 of the illustrated four sensor units 20 in the form of a single continuous band-shaped strain generator body that joins the four sensor units 20 with each other may have bent portions 21d bent in a certain direction, at a plurality of locations (in the illustrated example six locations) that corresponds to the respective intermediate portions between neighboring sensor units 20 and may be mounted to the outer member 1 so as to surround an outer periphery of the outer member 1. A signal processor IC 28, a signal cable 29, and a connector 30 connecting the signal processor IC 28 with the signal cable 29 may be provided in the strain generator members 21. The signal processor IC 28 may be configured to process output signals of the strain sensors 22 of each of the sensor units 20. The signal cable 29 may be configured to send the processed output signals to an outside of the wheel support bearing assembly. Each of the strain sensors 22 in each of the illustrated four sensor units 20 may be connected to the signal processor IC 28 via a wiring circuit pattern (not shown) that may be provided on the stain generator member 21.

In this way, the illustrated four sensor units 20, the strain generator members 21 that are integrally formed to continuously join the four sensor units 20 with each other and additional components that may be mounted to the strain generator members 21—including the signal processor IC 28, the signal cable 29 and the connector 30—may be combined integrally to form a single electronics complex or sensor assembly 31. This may enable such a single, combined sensor assembly 31 to be installed to an outer diametric surface of the outer member 1, during a process of constructing a sensor-equipped wheel support bearing assembly.

Output signals of the two illustrated strain sensors 22A, 22B in each of the sensor units 20 may be inputted, through the signal processor IC 28 and the signal cable 29, to the estimator 32 that may be included in the vehicle body. The estimator 32 may be configured to estimate, based on output signals of the illustrated two strain sensors 22A, 22B of sensor unit(s) 20, a force (e.g., a vertical load component $F_z$, a load component $F_x$ that may serve as a drive force or a brake force, and/or an axial load component $F_y$) that acts on the wheel support bearing assembly or between a wheel and a road surface (i.e., a tire tread). In the embodiment under discussion, the estimator 32 may estimate respective force components $F_z$, $F_x$, $F_y$ based on a difference between output signals of two strain sensors 22A, 22B (in a particular example, amplitude value of those output signals). The estimator 32 may include a relation definer (not shown) that defines a relationship between a difference between output signals of two strain sensors 22A, 22B and a vertical load component $F_z$, a load component $F_x$ that may serve as a drive force or a brake force, and/or an axial load component $F_y$. Such a relationship may be defined by an equation and/or a table. The estimator 32 may use the relation definer to estimate the aforementioned acting force (e.g., a vertical load component $F_z$, a load component $F_x$ that may serve as a drive force or a brake force, and/or an axial load component $F_y$), based on a difference between output signals of two strain sensors 22A, 22B. The content in the relation definer may be determined in advance through tests and/or simulations.

The information that may be used by the estimator 32 is not limited to the aforementioned difference between output signals. For example, the estimator 32 may use information including a sum, an average value, an amplitude value and/or an amplitude center value of output signals of two strain sensors 22A, 22B. The estimator 32 may appropriately use such information, for example, in a linearly combined manner, to estimate respective force components $F_z$, $F_x$, $F_y$. In such a case, too, the estimator 32 may use a relation definer that may define a relationship between the aforementioned information including, for example, a sum and/or an average value and respective force components $F_z$, $F_x$, $F_y$ by an equation and/or a table.

Figure 7:
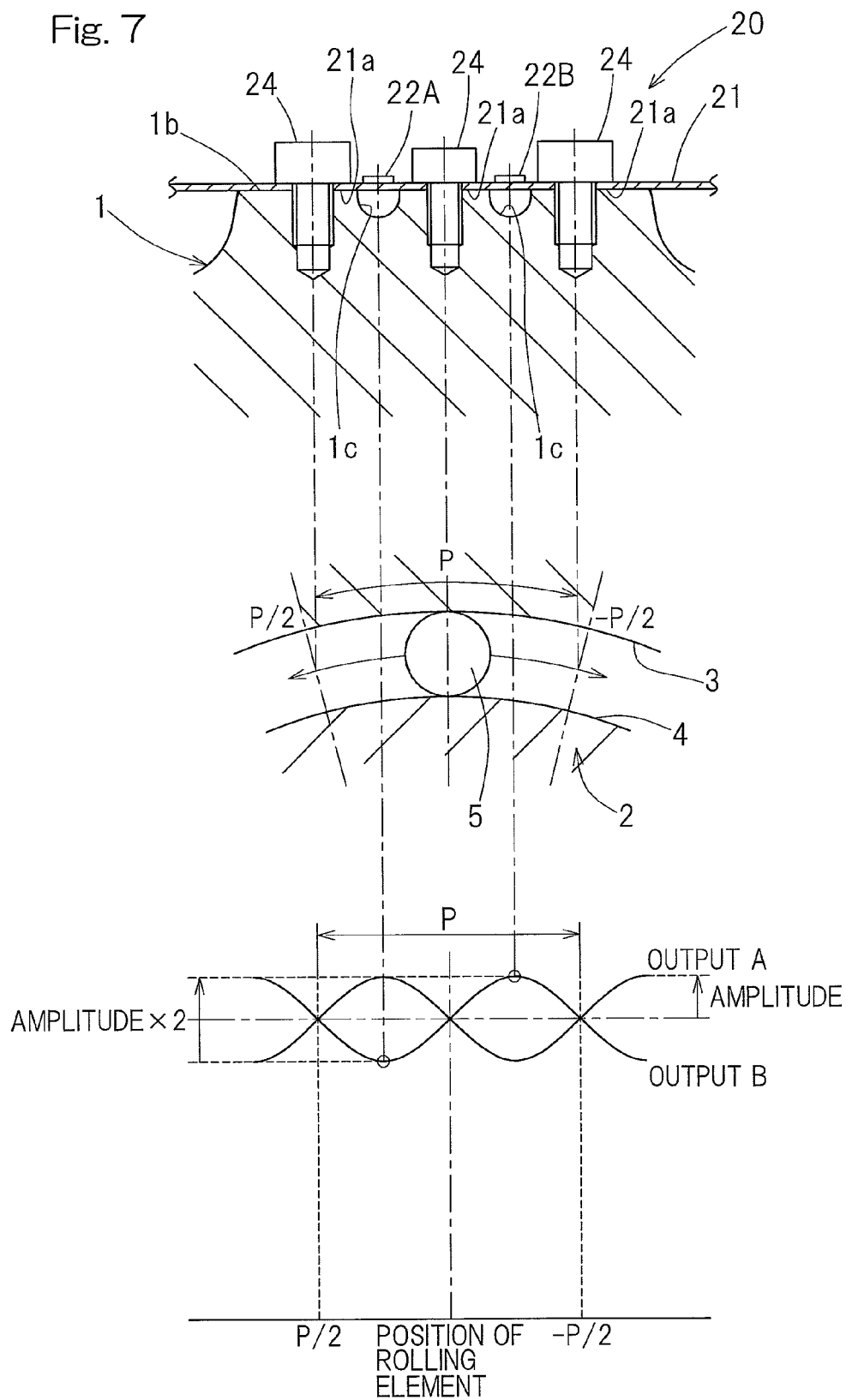
FIG. 7 is a set of explanatory views of the effects of the positions of rolling elements on the output signal of a sensor unit.

A sensor unit 20 may be positioned on an axial location that is in the vicinity of an outboard side raceway surface 3 of the outer member 1. In such a case, output signals of strain sensors 22A, 22B may be affected by the rolling elements 5 passing by the vicinity of the location of the corresponding sensor unit 20, as shown in FIG. 7. Even when there is no rotation in the wheel support bearing assembly, output signals A, B of the respective strain sensors 22A, 22B may be affected by the position of the rolling elements 5. Specifically, the output signals A, B of strain sensors 22A, 22B of a sensor unit 20 may reach a maximum value when a rolling element 5 is taking or passing by the closest position with respect to the strain sensors 22A, 22B. The output signals A, B may decrease as that rolling element 5 moves away from such a position or when that rolling element 5 is remote from such a position. When there is rotation in the wheel support bearing assembly, successive passing-by of the rolling elements 5 with a predetermined arrangement pitch P in the vicinity of the location of a sensor unit 20 may cause strain sensors 22A, 22B to produce output signals A, B having a periodically changing sinusoidal-like waveform such as indicated by the solid lines in FIG. 7, having one period corresponding to the arrangement pitch P of the rolling elements 5. The output signals A, B of strain sensors 22A, 22B may also be affected by possible effects induced by temperature as well as possible hysteresis induced by slips—for example, slips between a surface of a knuckle and a surface of the vehicle body mounting flange 1a (FIG. 1).

In the embodiment under discussion, a difference between output signals A, B of two strain sensors 22A, 22B may be processed through computational processing, to enable estimation of a force (e.g., a vertical load component $F_z$, a load component $F_x$ that may serve as a drive force or a brake force, and/or an axial load component $F_y$) that acts on the wheel support bearing assembly or between a wheel and a road surface (i.e., on a tire tread). In this way, possible effects induced by temperature as well as possible effects due to slips—for example, slips between a knuckle surface and a flange surface—on the output signals A, B of those two sensors 22A, 22B may be cancelled. This may enable accurate determination of a load that acts on the wheel support bearing assembly or on a tire tread.

Computational processing of a difference between output signals of strain sensors will now be described. Computational processing that may be used to process such a difference or differential signal to determine an amplitude value of the differential signal or a value that corresponds to the amplitude value may include determining a peak value of an absolute value |A−B|. The absolute value |A−B| may be calculated by an analog computational circuitry or may be calculated through digital computation. Where there is rotation, the absolute value |A−B| may have a waveform similar to a half-wave rectified waveform. Thus, a peak value of the absolute value |A−B| may be held or the absolute value |A−B| may be filtered by a low-pass filter (i.e., LPF) to obtain a DC component of the absolute value |A−B|, in order to determine a value that corresponds to an amplitude value of the differential signal. An effective value (i.e., root mean square value) of the differential signal (A−B) may be computed, and the effective value may be used as the value that corresponds to the amplitude value, for estimation of a load. The aforementioned digital computation may include determining a maximum value and a minimum value of the differential signal within time interval equal to or greater than at least one period of oscillation of the differential signal to calculate the value that corresponds to the amplitude value.

Referring to FIG. 7 which is intended to explain the effects of the positions of rolling elements on the output signal of a sensor unit having an exemplary configuration as shown in FIG. 5, a space between two fixation contact segments 21a positioned at opposite ends of the row of three fixation contact segments 21a arranged in a circumferential direction of an outer diametric surface of the outer member 1 (i.e., a stationary member) may be equal to arrangement pitch P of the rolling elements 5. In such a case, a space between two strain sensors 22A, 22B arranged at respective centers between the neighboring fixation contact segments 21a as viewed along the aforementioned circumferential direction will be substantially equal to ½ of arrangement pitch P of the rolling elements 5. In such a case, output signals A, B of these two strain sensors 22A, 22B have substantially 180° of phase difference from each other. Hence, a difference between output signals of these two sensors may adequately cancel possible effects induced by temperature as well as possible effects due to slips—for example, slips between a knuckle surface and a flange surface—on the output signals of those two sensors. Thus, a force (e.g., a vertical load component $F_z$, a load component $F_x$ that may serve as a drive force or a brake force, and/or an axial load component $F_y$) that acts on the wheel support bearing assembly or between a wheel and a road surface (i.e, on a tire tread), as estimated by the estimator 32 (FIG. 1), may more effectively avoid possible effects induced by temperature as well as possible effects due to slips—for example, slips between a knuckle surface and a flange surface, thus producing more accurate estimate.

Figure 8:
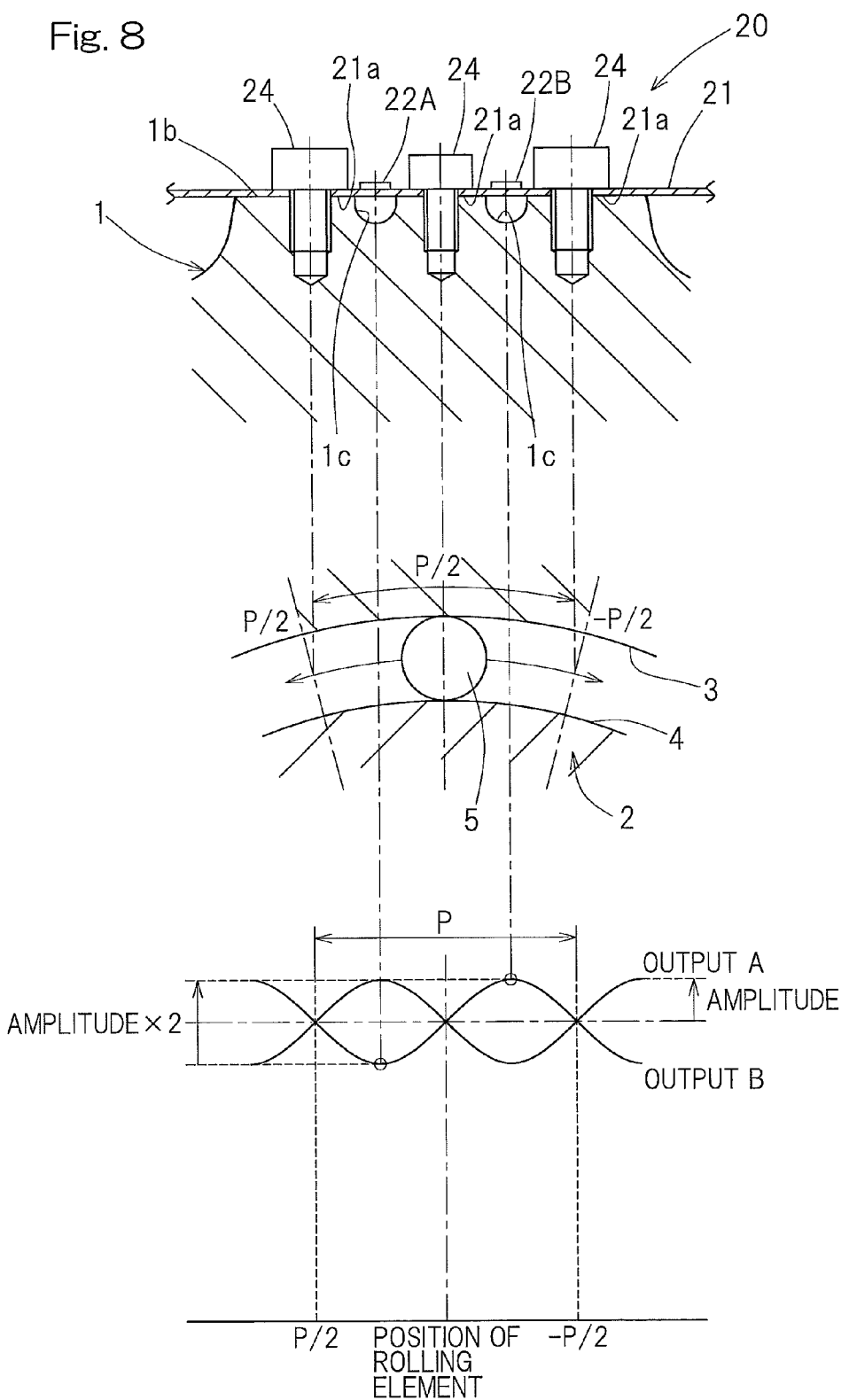
FIG. 8 is another set of explanatory views of the effects of the positions of rolling elements on the output signal of a sensor unit.

Referring to FIG. 8 which shows a variant of the exemplary configuration of a sensor unit 20 of FIG. 5, a space between the two illustrated strain sensors 22A, 22B along the aforementioned circumferential direction may be ½ of arrangement pitch P of the rolling elements 5. In this example, a space between the illustrated two strain sensors 22A, 22B along the aforementioned circumferential direction will be equal to ½ of arrangement pitch P of the rolling elements 5. In such a case, output signals A, B of these two strain sensors 22A, 22B have 180° of phase difference from each other. Hence, a difference between output signals of these two sensors may completely cancel possible effects induced by temperature as well as possible effects due to slips—for example, slips between a knuckle surface and a flange surface—on the output signals of those two sensors. Thus, a force (e.g., a vertical load component $F_z$, a load component $F_x$ that may serve as a drive force or a brake force, and/or an axial load component $F_y$) that acts on the wheel support bearing assembly or between a wheel and a road surface (i.e, on a tire tread), as estimated by the estimator 32 (FIG. 1), may more effectively avoid possible effects induced by temperature as well as possible effects due to slips—for example, slips between a knuckle surface and a flange surface. Note that a space between the illustrated two strain sensors 22A, 22B along the aforementioned circumferential direction may be equal to or approximate to (½+n) times as much as arrangement pitch P of the rolling elements 5, with n being an integer. In such a case, a difference between output signals A, B of those two sensors 22A, 22B may cancel possible effects induced by temperature as well as possible effects due to slips—for example, slips between a knuckle surface and a flange surface.

Figure 9:
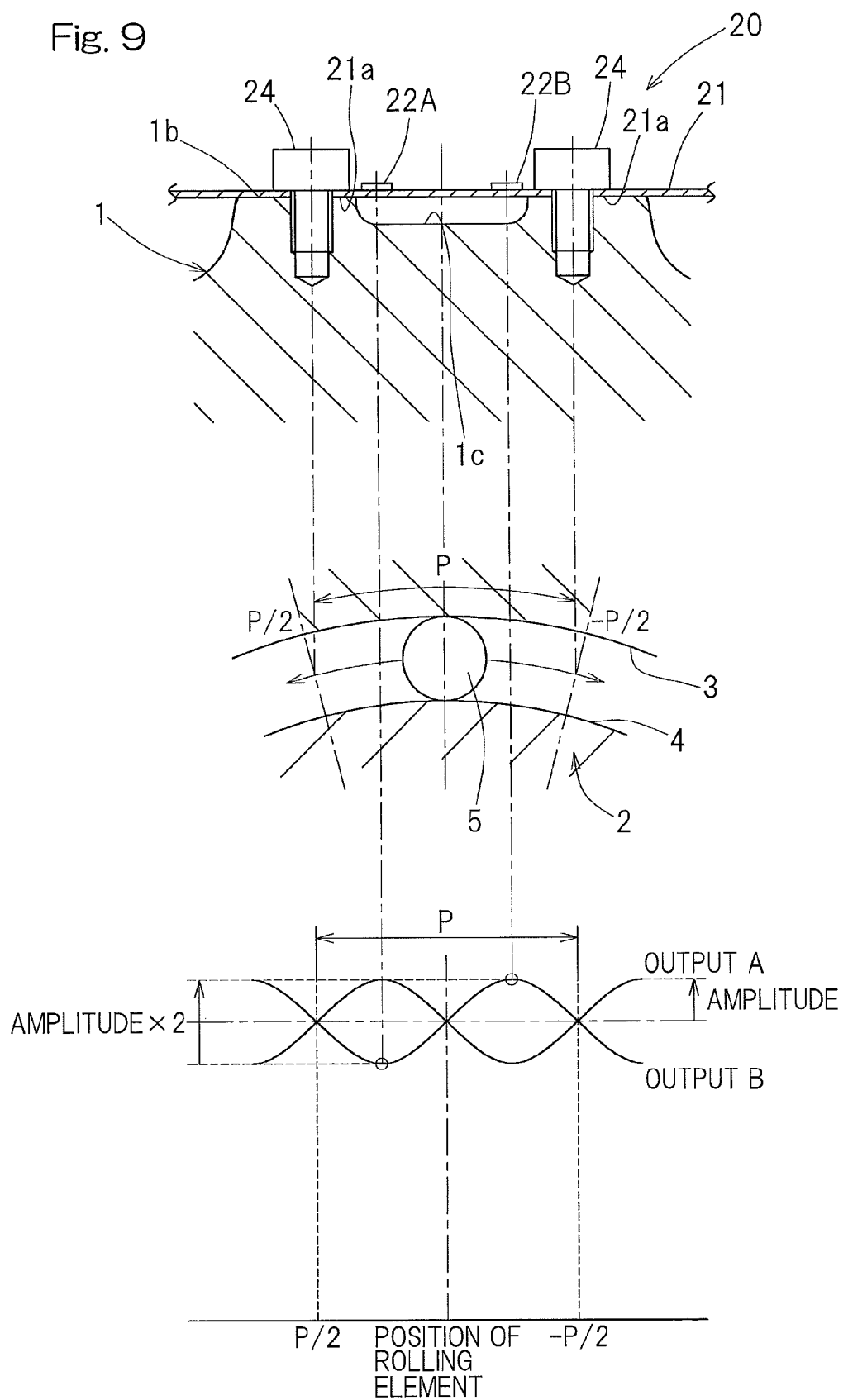
FIG. 9 is yet another set of explanatory views of the effects of the positions of rolling elements on the output signal of a sensor unit.

Referring to FIG. 9 which shows another variant of the exemplary configuration of a sensor unit 20 of FIG. 5, the central fixation contact segment 21a has been omitted, thereby leaving two fixation contact segments 21a. As is the case with the example of FIG. 7, a space between the two fixation contact segments 21a along the aforementioned circumferential direction may be equal to arrangement pitch P of the rolling elements 5. In such a case, a space between the illustrated two strain sensors 22A, 22B arranged between the two fixation contact segments 21a along the aforementioned circumferential direction, will be substantially equal to ½ of arrangement pitch P of the rolling elements 5. In such a case, output signals A, B of these two strain sensors 22A, 22B have substantially 180° of phase difference from each other. Hence, a difference between output signals A, B of these two sensors 22A, 22B may adequately cancel possible effects induced by temperature as well as possible effects due to slips—for example, slips between a knuckle surface and a flange surface—on the output signals A, B of those two sensors 22A, 22B. Thus, a force (e.g., a vertical load component $F_z$, a load component $F_x$ that may serve as a drive force or a brake force, and/or an axial load component $F_y$) that acts on the wheel support bearing assembly or between a wheel and a road surface (i.e, on a tire tread), as estimated by the estimator 32 (FIG. 1), may more effectively avoid possible effects induced by temperature as well as possible effects due to slips—for example, slips between a knuckle surface and a flange surface, thus producing more accurate estimate.

Figure 10:
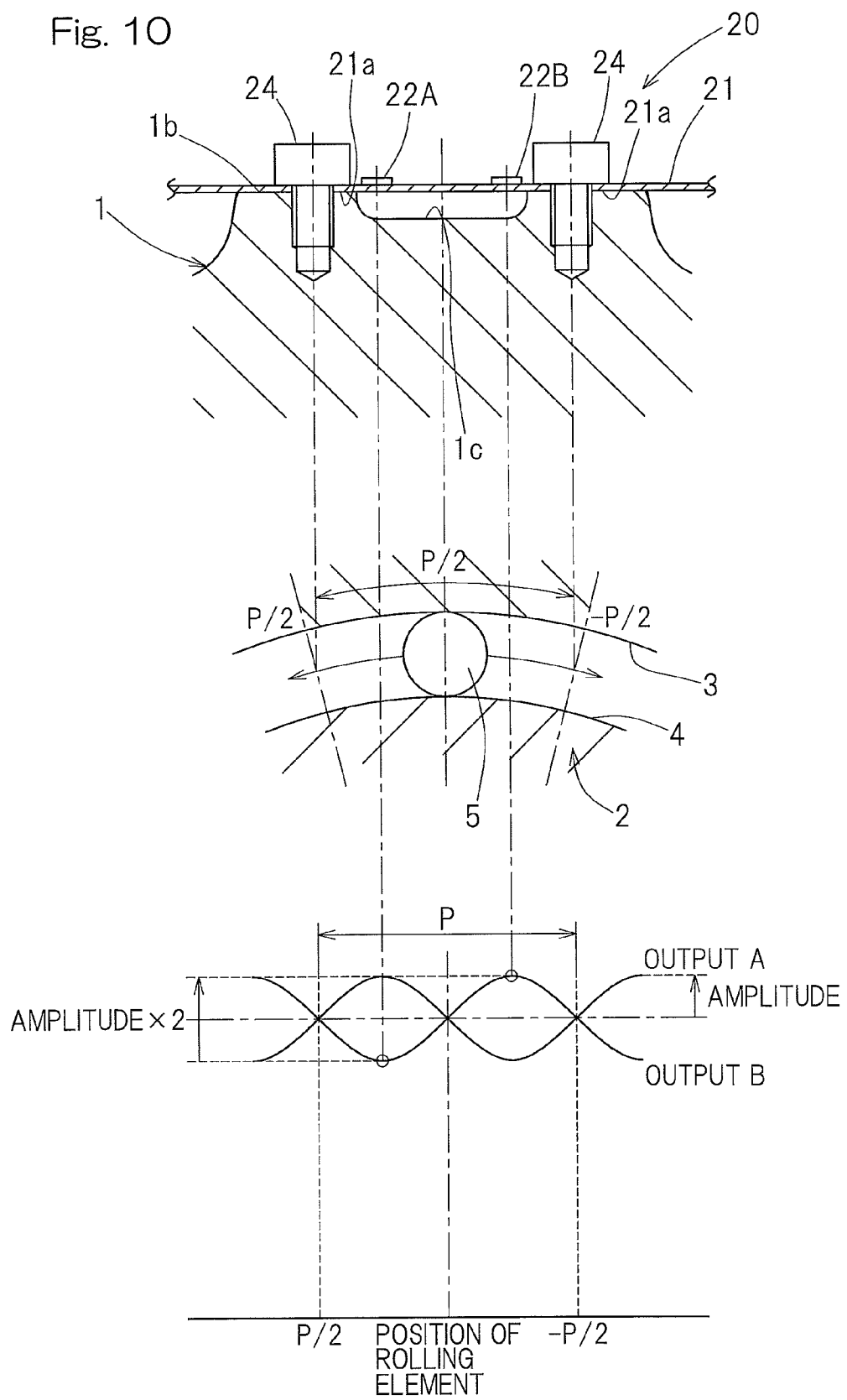
FIG. 10 is yet another set of explanatory views of the effects of the positions of rolling elements on the output signal of a sensor unit.

Referring to FIG. 10 which shows a variant of the exemplary configuration of a sensor unit 20 of FIG. 9, a space between the illustrated two strain sensors 22A, 22B along the aforementioned circumferential direction may be equal to ½ of arrangement pitch P of the rolling elements 5. As is the case with the example of FIG. 8, output signals A, B of these two strain sensors 22A, 22B will be 180° out of phase from each other. Hence, a difference between output signals A, B of these two sensors 22A, 22B may completely cancel possible effects induced by temperature as well as possible effects due to slips—for example, slips between a knuckle surface and a flange surface—on the output signals A, B of those two sensors 22A, 22B. Thus, a force (e.g., a vertical load component $F_z$, a load component $F_x$ that may serve as a drive force or a brake force, and/or an axial load component $F_y$) that acts on the wheel support bearing assembly or between a wheel and a road surface (i.e, on a tire tread), as estimated by the estimator 32 (FIG. 1), may more effectively avoid possible effects induced by temperature as well as possible effects due to slips—for example, slips between a knuckle surface and a flange surface.

Note that a space between the illustrated two strain sensors 22A, 22B along the aforementioned circumferential direction may be equal to or approximate to (½+n) times as much as arrangement pitch P of the rolling elements 5, with n being an integer. In such a case, too, a difference between output signals A, B of those two sensors 22A, 22B may cancel possible effects induced by temperature as well as possible effects due to slips—for example, slips between a knuckle surface and a flange surface.

Also note that, in the example of FIG. 7 or FIG. 8, a space between two neighboring fixation contact segments 21a along the aforementioned circumferential direction may be equal to or approximate to (½+n) times as much as arrangement pitch P of the rolling elements 5, with n being an integer. In such a case, too, a difference between output signals A, B of two neighboring sensors 22A, 22B may cancel possible effects induced by temperature as well as possible effects due to slips—for example, slips between a knuckle surface and a flange surface.

A load may act on the wheel support bearing assembly or between a tire of a wheel and a road surface. This will cause a load to be applied to the outer member 1 (i.e., a stationary member) of the wheel support bearing assembly, thus, in turn, causing deformation of the outer member 1. A sensor unit 20 may include a strain generator member 21 having cutout(s) 21b, and the strain generator member 21 may have fixation contact segments 21a—that may be three fixation contact segments 21a—which are fixedly in contact with the outer member 1. Thus, strain in the outer member 1 may be transmitted to the strain generator member 21 in amplified form. Such strain can be sensed by strain sensors 22A, 22B with enhanced sensitivity, with output signals of the strain sensors 22A, 22B being used to determine a load. A vertical load component $F_z$ and an axial load component $F_y$ may be estimated based on respective output signals of two sensor units 20 disposed on the upper and lower parts of an outer diametric surface of the outer member 1. A load component $F_x$ that may serve as a drive force or a brake force may be estimated based on respective output signals of two sensor units 20 disposed on the right and left parts of an outer diametric surface of the outer member 1.

Here, output signals A, B of strain sensors 22A, 22B of a sensor unit 20 may be affected by possible effects induced by temperature as well as possible effects due to slips—for example, slips between a knuckle surface and a flange surface. To address this, the estimator 32 may estimate a load (e.g., a vertical load component $F_z$, a load component $F_x$ that may serve as a drive force or a brake force, and/or an axial load component $F_y$) that acts on the wheel support bearing assembly or between a tire of a wheel and a road surface, based on a difference between those two output signals. This may avoid possible effects induced by temperature as well as possible effects due to slips—for example, slips between a knuckle surface and a flange surface, thus enabling accurate determination of a load.

Furthermore, in a sensor-equipped wheel support bearing assembly having any one of the aforementioned configurations, the strain generator members 21 of a plurality of sensor units 20 are formed of a single band-shaped strain generator body continuously joining the plurality of sensor units 20 with each other. This may not require a complex wiring operation, thus providing for wire connections with improved quality and enabling cost reduction.

In the embodiment under discussion, the strain generator members 21 of the structure as illustrated above, may have, along a longitudinal length thereof, a plurality of portions each bent to form a bent portion 21d, and may be fixed to the outer member 1 (i.e., a stationary member). Such a configuration may make it easier to mount the strain generator members 21 to the outer member 1.

If the fixation contact segments 21a of a sensor unit 20 fixedly in contact with an outer diametric surface of the outer member 1 (i.e., a stationary member) are not arranged at same axial positions on an outer diametric surface of the outer member 1, different strain may be transmitted from an outer diametric surface of the outer member 1 to the strain generator member 21 through the fixation contact segments 21a. In the embodiment under discussion, the fixation contact segments 21a of a sensor unit 20 are arranged at the same axial positions on an outer diametric surface of the outer member 1. This may facilitate concentration of strain in the strain generator member 21, thus resulting in a corresponding improvement in the sensitivity with which strain may be sensed.

In the embodiment under discussion, the strain generator member 21 of a sensor unit 20 may include a sheet plate having a general shape of a band or a band having a uniform width, and the sheet plate may have side(s) formed with cutout(s) 21b therein. This may facilitate transmission of a strain in the outer member 1 to the strain generator member 21 in amplified form. Such a strain can be sensed by strain sensors 22A, 22B with enhanced sensitivity. Furthermore, possible hysteresis that may appear in output signals A, B may be reduced, thus enabling accurate determination of a load. This may also result in a simplified shape of the strain generator member 21, thus allowing for the provision of a more compact and inexpensive strain generator member 21.

A strain generator member 21 may have cutout(s) 21b having a corner that has an arcuate cross sectional shape. This may prevent undesirable concentration of strain at a corner of a cutout 21b, thus reducing the possibility of plastic deformation of a strain generator member 21. Preventing undesirable concentration of strain at a corner of a cutout 21b may, in turn, reduce or minimize a variation of strain generated across a segment (i.e., a sensing segment) of the strain generator member 21 where strain sensors 22A, 22B may be mounted. This may reduce or minimize possible effects of the positions of the strain sensors 22A, 22B on output signals A, B of the strain sensors 22A, 22B, thus enabling more accurate determination of a load.

As such, a sensor-equipped wheel support bearing assembly having any one of the aforementioned configurations may provide a load estimate which, when used for vehicle control of an automotive vehicle, may help achieve stable travel of the automotive vehicle. Also, with such a sensor-equipped wheel support bearing assembly, a load sensor system with reduced size may be equipped to a vehicle. Furthermore, such a sensor-equipped wheel support bearing assembly may be more suitable for mass production, thus enabling cost reduction.

In the embodiment under discussion, as shown in FIG. 2, the vehicle body mounting flange 1a of the outer member 1 (i.e., a stationary member) may have a shape that has, as viewed on a front elevational view, line symmetry with respect to an imaginary line (e.g., an imaginary vertical line LV and/or an imaginary horizontal line LH in FIG. 2) perpendicular to an axis O of the wheel support bearing assembly or has, as viewed on a front elevational view, point symmetry with respect to the axis O (in a particular example, a circular shape). Such a configuration where the flange 1a that mounts to the vehicle body has the aforementioned shape may allow for simplification of the flange 1a of the outer member 1. Such a configuration may also reduce or minimize variation in temperature distribution of the outer member 1 as well as variation in the degree of expansion and shrinkage of the outer member 1, that may be caused by the complexity of the shape of the outer member 1 (i.e., a stationary member). This may enable the sensor units to, with the effects of those factors being reduced or minimized, sense strain induced by application of a load.

In the embodiment under discussion, a sensor unit 20 may be located at an axial location that is in vicinity of an outboard-row raceway 3—out of a plurality of raceway surfaces 3—of the outer member 1. Such a location may provide for a relatively large installation space and may also cause a relatively large deformation in response to a force that is applied to a tire and is transmitted via the rolling elements 5 to the outer member 1. This may enhance the sensitivity with which a strain may be sensed, thus enabling more accurate determination of a load.

In the embodiment under discussion, sensor units 20 may be disposed on upper, lower, right and left parts, respectively, of an outer diametric surface of the outer member 1 (i.e., a stationary member). This may enable more accurate determination of a load, regardless of various loading conditions. For example, when there is increase in a load component along a given direction, sensor units 20 may be disposed with 180° difference in mounting phase angle between each other, thus aligning themselves in that direction. In this way, a load will be transmitted to at least one of those sensor units 20 via the rolling elements 5 and the outer member 1. A portion of a raceway surface 3 that is in contact with a rolling element 5 and a portion of a raceway surface 3 that is not in contact with a rolling element 5 will generate a phase difference of 180° in output signals of strain sensors 22A, 22B. Hence, such a load component along that particular given direction can be sensed by the strain sensors 22A, 22B.

In the embodiment under discussion, the estimator 32 may estimate a load that acts on the wheel support bearing assembly, based on a difference between output signals A, B of at least two strain sensors 22A, 22B. In addition to this, the estimator 32 may also use a sum of output signals A, B of the at least two sensors 22A, 22B to estimate a load that acts on the wheel support bearing assembly. A sum of output signals A, B of the at least two sensors 22A, 22B may cancel the effects of the positions of the rolling elements 5 on the output signals A, B of the at least two sensors 22A, 22B. In addition, a difference between output signals A, B of the at least two sensors 22A, 22B may avoid possible effects induced by temperature as well as possible effects due to slips—for example, slips between a knuckle surface and a flange surface. Cancellation of the effects of the positions of the rolling elements 5, combined with reduction of possible effects induced by temperature as well as possible effects due to slips, may enable more accurate determination of a load.

Figure 11:
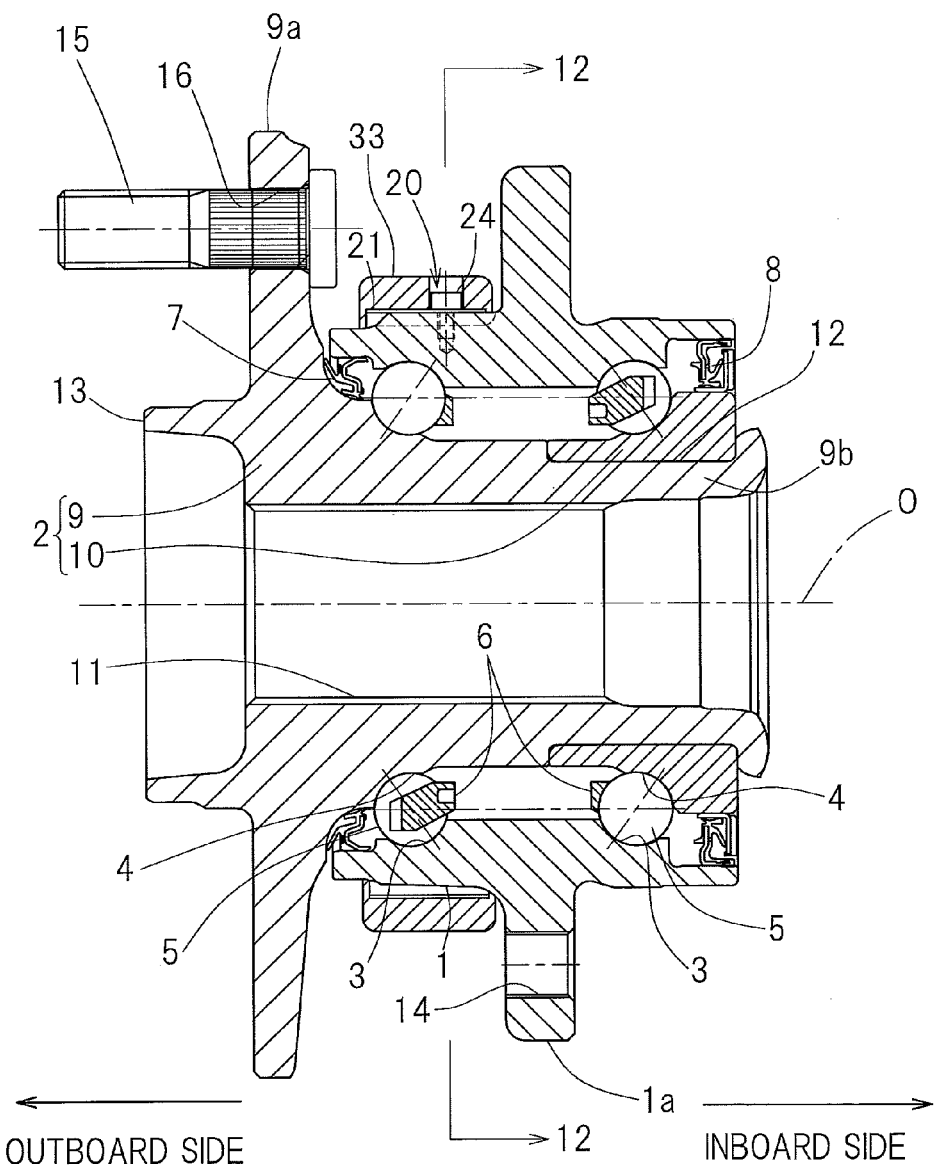
FIG. 11 is a longitudinal cross sectional view of a sensor-equipped wheel support bearing assembly according to the second embodiment of the present invention.
Figure 12:
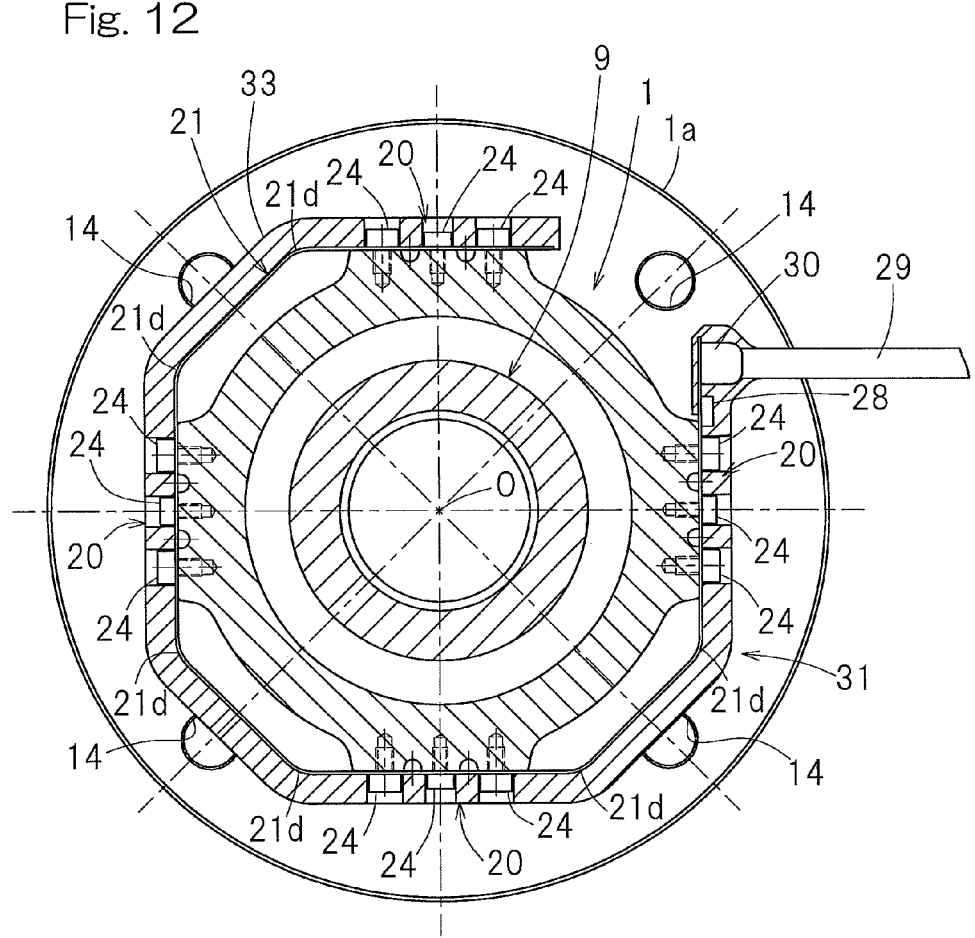
FIG. 12 is a cross sectional view of FIG. 11, taken along the line XII-XII in FIG. 11.

FIG. 11 to FIGS. 13A and 13B show the second embodiment of the present invention. FIG. 11 shows a longitudinal cross sectional view of a sensor-equipped wheel support bearing assembly according to the second embodiment, and FIG. 12 shows a cross sectional view of FIG. 11, taken along the line XII-XII in FIG. 11. Note that, for illustration purposes, an estimator 32 is not shown in FIG. 11. A sensor-equipped wheel support bearing assembly according to the second embodiment may differ from a sensor-equipped wheel support bearing assembly according to the first embodiment that is described in connection with FIG. 1 to FIG. 10, in that the strain generator members 21 formed by a single band-shaped strain generator body continuously joining the illustrated four sensor units 20 with each other may be coated with a mold material 33 made of an elastic material. The rest of the features in the second embodiment are the same as those of the first embodiment that is described in connection with FIG. 1 to FIG. 10.

Referring to FIG. 13A that shows a developed plan view of a sensor assembly 31, the strain generator members 21 having the illustrated four sensor units 20 are provided with a signal processor IC 28, a signal cable 29, and a connector 30 to form the sensor assembly 31. In FIG. 13A, portion(s) of the strain generator members 21 coated with a mold material 33 is/are hatched. As shown in FIG. 12, the strain generator members 21 may have, along a longitudinal direction thereof, a plurality of portions each bent to form a bent portion 21d, and the strain generator members 21 may be fixed to an outer diametric surface of the outer member 1. The mold material 33 that coats the strain generator members 21 may include an elastic material which does not hinder the bending of the strain generator members 21. Such an elastic material may be rubber material. Examples of rubber mold material may include nitrile rubber, hydrogenated nitrile rubber (H-NBR), acrylic rubber, fluorinated rubber, and silicone rubber. A surface segment of the strain generator members 21 that is in contact with the outer member 1 and/or a surface segment of the strain generator members 21 that is in contact with the bolt(s) 24 may not be coated with the mold material 33 that may include an elastic material, because such a coating of the mold material 33 may have undesirable effects on sensing of strain.

Thus, in the embodiment under discussion, the strain generator members 21 in the form of the single band-shaped strain generator body continuously joining the four sensor units 20, may be coated with a mold material 33 made of an elastic material. Such a configuration may prevent corrosion of strain sensors 22 of sensor units 20 that may be caused by contaminants such as dirt from an external environment. This may allow for providing a highly reliable sensor-equipped wheel support bearing assembly.

Figure 14:
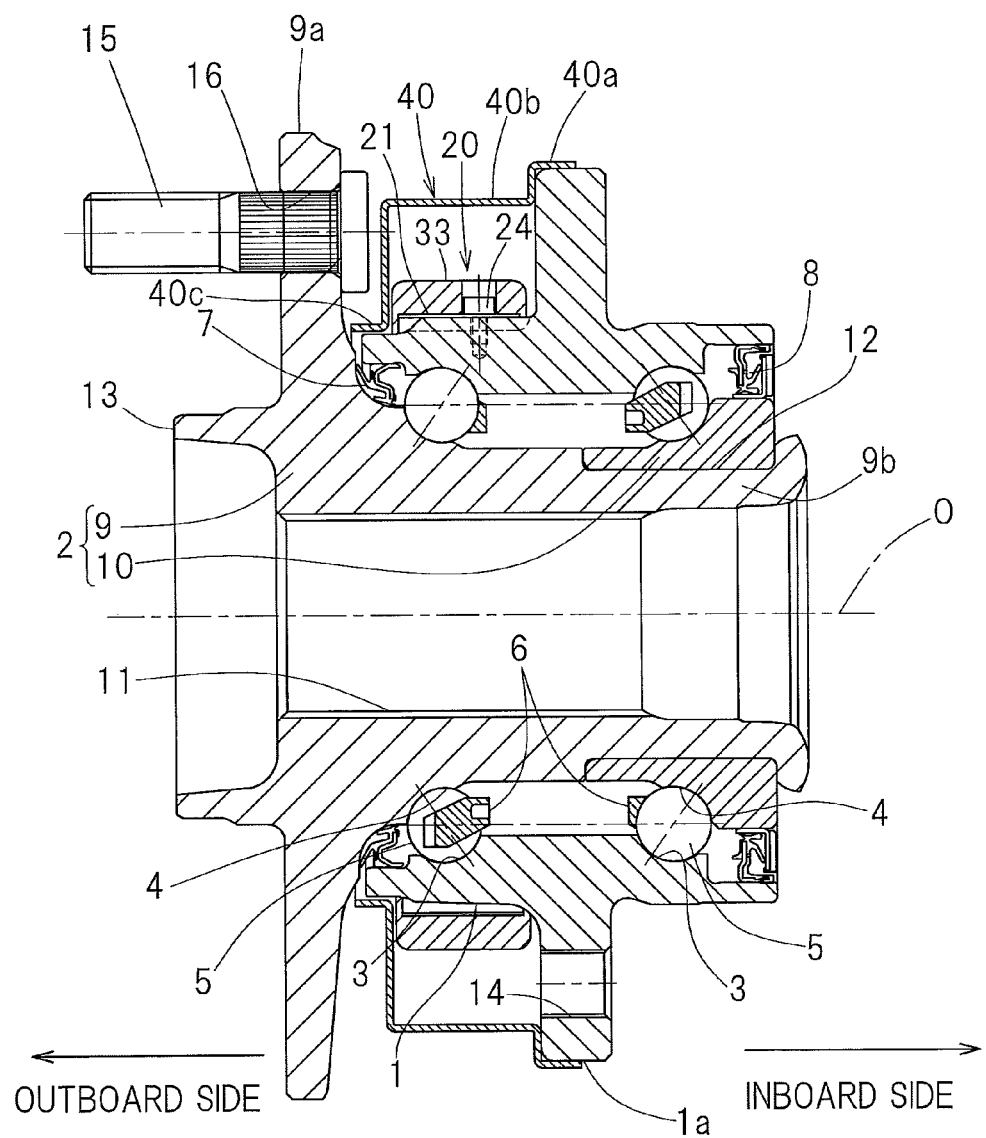
FIG. 14 is a longitudinal cross sectional view of a sensor-equipped wheel support bearing assembly according to the third embodiment of the present invention.
Figure 15:
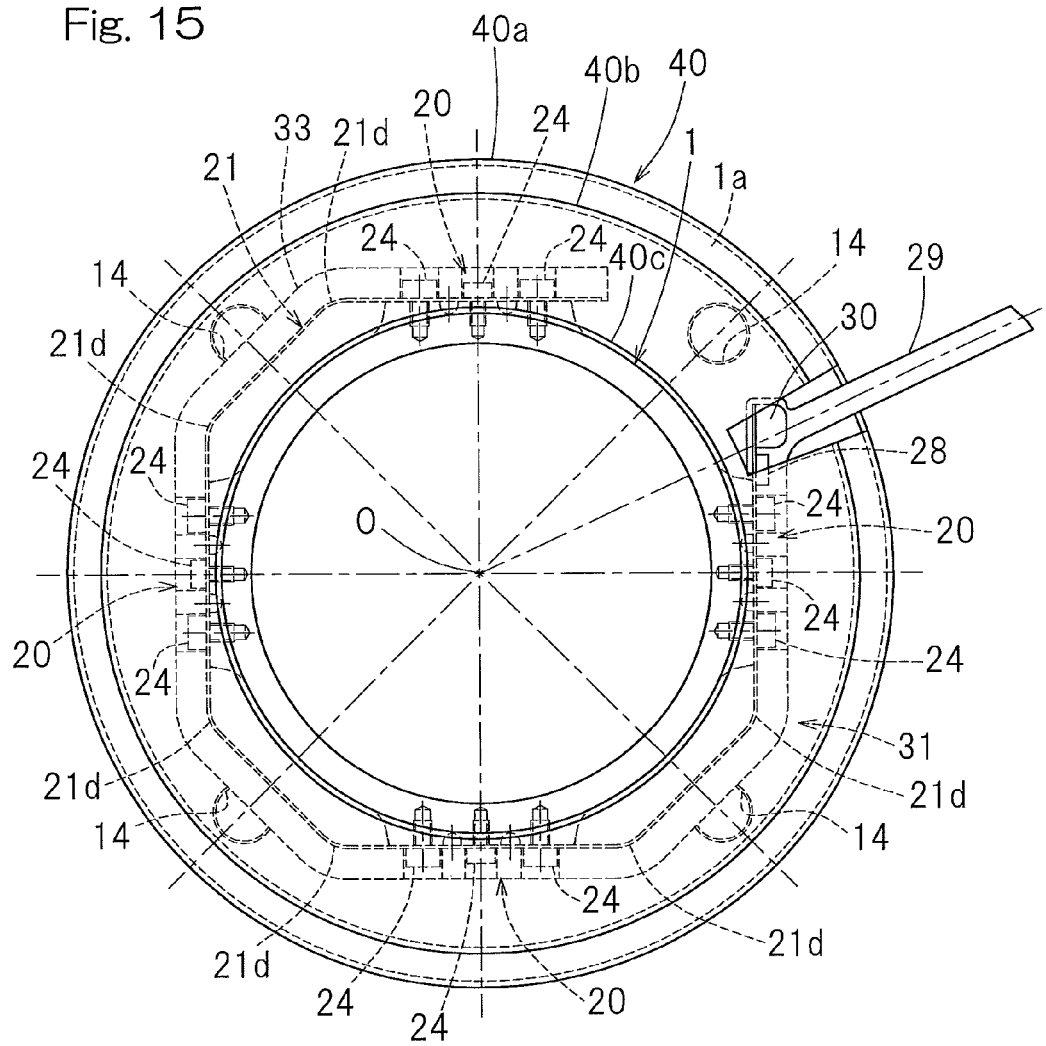
FIG. 15 is a front elevational view of an outer member of the sensor-equipped wheel support bearing assembly, as viewed from an outboard direction.
Figure 16:
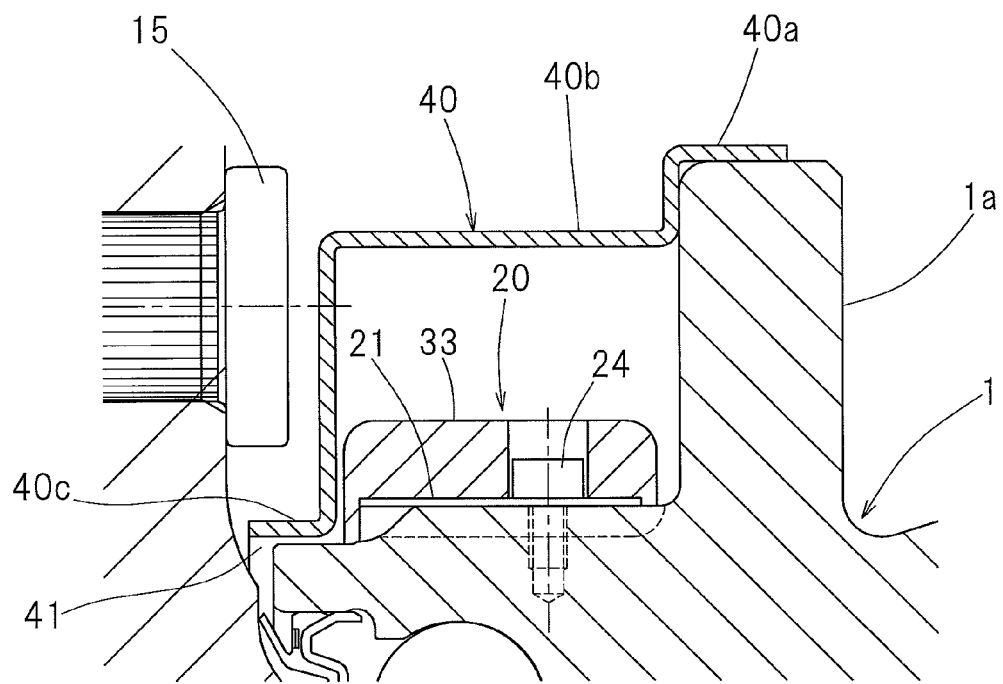
FIG. 16 is an enlarged longitudinal cross sectional view of a portion of the sensor-equipped wheel support bearing assembly where a protective cover is mounted.
Figure 17:
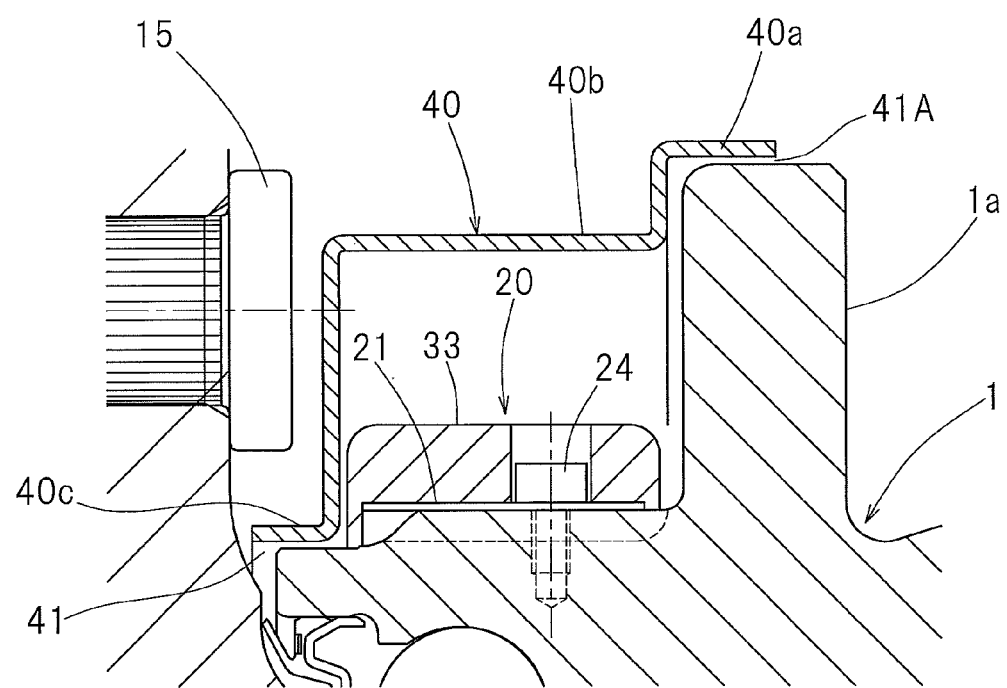
FIG. 17 is an enlarged longitudinal cross sectional view of a variant of a mounting configuration of a protective cover in the sensor-equipped wheel support bearing assembly.

FIG. 14 to FIG. 17 show the third embodiment of the present invention. FIG. 14 shows a longitudinal cross sectional view of a sensor-equipped wheel support bearing assembly according to the third embodiment of the present invention. FIG. 15 is a front elevational view of an outer member of a sensor-equipped wheel support bearing assembly according to the third embodiment, as viewed from an outboard side. It is to be noted that, for illustration purposes, an estimator 32 is not shown in FIG. 14. A sensor-equipped wheel support bearing assembly according to the third embodiment may differ from a sensor-equipped wheel support bearing assembly according to the second embodiment that is described in connection with FIG. 11 to FIGS. 13A and 13B, in that a tubular protective cover 40 covering the illustrated four sensor units 20 may be provided, with the protective cover 40 being fitted to an outer diametric surface of the outer member 1 (i.e., a stationary member). The rest of the features in the third embodiment are the same as those of the second embodiment that is described in connection with FIG. 11 to FIGS. 13A and 13B.

The protective cover 40 may be in the form of a stepped cylinder that has an inboard side portion including a larger diameter segment 40a and an outboard half including a smaller diameter segment 40b. The protective cover 40 has an inboard end that may be fitted to an outer diametric surface of the vehicle body mounting flange 1a. The protective cover 40 has an outboard end that may extend beyond an outboard end of the outer member 1 in an outboard direction to form a tubular portion 40c. The tubular portion 40c may be associated with an outer diametric surface of the outer member 1 at an outboard end of the outer member 1 in such a way that there is a play between the tubular portion 40c and the associated outer diametric surface to form a narrow gap therebetween. In this way, as shown in an enlarged longitudinal cross sectional view of FIG. 16, at an outboard end of the outer member 1, an outer diametric surface of the outer member 1 and the protective cover 40 may define a labyrinth seal 41 therebetween.

Such a configuration in which a labyrinth seal 41 is defined at an end where the protective cover 40 is not fitted, may prevent contaminants such as dirt from entering into the protective cover 40. In a variant such as shown in an enlarged longitudinal cross sectional view of FIG. 17, an outboard end of the protective cover 40 may be fitted to an outer diametric surface of the outer member 1 at an outboard end of the outer member 1, while an inboard end of the protective cover 40 may be associated with an outer diametric surface of the vehicle body mounting flange 1a in such a way that there is a play between the inboard end of the protective cover 40 and the associated outer diametric surface of the flange 1a to form a narrow gap therebetween. In such a case, an outer diametric surface of the vehicle body mounting flange 1a and the protective cover 40 may cooperatively define a labyrinth seal 41A therebetween. Examples of material for the protective cover 40 may include a pressed product of anti-corrosive steel plate. The steel plate may be a stainless steel plate. This may prevent corrosion of the protective cover 40 due to an external environment. The protective cover 40 may include a pressed product of a steel plate, and the pressed product may have a surface treatment. The surface treatment may include a plated metal, a paint or a coating. This may also prevent corrosion of the protective cover 40 due to an external environment. Other examples of material for the protective cover 40 may include plastic and/or rubber.

In the embodiment under discussion, a protective cover 40 covering the illustrated four sensor units 20 may be fitted to an outer diametric surface of the outer member 1 (i.e., a stationary member). Such a configuration may protect those four sensor units 20 from an external environment. In this way, possible failure of sensor units 20 due to an external environment, including possible failure of sensor units 20 due to the impingement of flying stones during the travel of a vehicle, may be avoided, thus ensuring a reliable determination of a load that acts on the wheel bearing assembly or on a tire tread for a longer period of time.

Figure 18:
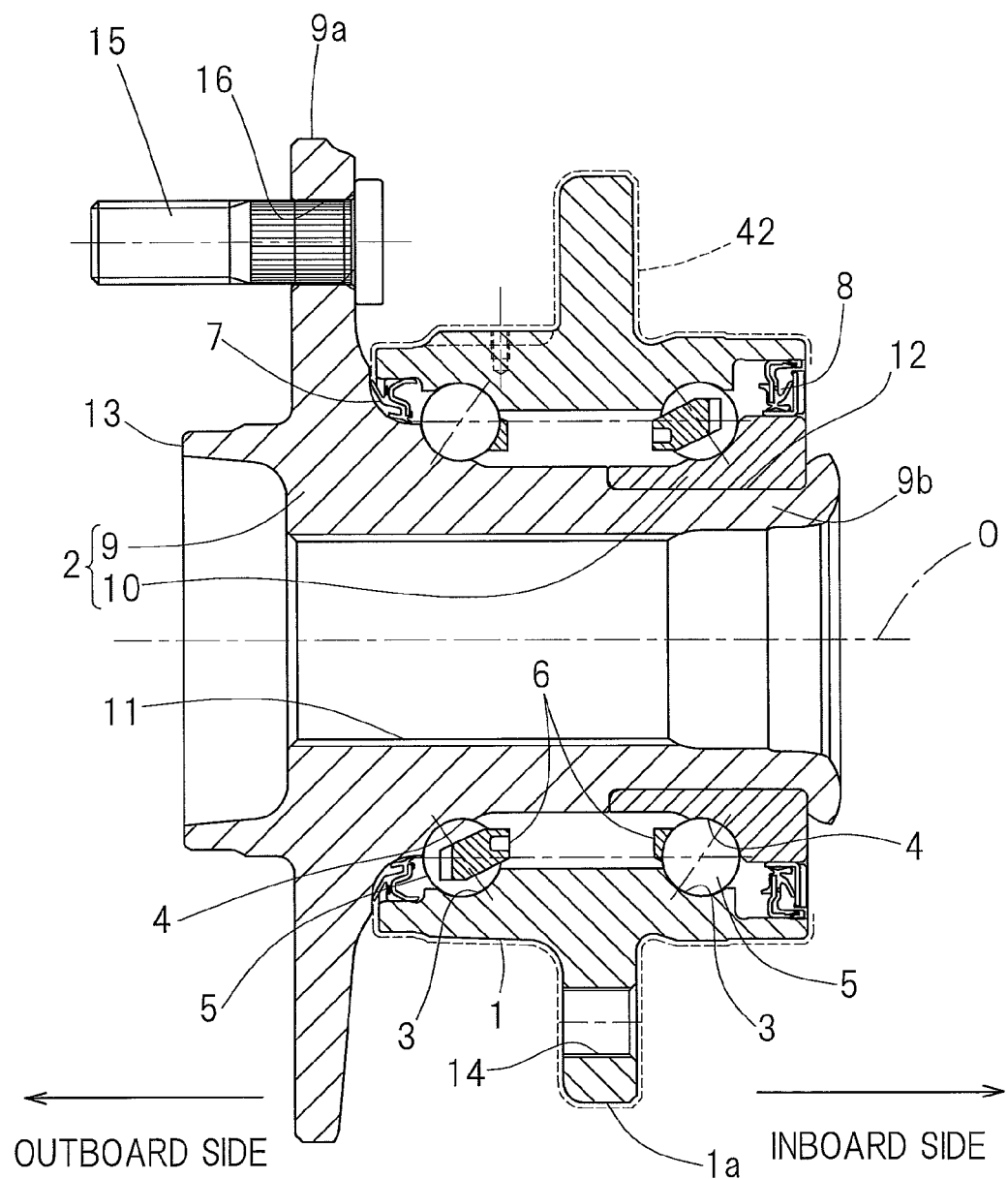
FIG. 18 is a longitudinal cross sectional view of a sensor-equipped wheel support bearing assembly according to the fourth embodiment of the present invention.

FIG. 18 shows the fourth embodiment of the present invention. A sensor-equipped wheel support bearing assembly according to the fourth embodiment may differ from a sensor-equipped wheel support bearing assembly according to any one of the embodiments that are described in connection with FIG. 1 to FIG. 17, in that segment(s) of an outer diametric surface of the outer member 1 where the strain generator members 21 in the form of the single band-shaped strain generator body continuously joining the illustrated four sensor units 20 with each other are fixed may be formed with a surface treatment layer 42 of anti-corrosion or corrosion prevention. In the illustrate example, an outer diametric surface of the outer member 1 may, in entirety thereof, have the surface treatment layer 42. In a variant, the surface treatment layer 42 may be formed so as to extend from the vehicle body mounting flange 1a to an outboard end of the outer member 1.

Examples of the surface treatment layer 42 of anti-corrosion or corrosion prevention may include a metal plated surface layer, a painted surface layer and/or a coated surface layer. Examples of metal plating treatment may include zinc plating, bright chromate conversion coating, chromating, nickel plating, chromium plating, electroless nickel plating, catalytic nickel generation plating, black oxide coating (i.e., blackening), and/or Raydent treatment. Examples of paint treatment may include cationic electrodeposition, anionic electrodeposition, electrodeposition of fluorinate(s), and/or ceramic coating such as silicon nitride coating.

In the embodiment under discussion, segment(s) of an outer diametric surface of the outer member 1 where the strain generator members 21 in the form of the single band-shaped strain generator body continuously joining the illustrated four sensor units 20 with each other are fixed may have a surface treatment layer 42 of anti-corrosion or corrosion prevention. Such a configuration may prevent rust formation on an outer diametric surface of the outer member 1. Rust formation may result in the rising of segment(s) of the outer diametric surface where those sensor units 20 are mounted. Such a configuration may also prevent those sensor units 20 from accidentally catching rust from an outer diametric surface of the outer member 1. In this way, possible malfunctioning of strain sensors 22 due to rust may be avoided, thus ensuring accurate determination of a load for a longer period of time.

A configuration where the surface treatment layer 42 is formed not on the entirety of an outer diametric surface of the outer member 1 but is formed so as to extend from the vehicle body mounting flange 1a to an outboard end of the outer member 1, may allow for holding non-surface treated segment(s) of an outer diametric surface of the outer member 1 at an inboard end of the outer member 1 during a machining operation of raceway surface(s) 3 of the outer member 1. This may enable performing precision machining of the raceway surface(s) 3.

In the discussion of the preceding embodiment(s), it is assumed that the outer member 1 serves as a stationary member. However, the present invention can also be applied to a wheel support bearing assembly in which an inner member serves as a stationary member. In such a case, sensor units 20 may be disposed on an inner peripheral surface of the inner member.

The fifth embodiment through the fourteenth embodiment of the present invention will now be described. It is to be noted that those features corresponding to the features already described with reference to the preceding embodiments will be given the same reference signs and will not be described to avoid redundancy. In the discussion of a given configuration where only certain features are described, the remaining non-described features should be considered as the same as those already described with reference to the preceding embodiments. It is to be also noted that in addition to the particular combinations of features described in a given embodiment, embodiments themselves may be partially combined with each other unless such combinations are inoperable.

Figure 19:
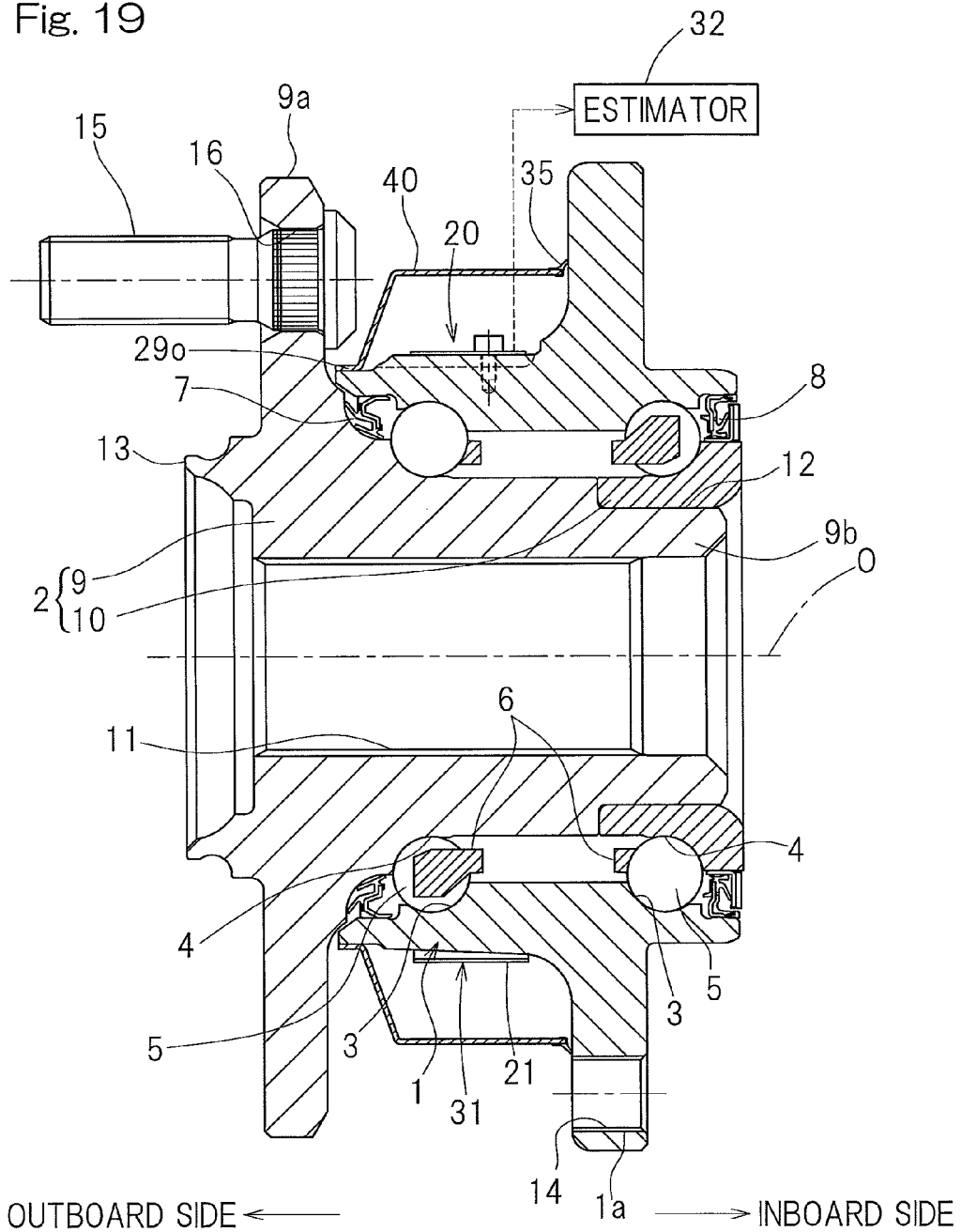
FIG. 19 illustrates a longitudinal cross sectional view of a sensor-equipped wheel support bearing assembly according to the fifth embodiment of the present invention, together with a block diagram of a schematic configuration of a sensing system for the sensor-equipped wheel support bearing assembly.

FIG. 19 to FIG. 22 show the fifth embodiment of the present invention. Referring to FIG. 19, in the fifth embodiment, a tubular protective cover 40 may surround an outer periphery of the outer member 1 (i.e., a stationary member) and may cover the sensor units 20, with the protective cover 40 having opposite axial ends, one of which is fitted to an outer periphery of the outer member 1 and the other of which has an opening rim that is provided with an annular seal member, with the seal member including a seal lip 35, with the seal lip 35 made of elastic material, and with the seal lip 35 being in contact with a surface of the outer member 1. A particular configuration will now be described.

Referring to FIG. 19, the protective cover 40 may be in the form of a tubular member surrounding an outer periphery of the outer member 1. The protective cover 40 may have, at an outboard end of the protective cover 40, a tubular mount portion 290 that may have a diameter reduced with respect to the other portion(s) of the protective cover 40, and may be fitted to an outer peripheral surface of the outer member 1. The protective cover 40 has an inboard end that may have an opening rim. The opening rim may include a seal member that may extend along the opening rim. The seal member may include an annular seal lip 35 made of an elastic material. The seal lip 35 may be in contact with an outboard oriented side surface of the vehicle body mounting flange 1a of the outer member 1. With such a configuration, sealing may be established between the outboard end of the protective cover 40 and an outer peripheral surface of the outer member 1 as well as between the inboard end of the protective cover 40 and an outer peripheral surface of the outer member 1. In a variant, the seal lip 35 may be in contact with an outer peripheral surface of the flange 1a.

Preferable elastic material for the seal lip 35 includes rubber material. Such a seal lip 35 may have reliable sealability at an inboard end of the protective cover 40. The seal lip 35 may be integrally provided in the protective cover 40. As shown in an enlarged longitudinal cross sectional view of FIG. 22, the seal lip 35 may have a shape having a diameter that increases in an inboard direction. Such a configuration may further ensure the prevention of external contaminants such as dirt and salt water from entering into the protective cover 40 from an inboard end of the protective cover 40.

Figure 20:
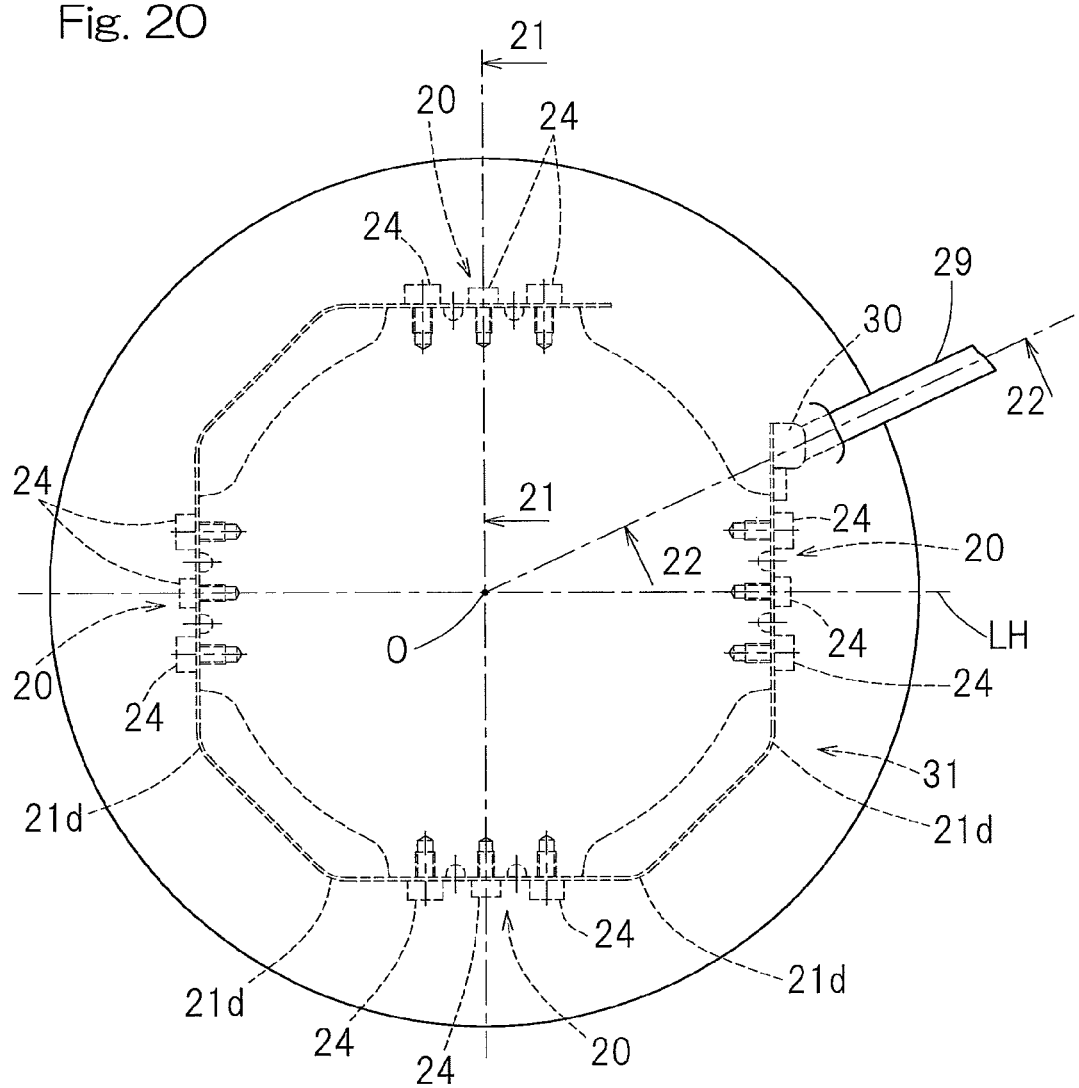
FIG. 20 is an explanatory view of a sensor assembly, when looking at an outer member of the sensor-equipped wheel support bearing assembly from an outboard direction.
Figure 21:
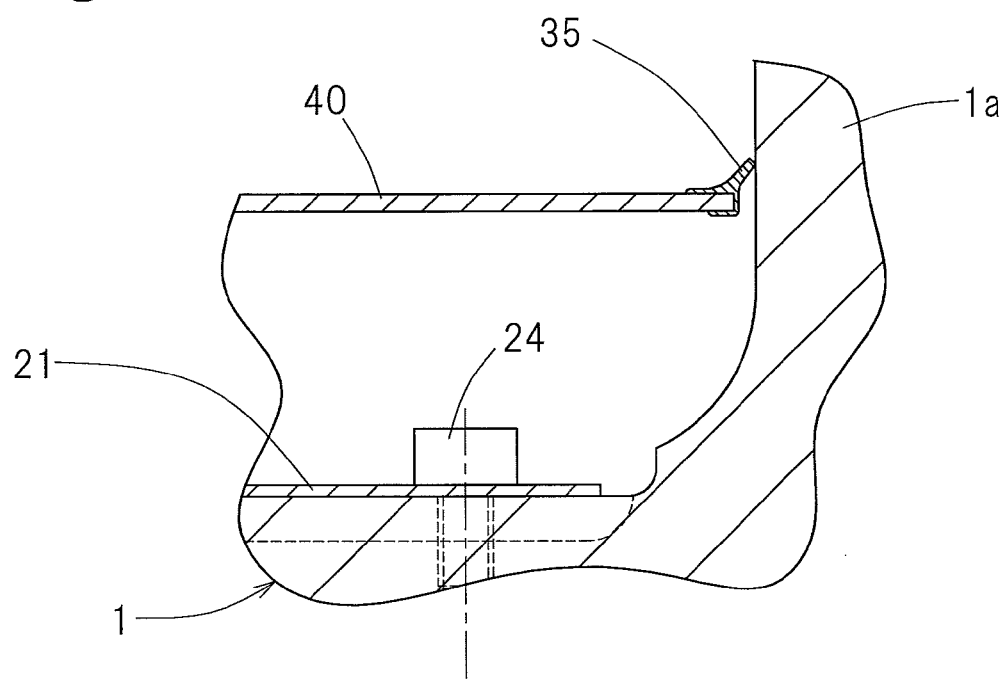
FIG. 21 is a cross sectional view of FIG. 20, taken along the line XXI-XXI in FIG. 20.
Figure 22:
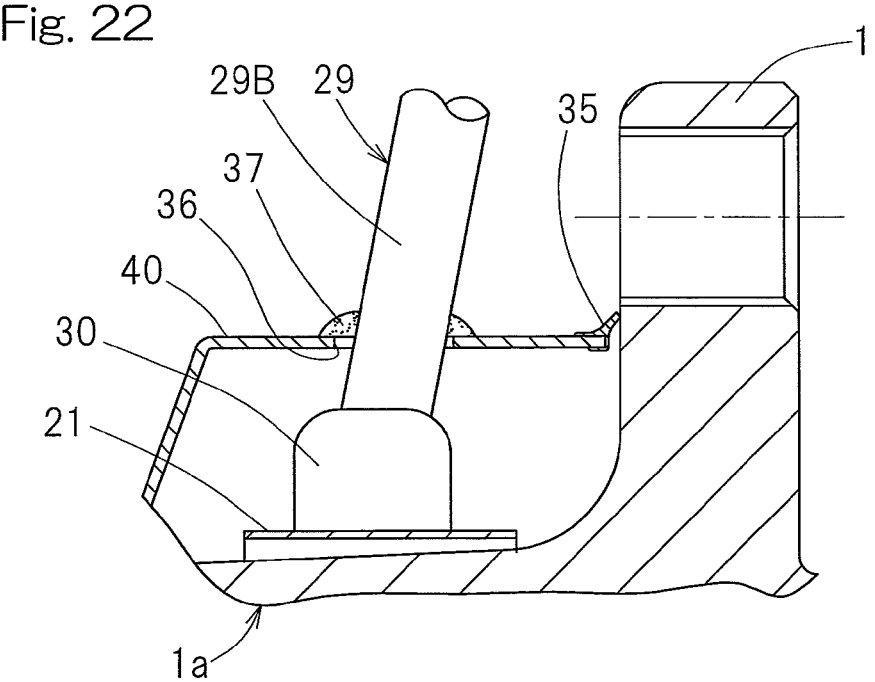
FIG. 22 is a cross sectional view of FIG. 20, taken along the line XXII-XXII in FIG. 20.

Referring to FIG. 22 which shows a cross sectional view of FIG. 20, taken along the line XXII-XXII in FIG. 20, an inboard end of the protective cover 40 may include a hole 36 through which a signal cable 29 of the aforementioned sensor assembly 31 may be drawn from the protective cover 40 to an outside of the protective cover 40 to form a signal cable drawn segment 29B of the signal cable 29, and a seal material 37 may be applied to portion(s) of the signal cable drawn segment 36 that is/are located at the hole 36. Such a seal material 37 may seal the hole 36. Such a configuration may ensure the sealability of portion(s) of the protective cover 40 where the signal cable drawn segment 29B may be drawn out of the protective cover 40.

A sensor-equipped wheel support bearing assembly according to the fifth embodiment may be constructed in the following steps:

Firstly, a sensor assembly 31 including electronic components that include sensor units 20 may be mounted to an outer peripheral surface of the outer member 1 or to the outer member 1 with the rolling elements 5 that are incorporated in advance into the outer member 1. Next, a tubular protective cover 40 may be force-fitted to an outer peripheral surface of the outer member 1 from an outboard direction, in such a way that an outboard end of the protective cover 40 is fitted to an outer peripheral surface of the outer member 1 and in such a way that a seal lip 35 at an inboard end of the protective cover 40 contacts an outboard oriented side surface or an outer peripheral surface of the vehicle body mounting flange 1a of the outer member 1, to cover the sensor assembly 31 including electronic components that include sensor units 20. Subsequently, the remaining work to construct the sensor-equipped wheel support bearing assembly is completed.

The aforementioned steps may make it easier to construct a sensor-equipped wheel support bearing assembly in which a protective cover 40 is provided to cover sensor units 20 mounted to the outer member 1 or to cover a sensor assembly 31 including sensor units 20.

In particular, the aforementioned sensor-equipped wheel support bearing assembly may include a tubular protective cover 40 that may surround an outer periphery of the outer member 1 (i.e., a stationary member). The protective cover 40 may cover the plurality of sensor units 20. The protective cover 40 has an outboard end and an inboard end. The outboard end of the protective cover 40 may be fitted to an outer peripheral surface of the outer member 1. The inboard end of the protective cover 40 may have an opening rim that includes an annular seal lip 35 that may extend along the opening rim. The seal lip 35 may include an elastic material. The seal lip 35 may be in contact with an outer peripheral surface or an outboard oriented side surface of the vehicle body mounting flange 1a of the outer member 1. Such a configuration may enable avoiding possible failure of sensor units 20 due to an external environment (such as possible damaging caused by flying stones and/or possible corrosion caused by external contaminants such as dirt and salt water), thus ensuring accurate determination of a load for a longer period of time. Such a configuration may also make it easier to perform wire routing of a signal cable 29 as well as installation of sensor units 20, thus enabling cost reduction.

In the embodiment under discussion, electronic components may be provided which include the sensor units 20, a signal processor IC 28 configured to process output signals of the sensor units 20, and a signal cable 29 configured to send the processed output signals to an outside of the wheel support bearing assembly, with the electronic components being connected with each other in a ring shape to form a sensor assembly 31. The sensor assembly 31 may be mounted to an outer peripheral surface of the outer member 1 (i.e., a stationary member) coaxially with the outer member 1. The protective cover 40 may cover the sensor assembly 31. In such a configuration, not only the sensor units 20 but also other electronic components of the sensor assembly 31 such as the signal processor IC 28 and the signal cable 29 may be protected against possible failure due to an external environment.

In the preceding discussions, it is assumed that the subject of interest is determination or estimation of a force acting between a tire of a wheel and a road surface. However, the subject of interest is not limited to such a force, but may also be a force (e.g., preload) acting on a wheel support bearing assembly. It is noted that FIG. 7 to FIG. 10 explaining the effects of the position of the rolling elements on output signals of sensor units 20 according to the first embodiment can also be applied to the fifth embodiment. A detailed description of the effects of the position of the rolling elements in the fifth embodiment is omitted to avoid redundancy, since the rolling elements in the fifth embodiment have a similar configuration to the rolling elements in the first embodiment, with similar effects.

Although not shown in FIG. 19 to FIG. 22, in the fifth embodiment, an outer peripheral surface of the outer member 1 may include segment(s) in contact with the plurality of sensor units 20, and a surface treatment layer 42 of anti-corrosion or corrosion prevention such as shown in FIG. 18 may be formed on at least those segment(s). The surface treatment layer 42 may be formed so as to extend on the entirety of an outer peripheral surface of the outer member 1. In a variant, the surface treatment layer 42 may be formed so as to extend on segment(s) of an outer peripheral surface of the outer member 1 that is/are outboard with respect to the vehicle body mounting flange 1a. In such a case, the surface treatment layer 42 may or may not extend to and accommodate the vehicle body mounting flange 1a. Similarly, in the following embodiment(s), a surface treatment layer 42 such as discussed above may be provided.

Such a surface treatment layer 42 may be formed on segment(s) of an outer peripheral surface of the outer member 1 where the sensor assembly 31 including sensor units 20 is mounted. This may prevent rust formation on segment(s) of an outer diametric surface of the outer member 1 where the sensor assembly 31 is mounted. Rust formation may result in the rising of such segment(s). In this way, possible malfunctioning of strain sensors 22A, 22B due to rust may be more reliably avoided.

Figure 23:
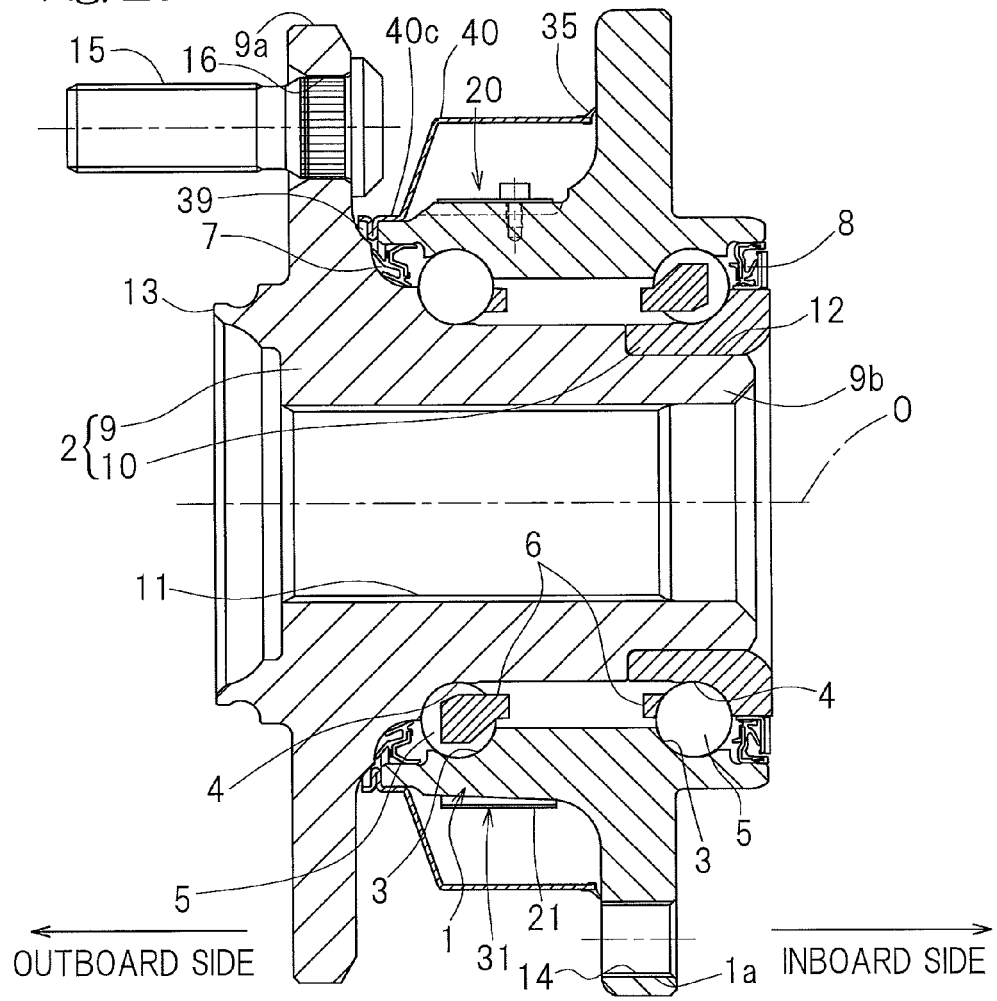
FIG. 23 is a longitudinal cross sectional view of a sensor-equipped wheel support bearing assembly according to the sixth embodiment of the present invention.
Figure 24:
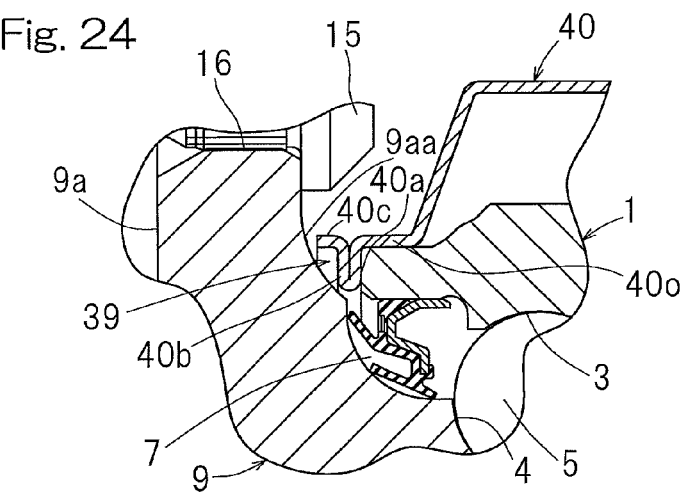
FIG. 24 is a fragmentary enlarged cross sectional view of FIG. 23.

FIG. 23 and FIG. 24 show the sixth embodiment of the present invention. A sensor-equipped wheel support bearing assembly according to the sixth embodiment may differ from a sensor-equipped wheel support bearing assembly according to the fifth embodiment that is described in connection with FIG. 19 to FIG. 22, in that the protective cover 40 has an outboard end that may extend beyond the outer member 1 in an outboard direction such that the outboard end and the inner member (i.e., a rotational member) cooperatively defines a non-contact seal gap 39 or a labyrinth seal therebetween. As shown in an enlarged longitudinal cross sectional view of FIG. 24, an outboard end of the protective cover 40 may include an inwardly bent formed segment 40a, an outwardly bent formed segment 40b and a tubular segment 40c. At an outboard end of the protective cover 40, the protective cover 40 may be bent in a radially inward direction along an outboard end of the outer member 1 to form the inwardly bent formed segment 40a that may contact the outboard end of the outer member 1. At an end of the inwardly bent formed segment 40a, the protective cover 40 may be bent in a radially outward direction to form the outwardly bent formed segment 40b that overlaps with the inwardly bent formed segment 40a in such a way that an overlapping portion thereof lies on the inwardly bent formed segment 40a. At an end of the outwardly bent formed segment 40b, the protective cover 40 may form the tubular segment 40c that extends towards a curved portion 9aa of the hub flange 9a of the inner member 2 which may be located at a base or root of the hub flange 9a. In this way, a narrow, non-contact seal gap 39 may be defined between the curved portion 9aa of the hub flange 9a which may be located at a base of the hub flange 9a and the area of the protective cover 40 containing the outwardly bent formed segment 40b and the tubular segment 40c.

Such a configuration where a non-contact seal gap 39 is defined between the inner member 2 and an outboard end of the protective cover 40 may improve sealability at an outboard end of the protective cover 40. This may further ensure the prevention of possible failure of sensors due to an external environment, thus enabling accurate determination of a load.

Figure 25:
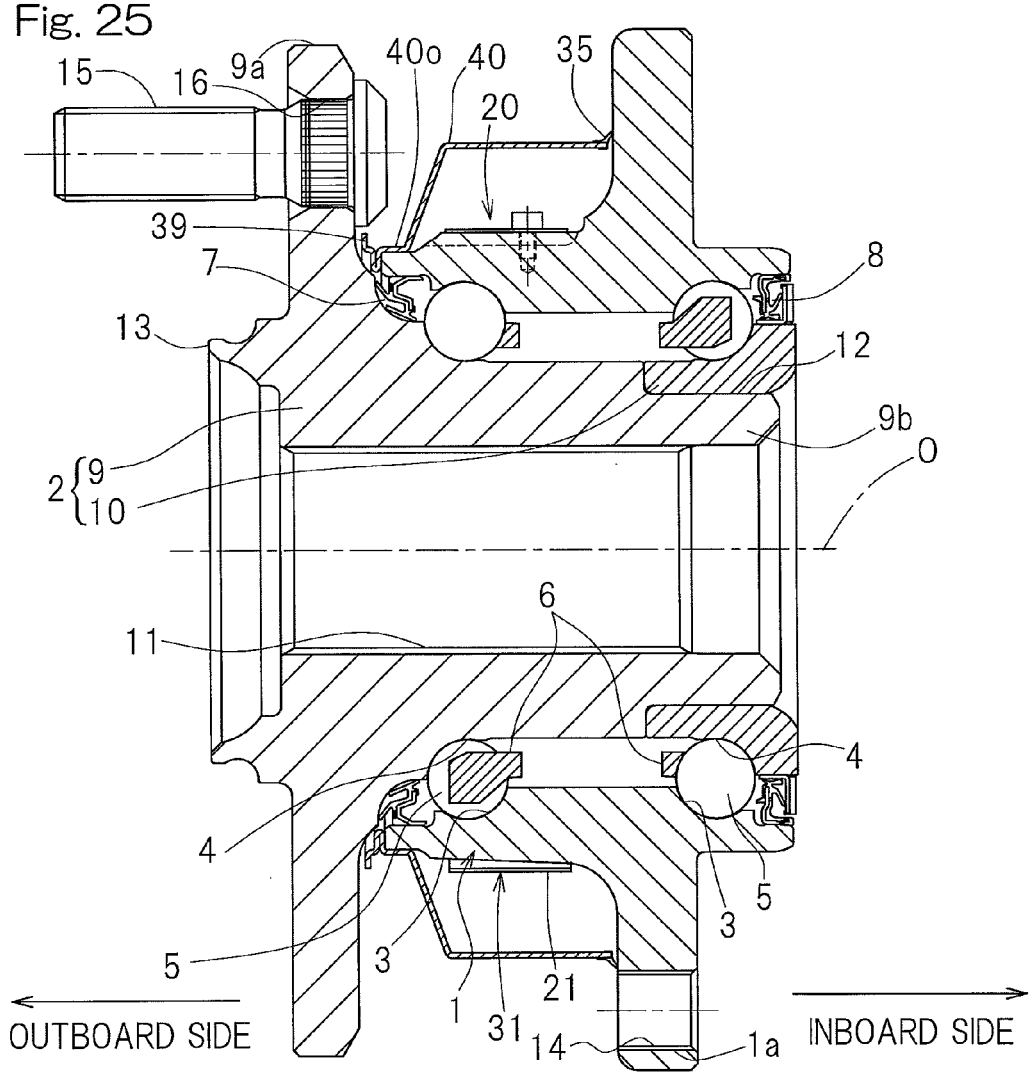
FIG. 25 is a longitudinal cross sectional view of a sensor-equipped wheel support bearing assembly according to the seventh embodiment of the present invention.
Figure 26:
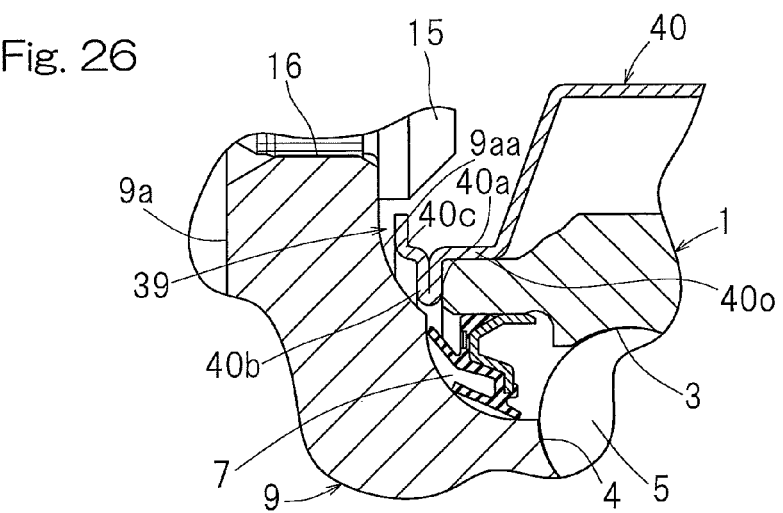
FIG. 26 is a fragmentary enlarged cross sectional view of FIG. 25.

FIG. 25 and FIG. 26 show the seventh embodiment of the present invention. A sensor-equipped wheel support bearing assembly according to the seventh embodiment may differ from a sensor-equipped wheel support bearing assembly according to the sixth embodiment that is described in connection with FIG. 23 and FIG. 24, in that, at an outboard end of the protective cover 40, the tubular segment 40c at an end of the outwardly bent formed segment 40b may have a shape that follows or extends along a side surface of the hub flange 9a. The shape of the tubular segment 40c may be an L cross sectional shape, such as shown in an enlarged longitudinal cross sectional view of FIG. 26. The rest of the features in the seventh embodiment are the same as those of the sixth embodiment that is described in connection with FIG. 23 and FIG. 24.

In this way, at an outboard end of the protective cover 40, the tubular segment 40c at an end of the outwardly bent formed segment 40b may be formed so as to have an L cross sectional shape that follows or extends along a side surface of the hub flange 9a. With such a configuration, the aforementioned non-contact seal gap 39—which may be defined between the curved portion 9aa of the hub flange 9a that may be located at a base of the hub flange 9a on one hand and the area of the protective cover 40 containing the outwardly bent formed segment 40b and the tubular segment 40c on the other hand—may have a shape that follows or extends along a side surface of the hub flange 9a. This may facilitate, at an outboard end of the protective cover 40, ejection of incoming external contaminants such as dirt, along a side surface of the hub flange 9a. This may further improve sealability at an outboard end of the protective cover 40.

Figure 27:
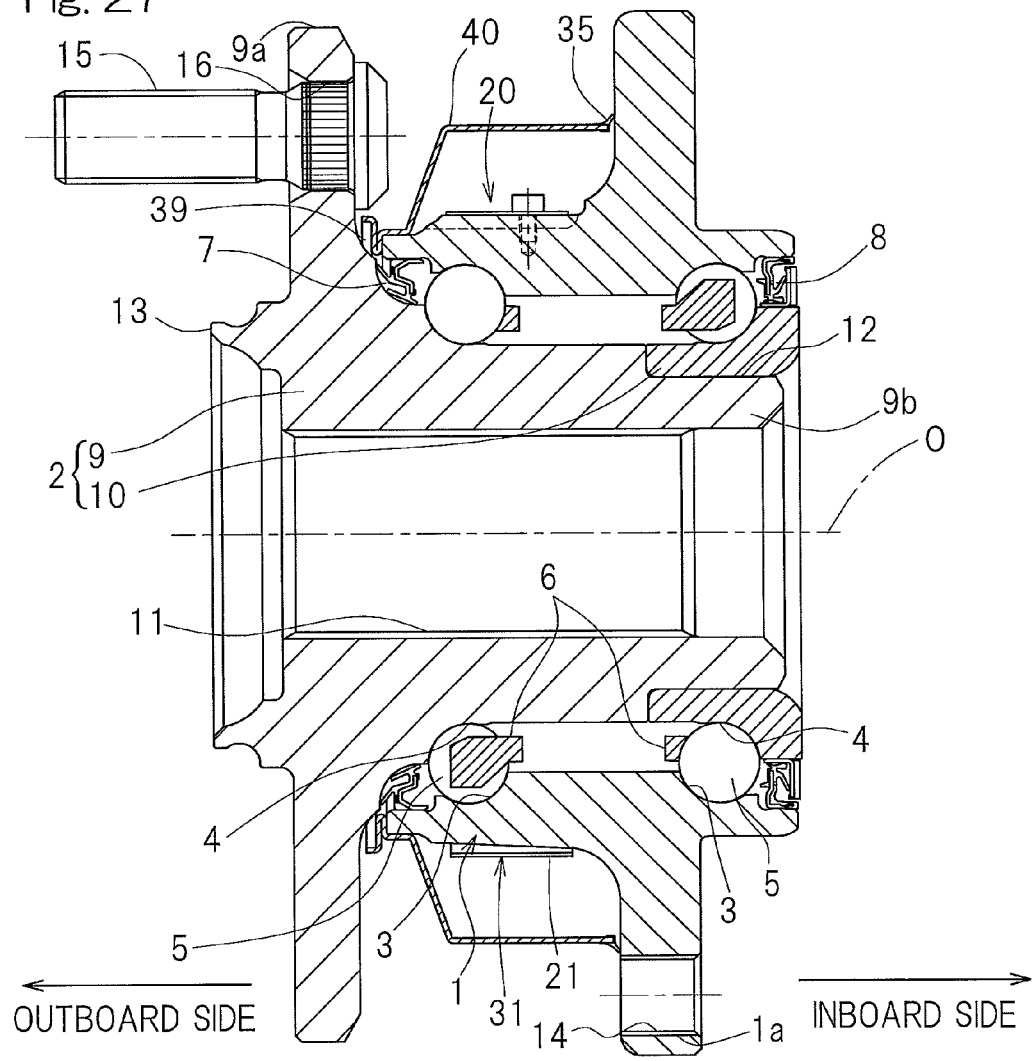
FIG. 27 is a longitudinal cross sectional view of a sensor-equipped wheel support bearing assembly according to the eighth embodiment of the present invention.
Figure 28:
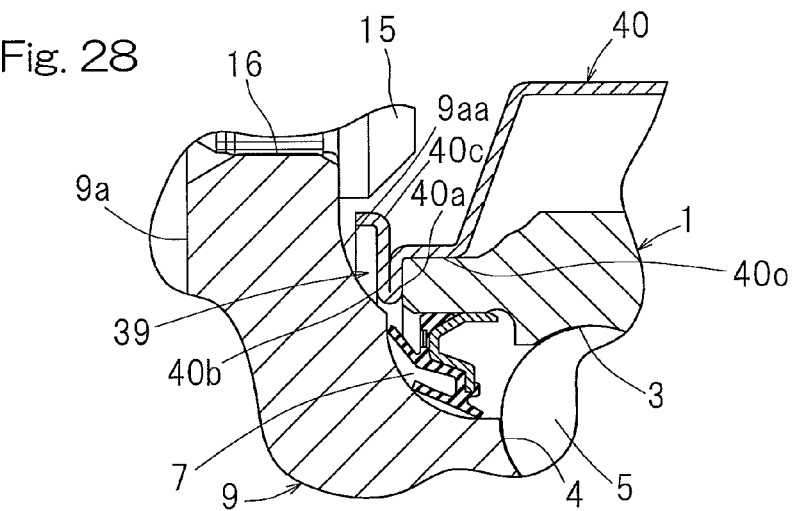
FIG. 28 is a fragmentary enlarged cross sectional view of FIG. 27.

FIG. 27 and FIG. 28 show the eighth embodiment of the present invention. A sensor-equipped wheel support bearing assembly according to the eighth embodiment may differ from a sensor-equipped wheel support bearing assembly according to the sixth embodiment that is described in connection with FIG. 23 and FIG. 24, in that, at an outboard end of the protective cover 40, the outwardly bent formed segment 40b may extend beyond a radially outward base or root end of the inwardly bent formed segment 40a in a radially outward direction, such as shown in an enlarged longitudinal cross sectional view of FIG. 28. The rest of the features in the eighth embodiment are the same as those of the sixth embodiment that is described in connection with FIG. 23 and FIG. 24.

In this way, at an outboard end of the protective cover 40, the outwardly bent formed segment 40b may extend beyond a radially outward base or root end of the inwardly bent formed segment 40a in a radially outward direction. With such a configuration, the aforementioned non-contact seal gap 39—which may be defined between the curved portion 9aa of the hub flange 9a that may be located at a base of the hub flange 9a and the area of the protective cover 40 containing the outwardly bent formed segment 40b and the tubular segment 40c—may extend over a longer distance in a radial direction. This may further improve sealability at an outboard end of the protective cover 40.

Figure 29:
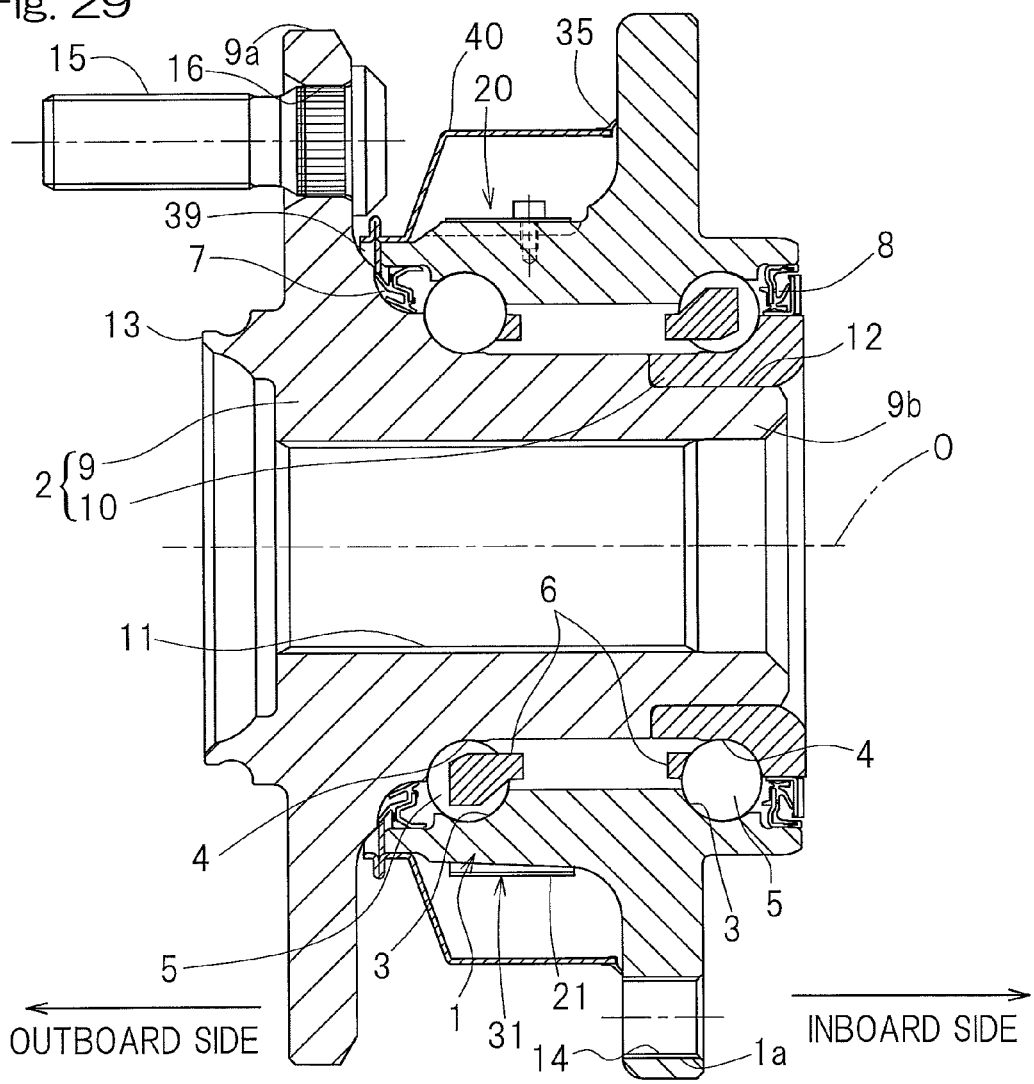
FIG. 29 is a longitudinal cross sectional view of a sensor-equipped wheel support bearing assembly according to the ninth embodiment of the present invention.
Figure 30:
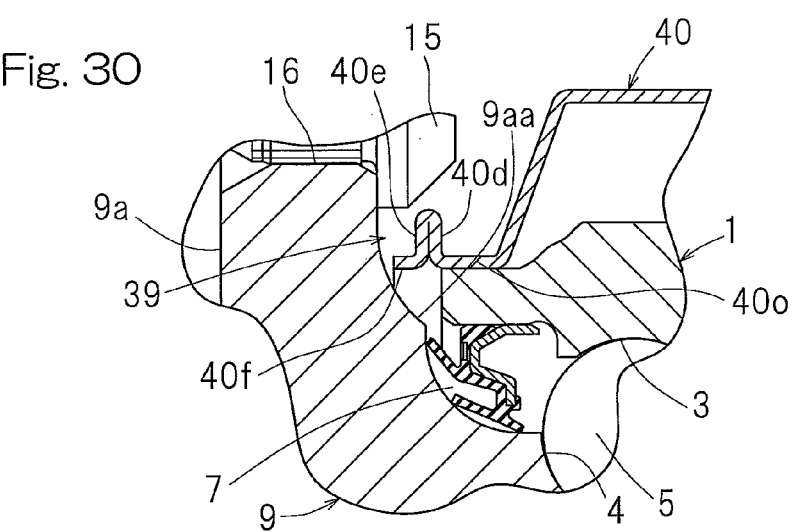
FIG. 30 is a fragmentary enlarged cross sectional view of FIG. 29.

FIG. 29 and FIG. 30 show the ninth embodiment of the present invention. Referring to an enlarged longitudinal cross sectional view of FIG. 30, in a sensor-equipped wheel support bearing assembly according to the ninth embodiment, an outboard end of the protective cover 40 may include an outwardly bent formed segment 40d, an inwardly bent formed segment 40e and a tubular segment 40f. At an outboard end of the protective cover 40, the protective cover 40 may extend beyond the outer member 1 in an outboard direction. This extension may be bent in a radially outward direction to form the outwardly bent formed segment 40d. At an end of the outwardly bent formed segment 40d, the protective cover 40 may be bent in a radially inward direction to form the inwardly bent formed segment 40e that overlaps with the outwardly bent formed segment 40d in such a way that an overlapping portion thereof lies on the outwardly bent formed segment 40d. At an end of the inwardly bent formed segment 40e, the protective cover 40 may form the tubular segment 40f that extends towards a curved portion 9aa of the hub flange 9a of the inner member 2 which may be located at a base or root of the hub flange 9a. In this way, a narrow, non-contact seal gap 39 that extends over a longer distance in a radial direction may be defined between the curved portion 9aa of the hub flange 9a which may be located at a base of the hub flange 9a on one hand and the area of the protective cover 40 containing the inwardly bent formed segment 40e and the tubular segment 40f on the other hand. The rest of the features in the ninth embodiment are the same as those of the fifth embodiment that is described in connection with FIG. 19 to FIG. 22.

In such a configuration, too, at an outboard end of the protective cover 40, a narrow, non-contact seal gap 39 that extends over a longer distance in a radial direction may be defined between the curved portion 9aa of the hub flange 9a which may be located at a base of the hub flange 9a on one hand and the area of the protective cover 40 containing the inwardly bent formed segment 40e and the tubular segment 40f on the other hand. This may improve sealability at an outboard end of the protective cover 40. This may further ensure the prevention of possible failure of sensors due to an external environment, thus enabling accurate determination of a load.

Figure 31:
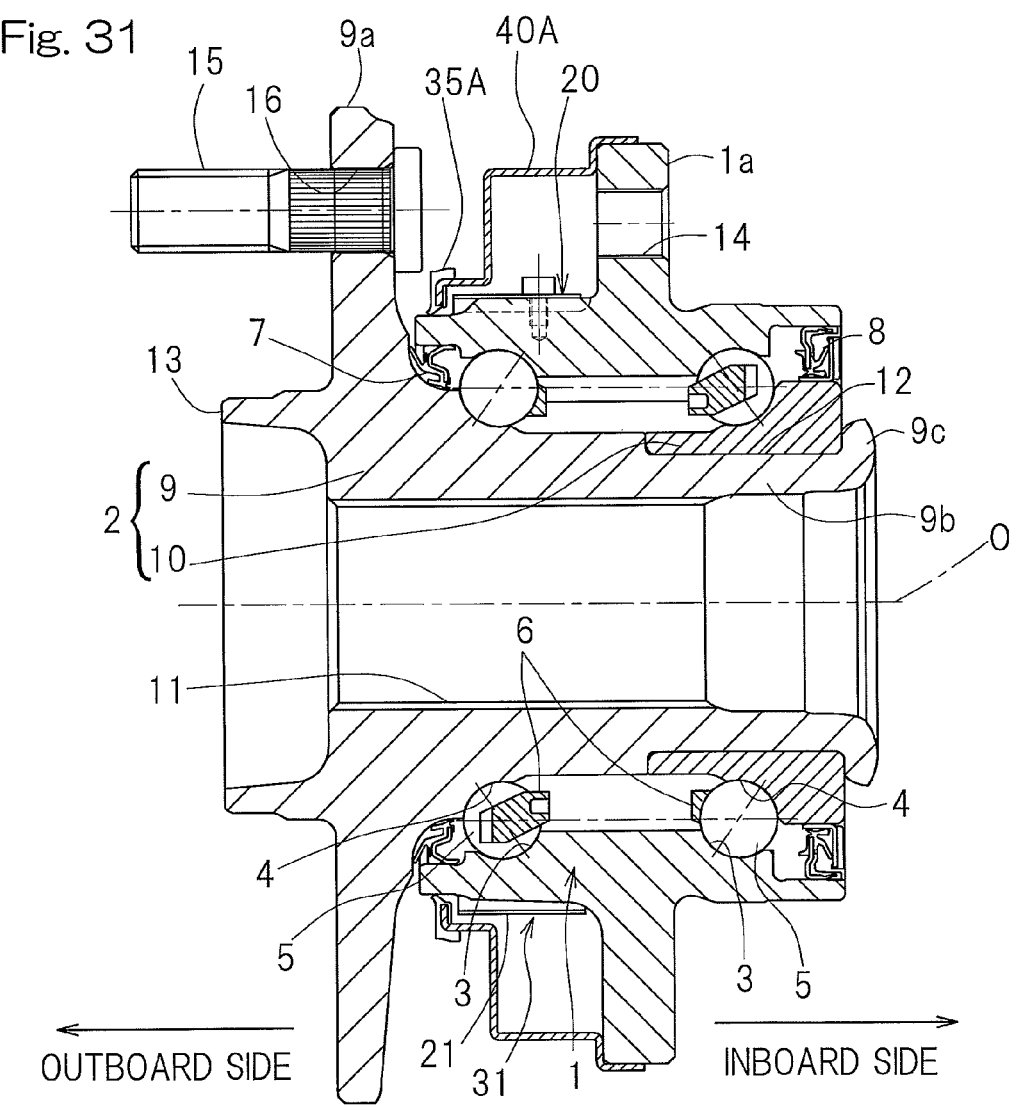
FIG. 31 is a longitudinal cross sectional view of a sensor-equipped wheel support bearing assembly according to the tenth embodiment of the present invention.
Figure 32:
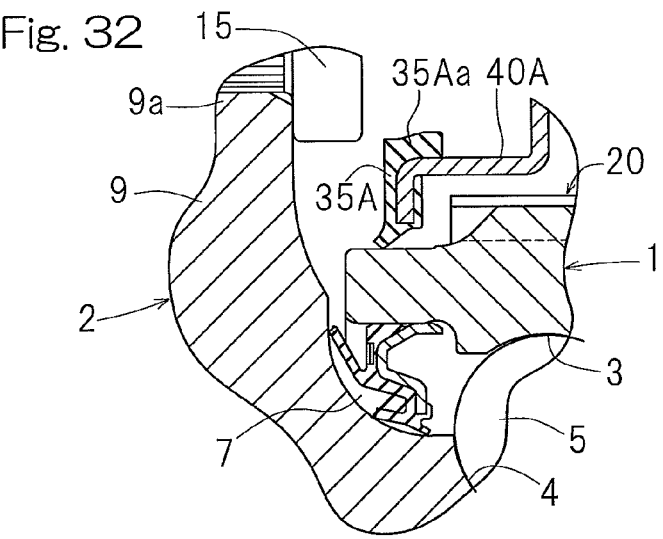
FIG. 32 is a fragmentary enlarged cross sectional view of FIG. 31.

FIG. 31 and FIG. 32 show the tenth embodiment of the present invention. A sensor-equipped wheel support bearing assembly according to the tenth embodiment may differ from a sensor-equipped wheel support bearing assembly according to the fifth embodiment that is described in connection with FIG. 19 to FIG. 22, in that a protective cover 40A associated with an outer peripheral surface of the outer member 1 may have the following configuration or construction. In the example under discussion, a protective cover 40A that may cover a sensor assembly 30 and may surround an outer periphery of the outer member 1 may be in the form of a tubular member, as in the fifth embodiment, while the protective cover 40A may differ from that of the fifth embodiment, in that the protective cover 40A has a shape having an outer diameter that may increase in stepwise manner from an outboard side to an inboard side of the protective cover 40A. The protective cover 40A has an inboard end that may be fitted to an outer diametric surface of the flange 1a of the outer member 1. The protective cover 40A has an outboard end that may have an opening rim. The opening rim may include an annular seal lip 35A. The seal lip 35A may extend along the opening rim. The seal lip 35A may include an elastic material. The seal lip 35A may be in contact with an outer peripheral surface of the outer member 1. In this way, sealing may be established between an outboard end of the protective cover 40A and an outer peripheral surface of the outer member 1 as well as between an inboard end of the protective cover 40A and an outer diametric surface of the flange 1a of the outer member 1. Such a configuration may ensure the prevention of external contaminants such as dirt and salt water from entering into the protective cover 40A from an outboard end of the protective cover 40A. This may ensure the prevention of possible failure of sensors due to an external environment, thus ensuring accurate determination of a load.

Preferable elastic material for the seal lip 35A includes rubber material. Such a seal lip 35A may have reliable sealability at an outboard end of the protective cover 40A. The seal lip 35A may be in one-piece construction with the protective cover 40A. As shown in an enlarged longitudinal cross sectional view of FIG. 32, the seal lip 35A may have a shape having a free end, and the free end has a diameter that may gradually decreases towards an outboard side. Such a configuration may further ensure the prevention of external contaminants such as dirt and salt water from entering into the protective cover 40A from an outboard end of the protective cover 40A. The seal lip 35A may include segment(s) extending to and encompassing a portion of an outer peripheral surface of the protective cover 40A to form an outer peripheral surface overlay portion 35Aa on the outer peripheral surface of the protective cover 40A. In such a configuration, a wall of the outer peripheral surface overlay portion 35Aa will be formed on an outer peripheral surface of the protective cover 40A, at an outboard end of the protective cover 40A. Such a wall may form a radially outward projection, which may prevent external contaminants such as dirt and salt water from flowing towards an area of an outer peripheral surface of the protective cover 40A that is integral with the seal lip 35A. Such a configuration may further ensure the prevention of external contaminants such as dirt and salt water from entering into the protective cover 40A. In a configuration where the seal lip 35A includes segment(s) integrated with an outer peripheral surface of the protective cover 40A to form such an outer peripheral surface overlay portion 35Aa on an outer peripheral surface of the protective cover 40A, the outer peripheral surface overlay portion 35Aa may extend in an inboard direction beyond an intended area of an outer peripheral surface of the protective cover 40A to be integrated with the seal lip 35A, in order to ensure a sufficient strength of the seal lip 35A for such integration.

The rest of the features in the tenth embodiment, along with effects or advantages in the tenth embodiment, are the same as those of the fifth embodiment that is described in connection with FIG. 19 to FIG. 22. Note that, in the embodiment under discussion as well as in the following embodiment(s), a surface treatment layer 42 according to the fourth embodiment that is described in connection with FIG. 18 may be provided.

Figure 33:
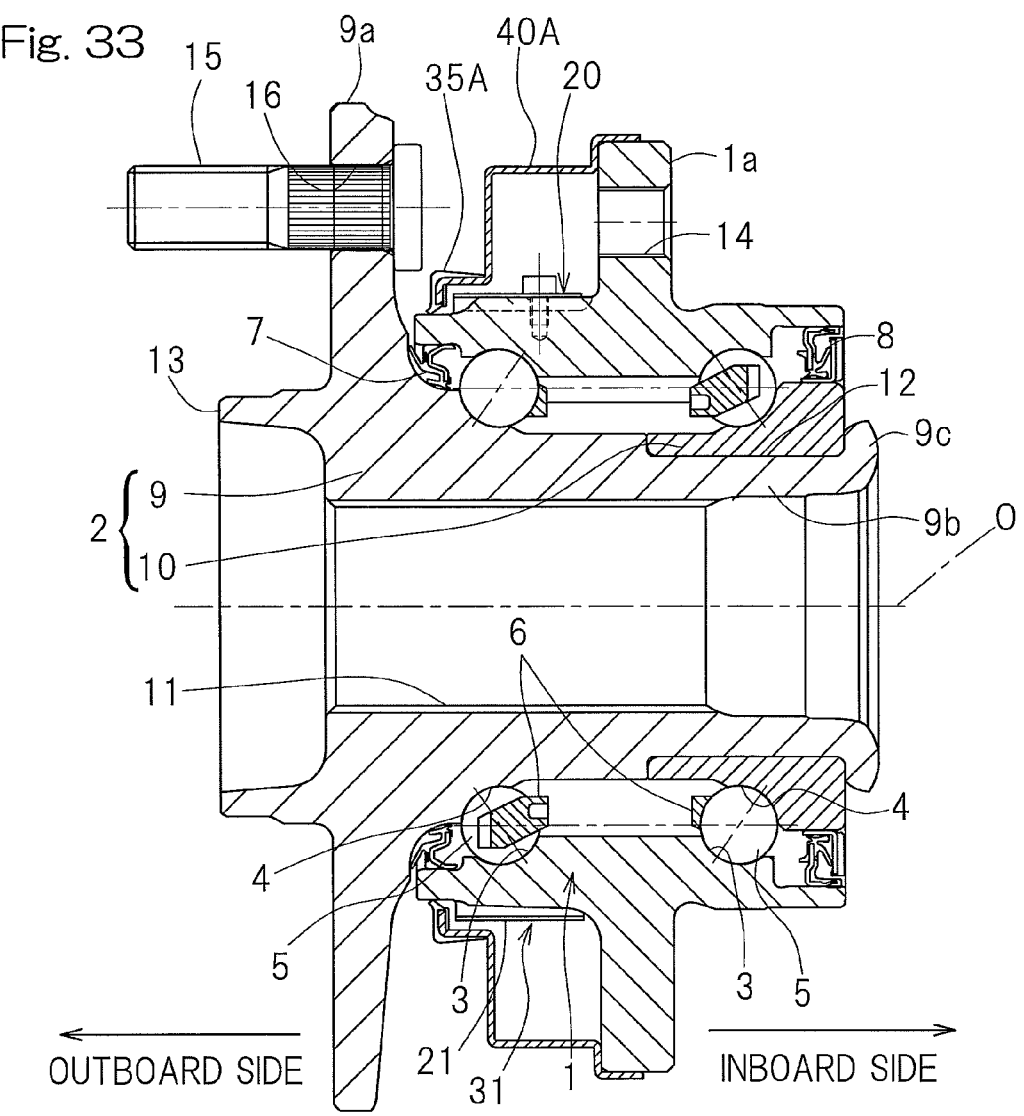
FIG. 33 is a longitudinal cross sectional view of a sensor-equipped wheel support bearing assembly according to the eleventh embodiment of the present invention.
Figure 34:
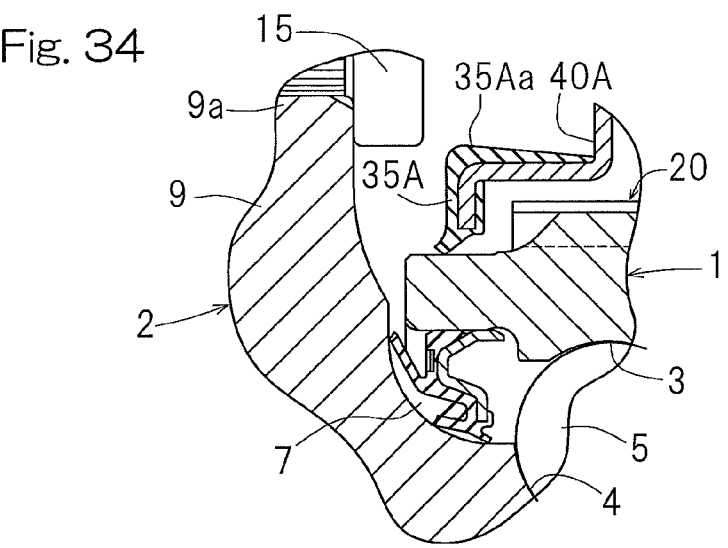
FIG. 34 is a fragmentary enlarged cross sectional view of FIG. 33.

FIG. 33 and FIG. 34 show the eleventh embodiment of the present invention. A sensor-equipped wheel support bearing assembly according to the eleventh embodiment of the present invention may differ from a sensor-equipped wheel support bearing assembly according to the tenth embodiment that is described in connection with FIG. 31 and FIG. 32, in that an outer peripheral surface of the outer peripheral surface overlay portion 35Aa of the seal lip 35A that may be integral with an outboard end of the protective cover 40A may form an inclined surface having a diameter that increases in an outboard direction, such as shown in an enlarged longitudinal cross sectional view of FIG. 34. The rest of the features in the eleventh embodiment are the same as those of the tenth embodiment that is described in connection with FIG. 31 and FIG. 32.

In this way, an outer peripheral surface of the outer peripheral surface overlay portion 35Aa of the seal lip 35A may form an inclined surface having a diameter that increases in an outboard direction. Such a configuration may prevent external contaminants such as dirt and salt water from flowing towards an area of an outer peripheral surface of the outer member 1 with which the seal lip 35A is in contact, thus further ensuring the prevention of external contaminants such as dirt and salt water from entering into the protective cover 40A.

Figure 35:
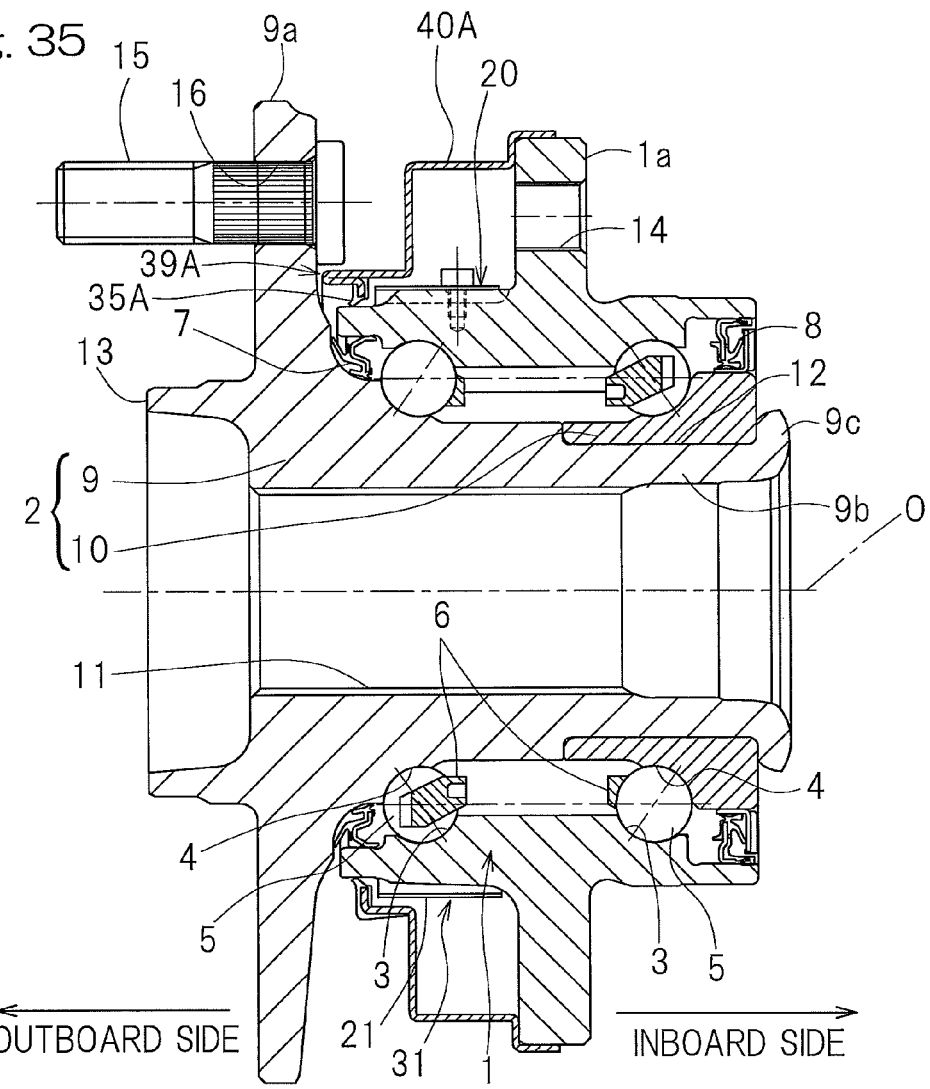
FIG. 35 is a longitudinal cross sectional view of a sensor-equipped wheel support bearing assembly according to the twelfth embodiment of the present invention.
Figure 36:
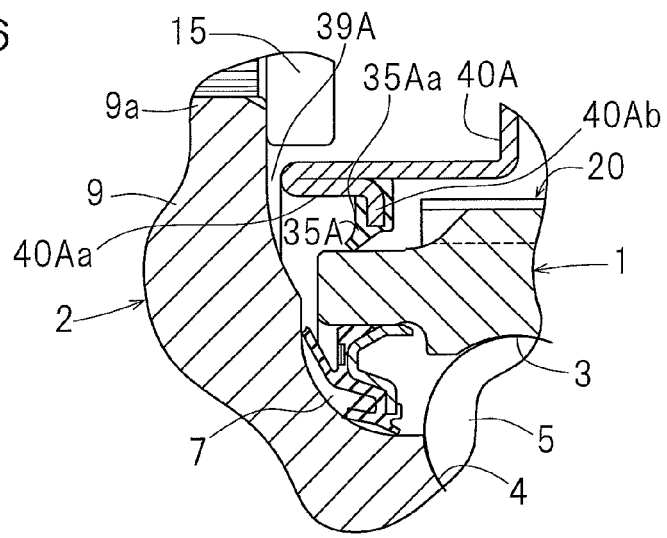
FIG. 36 is a fragmentary enlarged cross sectional view of FIG. 35.

FIG. 35 and FIG. 36 show the twelfth embodiment of the present invention. A sensor-equipped wheel support bearing assembly according to the twelfth embodiment of the present invention may differ from a sensor-equipped wheel support bearing assembly according to the tenth embodiment that is described in connection with FIG. 31 and FIG. 32, in that an outboard end of the protective cover 40A may extend beyond the outer member 1 in an outboard direction such that the outboard end of the protective cover 40A and the inner member 2 (i.e., a rotational member) defines a non-contact seal gap 39A or a labyrinth seal therebetween. The non-contact seal gap 39A may refer to a narrow gap of size that can, while there is a relative rotation between the outer member 1 and the inner member 2, block incoming external contaminants such as water. Referring to an enlarged longitudinal cross sectional view of FIG. 36, the protective cover 40A may include a bent formed segment 40Aa and an inwardly bent formed segment 40Ab. More specifically, the protective cover 40A has an outboard end that may extend to the vicinity of an inboard oriented side surface of the hub flange 9a of the inner member 2. At an end of this extension, the protective cover 40A may be bent in a radiallly inward direction as well as in an inboard direction, to form the bent formed segment 40Aa that extends in an inboard direction. At an end of the bent formed segment 40Aa, the protective cover 40A may be bent in a radially inward direction to form the inwardly bent formed segment 40Ab. The seal lip 35A may be integral with or in one-piece construction with the inwardly bent formed segment 40Ab. The rest of the features in the twelfth embodiment are the same as those of the tenth embodiment that is described in connection with FIG. 31 and FIG. 32.

In this way, an outboard end of the protective cover 40A and the inner member 2 may define a non-contact seal gap 39A therebetween. In such a configuration, the seal between an outboard end of the protective cover 40A and the outer member 1 may form a double-seal structure that includes a seal lip 35A contacting with the outer peripheral surface of the outer member 1 and a non-contact seal 39A defined between an outboard end of the protective cover 40A and the hub flange 9a of the inner member 2. This may provide a more reliable outboard seal, thus more reliably avoiding possible failure of sensors due to an external environment and enabling accurate determination of a load.

Figure 37:
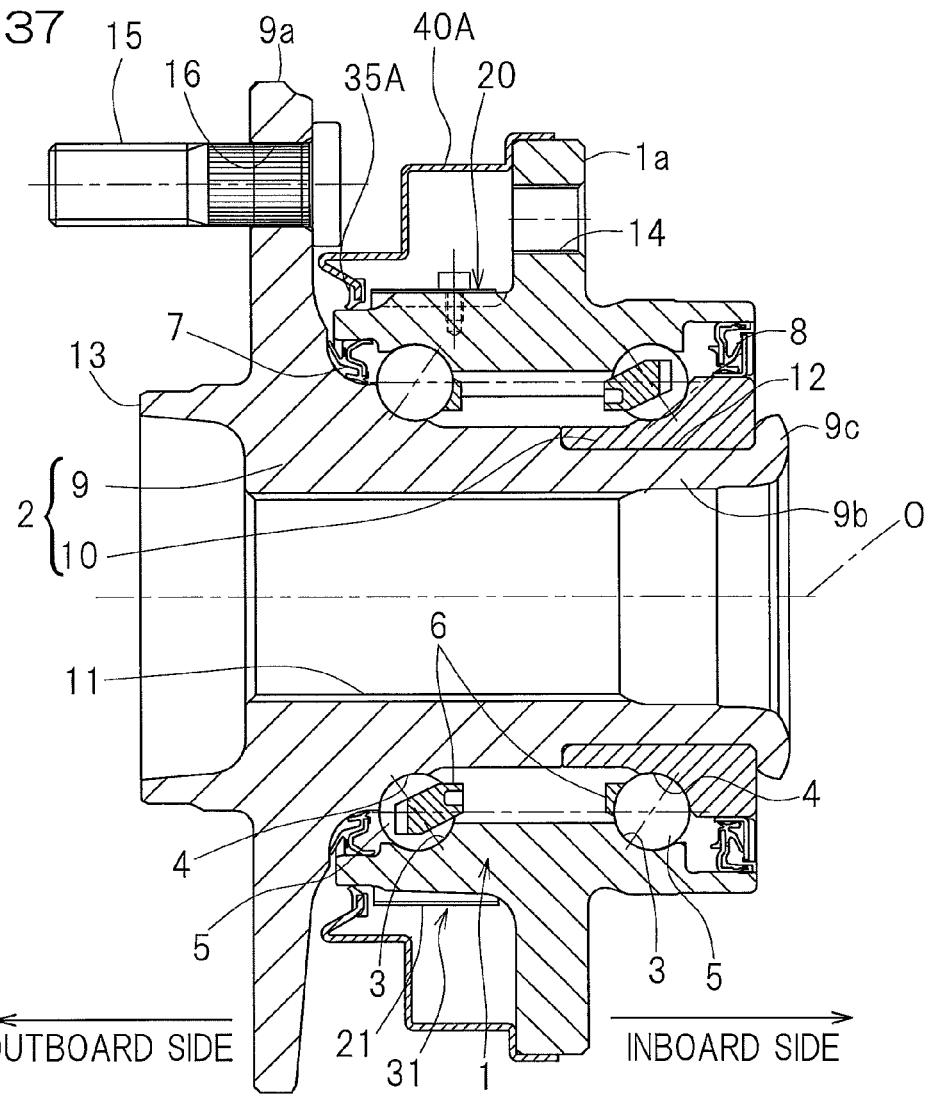
FIG. 37 is a longitudinal cross sectional view of a sensor-equipped wheel support bearing assembly according to the thirteenth embodiment of the present invention.
Figure 38:
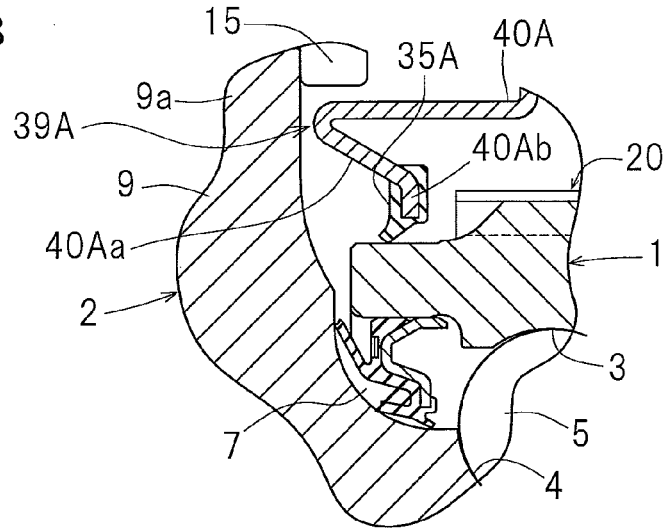
FIG. 38 is a fragmentary enlarged cross sectional view of FIG. 37.

FIG. 37 and FIG. 38 show the thirteenth embodiment of the present invention. A sensor-equipped wheel support bearing assembly according to the thirteenth embodiment of the present invention may differ from a sensor-equipped wheel support bearing assembly according to the tenth embodiment that is described in connection with FIG. 31 and FIG. 32, in that a bent formed segment 40Aa of the protective cover 40A at an outboard end of the protective cover 40A has a shape having a diameter that may decrease in an inboard direction such that the shape of the bent formed segment 40Aa is inclined in an inboard direction, such as shown in an enlarged longitudinal cross sectional view of FIG. 38. The rest of the features in the thirteenth embodiment are the same as those of the tenth embodiment that is described in connection with FIG. 31 and FIG. 32.

In this way, a bent formed segment 40Aa of the protective cover 40A at an outboard end of the protective cover 40A has a shape having a diameter that may decrease in an inboard direction such that the shape of the bent formed segment 40Aa is inclined in an inboard direction. External contaminants such as dirt and salt water may enter into an outboard end of the outer member 1 through the non-contact seal gap 39A. However, the aforementioned configuration may facilitate ejection of these external contaminants from the non-contact seal gap 39A, along the inclined surface of the bent formed segment 40Aa. This may further improve sealability at an outboard end of the protective cover 40A.

Figure 39:
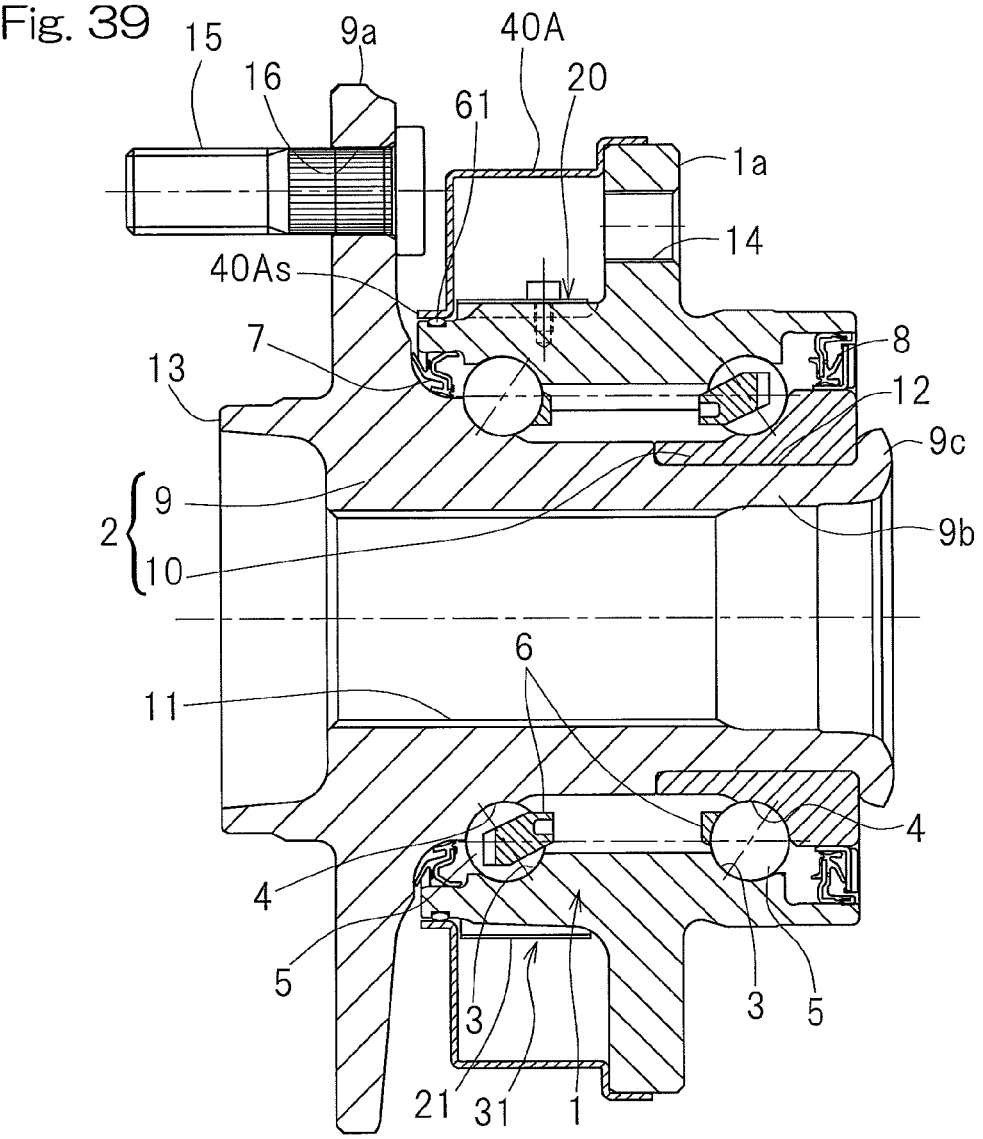
FIG. 39 is a longitudinal cross sectional view of a sensor-equipped wheel support bearing assembly according to the fourteenth embodiment of the present invention.
Figure 40:
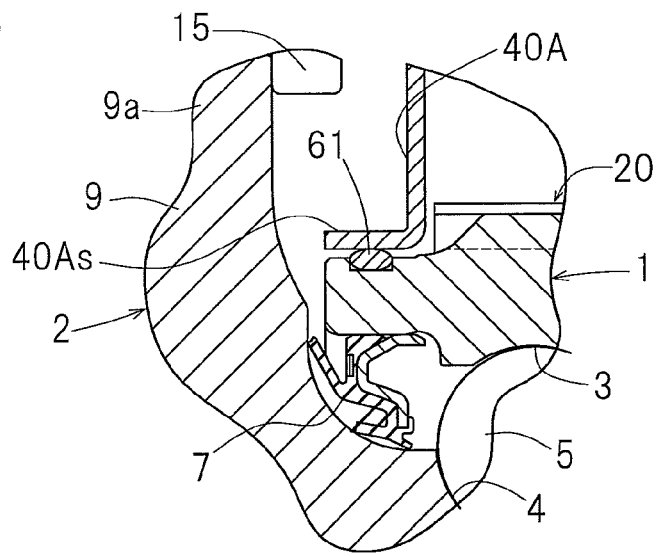
FIG. 40 is a fragmentary enlarged cross sectional view of FIG. 39.

FIG. 39 and FIG. 40 show the fourteenth embodiment of the present invention. A sensor-equipped wheel support bearing assembly according to the fourteenth embodiment of the present invention may differ from a sensor-equipped wheel support bearing assembly according to the tenth embodiment that is described in connection with FIG. 31 and FIG. 32, in that an outboard end of the protective cover 40A may include a smaller diameter tubular segment 40As, in that the seal member may include an O-ring 61, and in that the O-ring 61 may be interposed between the smaller diameter tubular segment 40As and an outer periphery of the outer member 1. As shown in an enlarged cross sectional view of FIG. 40, the O-ring 61 may be fittedly mounted in an annular, seal mount groove that may be formed in an outer peripheral surface of the outer member 1. The rest of the features in the fourteenth embodiment are the same as those of the tenth embodiment that is described in connection with FIG. 31 and FIG. 32. Such a configuration that includes the aforementioned O-ring 61 as a seal member, too, may ensure the prevention of external contaminants such as dirt and salt water from entering into the protective cover 40A from an outboard end of the protective cover 40A. This may ensure the prevention of possible failure of sensors due to an external environment, thus ensuring accurate determination of a load.

Figures 41, 42:
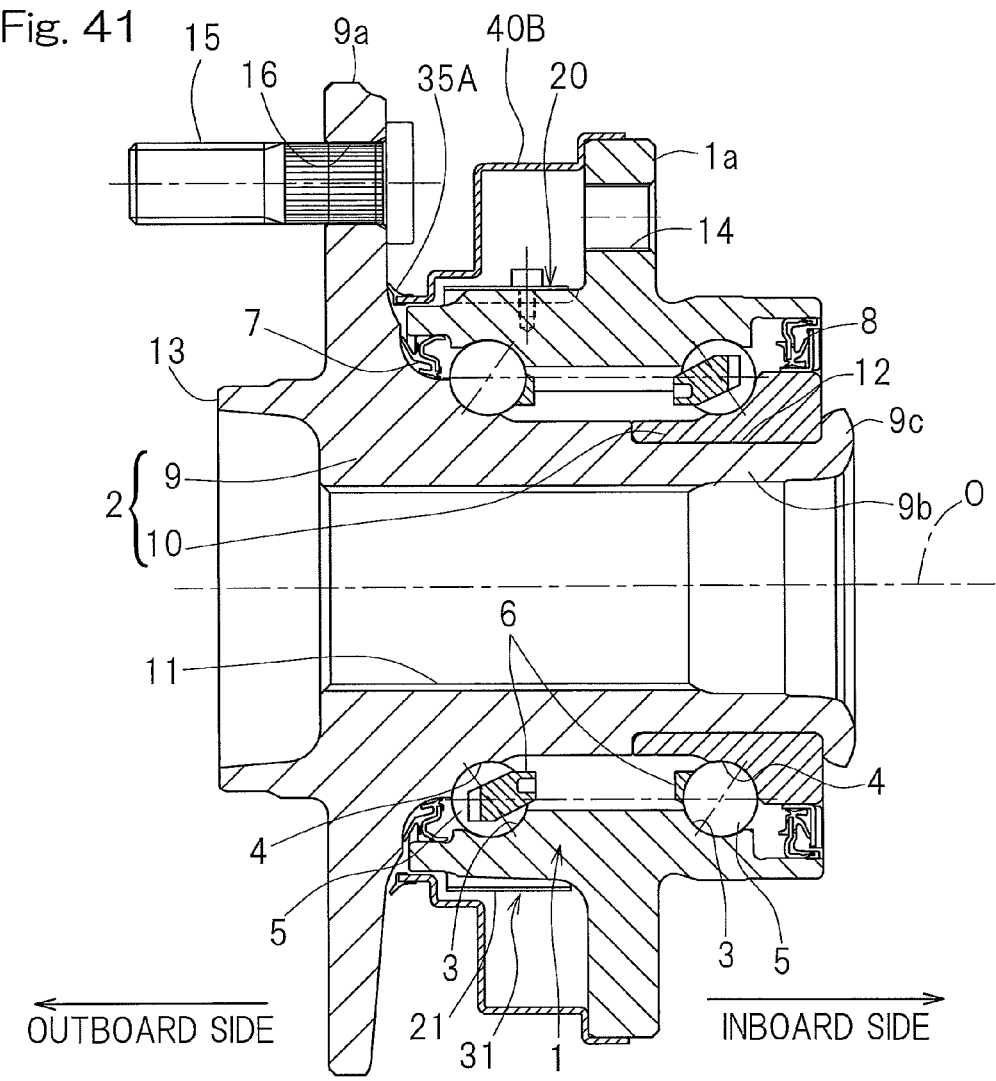
FIG. 41 is a longitudinal cross sectional view of a sensor-equipped wheel support bearing assembly according to the fifteenth embodiment of the present invention.
FIG. 42 is a fragmentary enlarged cross sectional view of FIG. 41.

FIG. 41 and FIG. 42 show the fifteenth embodiment of the present invention. A sensor-equipped wheel support bearing assembly according to the fifteenth embodiment of the present invention may differ from a sensor-equipped wheel support bearing assembly according to the tenth embodiment that is described in connection with FIG. 31 and FIG. 32, in that a seal lip 35A which may be integral with an outboard end of the protective cover 40B may be in contact with a surface of the inner member 2 (i.e., a rotational member). More specifically, an outboard end of the protective cover 40B may extend beyond the outer member 1 in an outboard direction such that the seal lip 35A contacts an inboard oriented side surface of the hub flange 9a of the hub unit 9 (i.e., a component of the inner member 2). The rest of the features in the fifteenth embodiment are the same as those of the tenth embodiment that is described in connection with FIG. 31 and FIG. 32.

In this way, a seal lip 35A which may be integral with an outboard end of the protective cover 40B may be in contact with the hub flange 9a of the inner member 2. Such a configuration, too, may ensure the prevention of external contaminants such as dirt and salt water from entering into the protective cover 40B from an outboard end of the protective cover 40B. This may ensure the prevention of possible failure of sensors due to an external environment, thus ensuring an accurate determination of a load. With such a configuration, sealing may also be established for an outboard end of the bearing space defined between the outer member 1 and the inner member 2. Thus, an outboard seal unit 7 may be omitted.

Figure 43:
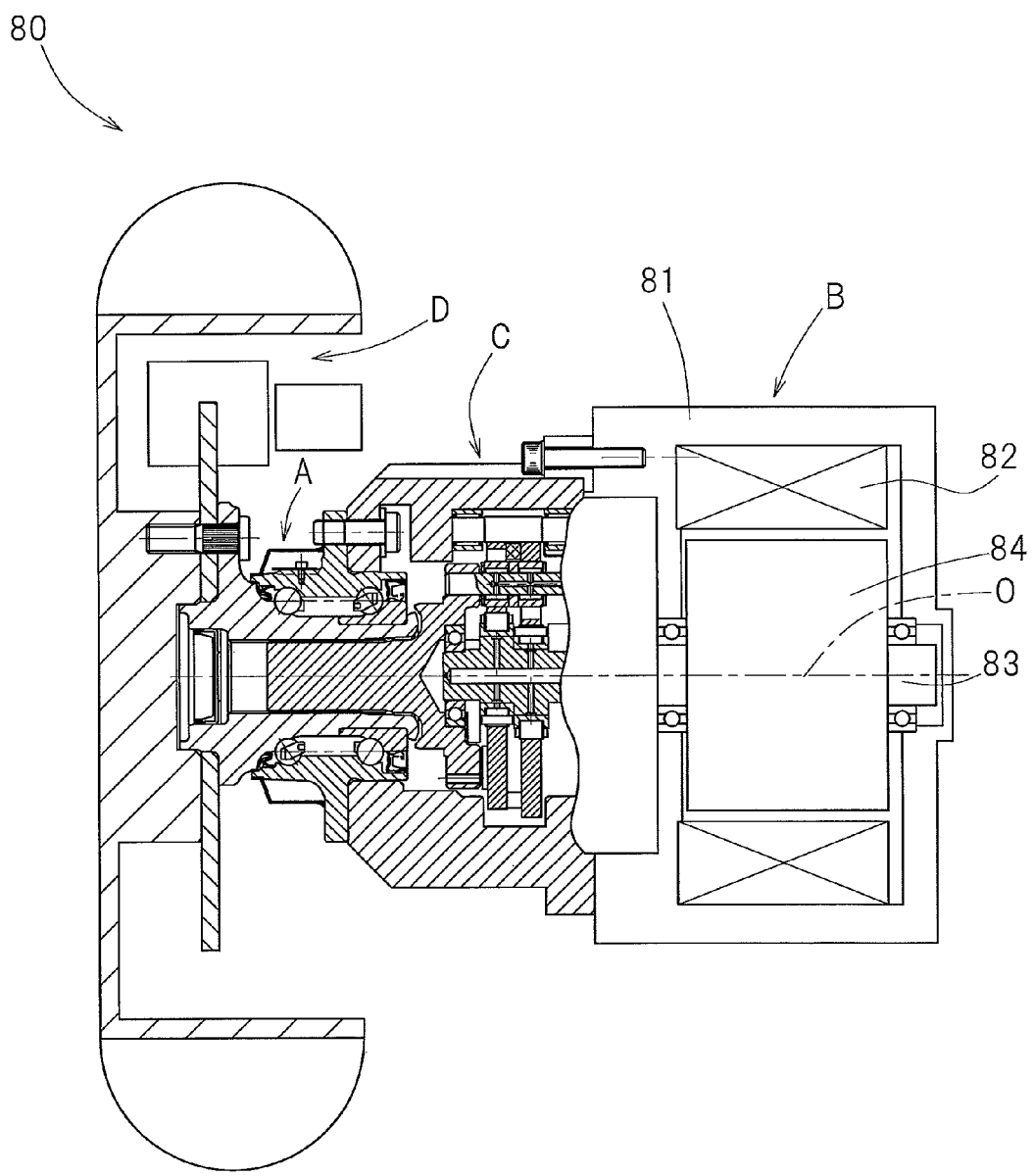
FIG. 43 is a longitudinal cross sectional view showing the general overview of a wheel support bearing assembly with in-wheel motor integration in which a sensor-equipped wheel support bearing assembly of FIG. 19 is incorporated.

FIG. 43 is a longitudinal cross sectional view showing the general overview of a wheel support bearing assembly with in-wheel motor integration in which a sensor-equipped wheel support bearing assembly A according to the fifth embodiment that is described in connection with FIG. 19 to FIG. 22 is incorporated. The illustrated wheel support bearing assembly with in-wheel motor integration may include the aforementioned sensor-equipped wheel support bearing assembly A that may rotatably support a hub unit for a drive wheel 80, an electric motor unit B that may serve as a rotational drive source, a reducer unit C that may produce rotation with a speed that is reduced with respect to that of rotation of the electric motor unit B for transmission to the hub unit, and a brake assembly D that may apply a brake force to the hub unit. These components A to D may be positioned coaxial with a central axis of the drive wheel 80. The electric motor unit B may be a radial gap type electric motor unit. More specifically, the electric motor unit B may include a tubular casing 81, a stator 82 fixed to the casing 81, an output shaft 83, and a rotor 84 mounted to the output shaft 83, with the stator 82 and the rotor 84 defining a radial gap therebetween. The reducer unit C may include a cycloidal reducer.

In the non-limiting example of FIG. 43, a sensor-equipped wheel support bearing assembly A according to the fifth embodiment that is described in connection with FIG. 19 to FIG. 22 is incorporated. However, a sensor-equipped wheel support bearing assembly according to any one of embodiments of the present invention may be incorporated, producing similar effects or advantages.

In this way, a wheel support bearing assembly with in-wheel motor integration may include a sensor-equipped wheel support bearing assembly having any one of the aforementioned configurations according to the present invention. This may provide a wheel support bearing assembly with in-wheel motor integration, which may prevent possible failure of sensors due to an external environment, thus enabling accurate determination of a load that acts on the wheel bearing assembly or on a tire tread for a longer period of time.

Although in the discussion of the preceding embodiments, application is made to a wheel support bearing assembly of a third generation type, the present invention can also be applied to a wheel support bearing assembly of a first or second generation type, where a bearing structure and a hub unit are independently formed. The present invention can also be applied to a wheel support bearing assembly of a fourth generation type, where an outer ring of a constant velocity joint forms part of an inner member. A sensor-equipped wheel support bearing assembly according to the present invention can be applied to a wheel support bearing assembly that rotatably supports a driven wheel and can also be applied to a wheel support tapered roller bearing assembly of any generation type. A sensor-equipped wheel support bearing assembly according to the present invention can also be applied to a wheel support bearing assembly in which an outer member serves as a rotational member. In such a case, sensor units 20 may be disposed on an outer periphery of an inner member.

Next, "Mode 1" to "Mode 25" as well as "Implementation 1" to "Implementation 3," which do not form part of embodiments of the present invention, will now be described in connection with FIG. 44 to FIG. 60.

Figure 89:
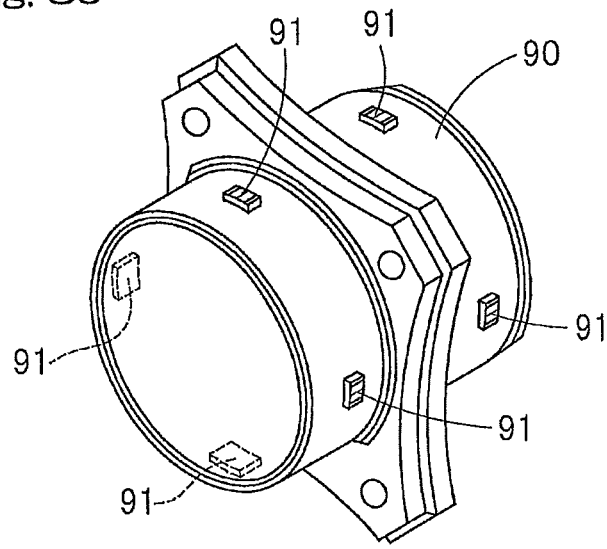
FIG. 89 is a perspective view of another conventional apparatus.

As part of the related art for "Implementation 1" to "Implementation 3," a wheel support bearing assembly has been proposed in which strain gauges 91 may be affixed to an outer ring 90 of the wheel support bearing assembly, such as shown in FIG. 89 (see, for example, the Patent Document 3; "JP Published Int'l Application No. 2003-530565"). Also, a computation method has been proposed to estimate a load that acts on a wheel, based on output signals of a plurality of strain sensors arranged on a wheel (see, for example, the Patent Document 4; "JP Published Int'l Application No. 2008-542735").

To determine a load that acts on a wheel by using strain sensor(s), such as in techniques disclosed in the Patent Document 3 and the Patent Document 4 listed above, a drift produced by a sensor due to an ambient temperature and/or an initial drift due to possible strain caused by installation of a sensor unit may pose an issue. A drift due to possible strain caused by installation of a sensor unit may be corrected by adjusting an offset produced by a strain sensor after installation, by converting the amount of offset into a signal output, and by cancelling the signal output. This may enable accurate sensing of strain signals.

A load estimator with such an offset adjustment function for sensor output signals may include an amplifier circuit that may amplify an output signal of strain sensor(s), an offset adjuster circuit, an offset corrector circuit, a linear corrector circuit, an output circuit, a controller, and an external interface (see, for example, the Patent Document 5; "JP Laid-open Patent Application No. 2008-185496" and the Patent Document 6; "JP Laid-open Patent Application No. 2008-185497").

The number of strain sensors to be associated with an outer member of a bearing assembly may be increased for a variety of reasons. This, however, may be accompanied by a corresponding increase in the number of pre-processing circuits including the aforementioned amplifier circuit and offset adjuster circuit. This may necessitate the use of a circuit board of greater size. Along with increased size comes the difficulty involved during a mounting operation of the circuit board to an outer member of a bearing assembly.

Figure 90:
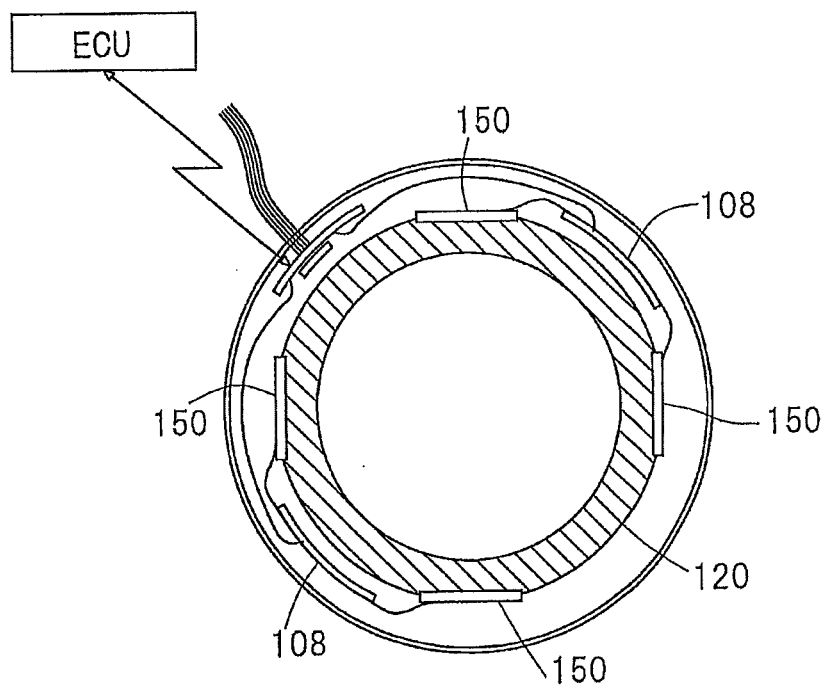
FIG. 90 is a cross sectional view of a possible arrangement for A to D converters in an exemplary apparatus.
Figure 91:
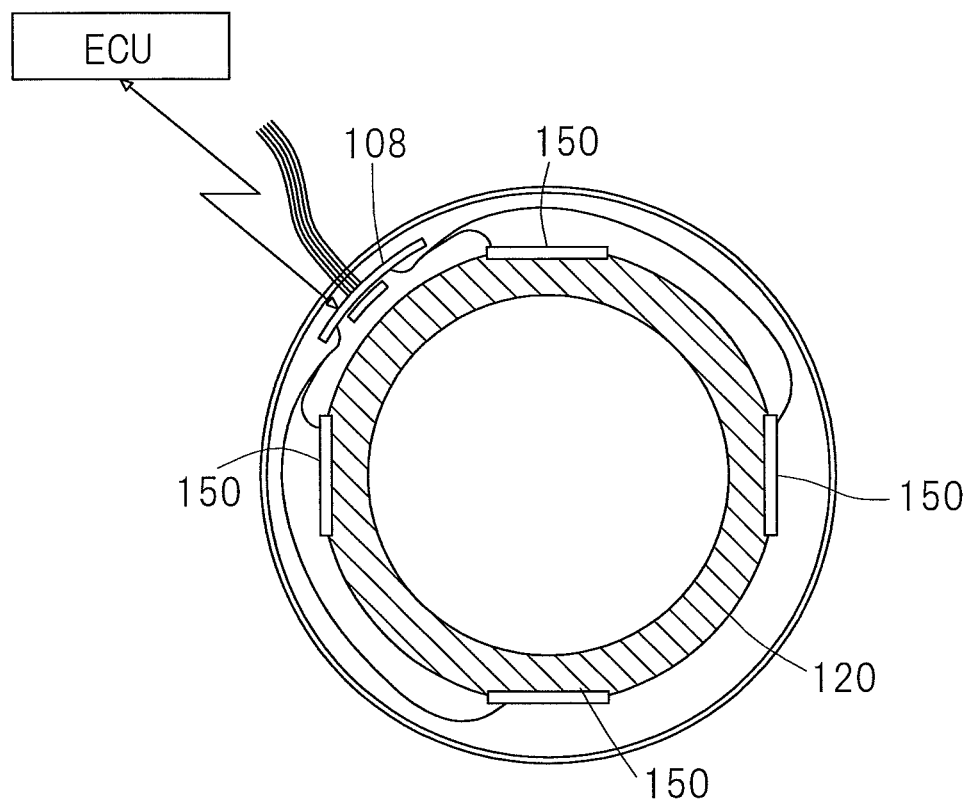
FIG. 91 is a cross sectional view of another possible arrangement for A to D converters in an exemplary apparatus.

Reducing the number of wires may be one option to alleviate such difficulty. To achieve this, an A to D converter system for converting output signals of sensor units from analog to digital may be equipped to an outer member of a bearing assembly. For instance, an A to D converter may be mounted onto a sensor unit. This, however, may imply the provision of A to D converters, one for every sensor unit, thereby resulting in cost increase. To address this, an A to D converter 108 that is shared in common by two sensor units 150 such as shown in FIG. 90, or an A to D converter 108 that is shared in common by four sensor units 150 such as shown in FIG. 91 may be envisioned. In either case, however, the question is where and how to fix such A to D converter(s) 108. For instance, an A to D converter 108 may be directly attached to an outer member 120 of a wheel support bearing assembly. This, however, may require the outer member to have a special seat portion for the A to D converter 108, for the same reason that a sensor unit 150 may need a special seat portion to be fixed to the outer member. Such a modification to the shape of the outer member 120 may give rise to a cylindrical geometry that is asymmetrical both in vertical and horizontal directions. The outcome of this may the complication of output signals produced by two or more strain sensors in a sensor unit 150, thus making it difficult to perform proper load determination. A protective covering may be provided to cover sensor units that may be fitted to an outer member of a wheel support bearing assembly (see, for example, the Patent Document 7; "JP Laid-open Patent Application No. 2009-192389" and the Patent Document 8; "JP Laid-open Patent Application No. 2010-138958"). An A to D converter system may be mounted on such a protective covering. In such a case, however, circuits wiring may have to be performed concurrently with installation of the protective covering. This may jeopardize ease of assembly.

Figure 92:
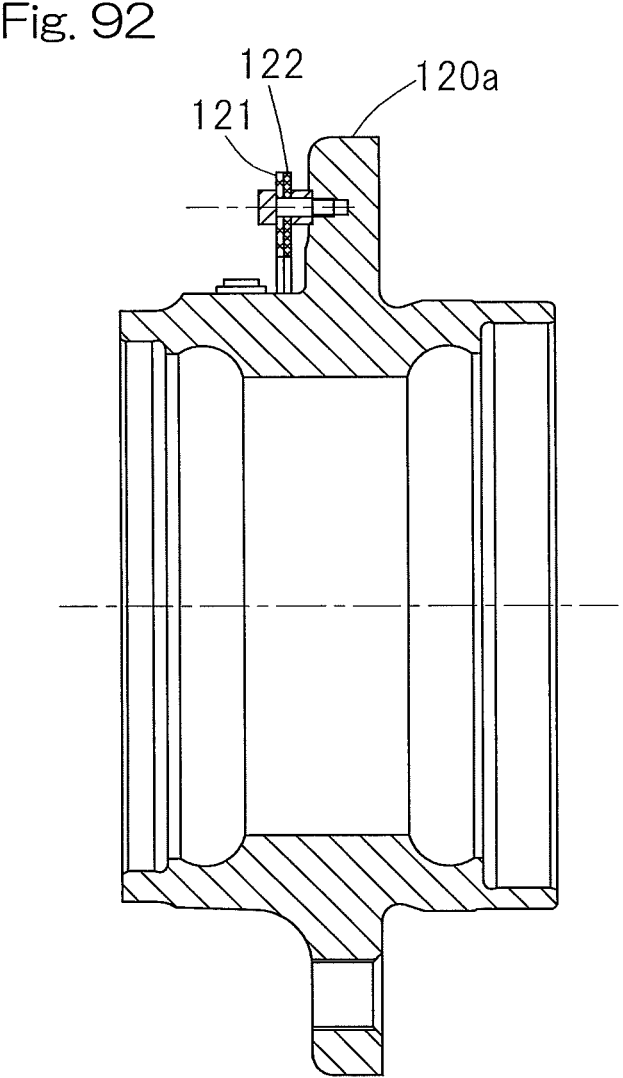
FIG. 92 is a cross sectional view of an outer member in another exemplary apparatus.
Figure 93:
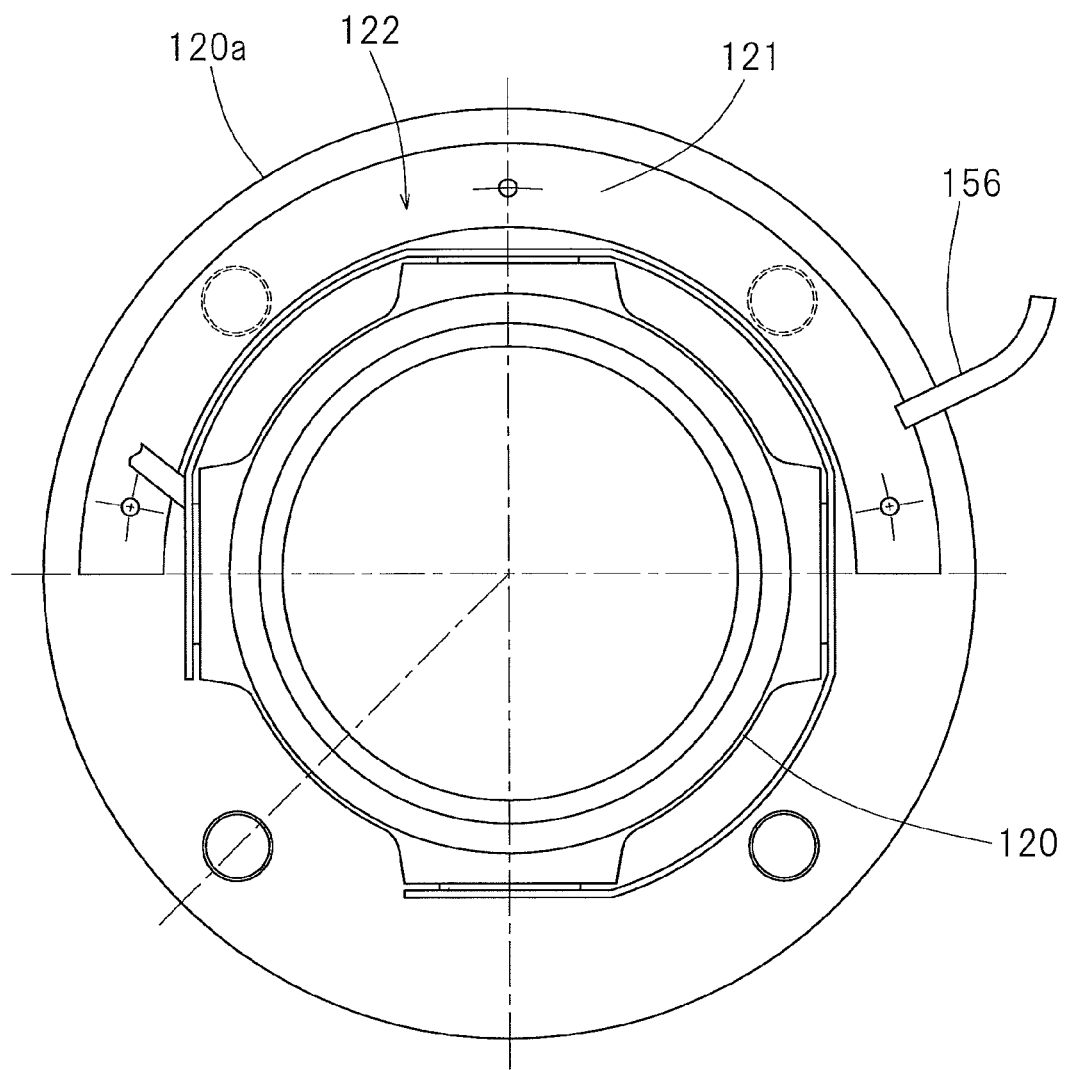
FIG. 93 is a front elevational view of an outer member of the exemplary apparatus of FIG. 92, as viewed from an outboard direction.

In an attempt to address this, as shown in FIG. 92 and FIG. 93, a computational processor circuitry 121 that may process output signals of sensors through computation may be attached to a circuitry securement stay 122. The aforementioned A to D converter system or A to D converters may be included in the computational processor circuitry 121. The circuitry securement stay 122 may be associated with a side surface of a vehicle body mounting flange 120*a* of a wheel support bearing assembly. In such a case, however, the question is how to fasten a signal cable 156 that extends from the computational processor circuitry 121 to an outside of the wheel support bearing assembly.

The same question may also apply to a configuration where sensor units fitted to an outer member of a wheel support bearing assembly are covered with a protective covering (see, for example, the Patent Document 7 and the Patent Document 8 listed above). In this case, the question may be reformulated into how to fasten a signal cable that extends out of the protective covering. Without proper fastening of a signal cable, an external force applied to the signal cable during installation of sensor units, during installation of a protective covering or after the entire assembly process is finished, may damage the connection between the circuitry and the signal cable.

To overcome the aforementioned drawbacks, the following "Mode 1" to "Mode 25" may provide a sensor-equipped wheel support bearing assembly which may simplify the fastening of a signal cable extending to an outside of the wheel support bearing assembly, which may facilitate the installation of sensor(s), and which may be highly reliable but inexpensive.

[Mode 1 and Mode 2]

A sensor-equipped wheel support bearing assembly according to "Mode 1" may be a sensor-equipped wheel support bearing assembly for rotatably supporting a wheel relative to a vehicle body. The wheel support bearing assembly includes an outer member having an inner periphery formed with a plurality of raceway surfaces, and an inner member having an outer periphery formed with a plurality of raceway surfaces opposed to the raceway surfaces of the outer member. One of the outer member and the inner member serves as a stationary member. The stationary member includes, at an outer periphery thereof, a flange that attaches to a knuckle to mount to the vehicle body. The wheel support bearing assembly also includes a plurality of rows of rolling elements interposed between the raceway surfaces of the outer member and the raceway surfaces of the inner member. The wheel support bearing assembly also includes at least one sensor unit for load determination, that is associated with an outer diametric surface of the stationary member. The wheel support bearing assembly also includes a computational processor circuitry configured to process an output signal of the sensor unit through computation, and a signal cable configured to send data computed by the computational processor circuitry to an outside of the wheel support bearing assembly. The wheel support bearing assembly also includes a circuitry securement stay that is associated with a side surface of the flange that mounts to the vehicle body. The computational processor circuitry and the signal cable are attached to the stay. The stay includes a fastener fastening the signal cable, with the fastener forming a part of the stay.

According to "Mode 2," the stationary member in "Mode 1" may be the outer member of the bearing assembly.

In the aforementioned configuration, a stationary member may include a flange that mounts to a vehicle body. A computational processor circuitry may be provided which is configured to process output signal(s) of sensor unit(s) through computation. A circuitry securement stay may be associated with a side surface of this flange, and the computational processor circuitry may be attached to the stay. In this way, a computational processor circuitry that may include an A to D converter may be equipped to the stationary member in a compact arrangement, without requiring change in a cylindrical geometry of the surface of a stationary member. This may enhance the ease of assembly and may also enable accurate determination of a load that acts on a bearing structure for rotatably supporting a wheel. Furthermore, a signal cable may be attached to the circuitry securement stay together with the computational processor circuitry, and the signal cable may also be fastened by a fastener that forms a part of the stay. In this way, an external force that may be applied to the signal cable may be absorbed by the fastener as well as by a sheath of the signal cable, thus preventing an external force from being applied to the connection between the signal cable and the computational processor circuitry. As such, a sensor-equipped wheel support bearing assembly may be provided which may simplify the fastening of a signal cable extending to an outside of the wheel support bearing assembly, that may facilitate the installation of sensor(s), and that may be highly reliable but inexpensive.

[Mode 3 and Mode 4]

In "Mode 1" or "Mode 2," the circuitry securement stay may be associated with a side surface of the flange that mounts to the vehicle body, such that the stay extends along a circumferential direction of the flange in parallel with the side surface of the flange, and the fastener fastening the signal cable may include a clamp having a semicircular arcuate cross sectional shape that is formed at a plurality of locations of the stay.

The fastener fastening the signal cable may include a clamp having a C cross sectional shape formed at a portion of the circuitry securement stay. Such a clamp having a C cross sectional shape may fasten the signal cable in wrapping fashion, thus enabling more rigid fastening of the signal cable.

[Mode 5]

In any one of "Mode 1" to "Mode 4," the circuitry securement stay may include, in a portion of the stay, a discontinuity through which the signal cable is drawn to an outside of the wheel support bearing assembly.

[Mode 6 and Mode 7]

In any one of "Mode 1" to "Mode 5," the circuitry securement stay may include a pressed product of an anti-corrosive steel plate ("Mode 6").

In addition to this, the pressed product of an anti-corrosive steel plate may have a plated metal, a paint or a coating. As a variant, the circuitry securement stay may include a pressed product of a steel plate, and the pressed product may have a plated metal, a paint or a coating ("Mode 7").

Any one of these configurations may prevent rust formation on the circuitry securement stay. Rust formation may result in the rising of segment(s) of the stay where the computational processor circuitry is attached. Any one of these configurations may also prevent the computational processor circuitry from accidentally catching rust from the stay. In this way, incorrect computational processing due to rust may be avoided.

[Mode 8]

In any one of "Mode 1" to "Mode 7," the circuitry securement stay, the computational processor circuitry and a portion of the signal cable may be integrally molded with resinous material. Such a configuration, too, may prevent rust formation on the circuitry securement stay. Rust formation may result in the rising of segment(s) of the stay where the computational processor circuitry and/or the signal cable is/are attached. Such a configuration may also prevent the computational processor circuitry from accidentally catching rust from the stay. In this way, incorrect computational processing due to rust as well as accidental breaking of the signal cable may be avoided.

[Mode 9 and Mode 10]

In any one of "Mode 1" to "Mode 5," the circuitry securement stay may include a molded article of resinous material ("Mode 9"). In "Mode 9," the computational processor circuitry may be insertion-molded in the circuitry securement stay ("Mode 10"). Any one of these configurations may prevent rust formation on the circuitry securement stay. Rust formation may result in the rising of segment(s) of the stay where the computational processor circuitry is attached. Any one of these configurations may also prevent the computational processor circuitry from accidentally catching rust from the stay. In this way, incorrect computational processing due to rust may be avoided. With a configuration where the computational processor circuitry is insertion-molded in the circuitry securement stay, an attaching operation of the computational processor circuitry to the stay may be omitted.

[Mode 11]

In any one of "Mode 1" to "Mode 10," the computational processor circuitry may include an A to D converter configured to directly convert an output signal of the sensor unit from analog to digital.

[Mode 12]

In any one of "Mode 1" to "Mode 10," the computational processor circuitry may include an offset adjuster circuit configured to adjust an offset generated from the sensor unit to a normal value (i.e., a reference value), and may also include an amplifier circuit configured to amplify an output signal of the sensor unit.

[Mode 13]

In any one of "Mode 1" to "Mode 12," the computational processor circuitry may include a load estimator configured to estimate a load that acts on the wheel, based on an output signal of the sensor unit.

[Mode 14]

In any one of "Mode 1" to "Mode 13," the sensor-equipped wheel support bearing assembly may further include an annular protective cover covering the sensor unit and the computational processor circuitry, with the protective cover being mounted to a peripheral surface of the stationary member coaxially with the stationary member. In such a configuration, the sensor unit and the computational processor circuitry may be covered with a protective cover. In this way, possible failure of the sensor unit and the computational processor circuitry due to an external environment may be avoided, thus ensuring accurate determination of a load that acts on the wheel bearing assembly or on a tire tread for a longer period of time. For example, the sensor unit and the computational processor circuitry may be reliably protected from external contaminants such as flying stones, dirt and salt water.

[Mode 15 and Mode 16]

In "Mode 14," the protective cover may include a pressed product of an anti-corrosive steel plate ("Mode 15").

In addition to this, the pressed product of an anti-corrosive steel plate may have a plated metal, a paint or a coating. As a variant, the protective cover may include a pressed product of a steel plate, and the pressed product may have a plated metal, a paint or a coating ("Mode 16").

[Mode 17 and Mode 18]

In any one of "Mode 1" to "Mode 1," the flange that mounts to the vehicle body may have a side surface, and the side surface may have a through hole formed therein through which the signal cable is drawn to an outside of the wheel support bearing assembly ("Mode 17").

In any one of "Mode 14" to "Mode 16," the protective cover may include a cylindrical segment, with the cylindrical segment being situated in an outboard direction with respect to the flange that mounts to the vehicle body, and the cylindrical segment may include a through hole formed therein through which the signal cable is drawn to an outside of the wheel support bearing assembly ("Mode 18").

In this way, a through hole may be formed in a side surface of the flange or in a cylindrical segment of the protective cover, through which the signal cable is drawn to an outside of the wheel support bearing assembly. Such a through hole may help weaken an external force that may apply tension to the signal cable. Such a through hole may also limit circumferential displacement of the signal cable. In this way, the signal cable may be more reliably fastened.

[Mode 19]

In "Mode 17" or "Mode 18," the sensor-equipped wheel support bearing assembly may further include a seal material applied to the through hole formed in the flange or the through hole formed in the protective cover. A configuration where a seal material is applied to a through hole formed in the protective cover may further improve sealability of the protective cover.

[Mode 20]

In "Mode 17" or "Mode 18," the sensor-equipped wheel support bearing assembly may further include a rubber bushing mounted on the signal cable, with the rubber bushing being fitted, through insertion of the signal cable, into the through hole formed in the flange or the through hole formed in the protective cover.

[Mode 21]

In any one of "Mode 1" to "Mode 20," the sensor unit may include a strain generator member and at least one sensor mounted on the strain generator member to sense strain in the strain generator member. The strain generator member may include at least two fixation contact segments fixedly in contact with the stationary member.

A load may act on the wheel support bearing assembly or between a tire of a wheel and a road surface. This will cause a load to be applied to a stationary member (e.g. outer member) of the wheel support bearing assembly, thus, in turn, causing deformation of the stationary member. In the aforementioned configuration, a sensor unit includes a strain generator member, and the strain generator member may be fixedly in contact with the stationary member. Thus, strain in the stationary member may be transmitted to the strain generator member in amplified form. Such strain can be sensed by a strain sensor with enhanced sensitivity. This may enable accurate determination of a load.

[Mode 22]

In any one of "Mode 1" to "Mode 21," the sensor unit may be each disposed on upper, lower, right and left parts, respectively, of an outer diametric surface of the stationary member, such that four sensor units are evenly distributed 90° out of phase from each other in a circumferential direction of an outer diametric surface of the stationary member. The upper and lower parts may correspond to vertical regions relative to a tire tread, and the right and left parts may correspond to horizontal regions relative to a tire tread. Such arrangement of four sensor units may enable more accurate estimation of a vertical load component $F_z$, a load component $F_x$ that may serve as a drive force or a brake force, and/or an axial load component $F_y$ that act on the wheel support bearing assembly.

[Mode 23 and Mode 24]

In any one of "Mode 1" to "Mode 22," the flange of the stationary member may have a shape that has, as viewed on a front elevational view, line symmetry with respect to an imaginary line perpendicular to an axis of the wheel support bearing assembly ("Mode 23"). In any one of "Mode 1" to "Mode 22," the flange of the stationary member may have a shape that has, as viewed on a front elevational view, point symmetry with respect to an axis of the wheel support bearing assembly ("Mode 24").

Any one of these configurations may allow for simplification of the shape of the stationary member. Any one of these configurations may also reduce or minimize variation in temperature distribution of the stationary member as well as variation in the degree of expansion and shrinkage of the stationary member that may be caused by the complexity of the shape of the stationary member. This may enable sensor unit(s) to, with the effects of those factors being reduced or minimized, sense strain induced by application of a load.

[Mode 25]

A method of constructing a sensor-equipped wheel support bearing assembly according to "Mode 25" is a method of constructing a sensor-equipped wheel support bearing assembly of any one of "Mode 14" to "Mode 24."

The method includes: mounting the sensor unit to a peripheral surface of the stationary member or to a peripheral surface of the stationary member with the rolling elements that are incorporated in advance into the stationary member; mounting the protective cover to a peripheral surface of the stationary member; and subsequently installing remaining components to construct the sensor-equipped wheel support bearing assembly.

The aforementioned construction method may make it easier to construct a sensor-equipped wheel support bearing assembly in which a sensor unit as well as a protective cover are configured to be mounted to the stationary member.

"Implementation 1," which is one of particular examples of the aforementioned "Mode(s)," will now be described in connection with FIG. 44 to FIG. 56.

A sensor-equipped wheel support bearing assembly according to "Implementation 1" includes an outer member 1 and an inner member 2. One of the outer member 1 and the inner member 2 serves as a stationary member. The wheel support bearing assembly also includes at least one sensor unit 20 that is associated with an outer diametric surface of the stationary member. The wheel support bearing assembly also includes a computational processor circuitry 18 configured to process output signal(s) of the sensor unit(s) 20 through computation, and a signal cable 29 configured to send data computed by the computational processor circuitry 18 to an outside of the wheel support bearing assembly. The wheel support bearing assembly also includes a circuitry securement stay 47 that is associated with a side surface of the vehicle body mounting flange 1a. The computational processor circuitry 18 and the signal cable 29 are attached to the stay 47. The stay 47 includes a fastener fastening the signal cable 29, with the fastener forming a part of the stay 47.

Figure 45:
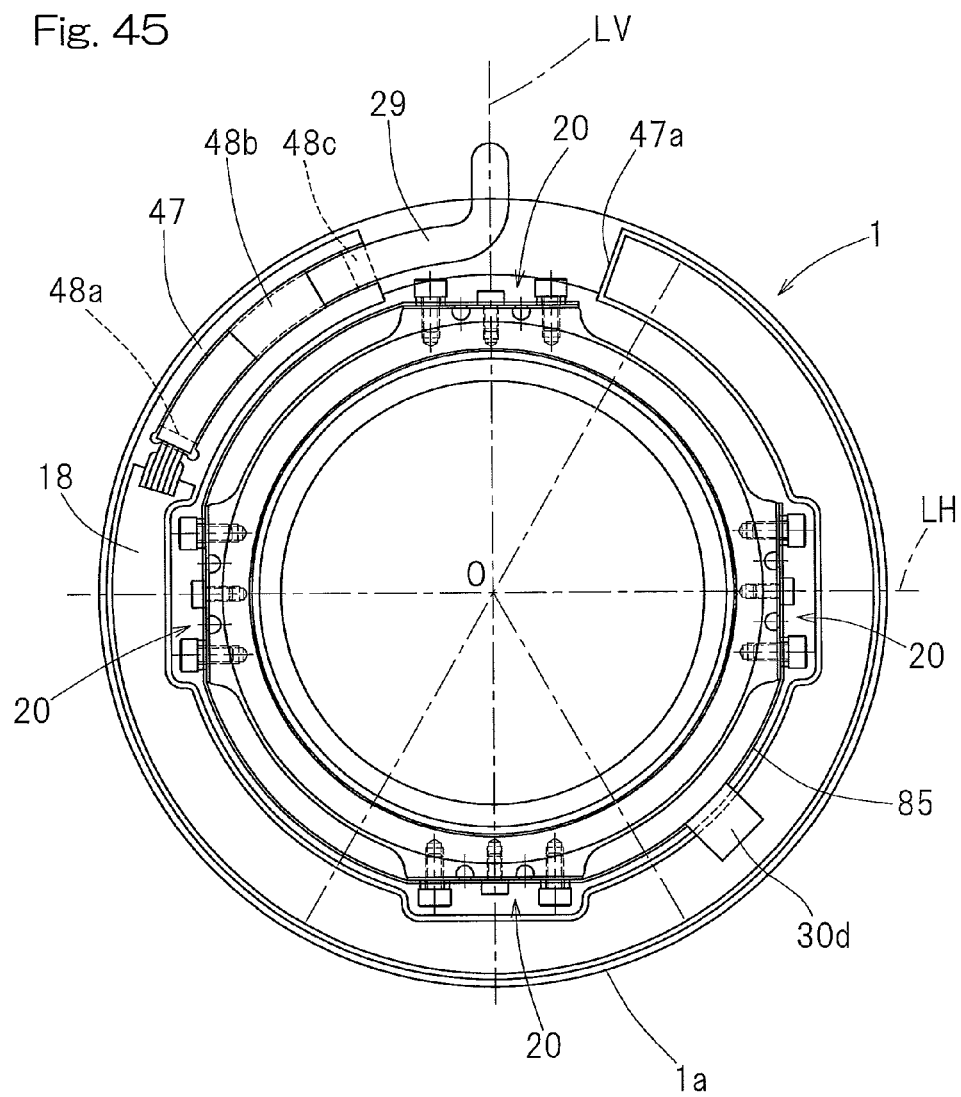
FIG. 45 is a front elevational view of an outer member of the sensor-equipped wheel support bearing assembly, as viewed from an outboard direction.

FIG. 45 is a front elevational view of the outer member 1 of a sensor-equipped wheel support bearing assembly according to "Implementation 1," as viewed from an outboard direction. The vehicle body mounting flange 1a has a shape that may have, as viewed on a front elevational view, line symmetry with respect to an imaginary line (e.g., an imaginary vertical line LV and/or an imaginary horizontal line LH in FIG. 45) perpendicular to an axis O of the wheel support bearing assembly or may have, as viewed on a front elevational view, point symmetry with respect to the axis O. In a particular example, the vehicle body mounting flange 1a has, as viewed on a front elevational view, a circular shape.

Figure 47:
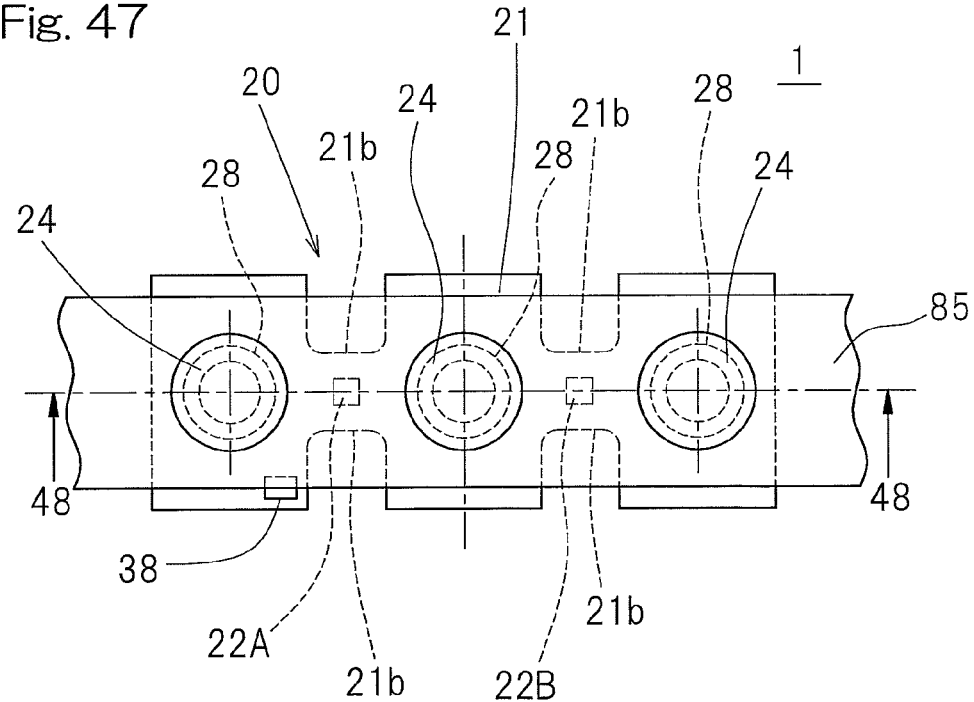
FIG. 47 is an enlarged plan view of a sensor unit for the sensor-equipped wheel support bearing assembly.
Figure 48:
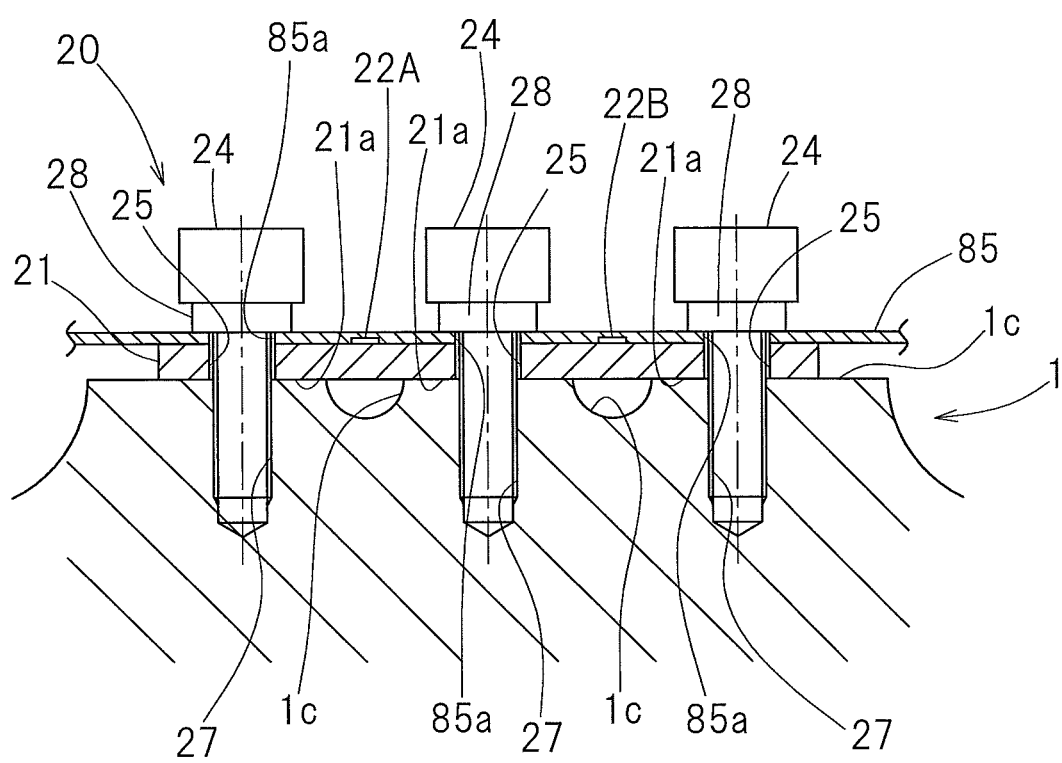
FIG. 48 is a cross sectional view of FIG. 47, taken along the line XXXXVIII-XXXXVIII in FIG. 47.

Referring to an enlarged plan view of FIG. 47 and an enlarged longitudinal cross sectional view of FIG. 48, a sensor unit 20 includes a strain generator member 21. The strain generator member 21 may include three fixation contact segments 21a. The three fixation contact segments 21a may be spaced from each other along a circumferential direction of an outer diametric surface of the outer member 1 and arranged at the same axial positions on an outer diametric surface of the outer member 1. The fixation contact segments 21a may be fixed with respective bolts 24 to an outer diametric surface of the outer member 1. In particular, a flexible circuit board 85, which may be disposed on an outer surface of sensor unit(s) 20, may also be fixed with the bolts 24 to an outer diametric surface of the outer member 1. The flexible circuit board 85 may be a single, band-shaped circuit board that may be arranged in a ring shape so as to extend along an outer diametric surface of the outer member 1. In particular, the single, band-shaped circuit board may be arranged coaxially with the outer member 1. For example, the illustrated four sensor units 20 may be attached to an underside surface of a single, flexible circuit board 85, and these four sensor units 20 may be fixed, together with the flexible circuit board 85, to an outer diametric surface of the outer member 1. Preferable base material for the flexible circuit board 85 includes polyimide(s), since the flexible circuit board 85 may be arranged in a ring shape so as to extend along an outer diametric surface of the outer member 1. Polyimide(s) as a base material for the flexible circuit board 85 may provide the flexible circuit board 85 with desirable bending performance and thermal resistance. This may make it easier for the flexible circuit board 85 to conform to the shape of the outer member 1 along a circumferential direction of the outer member 1.

Each of the bolts 24 may be inserted into the corresponding one of bolt insertion holes 85a that may be formed in the flexible circuit board 85 as well as into a bolt insertion radial through holes 25 that may be formed in each of the fixation contact segments 21a of a strain generator member 21, and may be screwed into the corresponding one of screw holes 27 that may be formed in an outer periphery of the outer member 1. A washer 28 may be interposed between the head of each of the bolts 24 and a strain generator member 21. The outer member 1 has an outer diametric surface that may include flat segment(s) 1b with which fixation contact segments 21a may be fixedly in contact. This may enable sensor unit(s) 20 to be fixed with increased stability to an outer diameter of the outer member 1. The outer diametric surface may be formed therein with grooves 1c. The grooves 1c may be formed at respective centers between the locations in the outer diametric surface of the outer member 1 with which the illustrated three fixation contact segments 21a may be fixedly in contact. By fixing, in the aforementioned manner, fixation contact segments 21a to an outer diametric surface of the outer member 1, portion(s) of a strain generator member 21—which may be in the form of a sheet plate—where cutout(s) 21b may be formed may be separated a distance from an outer diametric surface of the outer member 1. This may facilitate, in the vicinity of the cutout(s) 21b, strain-induced deformation of the strain generator member 21.

FIG. 49A is a developed plan view of one possible arrangement of sensor units 20 with respect to the flexible circuit board 85, and FIG. 49B is a longitudinal cross sectional view of FIG. 49A. In this illustrated arrangement, four sensor units 20 are directly attached to the flexible circuit board 85. Sensor unit(s) 20 may be attached to an underside surface of the flexible circuit board 85 (i.e., a surface of the flexible circuit board 85 that faces an outer diametric surface of the outer member 1). A wiring circuit 87 that may be configured to transmit output signals of strain sensors 22A, 22B from each of the sensor unit(s) 20 may be printed, in the form of circuit patterns, on an outer surface and/or an underside surface of the flexible circuit board 85. Sensor unit(s) 20 may be connected with the wiring circuit. In particular, sensor unit(s) 20 may be soldered to the wiring circuit. A sensor unit 20 may include circuits printed on a surface of the sensor unit 20. This particular surface may be situated on a side that is opposite to a side on which a surface of a strain generator member 21 of the sensor unit 20 contacting the outer member 1 is situated. A sensor unit 20 may be attached to the flexible circuit board 85 such that the aforementioned surface of the sensor unit 20 printed thereon with circuits faces a surface of the flexible circuit board 85 where the wiring circuit 87 is printed. In the example under discussion, at area(s) of the flexible circuit board 85 where sensor unit(s) 20 is/are attached, the flexible circuit board 85 may have band-shaped opening(s) 85b formed therein—each for one of opposite sides of a sensor unit 20—that may extend along a longitudinal direction of the flexible circuit board 85. This may allow a sensor unit 20 to have a flat surface with no printed circuits and/or solders, that may be used as a surface to contact with the outer member 1, thus enabling attachment of sensor unit(s) 20 with tight contact to the outer member 1.

Figure 44:
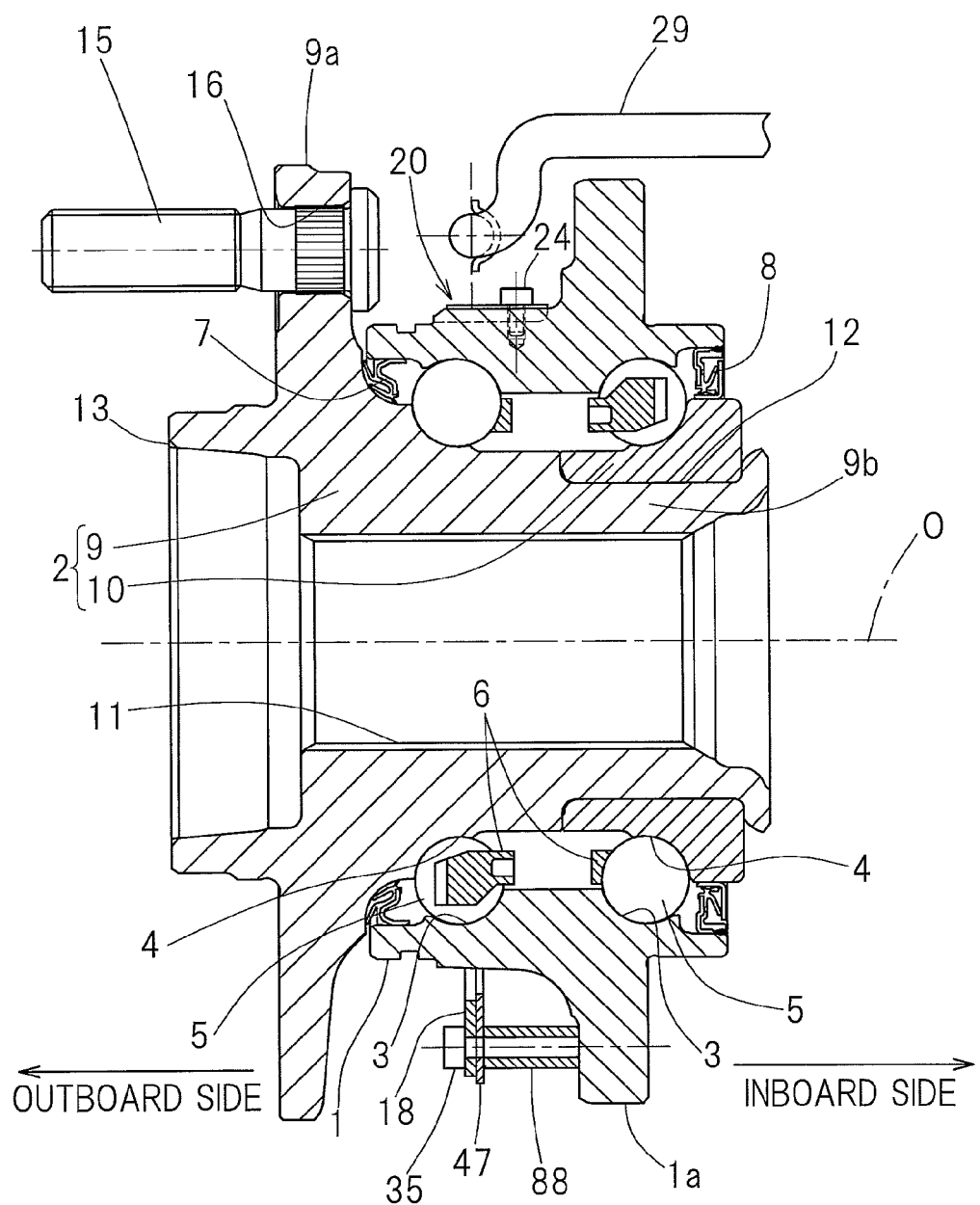
FIG. 44 is a longitudinal cross sectional view of a sensor-equipped wheel support bearing assembly according to "Implementation 1"
Figure 53:
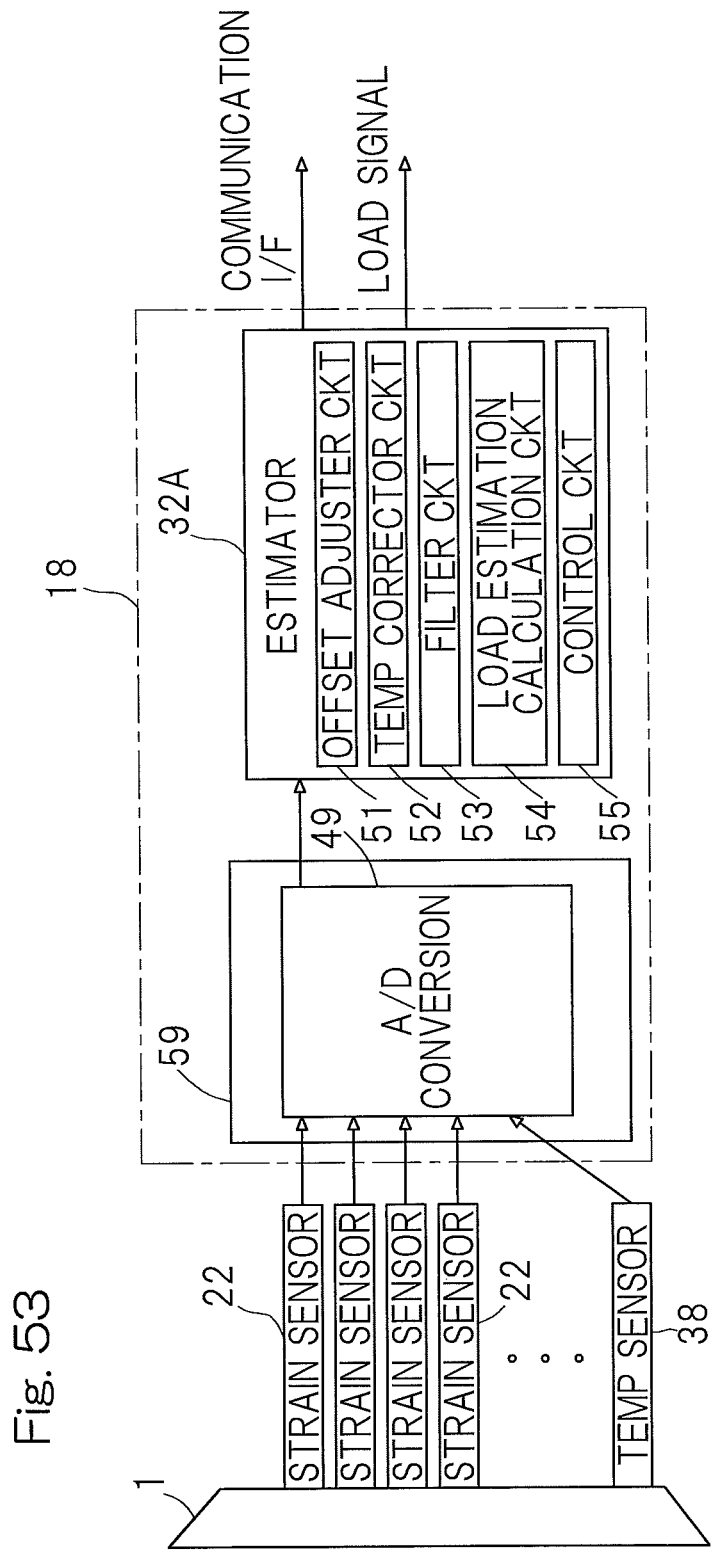
FIG. 53 is a block diagram showing an example of the general configuration of a sensing system in the sensor-equipped wheel support bearing assembly.
Figure 54:
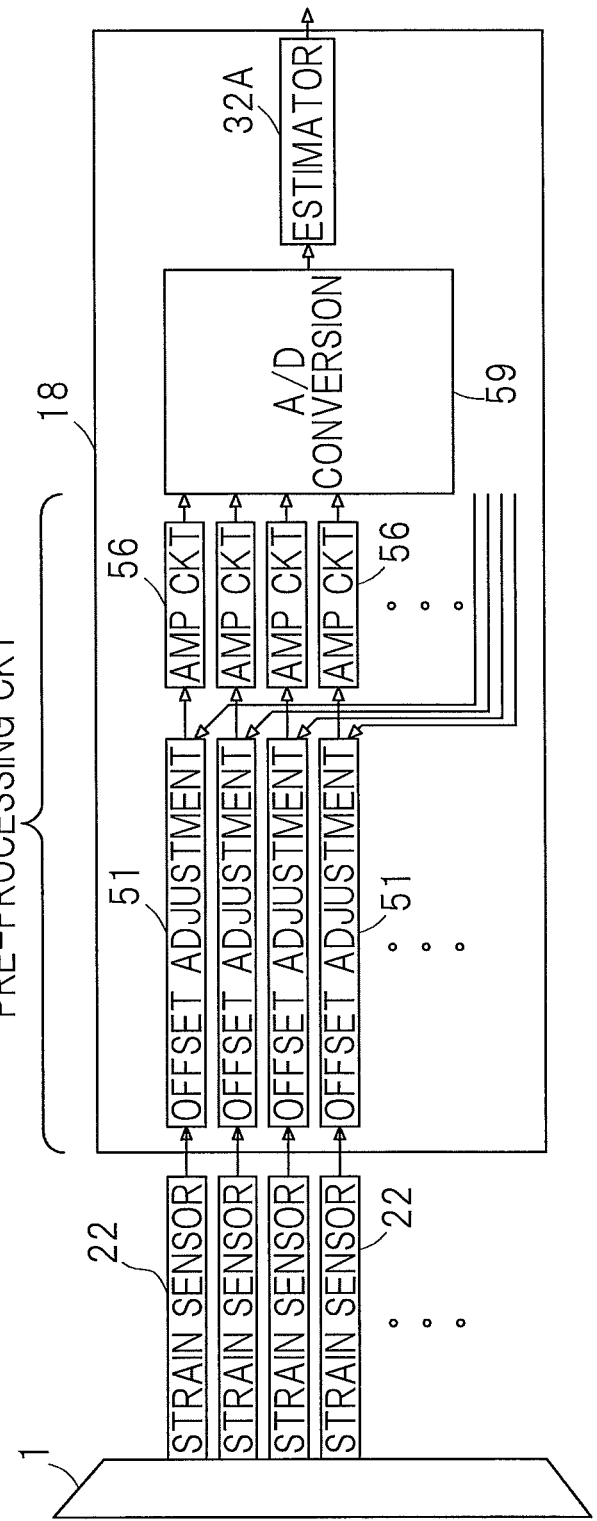
FIG. 54 is a block diagram showing another example of the general configuration of a sensing system in the sensor-equipped wheel support bearing assembly.

The flexible circuit board 85 may have a branch 85d, via which strain sensor(s) 22A, 22B of sensor unit(s) 20 may be connected with the computational processor circuitry 18 (FIG. 44 and FIG. 45). The branch 85d may be located at a center of a longitudinal length of the flexible circuit board 85. The computational processor circuitry 18 may be configured to process output signal(s) of strain sensor(s) 22A, 22B of sensor unit(s) 20 through computational processing, to estimate a force (e.g., a vertical load component $F_z$, a load component $F_x$ that may serve as a drive force or a brake force, and/or an axial load component $F_y$) that acts on the wheel support bearing assembly or between a wheel and a road surface (i.e., on a tire tread). The computational processor circuitry 18 may include a circuit board and circuit devices mounted on the circuit board. FIG. 53 and FIG. 54 show exemplary configurations of the computational processor circuitry 18.

FIG. 50A is a developed plan view of another possible arrangement of sensor units 20 with respect to the flexible circuit board 85, and FIG. 50B is a longitudinal cross sectional view of FIG. 50A. In this illustrated arrangement, too, all sensor unit(s) 20 is/are directly attached to the flexible circuit board 85. In this illustrated arrangement, at areas of the flexible circuit board 85 where sensor unit(s) 20 is/are attached, the flexible circuit board 85 may have a quadrilateral opening 85c formed therein—each for the corresponding one of the sensor unit(s) 20—that may expose substantially the entirety of the corresponding one of the sensor unit(s) 20. This may ensure that deformation of a strain generator member 21 of a sensor unit 20 is not limited or hindered by the flexible circuit board 85, thus resulting in a corresponding improvement on the accuracy with which a load may be determined. The rest of the features in this illustrated arrangement are the same as those of the possible arrangement shown in FIG. 49A and FIG. 49B.

FIG. 51A is a developed plan view of yet another possible arrangement of sensor units 20 with respect to the flexible circuit board 85, and FIG. 51B is a longitudinal cross sectional view of FIG. 51A. In this illustrated arrangement, each one of sensor unit(s) 20 may be separated from the flexible circuit board 85, except for the connection(s) of the sensor unit(s) 20 with the wiring circuit 87 on the flexible circuit board 85. The rest of the features in this illustrated arrangement are the same as those of the possible arrangement shown in FIG. 49A and FIG. 49B.

A circuit board of the computational processor circuitry 18 may be associated, via the circuitry securement stay 47, with an outboard oriented side surface of the vehicle body mounting flange 1a of the outer member 1, such as shown in FIG. 44. Here, the circuitry securement stay 47 may be in the form of a substantially annular, plate member. The circuitry securement stay 47 may be associated, via spacer(s) 88 (FIG. 44), with an outboard oriented side surface of the vehicle body mounting flange 1a, such that the stay 47 extends along a circumferential direction of the flange 1a in parallel with the outboard oriented side surface of the flange 1a. In particular, the stay 47 may be associated with the flange 1a coaxially with the outer member 1. The stay 47 may include, in a circumferential portion thereof, a discontinuity 47a. In such a case, the stay 47 has a circular arcuate shape. A circuit board of the computational processor circuitry 18 may have a circular arcuate shape that is substantially the same as the shape of the circuitry securement stay 47. In such a case, a circuit board of the computational processor circuitry 18 may be placed on a front surface of the stay 47 in overlapping manner, and a circuit board of the computational processor circuitry 18, together with the stay 47, may be fixedly associated via a plurality of bolts 35 (FIG. 44) with a side surface of the flange 1a. In a variant, instead of using the bolts 35 for fixation, the circuitry securement stay 47 may be glued or fixedly adhered to a side surface of the flange 1a, and a circuit board of the computational processor circuitry 18 may be glued or fixedly adhered to a front surface of the stay 47. The computational processor circuitry 18 may be connected to a signal cable 29 (FIG. 45) that may be configured to send data processed by the computational processor circuitry 18 to an outside of the wheel support bearing assembly. The computational processor circuitry 18 and the signal cable 29 may be both electrically and mechanically connected with each other. For example, the computational processor circuitry 18 and the signal cable 29 may be soldered to each other or may be connected with each other via a connector. The signal cable 29 may be drawn to an outside of the wheel support bearing assembly through the discontinuity 47a in the stay 47.

Figure 46A:
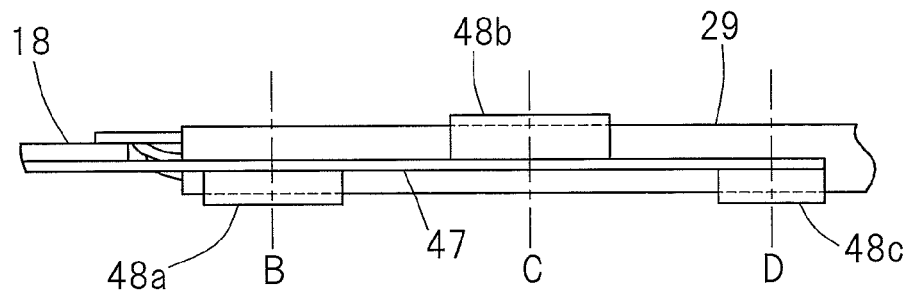
FIG. 46A is a side view of a circuitry securement stay in the sensor-equipped wheel support bearing assembly, showing how a signal cable may be fastened at the stay.
Figure 46B:
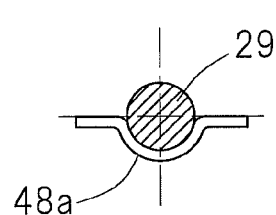
FIG. 46B is a longitudinal cross sectional view of FIG. 46A, taken along the line indicated by a symbol B.
Figure 46C:
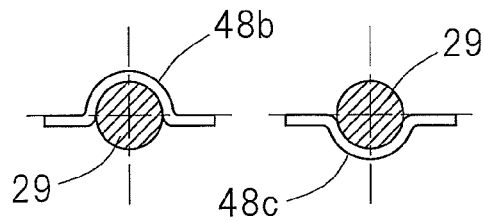
FIG. 46C is a longitudinal cross sectional view of FIG. 46A, taken along the line indicated by a symbol C.
Figure 46D:
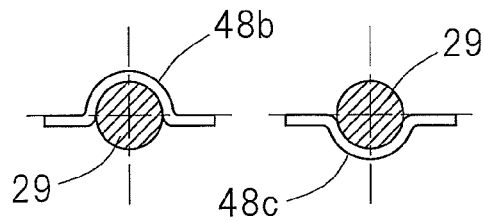
FIG. 46D is a longitudinal cross sectional view of FIG. 46A, taken along the line indicated by a symbol D.

Referring to FIG. 45 and FIG. 46A to FIG. 46D, the circuitry securement stay 47 may include, as a fastener fastening the signal cable 29, three clamps 48a, 48b, 48c that may be circumferentially spaced apart from each other. The clamps 48a, 48b, 48c may be integral with or in one-piece construction with the circuitry securement stay 47. FIG. 46A shows a side view of these clamps 48a, 48b, 48c. FIG. 46B, FIG. 46C and FIG. 46D are cross sectional views of FIG. 46A, taken along the line indicated by a symbol B, taken along the line indicated by a symbol C, and taken along the line indicated by a symbol D, respectively. The first clamp 48a, which is the closest clamp to the connection between the computational processor circuitry 18 and the signal cable 29 among the clamps 48a, 48b, 48c, may include a material of the stay 47 that is lanced towards the flange 1a and is pressed onto a semi-circumferential portion of a peripheral surface of the signal cable 29 that is situated on a side facing the flange 1a, thus forming a clamp 48a having a semicircular arcuate cross sectional shape. The second clamp 48b, which is next to the first clamp 48a, may include a material of the stay 47 that is lanced in an outboard direction away from the flange 1a and is pressed onto a semi-circumferential portion of a peripheral surface of the signal cable 29 that is situated on a side facing away from the flange 1a, thus forming a clamp 48b having a semicircular arcuate cross sectional shape. The third clamp 48c, which is next to the second clamp 48b and is closer to the discontinuity 47a, may include a material of the stay 47 that is lanced towards the flange 1a and is pressed onto a semi-circumferential portion of a peripheral surface of the signal cable 29 that is situated on a side facing the flange 1a, thus forming a clamp 48c having a semicircular arcuate cross sectional shape.

The circuitry securement stay 47 may include a pressed product of an anti-corrosive steel plate. In addition to this, the pressed product of an anti-corrosive steel plate may have a plated metal, a paint or a coating. As a variant, the circuitry securement stay 47 may include a pressed product of a steel plate, and the pressed product may have a plated metal, a paint or a coating. The circuitry securement stay 47, a circuit board of the computational processor circuitry 18 and a portion of the signal cable 29 may be integrally molded with resinous material. The circuitry securement stay 47 may include a molded article of resinous material. Any one of these configurations may prevent rust formation on the circuitry securement stay 47. Rust formation may result in the rising of segment(s) of the stay 47 where the computational processor circuitry 18 and/or the signal cable 29 is/are attached. Any one of these configurations may also prevent the computational processor circuitry 18 from accidentally catching rust from the stay 47. In this way, incorrect computational processing due to rust as well as accidental breaking of the signal cable 29 may be avoided. In a configuration where the circuitry securement stay 47 includes a molded article of resinous material, the computational processor circuitry 18 may be insertion-molded in the circuitry securement stay 47. In this way, an attaching operation of the computational processor circuitry to the stay may be omitted.

According to an exemplary configuration of the computational processor circuitry 18 as shown in FIG. 53, strain sensor(s) 22 of sensor unit(s) 20 may be connected through an A to D converter 49 to an estimator 32A of the computational processor circuitry 18. More specifically, output signal(s) of strain sensor(s) 22 may be directly converted from analog to digital by the A to D converter 49, and the A to D converted output signal(s) of the strain sensor(s) 22 may be sent to the input of the estimator 32A. The A to D converter 49 may have a resolution of at least twenty bits. The A to D converter 49 may be a multi-channel input, micro A to D converter device. In such a case, the A to D converter 49 may form a converter unit 59 that may be configured to transform output signal(s) of sensor(s) of a plurality of sensor units 20 into a single digital data. Preferably, the A to D converter 49 is a delta-sigma A to D converter, since such an A to D converter has a higher resolution and operates a relatively high speed.

The estimator 32A may be configured to estimate, based on A to D converted output signal(s) of strain sensor(s) 22 of sensor unit(s) 20, a force (e.g., a vertical load component $F_z$, a load component $F_x$ that may serve as a drive force or a brake force, and/or an axial load component $F_y$) that acts on the wheel support bearing assembly or between a wheel and a road surface (i.e., on a tire tread). The estimator 32A may be formed of a microcomputer. An estimator 32A formed of a microcomputer may include a circuit board and various electronic devices mounted on the circuit board. In a variant, the estimator 32A formed of a microcomputer may be a single-chip component. The estimator 32A may include an offset adjuster circuit 51, a temperature corrector circuit 52, a filter circuit 53 that may include a low-pass filter, a load estimation calculation circuit 54, and a controller circuit 55. The offset adjuster circuit 51 may be configured to adjust an offset to a normal value (i.e., a reference value). Such an offset may include an initial offset that may be produced by strain sensor(s) 22 and/or an offset that may be caused by installation of strain sensor(s) 22 to the wheel support bearing assembly. Offset adjustment that may be carried out by the offset adjuster circuit 51 may be modulated by the controller circuit 55 or may be modulated in response to an external input or instruction. Offset-inducing factors may include tolerance of strain sensor(s) 22 and unintended strain that may be caused during installation of strain sensor(s) 22. Thus, offset adjustment is preferably carried out after sensor unit(s) 20 are installed to the wheel support bearing assembly and the construction of the wheel support bearing assembly is finished.

In this way, offset adjustment may be carried out by the offset adjuster circuit 51, after the construction of a sensor-equipped wheel support bearing assembly is finished, so that an output signal of a strain sensor 22 as of this point can be used as a reference value. More specifically, an output of a strain sensor 22 as of when a sensor-equipped wheel support bearing assembly has been constructed, may be used as a zero point. This may ensure the quality of output signal(s) of strain sensor(s).

An output signal of a strain sensor 22 may contain a drift. Such a drift may include a drift that is attributable to temperature characteristics of the strain sensor 22 itself and a drift that is attributable to temperature-induced strain of the outer member 1 (i.e., a stationary member). The temperature corrector circuit 52 may be configured to correct a drift that may be attributable to temperature, which may be contained in output signal(s) of strain sensor(s) 22 that went through offset adjustment. To carry out correction of a drift that may be attributable to temperature, a temperature sensor 38 may be mounted to a strain generator member 21 of at least one sensor unit 20, such as shown in FIG. 47. Output signal(s) of the temperature sensor(s) 38 may be digitalized by the A to D converter 49 and sent to the input of the temperature corrector circuit 52.

The load estimation calculation circuit 54 may be configured to estimate a load, based on digitalized output signal(s) of strain sensor(s) 22 that went through various processing that may include offset adjustment by the offset adjuster circuit 51, temperature-responsive correction by the temperature corrector circuit 52, and filtering by the filter circuit 53. The load estimation calculation circuit 54 may include a relation definer (not shown) that may store a relationship between output signal(s) of strain sensor(s) 22 on one hand and a vertical load component $F_z$, a load component $F_x$ that may serve as a drive force or a brake force, and/or an axial load component $F_y$, on the other hand. Such a relationship may be defined by an equation and/or a table. The load estimation calculation circuit 54 may use the relation definer to estimate the aforementioned force (e.g., a vertical load component $F_z$, a load component $F_x$ that may serve as a drive force or a brake force, and/or an axial load component $F_y$), based on output signal(s) of strain sensor(s) 22. The content in the relation definer may be defined in advance through tests and/or simulations. The load estimation calculation circuit 54 of the estimator 32A may produce load data that may be transmitted by the signal cable 29 for output. The transmitted load data may be sent, via an intra-vehicle communication bus (e.g., a CAN bus), to a higher-level electronic control unit (i.e., ECU) that may be included in the vehicle body.

According to another exemplary configuration of the computational processor circuitry 18 as shown in FIG. 54, the aforementioned offset adjuster circuit(s) 51 and amplifier circuit(s) 56 that may be configured to amplify output signal(s) of strain sensor(s) 22 may be provided, as pre-processing circuits, upstream of or at a preceding stage of the estimator 32A. This exemplary configuration is the same as the exemplary configuration as shown in FIG. 53, with respect to the configuration of the converter unit 59 that may transform output signals of sensor(s) of a plurality of sensor units 20 into a single digital data as well as the configuration of the estimator 32A that may be provided downstream or at subsequent stage of those pre-processing circuits.

Figure 55:
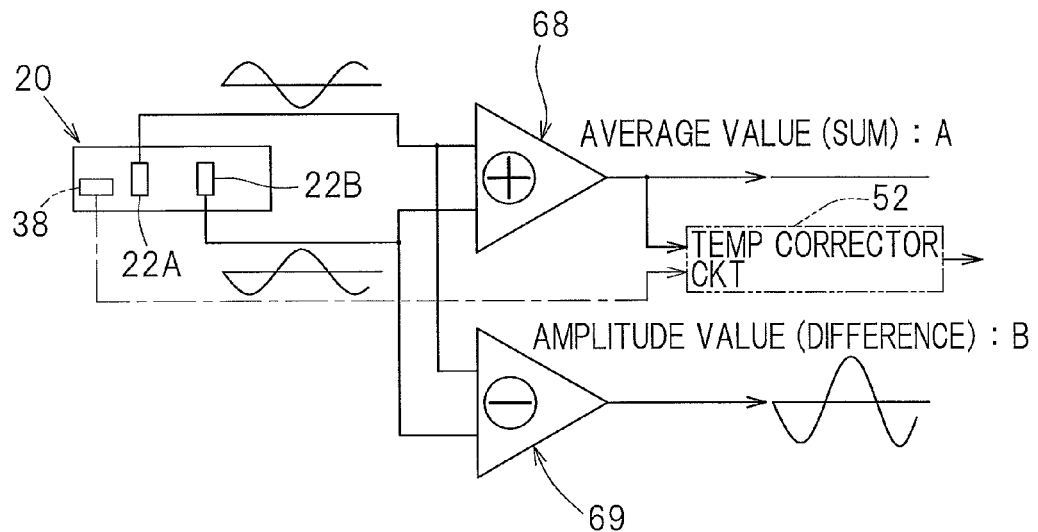
FIG. 55 is a block diagram of an exemplary circuit that may be used in a computational segment for calculating an average value and an amplitude value.

The load estimation calculation circuit 54 of the estimator 32A may include an average value calculator 68 and an amplitude value calculator 69 as shown in FIG. 55. The average value calculator 68, which may include an adder component, may be configured to calculate a sum of output signals of the illustrated two strain sensors 22A, 22B of a sensor unit 20, as an average value A for output. The amplitude value calculator 69, which may include a subtractor component, may be configured to calculate a difference between output signals of the two illustrated strain sensors 22A, 22B, as an amplitude value B for output.

Figure 56:
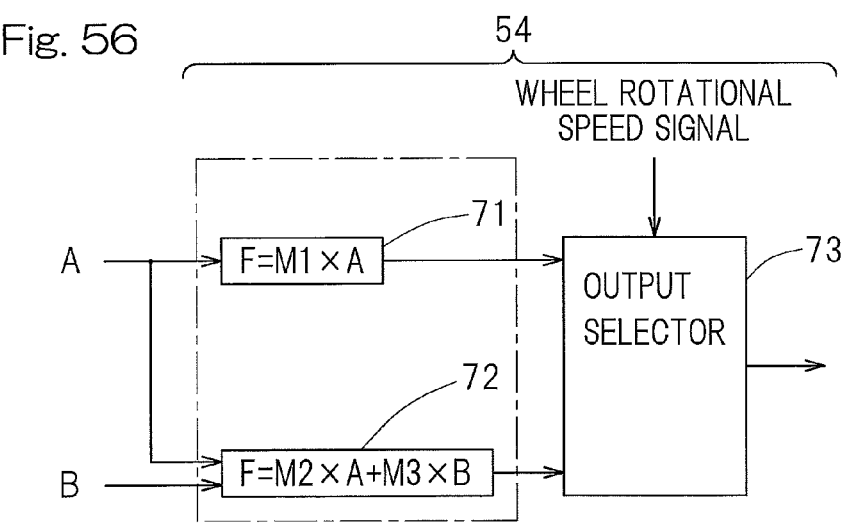
FIG. 56 is a block diagram of a circuit that may be used to estimate a load, based on an average value and/or an amplitude value, for output.

The load estimation calculation circuit 54 may be configured to estimate, through computation, a force F (e.g., a vertical load component $F_z$) that acts on the wheel support bearing assembly or between a wheel and a road surface (i.e., on a tire tread), based on an average value A and/or an amplitude value B that may be calculated by the average value calculator 68 and the amplitude value calculator 69, respectively. To perform such an estimation through computation, the load estimation calculation circuit 54 may include two load estimator components 71, 72 as shown in FIG. 56. The first load estimator component 71 may be configured to estimate, through computation, a load F that acts on the wheel support bearing assembly, based on the aforementioned average value A. The second load estimator component 72 may be configured to estimate, through calculation, a load F that acts on the wheel support bearing assembly, based on a combination of the aforementioned average value A and the aforementioned amplitude value B.

The relationship between a given load F that acts on the wheel support bearing assembly and output signal(s) S of strain sensor(s) 22A, 22B, within the linear range and by disregarding an offset, can be expressed by the following equation (1):

$$F = M1 \times S \tag{1}$$

Using the equation (1), an estimate can be made of the given load F. Note that M1 in the equation (1) represents a predefined correction coefficient.

Thus, the first load estimator component 71 may be configured to estimate, through calculation, the given load F, employing the following linear equation (2):

$$F = M1 \times A \tag{2}$$

where a variable A represents the aforementioned average value A, which is a value that has removed an offset in output signals of the illustrated strain sensors 22A, 22B, and the variable A is multiplied by M1 which represents the predefined correction coefficient.

The use of such a variable, which has disregarded an offset, may improve the accuracy with which a load may be estimated.

The second load estimator component 72 may be configured to estimate, through computation, the given load F, employing the following linear equation (3) that uses as variables the aforementioned average value A and the aforementioned amplitude value B:

$$F = M2 \times A + M3 \times B \qquad (3)$$

in which the variable A is multiplied by M2 which represents a predefined correction coefficient, and the variable B is multiplied by M3 which represents a predefined correction coefficient. The use of such two different variables may further improve the accuracy with which a load may be estimated.

The correction coefficients in the aforementioned equations may be determined in advance through tests and/or simulations. The computation by the first load estimator component 71 and the computation by the second estimator component 72 may be preformed in parallel with each other. Note that, in the equation (3), the average value A as the variable A may be omitted. In other words, the second estimator component 72 may be configured to estimate, through computation, the given load F, employing only the amplitude value B as a variable in the equation (3).

Figure 52:
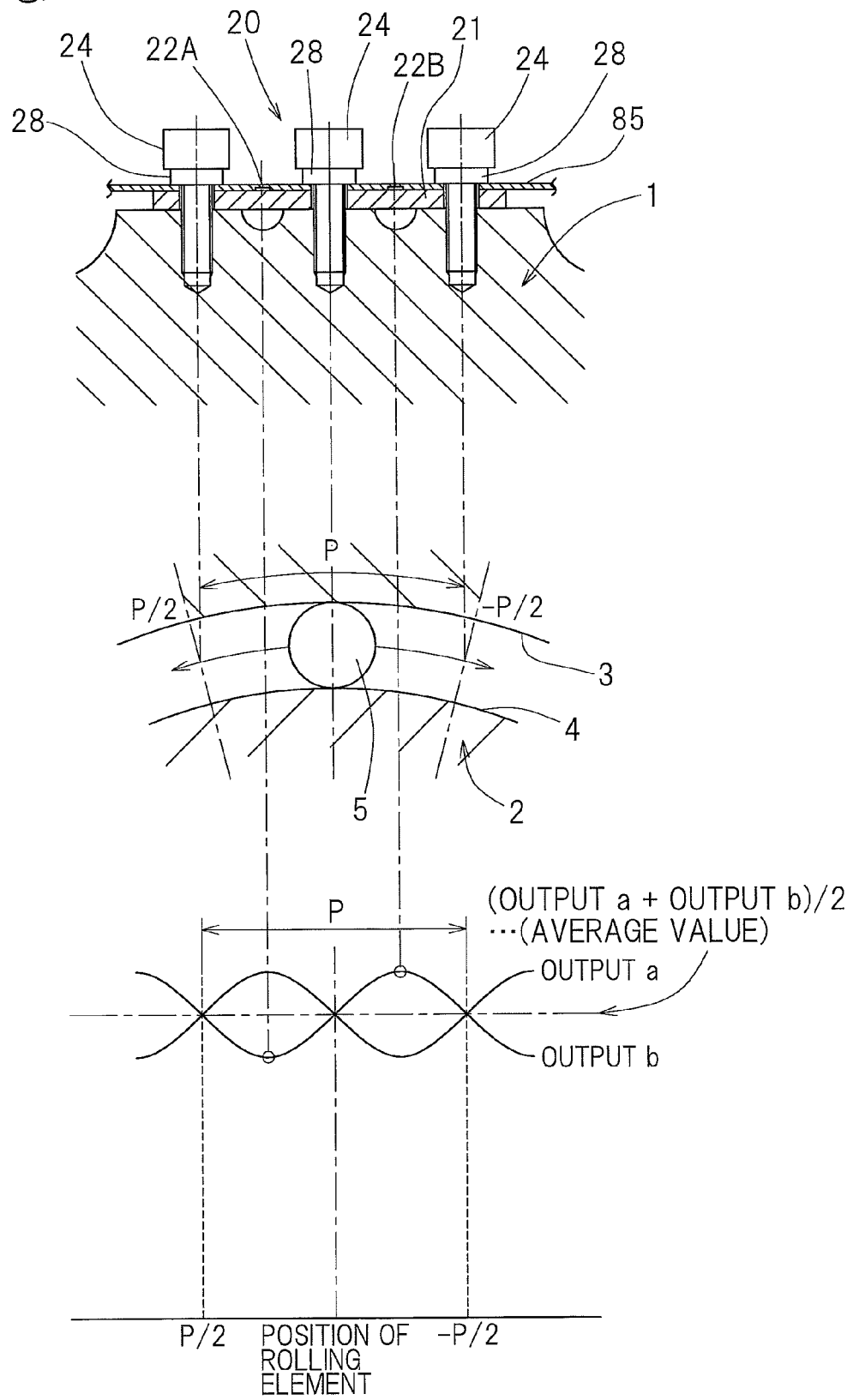
FIG. 52 is a set of explanatory views of the effects of the positions of rolling elements on the output signal of a sensor unit.

A sensor unit 20 may be positioned on an axial location that is in the vicinity of an outboard side raceway surface 3 of the outer member 1, such as shown in FIG. 44. In such a case, output signal(s) a, b of strain sensor(s) 22A, 22B may be affected by the rolling elements 5 passing by the vicinity of the location of the corresponding sensor unit 20, as shown in FIG. 52. FIG. 52 corresponds to FIG. 7 that is already described in detail in the context of the first embodiment. Since the configuration or construction as well as the effects or advantages of FIG. 52 are the same as that of FIG. 7, the description in connection with FIG. 52 will be omitted to avoid redundancy.

Referring to FIG. 56, the load estimator components 71, 72 of the load estimation calculation circuit 54 may be connected to a subsequent stage that may include an output selector 73. The output selector 73 may be configured to selectively switch, based on a rotational speed of a wheel, between a load estimate produced by the first load estimator component 71 and a load estimate produced by the second load estimator component 72, for output. More specifically, the output selector 73 may be configured to select a load estimate produced by the first load estimator component 71 for output, if a rotational speed of a wheel is below a predetermined lower speed limit. When a rotational speed of a wheel is in low speed regime, it may take a longer processing time to determine an amplitude value of output signal(s) of sensor(s). When a wheel is not rotating, determination of such an amplitude value may become entirely impossible. To address this, a load estimate that is produced by the first load estimator component 71 based only on an average value A may be selected for output, if a rotational speed of a wheel is below a predetermined lower speed limit. This may prevent possible delay in outputting a signal that indicates a load estimate.

In "Implementation 1," a sensor unit 20 may be each disposed on upper, lower, right and left parts, respectively, of an outer diametric surface of the outer member 1, such that four sensor units 20 are evenly distributed 90° out of phase from each other in a circumferential direction of an outer diametric surface of the outer member 1. The upper and lower parts may correspond to vertical regions relative to a tire tread, and the right and left parts may correspond to horizontal regions relative to a tire tread. Such arrangement of four sensor units 20 may enable more accurate estimation of a vertical load component $F_z$, a load component $F_x$ that may serve as a drive force or a brake force, and/or an axial load component $F_y$ that act on the wheel support bearing assembly.

In "Implementation 1," an outer member 1 (i.e., a stationary member) may include a flange 1a that mounts to a vehicle body. A computational processor circuitry 18 may be provided which is configured to process output signal(s) of strain sensor(s) 22A, 22B of sensor unit(s) through computation. A signal cable 29 may be provided which is configured to send data computed by the computational processor circuitry 18 to an outside of the wheel support bearing assembly. A circuitry securement stay 47 may be associated with a side surface of this flange 1a, and the computational processor circuitry 18 and the signal cable 29 may be attached to the stay 47. In this way, a computational processor circuitry 18 that may include an A to D converter 49 may be equipped to the outer member 1 in a compact arrangement, without requiring change in a cylindrical geometry of the surface of the outer member 1. This may enhance the ease of assembly and may also enable accurate determination of a load that acts on a bearing structure for rotatably supporting a wheel.

Furthermore, the signal cable 29 may be attached to the circuitry securement stay 47 together with the computational processor circuitry 18, and the signal cable 29 may also be fastened by clamps 48a to 48c (i.e., a fastener) that form a part of the stay 47. In this way, an external force that may be applied to the signal cable 29 may be absorbed by the clamps 48a to 48c as well as by a sheath of the signal cable 29, thus preventing an external force from being applied to the connection between the signal cable 29 and the computational processor circuitry 18. As such, a sensor-equipped wheel support bearing assembly may be provided which may simplify the fastening of a signal cable 29 extending to an outside of the wheel support bearing assembly, that may facilitate the installation of sensor(s), and that may be highly reliable but inexpensive.

FIG. 57 to FIGS. 59A to 59D show "Implementation 2." A sensor-equipped wheel support bearing assembly according to "Implementation 2" may differ from a sensor-equipped wheel support bearing assembly according to "Implementation 1," in that a vehicle body mounting flange 1a of the outer member 1 may have a side surface, in that the side surface may have a through hole 44 formed therein, and in that the signal cable 29 may be inserted into the through hole 44 from an outboard side of the flange 1a such that the signal cable 29 is drawn to an outside of the wheel support bearing assembly. A seal material may be applied to the through hole 44.

In this way, a through hole 44 may be formed in a side surface of the flange 1a through which the signal cable 29 is drawn to an outside of the wheel support bearing assembly. Such a through hole 44 may help weaken an external force that may apply tension to the signal cable 29. Such a through hole 44 may also limit circumferential displacement of the signal cable 29. In this way, the signal cable 29 may be more reliably fastened.

In the aforementioned configuration, a rubber bushing may be mounted on the signal cable 29, with the rubber bushing being fitted, through insertion of the signal cable 29, into the through hole 44.

In "Implementation 2," the circuitry securerment stay 47 may include fastener fastening the signal cable 29. The fastener may include three clamps 48a to 48c. A third clamp 48c, which is closer to the discontinuity 47a in the stay 47 among the three clamps 48a to 48c, may have a C cross sectional shape, such as shown in FIG. 59D. Such a clamp 48c having a C cross sectional shape may fasten the signal cable 29 in wrapping fashion, thus enabling more rigid fastening of the signal cable 29.

Figure 57:
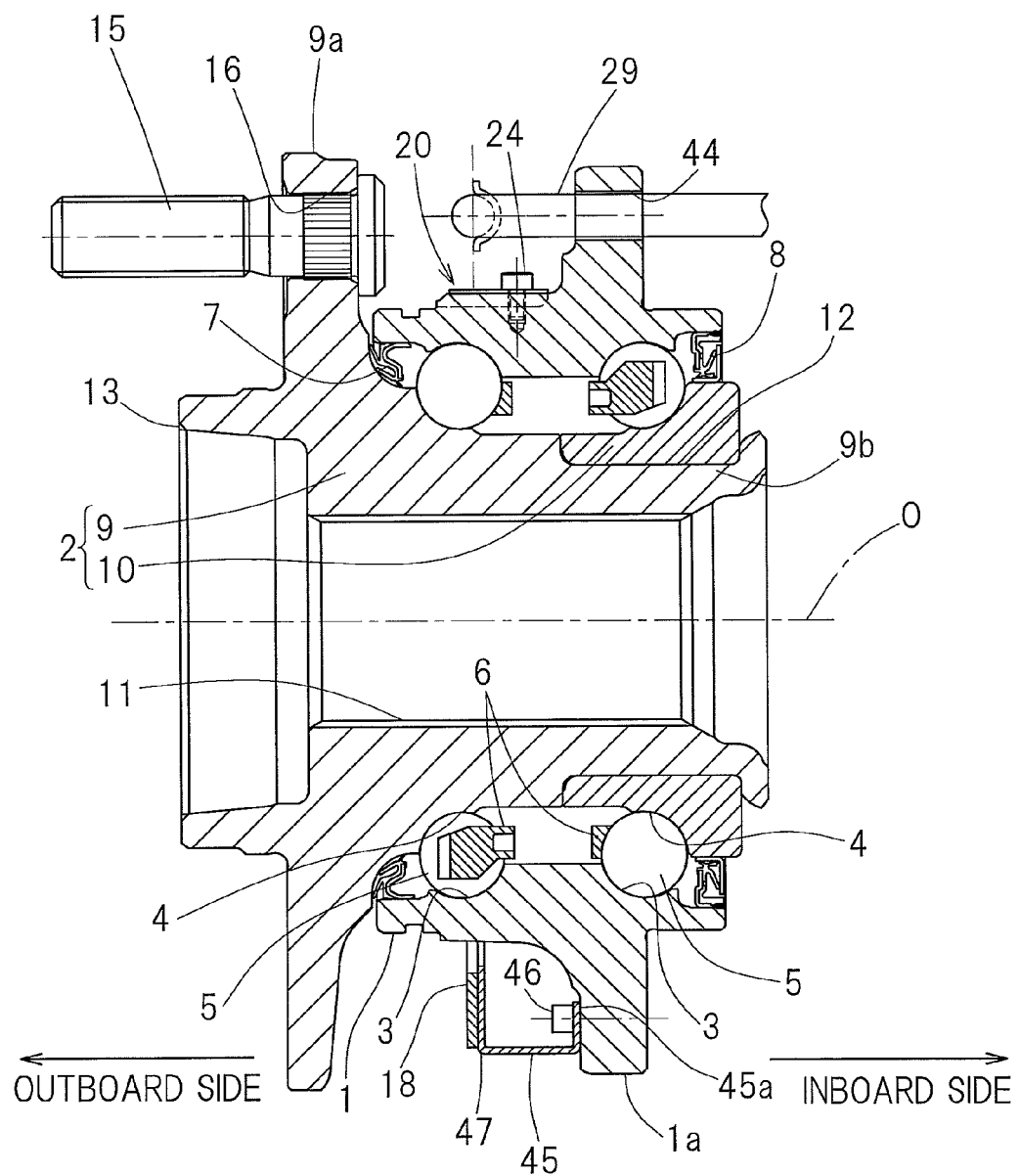
FIG. 57 is a longitudinal cross sectional view of a sensor-equipped wheel support bearing assembly according to "Implementation 2"
Figure 58:
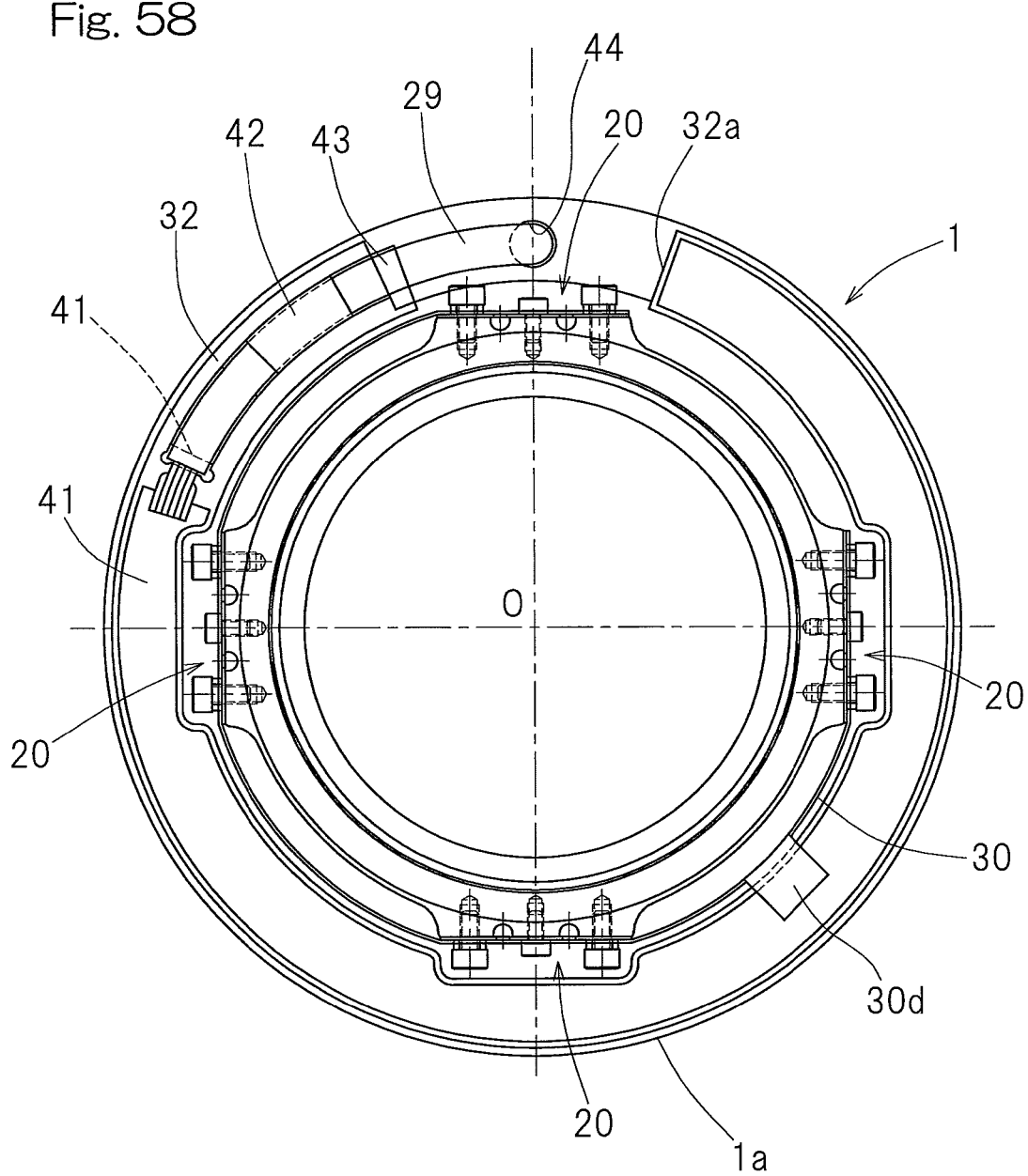
FIG. 58 is a front elevational view of an outer member of the sensor-equipped wheel support bearing assembly, as viewed from an outboard direction.

In "Implementation 2," the circuitry securement stay 47 may have a U cross sectional shape such as shown in FIG. 57. More specifically, the stay 47 may include a leg 45 extending towards the flange 1a of the outer member 1 and may also include, at a free end of the leg 45, a contact portion 45a extending in parallel to a side surface of the flange 1a. The contact portion 45a may be fixed to the flange 1a with bolt(s) 46, thus attaching the circuitry securement stay 47 to a side surface of the flange 1a. Such an attachment configuration may not require the provision of spacer(s) between the stay 47 and the flange 1a, thus reducing the parts count. The rest of the features in "Implementation 2" are the same as those of "Implementation 1" that is described in connection with FIG. 44 to FIG. 56.

Figure 60:
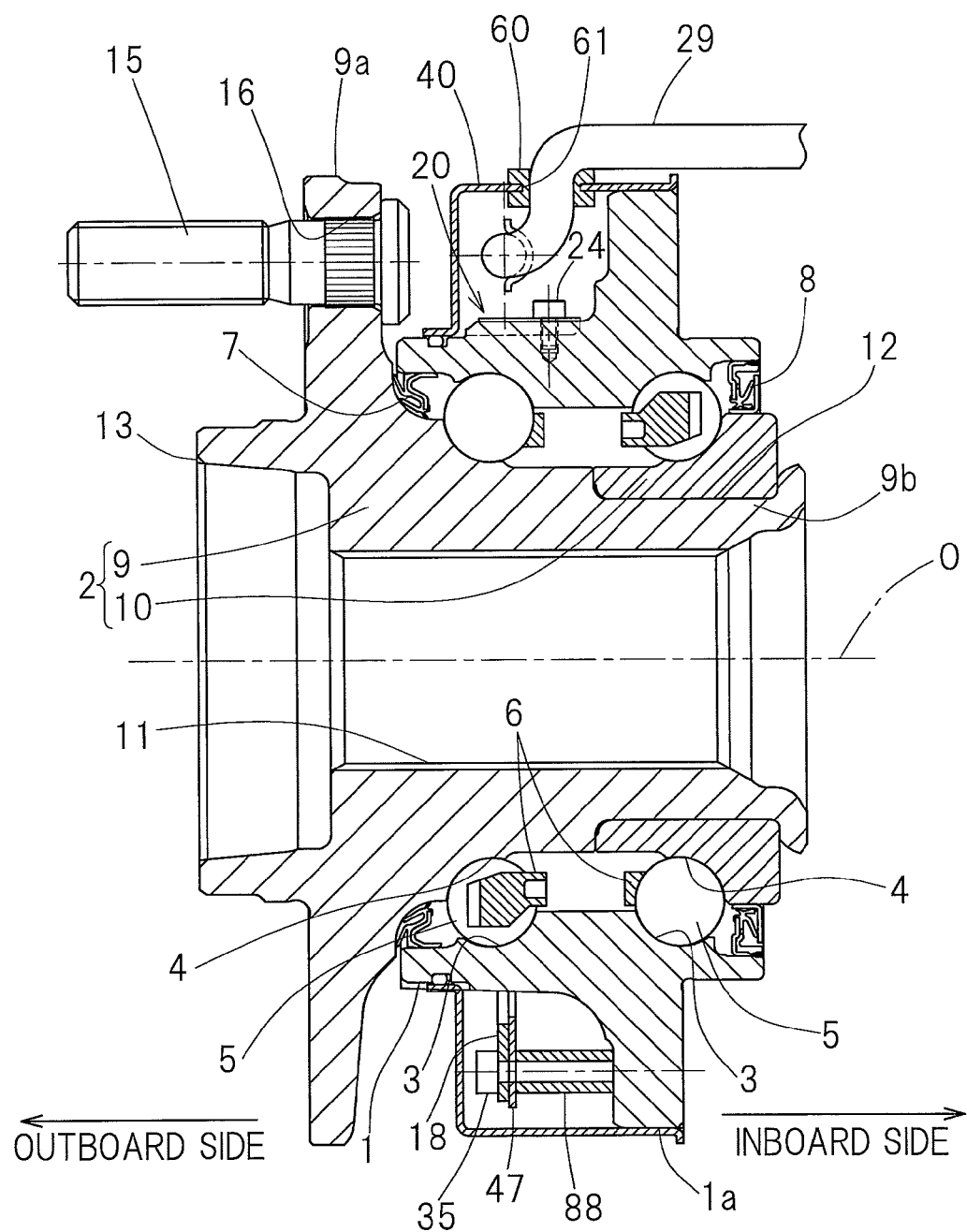
FIG. 60 is a longitudinal cross sectional view of a sensor-equipped wheel support bearing assembly according to "Implementation 3"

FIG. 60 shows "Implementation 3." A sensor-equipped wheel support bearing assembly according to "Implementation 3" may differ from a sensor-equipped wheel support bearing assembly according to "Implementation 1" that is described in connection with FIG. 44 to FIG. 56, in that an annular protective cover 40 covering sensor unit(s) 20 and the computational processor circuitry 18 may be provided, with the protective cover 40 being mounted to an outer peripheral surface of the outer member 1 (i.e., a stationary member) coaxially with the outer member 1. The rest of the features in "Implementation 3" are the same as those of "Implementation 1" that is described in connection with FIG. 44 to FIG. 56.

The protective cover 40 may have an inboard end and an outboard end. The outboard end has a diameter that may be smaller than that of the inboard end. The inboard end of the protective cover 40 may be fitted to an outer diametric surface of the vehicle body mounting flange 1a, while the outboard end may be fitted to an outer diametric surface of the outer member at an outboard end of the outer member 1.

The signal cable 29 which may be connected with the computational processor circuitry 18 may be drawn through one portion in the protective cover 40 to an outside of the wheel support bearing assembly. More specifically, the protective cover 40 may include a cylindrical segment, with the cylindrical segment being situated in an outboard direction with respect to the flange that mounts to the vehicle body. The cylindrical segment may include a through hole 61 formed therein. The signal cable 29 may be inserted into the through hole 61 from an inside of the protective cover 40 such that the signal cable 29 is drawn to an outside of the wheel support bearing assembly.

Such a through hole 61 may help weaken an external force that may apply tension to the signal cable 29. Such a through hole 61 may also limit circumferential displacement of the signal cable 29. In this way, the signal cable 29 may be more reliably fastened.

In the aforementioned configuration, a rubber bushing 60 may be mounted on the signal cable 29, with the rubber bushing 60 being fitted, through insertion of the signal cable 29, into the through hole 61. Such a configuration may improve sealability of the protective cover 40. This may more reliably protect sensor unit(s) 20 and the computational processor circuitry 18 that may be covered by the protective cover 40, from external contaminants such as flying stones, dirt and salt water.

In such a case, a seal material may be applied to the through hole 61, through which the signal cable 29 is drawn from the protective cover 40 to form a signal cable drawn segment of the signal cable 29, thus sealing the signal cable drawn segment of the signal cable 29. Such a configuration, too, may improve sealability of the protective cover 40. This may more reliably protect sensor unit(s) 20 and the computational processor circuitry 18 that may be covered by the protective cover 40, from external contaminants such as flying stones, dirt and salt water.

A sensor-equipped wheel support bearing assembly according to "Implementation 3" may be constructed in the following steps:

Firstly, sensor unit(s) 20, a flexible circuit board 85 and a computational processor circuitry 18 may be equipped to the outer member 1 or to the outer member 1 with the rolling elements 5 that are incorporated in advance into the outer member 1. Next, a protective cover 40 may be installed from an outboard side of the outer member 1, such that an inboard end of the protective cover 40 is fitted to an outer diametric surface of the flange 1a of the outer member 1 and that an outboard end of the protective cover 40 is fitted to an outer diametric surface of an outboard cylindrical segment of the outer member 1, to cover the sensor unit(s) 20, the flexible circuit board 85 and the computational processor circuitry 18 with the protective cover 40. Subsequently, the remaining components are installed to construct the sensor-equipped wheel support bearing assembly.

The aforementioned steps may make it easier to construct a sensor-equipped wheel support bearing assembly in which a protective cover 40 is provided to cover sensor unit(s) 20 mounted to an outer member 1, a flexible circuit board 85 and a computational processor circuit 18.

Next, "Mode 26" to "Mode 38" as well as "Implementation 4" to "Implementation 7," which do not form part of embodiments of the present invention, will now be described in connection with FIG. 61 to FIG. 84.

In an attempt to overcome possible drawbacks of the Patent Document 3 and/or the Patent Document 4 listed earlier, one or more of the inventors listed in the instant application have proposed a sensor-equipped wheel support bearing assembly having the following configurations (see the Patent Document 9; "JP Laid-open Patent Application No. 2009-192392" and the Patent Document 10; "JP Laid-open Patent Application No. 2010-096565").

A sensor equipped wheel support bearing assembly disclosed in the Patent Document 9 listed above may be a sensor equipped wheel support bearing assembly for rotatably supporting a vehicle wheel relative to a vehicle body structure. The wheel support bearing assembly may include an outer member having an inner periphery formed with a plurality of rows of rolling surfaces, an inner member having an outer periphery formed with rolling surfaces opposed to the rolling surface referred to above, and a plurality of rows of rolling elements interposed between the respective opposed rolling surfaces defined in the outer and inner members. Sensor unit(s) may be provided in one of the outer and inner members, which serves as a stationary member, each sensor unit including a strain generating member, having two or more contact fixing segments secured to the stationary member in contact therewith, and two or more sensors fitted to the strain generating member for detecting a strain occurring in the strain generating member. The two or more contact fixing segments may be so arranged as to occupy the same axial positions of an outer diametric surface of the stationary member and as to occupy respective positions spaced from each other in a circumferential direction. The wheel support bearing assembly may also include a calculating section to calculate a load acting on the wheel support bearing assembly by the sum of respective outputs of the two or more sensors.

In such a sensor equipped wheel support bearing assembly, a sum of respective output signals of two or more sensors may counterbalance the influences brought about by the position of the rolling elements. Accordingly, without being affected by the rolling elements, and even at the time they are halted, the load acting in the wheel support bearing assembly and/or between the vehicle wheel and the road surface may be detected with high accuracy.

A sensor equipped wheel support bearing assembly disclosed in the Patent Document 10 listed above may differ from a sensor equipped wheel support bearing assembly disclosed in the Patent Document 9 listed above, in that a stationary member may have an outer diametric surface provided with at least three or more sensor units, each of the sensor units including a strain generating member, having two or more contact fixing segments fixed to the outer diametric surface of the stationary member in contact with such outer diametric surface, and one or more strain sensors fitted to the strain generating member for detecting a strain occurring in the strain generating member, and in that a load estimating section may be provided for estimating a radial load, acting in a direction radially of the wheel support bearing assembly, and an axial load, acting in a direction axially of the wheel support bearing assembly, from respective output signals of the sensors of the three or more sensor units.

With such a sensor equipped wheel support bearing assembly, regardless of any loading conditions, a radial load (a load $F_x$ expected to become a driving force or a vertical load $F_z$) and an axial load $F_y$ may be accurately detected with a high sensitivity.

To perform a load estimation with any one of a sensor equipped wheel support bearing assembly disclosed in the Patent document 9 and a sensor equipped wheel support bearing assembly disclosed in the Patent document 10 listed above, the relation between sensor output(s) and a load that acts on a tire face contacting a surface would have to be determined in advance. For instance, a calibration process may be employed in order to derive a correction coefficient to correct each sensor output in an equation that computes a load estimate. In a calibration process, a sensor equipped wheel support bearing may have to be incorporated into a calibration device or into a vehicle. Furthermore, assuming that a vehicle's longitudinal direction is an X-axis and a vehicle's vertical direction perpendicular to a vehicle's contact surface with the ground is a Z-axis, a plane in which a bearing assembly may be associated to a left wheel and a plane in which a bearing assembly may be associated to a right wheel may be symmetric with each other, in terms of the X-Z plane. In other words, different correction coefficients may have to be assigned to left and right wheels, so that those respective correction coefficients correspond to the coordinates of these wheels, in a vehicle's coordinate system for a load. However, carrying out a calibration process for each of left and tight wheels will increase the number of calibration steps.

To overcome the aforementioned drawbacks, the following "Mode 26" to "Mode 38" may provide a sensor-equipped wheel support bearing assembly which may enable simplified calibration during association of the wheel support bearing assembly with a vehicle to designate correction coefficient(s) for load estimation and which may enable accurate determination of a load that acts on a bearing structure for rotatably supporting a wheel.

[Mode 26]

A sensor-equipped wheel support bearing assembly according to "Mode 26" may be a sensor-equipped wheel support bearing assembly for rotatably supporting a wheel relative to a vehicle body. The wheel support bearing assembly includes an outer member having an inner periphery formed with a plurality of raceway surfaces, an inner member having an outer periphery formed with a plurality of raceway surfaces opposed to the raceway surfaces of the outer member, and a plurality of rows of rolling elements interposed between the raceway surfaces of the outer member and the raceway surfaces of the inner member. One of the outer member and the inner member serves as a stationary member. The sensor-equipped wheel support bearing assembly also includes at least three sensor units for load determination, each of the sensor units including a strain generator member and at least one sensor mounted on the strain generator member to sense strain in the strain generator member. The strain generator member includes at least two fixation contact segments fixedly in contact with the stationary member. The sensor-equipped wheel support bearing assembly also includes a load estimator configured to estimate a load that acts on the wheel, based on sensor output signal(s) of one or more of the sensor units. The load estimator includes pre-derived correction coefficient(s) registered therein for each of wheels to which the wheel support bearing assembly is associable. The load estimator is configured to use output(s) of one or more of the sensor units as well as corresponding one(s) of the correction coefficient(s) to estimate a load.

The prefix "pre-" in the term "pre-derived" is intended to mean "before the sensor-equipped wheel support bearing assembly is equipped to a vehicle for use in the travel of the vehicle." The adjective "derived" in the term "pre-derived" is not limited to being derived by performing a calibration test but may also encompass being derived from simulations, designs and/or calculations. In other words, any derivation method may be used.

A load may act on the wheel support bearing assembly or between a tire of a wheel and a road surface. This will cause a load to be applied to a stationary member (e.g. outer member) of the wheel support bearing assembly, thus, in turn, causing deformation of the stationary member. The sensor units may sense the deformation to enable determination of the load. A sensor unit may include two or more sensors. Output signals of the two or more sensors may be affected by the passing-by of the rolling elements. To address this, the estimator may use a sum of output signals of those sensors to estimate a force (e.g., a vertical load component $F_z$, a load component $F_x$ that may serve as a drive force or a brake force, and/or an axial load component $F_y$) that acts on the wheel support bearing assembly or between a wheel and a road surface (i.e., on a tire tread). A sum of output signals of the sensors may cancel the effects of the positions of the rolling elements on the output signals of these sensors. Such a configuration may reduce or eliminate the undesirable effects of the rolling elements. Furthermore, such a configuration may enable accurate estimation of a load (e.g., a vertical load component $F_z$, a load component $F_x$ that may serve as a drive force or a brake force, and/or an axial load component $F_y$) that acts on the wheel support bearing assembly or between a tire of a wheel and a road surface, even when the vehicle is not moving.

Moreover, the load estimator may use output(s) of one or more of the sensor units as well as corresponding one(s) of correction coefficient(s) to estimate a load. More specifically, the load estimator may include pre-derived correction coefficient(s) registered therein for each of wheels to which the wheel support bearing assembly is associable. Note that the correction coefficient(s) may be derived in advance by a calibration process that may involve incorporating the sensor-equipped wheel support bearing assembly into a calibration device. In such a configuration, calibration that may be performed during association of the sensor-equipped wheel support bearing assembly with a vehicle to designate correction coefficient(s) may only require sending an input to the load estimator. Such an input may include information as to which wheel the wheel support bearing assembly is associated to or a command to cause the load estimator to select correction coefficient(s) that correspond(s) to a particular wheel to which the wheel support bearing assembly is associated.

In this way, it may be possible to perform simplified calibration during association of the wheel support bearing assembly with a vehicle to designate correction coefficient(s) for load estimation and to enable accurate determination of a load that acts on a bearing structure for rotatably supporting a wheel.

[Mode 27]

In "Mode 26," the load estimator may be included in an ECU (i.e., electronic control unit), and the ECU may be configured to, after the wheel support bearing assembly including the sensor units is equipped to a vehicle, receive information as to which wheel the wheel support bearing assembly is associated to.

[Mode 28]

In "Mode 26" or "Mode 27," the load estimator may include a plurality of the correction coefficients registered therein. The load estimator may be configured to, after the wheel support bearing assembly including the sensor units is equipped to a vehicle, be caused to select which of the registered correction coefficients to use to estimate a load, in response to a command sent from an ECU provided in the vehicle body.

[Mode 29]

A sensor-equipped wheel support bearing assembly according to "Mode 29" may be a sensor-equipped wheel support bearing assembly for rotatably supporting a wheel relative to a vehicle body. The wheel support bearing assembly includes an outer member having an inner periphery formed with a plurality of raceway surfaces, an inner member having an outer periphery formed with a plurality of raceway surfaces opposed to the raceway surfaces of the outer member, and a plurality of rows of rolling elements interposed between the raceway surfaces of the outer member and the raceway surfaces of the inner member. One of the outer member and the inner member serves as a stationary member. The sensor-equipped wheel support bearing assembly also includes at least three sensor units for load determination, each of the sensor units including a strain generator member and at least one sensor mounted on the strain generator member to sense strain in the strain generator member. The strain generator member includes at least two fixation contact segments fixedly in contact with the stationary member. The sensor-equipped wheel support bearing assembly also includes a load estimator configured to estimate a load that acts on the wheel, based on sensor output signal(s) of one or more of the sensor units. The load estimator includes pre-derived correction coefficient(s) registered therein for each of mounting phase angles at which the sensor units are mountable to the wheel support bearing assembly, as viewed on an X-Z planar coordinate system defined by a vehicle's longitudinal axis and by a vehicle's vertical axis. The load estimator is configured to multiply an output of one or more of the sensor units with the correction coefficient(s) that correspond(s) to a mounting phase angle at which the one or more of the sensor units is mounted to the wheel support bearing assembly as of when the wheel support bearing assembly including the sensor units is equipped to a vehicle, to estimate a load.

In such a configuration, the load estimator may include pre-derived correction coefficient(s) registered therein for each of mounting phase angles at which the sensor units are mountable to the wheel support bearing assembly. Note that the correction coefficient(s) may be derived in advance by a calibration process that may involve incorporating the sensor-equipped wheel support bearing assembly into a calibration device. In such a configuration, calibration that may be performed during association of the sensor-equipped wheel support bearing assembly with a vehicle to designate correction coefficient(s) may only require sending an input to the load estimator. Such an input may include information as to which mounting phase angle the one or more of the sensor units is/are mounted to the wheel support bearing assembly at.

In this way, it may be possible to perform simplified calibration during association of the wheel support bearing assembly with a vehicle to designate correction coefficient(s) for load estimation and to enable accurate determination of a load that acts on a bearing structure for rotatably supporting a wheel.

[Mode 30]

In "Mode 29," preferably, an initial drift in sensor output signals of the sensor units is corrected before the sensor units are mounted to the wheel support bearing assembly.

[Mode 31]

In "Mode 29" or "Mode 30," preferably, a difference in output sensitivity among the sensors of the sensor units is corrected in advance.

[Mode 32]

In any one of "Mode 29" to "Mode 31," the sensor-equipped wheel support bearing assembly may further include a temperature sensor mounted to one or more of the sensor units or mounted to the stationary member. A sensor output signal of the one or more of the sensor units may be corrected based on an output signal of corresponding one(s) of the temperature sensor(s). In such a configuration, a drift in sensor output signal(s) of the one or more of the sensor units that is attributable to temperature may be corrected, thus enabling even more accurate estimation of a load.

[Mode 33]

In any one of "Mode 29" to "Mode 32," the load estimator may be configured to, after the wheel support bearing assembly including the sensor units is equipped to a vehicle, receive information as to which mounting phase angle the one or more of sensor units is mounted to the wheel support bearing assembly at.

[Mode 34]

In any one of "Mode 26" to "Mode 33," the sensor units may be disposed on upper, lower, right and left parts, respectively, of an outer diametric surface of the stationary member, such that four sensor units are evenly distributed 90° out of phase from each other in a circumferential direction of an outer diametric surface of the stationary member. The upper and lower parts may correspond to vertical regions relative to a tire tread, and the right and left parts may correspond to horizontal regions relative to a tire tread. Such arrangement of four sensor units may enable more accurate estimation of load components of three directions (e.g., a vertical load component $F_z$ a load component $F_x$ that may serve as a drive force or a brake force, and/or an axial load component $F_y$) that act on the wheel support bearing assembly.

[Mode 35]

In any one of "Mode 26" to "Mode 34," the sensor units may include a sensor unit including neighboring first, second and third fixation contact segments, and the sensors of that sensor unit may include neighboring sensors, each mounted between the first and the second fixation contact segments and between the second and the third fixation contact segments, whereby that sensor unit may include three fixation contact segments and two sensors.

[Mode 36]

In such a case, a space between the neighboring fixation contact segments or a space between the neighboring sensors may be, as viewed along a circumferential direction of an outer diametric surface of the stationary member, equal to or approximate to ($½+n$) times as much as arrangement pitch of the rolling elements, with n being an integer.

A sum of output signals of the neighboring sensors or a time average of the sum may be used as an output of that sensor unit. A difference between output signals of the neighboring sensors may be used as an amplitude value of the output signals of the neighboring sensors, and the amplitude value may be used as an output of that sensor unit. A combination of a sum of output signals of the neighboring sensors and a difference between output signals of the neighboring sensors may be used as an output of that sensor unit.

The load estimator may be configured to employ a linear equation that uses output(s) of the one ore more of the sensor units as variable(s) and that multiplies the variable(s) with corresponding one(s) of correction coefficient(s) defined for each of load components of different directions, to estimate a load component of a given direction.

In "Mode 26" or "Mode 29," the sensor-equipped wheel support bearing assembly may further include a computational processor circuitry configured to process outputs of the sensor units through computation. The computational processor circuitry may include an A to D converter configured to directly convert sensor output signals of the sensor units from analog to digital.

In "Mode 26" or "Mode 29," the sensor-equipped wheel support bearing assembly may further include a computational processor circuitry configured to process outputs of the sensor units through computation. The computational processor circuitry may include an offset adjuster circuit configured to adjust an offset generated from the sensor units to a normal value (i.e., a reference value), and may also include an amplifier circuit configured to amplify outputs of the sensor units.

The computational processor circuitry may include the aforementioned load estimator.

[Mode 37]

In "Mode 26" or "Mode 29," the stationary member may include, at an outer periphery thereof, a flange that attaches to a knuckle to mount to the vehicle body, and a shape of the flange, as viewed on a front elevational view, may have line symmetry with respect to an imaginary line perpendicular to an axis of the wheel support bearing assembly or have point symmetry with respect to the axis. Such a configuration where the flange that mounts to the vehicle body has the aforementioned shape may allow for simplification of the shape of the stationary member. Such a configuration may also reduce or minimize variation in temperature distribution of the stationary member as well as variation in the degree of expansion and shrinkage of the stationary member, that may be caused by the complexity of the shape of the stationary member. This may enable sensor(s) of the sensor units to, with the effects of those factors being reduced or minimized, sense strain induced by application of a load.

[Mode 38]

In "Mode 26" or "Mode 29," the stationary member may include, at an outer periphery thereof, a flange that attaches to a knuckle to mount to the vehicle body. The flange may have a plurality of circumferential locations formed therein with respective bolt holes. The sensor units may be positioned at respective circumferential locations, each between neighboring bolt insertion holes of the bolt insertion holes. In such a configuration, outputs of the sensor units may not be affected by the bolt holes, thus enabling accurate estimation of a load.

In "Mode 26" or "Mode 29," the sensor-equipped wheel support bearing assembly may further include a ring-shaped protective cover covering the sensor units, with the protective cover being associated with the stationary member. In such a configuration, the sensor units may be covered with a protective cover. In this way, possible failure of the sensor units due to an external environment may be avoided, thus ensuring a reliable determination of a load that acts on the wheel bearing assembly or on a tire tread for a longer period of time. For example, the sensor units may be reliably protected from external contaminants such as flying stones, dirt and salt water.

"Implementation 4" to "Implementation 7," which are some of particular examples of the aforementioned "Mode(s)," will now be described in connection with FIG. 61 to FIG. 84. First, "Implementation 4," will be described in connection with FIG. 61 to FIG. 68.

Figure 61:
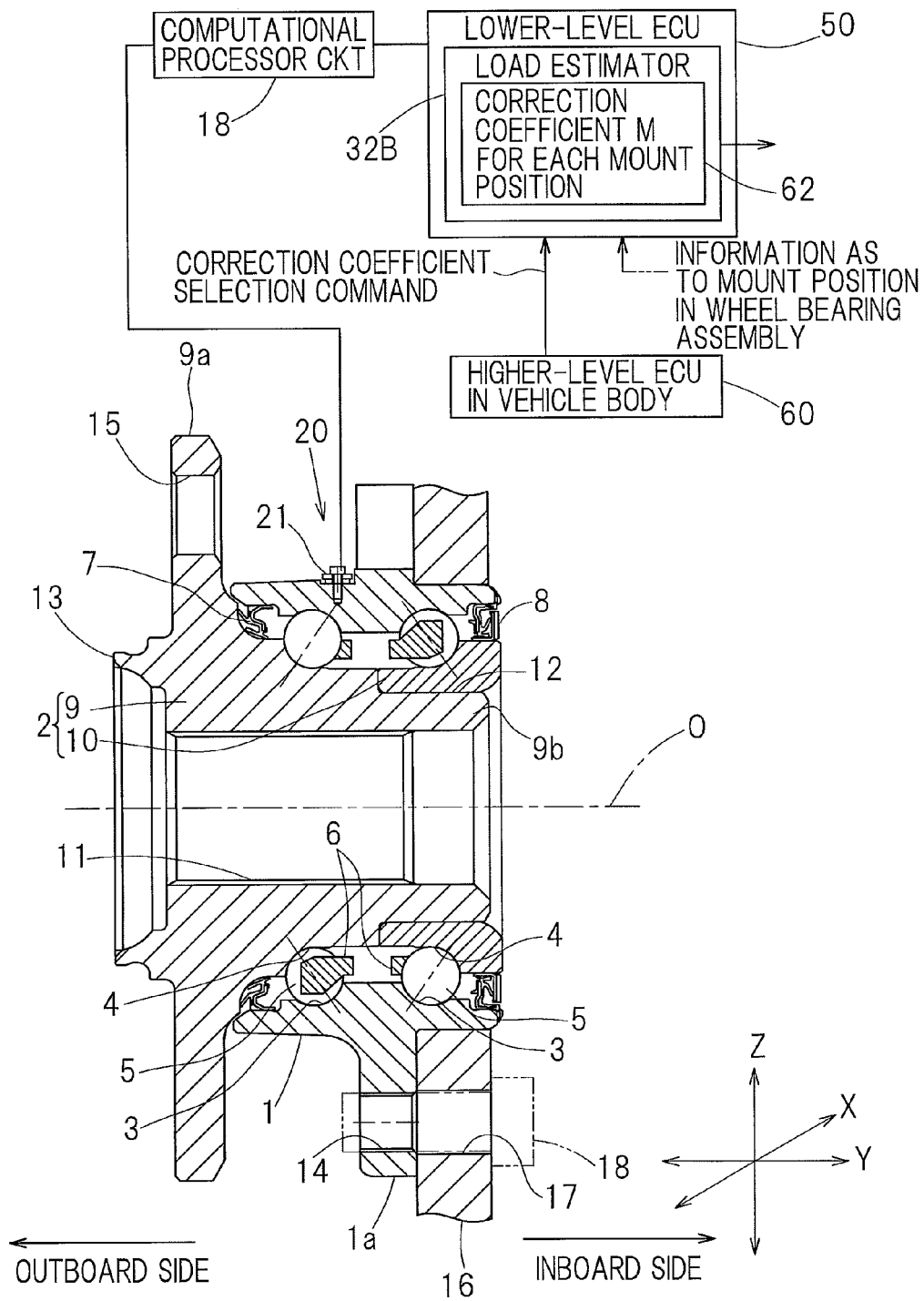
FIG. 61 illustrates a longitudinal cross sectional view of a sensor-equipped wheel support bearing assembly according to "Implementation 4," together with a block diagram of a schematic configuration of a sensing system for the sensor-equipped wheel support bearing assembly.

Referring to FIG. 61, a sensor-equipped wheel support bearing assembly according to "Implementation 4" includes an outer member 1 and an inner member 2. One of the outer member 1 and the inner member 2 serves as a stationary member. The sensor-equipped wheel support bearing assembly also includes at least three sensor units 20 for load determination. Each of the sensor units 20 includes a strain generator member 21 and at least one sensor 22 mounted on the strain generator member 21 to sense strain in the strain generator member 21. The strain generator member 21 includes at least two fixation contact segments fixedly in contact with the stationary member. The sensor-equipped wheel support bearing assembly also includes an estimator 32B configured to estimate a load that acts on the wheel, based on sensor output signal(s) of one or more of the sensor units 20. The estimator 32B includes pre-derived correction coefficient(s) registered therein for each of wheels to which the wheel support bearing assembly is associable. The estimator 32B is configured to use output(s) of one or more of the sensor units 20 as well as corresponding one(s) of the correction coefficient(s) to estimate a load.

FIG. 62 is a front elevational view of the outer member 1 of the sensor-equipped wheel support bearing assembly, as viewed from an outboard direction. FIG. 61 is a cross sectional view of FIG. 62, taken along the line XXXXXXI-XXXXXXI in FIG. 62. Referring to FIG. 62, the vehicle body mounting flange 1a may include circumferential locations formed therein with respective bolt holes 14, and these circumferential locations may be in the form of protrusion segments 1aa protruding in a radially outward direction with respect to other portion(s) of the flange 1a.

Referring back to FIG. 61, although not shown, a ring-shaped protective cover that may cover the sensor units 20 may be associated with the outer member 1. In this way, possible failure of the sensor units 20 due to an external environment may be avoided. For example, the sensor units 20 may be reliably protected from external contaminants such as flying stones, dirt and salt water.

Referring again to FIG. 61, each one of the sensor units 20 may include two strain sensors 22A, 22B. Two strain sensors 22A, 22B of the each one of the sensor units 20 may be connected with a computational processor circuitry 18 which may be configured to process sensor output signals of these sensor units through computation. The computational processor circuitry 18 may, in turn, be connected with the load estimator 32B which may be included in a lower-level ECU (i.e., electronic control unit) 50. In the example as shown in FIG. 61, the estimator 32B is provided as a component external to the computational processor circuitry 18. In a variant, however, the estimator 32B may be included in the computational processor circuitry 18, such as shown in FIG. 67 and/or FIG. 68.

Figure 67:
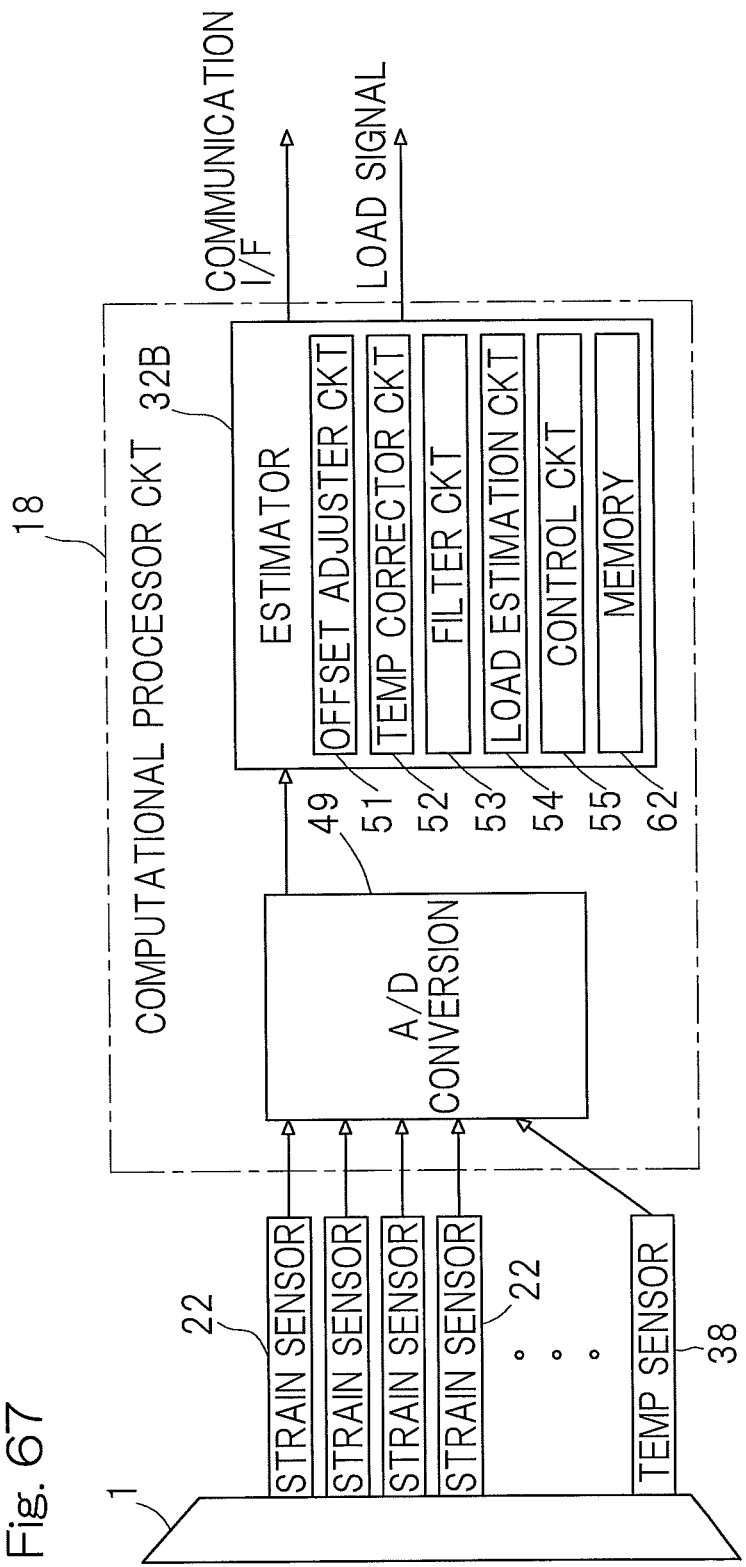
FIG. 67 is a block diagram showing an example of the general configuration of a sensing system in the sensor-equipped wheel support bearing assembly.
Figure 68:
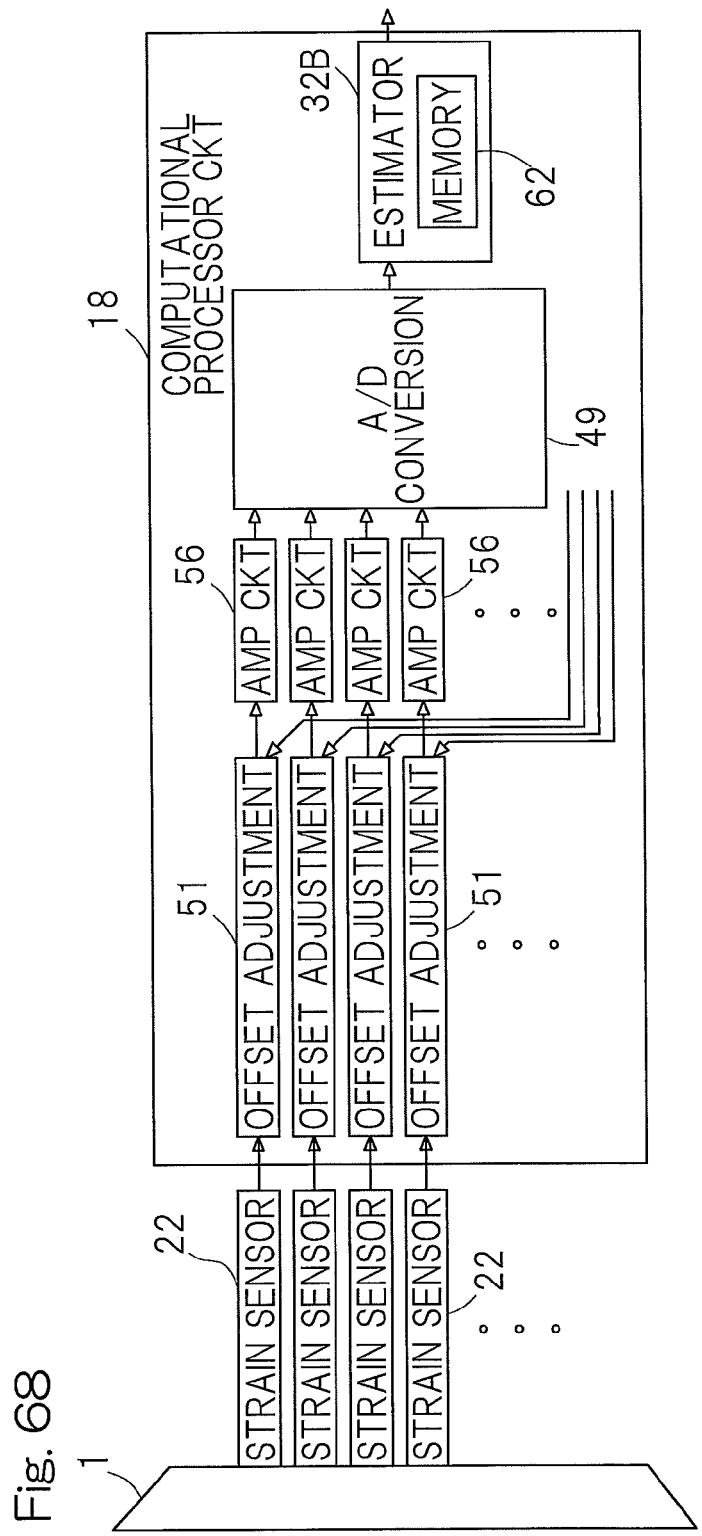
FIG. 68 is a block diagram showing another example of the general configuration of a sensing system in the sensor-equipped wheel support bearing assembly.

According to an exemplary configuration of the computational processor circuitry 18 as shown in FIG. 67, strain sensor(s) 22 of one or more of the sensor units 20 may be connected through an A to D converter 49 to the estimator 32B. More specifically, output signal(s) of strain sensor(s) 22 may be directly converted from analog to digital by the A to D converter 49, and the A to D converted output signal(s) of the strain sensor(s) 22 may be sent to the input of the estimator 32B.

The estimator 32B may be configured to estimate, based on A to D converted output signal(s) of strain sensor(s) 22 of the sensor units 20, a force (e.g., a vertical load component $F_z$, a load component $F_x$ that may serve as a drive force or a brake force, and/or an axial load component $F_y$) that acts on the wheel support bearing assembly or between a wheel and a road surface (i.e., on a tire tread). The estimator 32B may be formed of a microcomputer. Referring to FIG. 67, the estimator 32B may include an offset adjuster circuit 51, a temperature corrector circuit 52, a filter circuit 53 that may include a low-pass filter, a load estimation calculation circuit 54, a controller circuit 55 and a memory 62. In a configuration where the load estimator 32B is provided as a component external to the computational processor circuitry 18 such as shown in FIG. 61, the computational processor circuitry 18 may, although not illustrated in FIG. 61, include the aforementioned adjuster circuit 51, the aforementioned temperature corrector circuit 52 and the aforementioned filter circuit 53. The offset adjuster circuit 51 may be configured to adjust an offset to a normal value (i.e., a reference value). Such an offset may include an initial offset that may be produced by strain sensor(s) 22 and/or an offset that may be caused by installation of strain sensor(s) 22 to the wheel support bearing assembly. Offset adjustment that may be carried out by the offset adjuster circuit 51 may be modulated by the controller circuit 55 or may be modulated in response to an external input or instruction. Offset-inducing factors may include tolerance of strain sensor(s) 22 and unintended strain that may be caused during installation of strain sensor(s) 22. Thus, offset adjustment is preferably carried out after sensor units 20 are installed to the wheel support bearing assembly and the construction of the wheel support bearing assembly is finished.

In this way, offset adjustment may be carried out by the offset adjuster circuit 51, after the construction of a sensor-equipped wheel support bearing assembly is finished, so that an output signal of a strain sensor 22 as of this point can be used as a reference value. More specifically, an output of a strain sensor 22 as of when a sensor-equipped wheel support bearing assembly has been constructed, may be used as a zero point. This may ensure the quality of output signal(s) of strain sensor(s).

Figure 63:
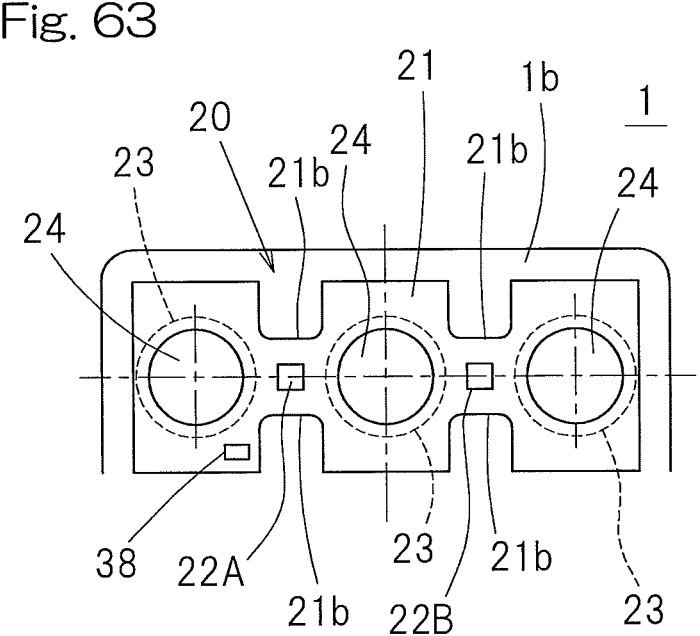
FIG. 63 is an enlarged plan view of a sensor unit for the sensor-equipped wheel support bearing assembly.
Figure 64A:
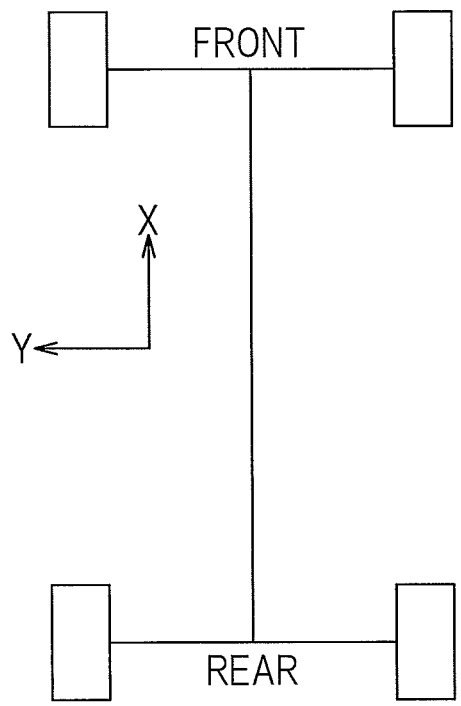
FIG. 64A is a schematic plan view of a vehicle.
Figure 64B:
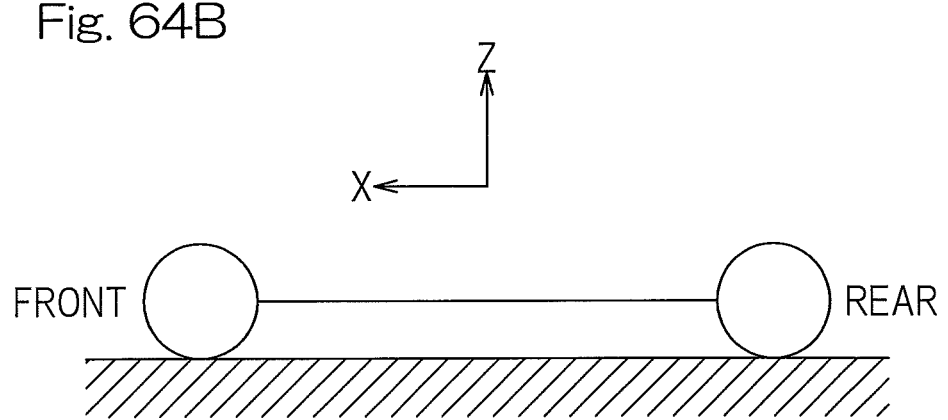
FIG. 64B is a schematic side view of the vehicle of FIG. 64A.

An output signal of a strain sensor 22 may contain a drift. Such a drift may include a drift that is attributable to temperature characteristics of the strain sensor 22 itself and a drift that is attributable to temperature-induced strain of the outer member 1 (i.e., a stationary member). The temperature corrector circuit 52 may be configured to correct a drift that may be attributable to temperature, which may be contained in output signal(s) of strain sensor(s) 22 that went through offset adjustment. To carry out correction of a drift that may be attributable to temperature, a temperature sensor 38 may be mounted to a strain generator member 21 of at least one sensor unit 20, such as shown in FIG. 63. Output signal(s) of the temperature sensor(s) 38 may be digitalized by the A to D converter 49 and may be sent to the input of the temperature corrector circuit 52.

The load estimation calculation circuit 54 of the estimator 32B may be configured to estimate a load through computation, based on digitalized output signal(s) of strain sensor(s) 22 that went through various processing that may include offset adjustment, temperature-responsive correction, and filtering. In the example under discussion, a sum of output signals of two strain sensors 22 of a sensor unit 20 may be used as an output of the particular sensor unit 20. The load estimation calculation circuit 54 may employ an equation that uses such output(s) as well as corresponding one(s) of correction coefficient(s) that may be registered in the memory 62 that may be included in the estimator 32B, to estimate a force (e.g., a vertical load component $F_z$, a load component $F_x$ that may serve as a drive force or a brake force, and/or an axial load component $F_y$) that acts on the wheel support bearing assembly or between a wheel and a road surface (i.e., on a tire tread). Such an equation may be a linear equation that uses output(s) S of the sensor unit(s) 20 as variable(s) and that multiplies the variable(s) S with corresponding one(s) of correction coefficient(s) M that may be pre-derived and registered for each of load components of different directions.

Such correction coefficient(s) M may be pre-derived, by a calibration process, for each of wheels to which the wheel support bearing assembly is associable, and may be registered in the memory 62 that may be included in the estimator 32B. Referring to the example of FIG. 61, the lower-level ECU 50 that may include the estimator 32B may also include a certain memory domain (not shown). In the memory domain, after a sensor-equipped wheel support bearing assembly according to "Implementation 4" is equipped to a vehicle, information as to which wheel the wheel support bearing assembly is associated to may be received or stored. Such information may be supplied from a component external to the wheel support bearing assembly. Such information as to which wheel the wheel support bearing assembly is associated to may be used to identify which one of wheels—e.g., which one of four wheels of a vehicle as shown in a schematic plan view of FIG. 64A and in a schematic side view of FIG. 64B—to which a sensor-equipped wheel support bearing assembly is associated.

Registration of correction coefficient(s) M in the memory 62 and/or designation in the ECU 50 of as to which wheel a sensor-equipped wheel support bearing assembly is associated to may be performed via a personal computer that may be connected to an input interface of the ECU 50. The ECU 50 may include an input processor (not shown) which may be configured to allow the aforementioned registration and/or designation to be carried out by a manual input from an input device such as a keyboard that may be connected to the input interface of the ECU 50. The ECU 50 may include a casing that may include switch(es) to enable the aforementioned registration and/or designation. A wheel to which the sensor-equipped wheel support bearing assembly is associated may be identified based on output(s) of sensor(s) that is/are generated after the wheel support bearing assembly is equipped to a vehicle body. In the following discussion, registration and/or designation of coefficient(s) and value(s) may be carried out in a manner similar to the aforementioned manner.

The estimator 32B may be configured to select correction coefficient(s) M that correspond(s) to information as to which wheel the wheel support bearing assembly is associated to. Such information may be designated in the aforementioned manner. As a variant to designation in the ECU 50 from a component external to the wheel support bearing assembly, as to which wheel the wheel support bearing assembly is associated to, the estimator 32B may be configured to be caused to select correction coefficient(s) M that correspond(s) to information as to which wheel the wheel support bearing assembly is associated to, in response to a command sent from a higher-level ECU 60 that may be included in the vehicle body 60. The higher-level ECU 60 may be a primary ECU of a vehicle that may be configured to perform general control of the vehicle.

The computational processing that may be performed by the load estimation calculation circuit 54 for load estimation will now be described.

Figure 65A:
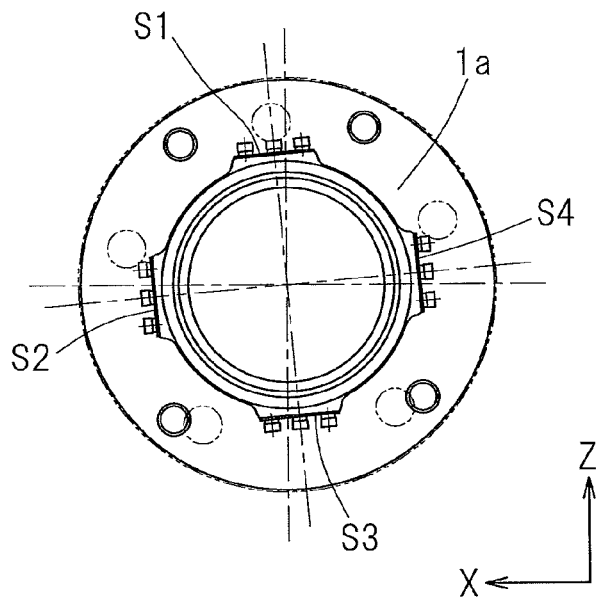
FIG. 65A is a front elevational view of the sensor-equipped wheel support bearing assembly that is equipped to a left wheel.
Figure 65B:
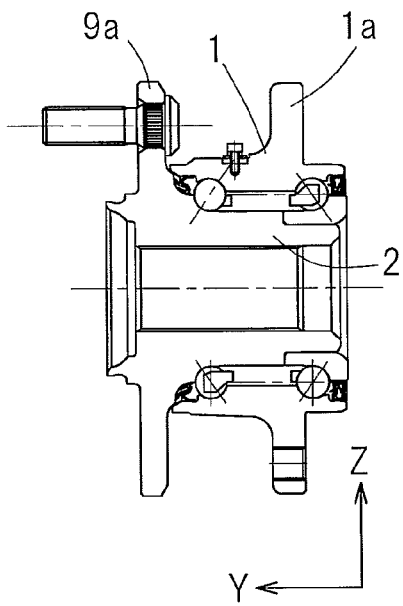
FIG. 65B is a longitudinal cross sectional view of FIG. 65A.
Figure 66A:
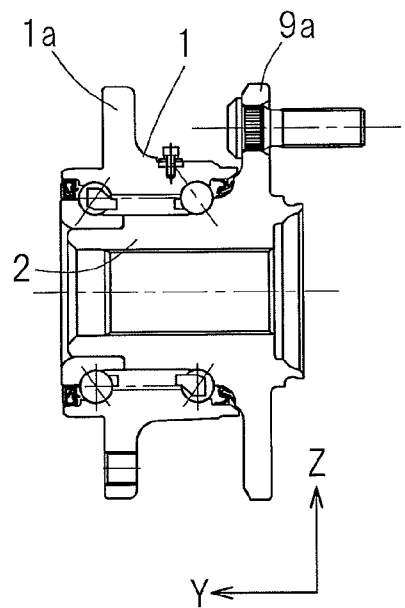
FIG. 66A is a front elevational view of the sensor-equipped wheel support bearing assembly that is equipped to a right wheel.
Figure 66B:
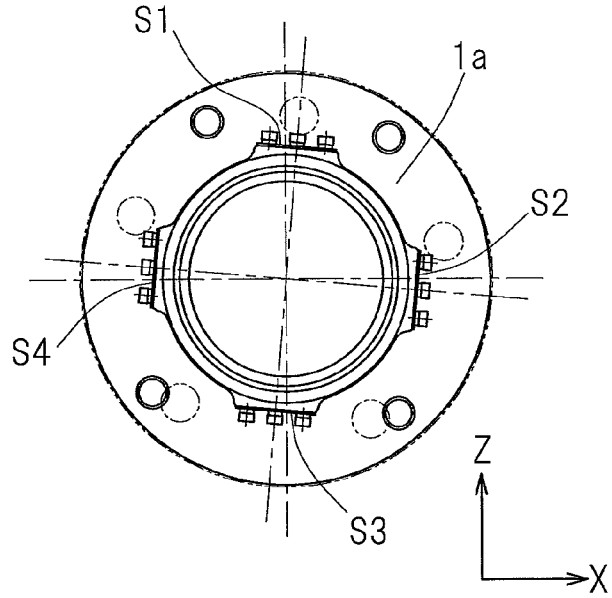
FIG. 66B is a longitudinal cross sectional view of FIG. 65A.

FIG. 65A and FIG. 65B are a front elevational view and a cross sectional view of a sensor-equipped wheel support bearing assembly according to "Implementation 4" equipped to a front left wheel, respectively. FIG. 66A and FIG. 66B are a cross sectional view and a front elevational view of a sensor-equipped wheel support bearing assembly according to "Implementation 4" equipped to a front right wheel, respectively. In FIG. 65A and FIG. 66B, an inner member 2 is omitted for illustration purposes, and the vehicle body mounting flange 1a of an outer member is assumed to have a circular shape. As can be seen from these figures and FIGS. 64A and 64B, front and rear wheel support bearing assemblies, along with left and right wheel support bearing assemblies, may be symmetric with each other, in terms of an X-Z planar coordinate system that defines a vehicle's longitudinal direction as an X-axis and defines a vehicle's vertical direction as a Z-axis. Thus, the relationship between a sensor-equipped wheel support bearing assembly and an associated load may differ, for example, depending on whether the wheel support bearing assembly is associated to a front left wheel or a front right wheel.

Assuming that a correction coefficient for a left wheel is expressed as "ML" and a correction coefficient for a right wheel is expressed as "MR," a given load F associated with a sensor-equipped wheel support bearing assembly associated to a left wheel may be estimated according to the following equation:

$$F=ML \times S$$

a given load F associated with a sensor-equipped wheel support bearing assembly associated to a right wheel may be estimated according to the following equation:

$$F=MR \times S$$

The symbol F may represent load components of three directions ($F_x$, $F_y$, $F_z$). The symbol S may represent output(s) of one or more of the sensor units 20 (S1 to S4). The correction coefficients ML, MR may be separately pre-derived and registered for each one of the sensor units 20.

As noted earlier, the load estimation calculation circuit 54 may be configured to estimate a load through computation, based on a sum of output signals of two strain sensors 22 of a sensor unit 20. In a variant, a time average of the sum may be used as an output S of that sensor unit 20. In another variant, a difference between output signals of two strain sensors 22 of a sensor unit 20 may be used as an amplitude value of the output signals of these sensors 22, and the amplitude value may be used as an output S of that sensor unit 20. In yet another variant, a combination of a sum of output signals of these two sensors 22 and a difference between output signals of these two sensors 22 may be used as an output S of that sensor unit 20.

A sensor unit 20 may include two strain sensors 22A, 22B which may produce output signals A, B that may be used in computation to estimate a load. These output signals A, B may be affected by the passing-by of the rolling elements 5, as noted earlier. To address this, the load estimator 32 may use a sum of output signals of those two sensors to estimate load components of three-axis directions (e.g., a vertical load component $F_z$, a load component $F_x$ that may serve as a drive force or a brake force, and/or an axial load component $F_y$) that acts on the wheel support bearing assembly or between a tire of a wheel and a road surface. Such a configuration may cancel, both when there is rotation and when there is no rotation in the wheel support bearing assembly, the effects of the positions of the rolling elements 5 on the output signals of these sensors. This may enable accurate determination of a load. This may also allow avoiding the provision of a low-pass filter, thus improving the response speed.

As such, a sensor-equipped wheel support bearing assembly according to "Implementation 4" may provide a load estimate which, when used for vehicle control of an automotive vehicle, may help achieve stable travel of the automotive vehicle. Also, with such a sensor-equipped wheel support bearing assembly, a compact, load sensor system may be equipped to a vehicle. Furthermore, such a sensor-equipped wheel support bearing assembly may be more suitable for mass production, thus enabling cost reduction.

In "Implementation 4," the outer member 1 (i.e., a stationary member) may include a flange 1a that mounts to the vehicle body. The flange 1a may have a plurality of circumferential locations formed therein with respective bolt holes 14 for attaching to a knuckle. These circumferential locations may be in the form of protrusion segments 1aa protruding in a radially outward direction with respect to other portion(s) of the flange 1a. The sensor units 20 may be arranged such that the fixation contact segments 21a of the strain generator member 21 of each sensor unit 20 are located at the corresponding one of respective centers between neighboring protrusion segments 1aa. In such a configuration, a strain generator member 21 may be located at a position remote from a protrusion segment 1aa that may become a cause of hysteresis. In this way, a corresponding reduction in possible hysteresis that may appear in output signal(s) A, B of strain sensor(s) 22A, 22B may be achieved, thus enabling more accurate determination of a load.

In "Implementation 4," sensor units 20 may be disposed on upper, lower, right and left parts, respectively, of an outer diametric surface of the outer member 1 (i.e., a stationary member). This may enable accurate determination of a load, regardless of any loading conditions. For example, when there is increase in a load component along a given direction, sensor units 20 may be disposed with 180° difference in mounting phase angle between each other, thus aligning themselves in that direction. In this way, a load will be transmitted to at least one of those sensor units 20 via the rolling elements 5 and the outer member 1. A portion of a raceway surface 3 that is in contact with a rolling element 5 and a portion of a raceway surface 3 that is not in contact with a rolling element 5 will generate a phase difference of 180° in output signals of strain sensors 22A, 22B. Hence, such a load component along that particular given direction can be sensed by strain sensors 22A, 22B.

In "Implementation 4," referring to FIG. 62, the outer member 1 (i.e., a stationary member) may include, at an outer periphery, a flange 1a that attaches to a knuckle to mount to the vehicle body. As shown in the same figure, the vehicle body mounting flange 1a may have a shape that has, as viewed on a front elevational view, line symmetry with respect to an imaginary line (e.g., an imaginary vertical line LV and/or an imaginary horizontal line LH in FIG. 60) perpendicular to an axis O of the wheel support bearing assembly or has, as viewed on a front elevational view, point symmetry with respect to the axis O (in a particular example, a circular shape). Such a configuration may allow for simplification of the shape of the outer member 1. Such a configuration may also reduce or minimize variation in temperature distribution of the outer member 1 as well as variation in the degree of expansion and shrinkage of the outer member 1, that may be caused by the complexity of the shape of the outer member 1 (i.e., a stationary member). This may enable strain sensor(s) 22 of a sensor unit 20 to, with the effects of those factors being reduced or minimized, sense strain induced by application of a load.

In "Implementation 4," the outer member 1 may include, at an outer periphery thereof, a flange 1*a* that attaches to a knuckle 16 to mount to the vehicle body. The flange 1*a* may have a plurality of circumferential locations formed therein with respective bolt holes 14. The sensor units 20 may be positioned at respective circumferential locations, each between neighboring bolt insertion holes 14 of the bolt insertion holes 14. In such a configuration, outputs of the sensor units 20 may not be affected by the bolt holes 14, thus enabling accurate estimation of a load.

FIG. 69 to FIG. 79 show "Implementation 5." It is to be noted that those features corresponding to the features already described with reference to "Implementation 4" will be given the same reference signs. Configurations of a sensor-equipped wheel support bearing assembly according to "Implementation 4" may be applied to "Implementation 5" and therefore will not be described to avoid redundancy.

Two sensor units 20 may form a sensor unit pair. Two of such a sensor unit pair may be disposed on an outer diametric surface of the outer member 1 (i.e., a stationary member). Two sensor units 20 in each sensor unit part 19A, 19B may be positioned at respective locations on an outer diametric surface of the outer member 1 that are 180° different in mounting phase angle between each other along a circumferential direction of an outer diametric surface of the outer member 1. In the example under discussion, two sensor units 20 in a sensor unit part 19A may be disposed on upper and lower parts, respectively, of an outer diametric surface of the outer member 1, with the upper and lower parts corresponding to vertical regions relative to a tire tread. Also, two sensor units 20 in the other sensor unit pair 19B may be disposed on right and left parts, respectively, of an outer diametric surface of the outer member 1, with the upper and lower parts corresponding to horizontal regions relative to a tire tread.

Figure 69:
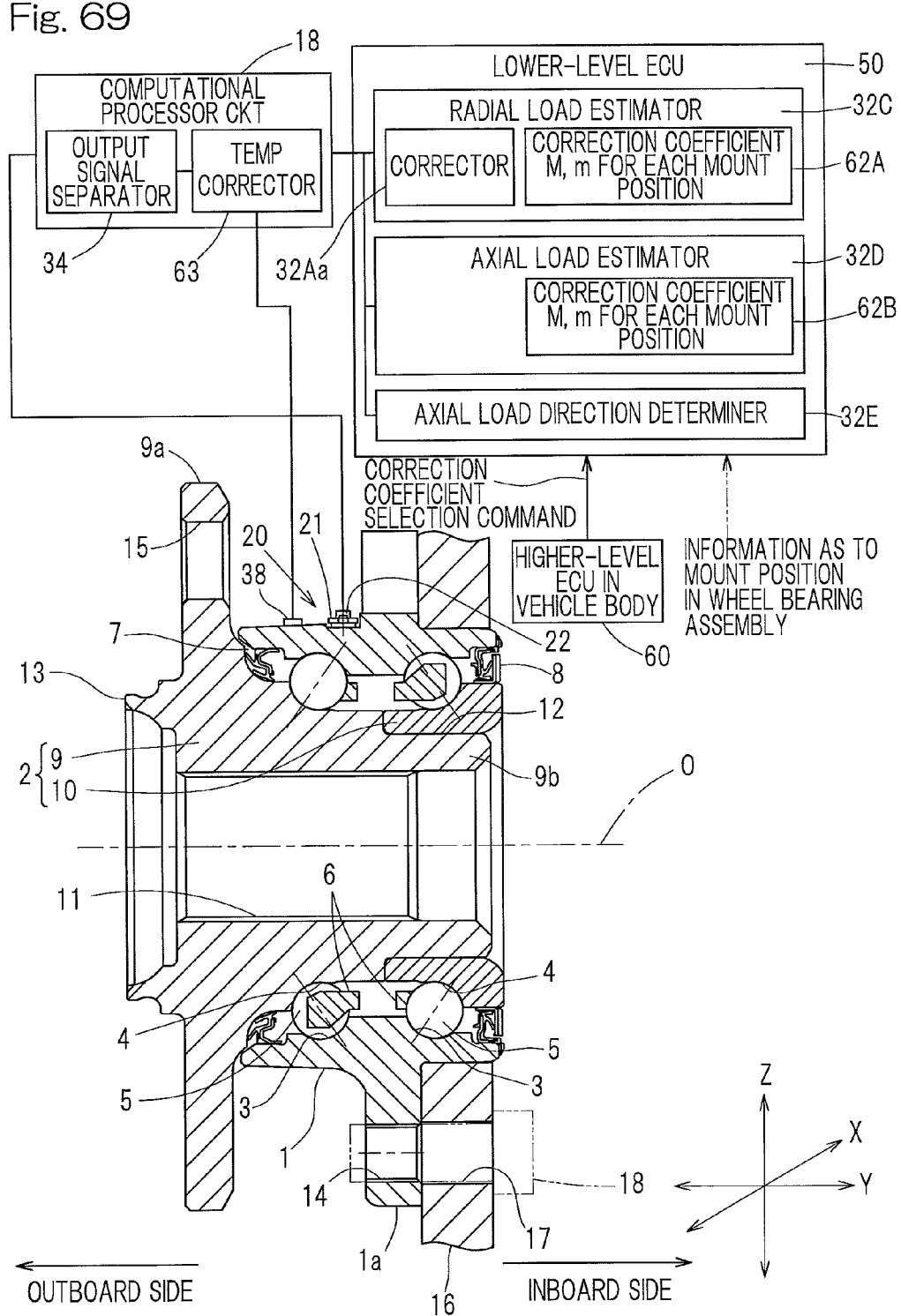
FIG. 69 illustrates a longitudinal cross sectional view of a sensor-equipped wheel support bearing assembly according to "Implementation 5," together with a block diagram of a schematic configuration of a sensing system for the sensor-equipped wheel support bearing assembly.
Figure 70:
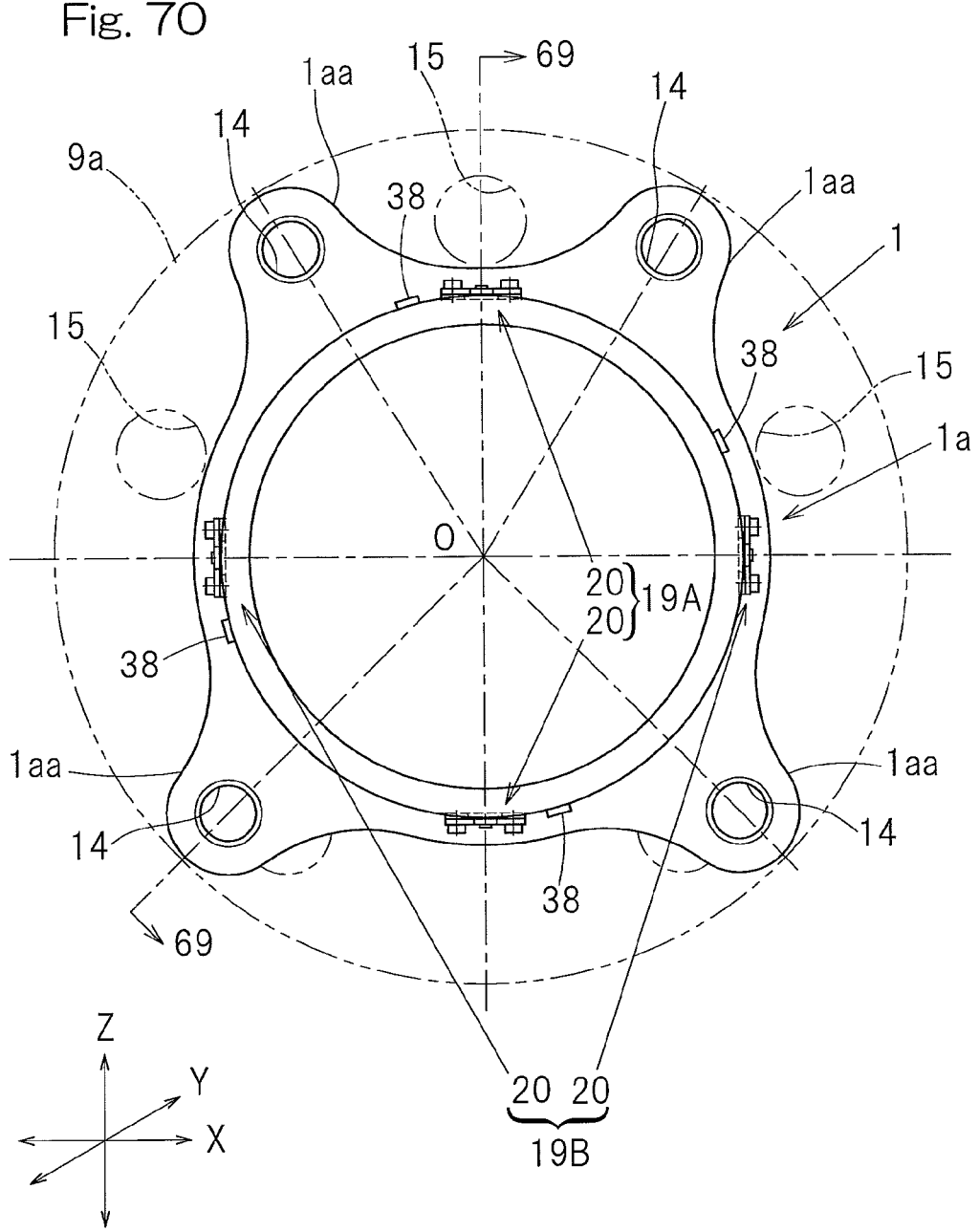
FIG. 70 is a front elevational view of an outer member of the sensor-equipped wheel support bearing assembly, as viewed from an outboard direction.

More specifically, as shown in FIG. 70, one of two sensor units 20 in a sensor unit pair 19A may be disposed on an upper part of an outer diametric surface of the outer member 1 so as to be located at a center between two neighboring protrusion segments 1*aa* that are situated in the upper part of an outer diametric surface of the outer member 1. The other of two sensor units 20 in a sensor unit pair 19A may be disposed on a lower part of an outer diametric surface of the outer member 1 so as to be located at a center between two neighboring protrusion segments 1*aa* that are situated in the lower part of an outer diametric surface of the outer member 1. FIG. 70 is a front elevational view of the outer member 1 of the sensor-equipped wheel support bearing assembly, as viewed from an outboard direction. FIG. 69 is a cross sectional view of FIG. 70, taken along the line XXXXXXIX-XXXXXXIX in FIG. 70.

Figure 71:
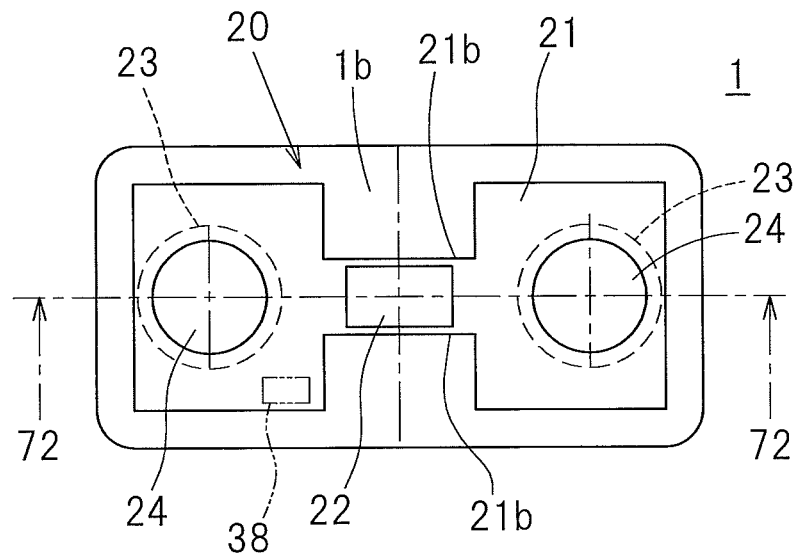
FIG. 71 is an enlarged plan view of a sensor unit for the sensor-equipped wheel support bearing assembly.
Figure 72:
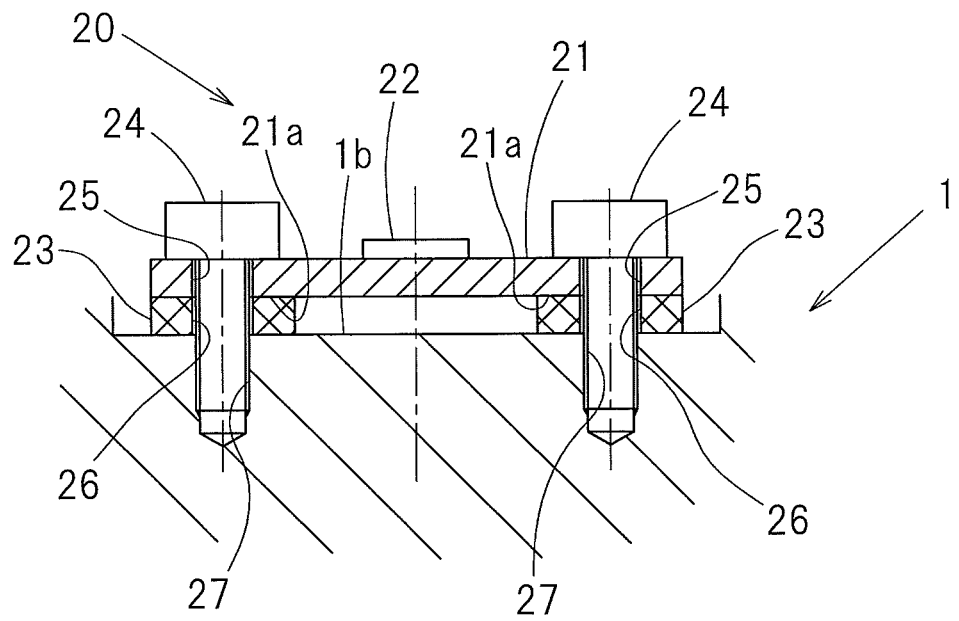
FIG. 72 is a cross sectional view of FIG. 71, taken along the line XXXXXXII-XXXXXXII in FIG. 71.

Referring to an enlarged plan view of FIG. 71 and to an enlarged longitudinal cross sectional view of FIG. 72, each of the sensor units 20 may include a strain generator member 21 and a single strain sensor 22 mounted on the strain generator member 21 to sense strain in the strain generator member 21.

The strain generator member 21 may include a sheet plate having a general shape of a band. The sheet plate may be an elastically deformable metal sheet plate. The sheet plate may have a thickness of 2 mm or smaller. The sheet plate may be made of steel. The sheet plate may have a side formed with a cutout 21*b* therein. In particular, the sheet plate may have opposite sides, each formed with a cutout 21*b* therein, with the cutout 21 being located at a center of the sheet plate. The strain generator member 21 may include two fixation contact segments 21*a* that are fixedly in contact, through respective spacers 23, with an outer diametric surface of the outer member 1. The two fixation contact segments 21*a* may be located at respective opposite ends of the strain generator member 21.

As such, a sensor unit 20 in "Implementation 5" may differ from a sensor unit 20 in "Implementation 4," in that only a single strain sensor 21 may be provided for each sensor unit 20. The rest of the features in "Implementation 5" are the same as those of the aforementioned "Implementation 4," except for the followings:

A strain sensor 22 in each of the sensor units 22 may be connected, via an output signal separator 34, to a radial load estimator 32C and an axial load estimator 32D. The output signal separator 34 may be included in the computational processor circuitry 18 which is described in the discussion of "Implementation 4." The radial load estimator 32C and the axial load estimator 32D may be included in the lower-level ECU 50 which is also described in the discussion of "Implementation 4." The radial load estimator 32C may estimate a radial load component that acts on the wheel support bearing assembly in a radial direction. The axial load estimator 32D may estimate an axial load component (e.g., a cornering force) that acts on the wheel support bearing assembly in an axial direction. More specifically, the radial load estimator 32C may estimate a vertical load component $F_z$ that acts on the wheel support bearing assembly in a vertical direction as well as a load component $F_x$ (e.g., a drive force) that acts on the wheel support bearing assembly in a horizontal direction or a vehicle's longitudinal direction. The radial load estimator 32C may include a memory 62A, while the axial load estimator 32D may include a memory 62B. As is the case with "Implementation 4," correction coefficients M, m for each of wheels to which the wheel support bearing assembly is associable—that may be used in computation to estimate a load—may be pre-derived by a calibration process and may be registered to the memories 62A and 62B. The lower-level ECU 50 that may include the radial load estimator 32C and the axial load estimator 32D may be configured to, after a sensor-equipped wheel support bearing assembly according to "Implementation 5" is equipped to a vehicle, receive information as to which wheel the wheel support bearing assembly is associated to. In a variant, the radial load estimator 32C and/or the axial load estimator 32D may be configured to be caused to select correction coefficients M, m that correspond to a particular wheel to which the wheel support bearing assembly is associated, in response to a command sent from the higher-level ECU 60 that may be included in the vehicle body.

The output signal separator 34 may be configured to separate sensor output signal(s) of one or more of the sensor units 20 into an AC component and a DC component, and to send the AC and DC components to the input of the radial and axial load estimators 32C and 32D. A low-pass filter may be provided to obtain such a DC component of the sensor output signal(s).

The radial load estimator 32C and the axial load estimator 32D may estimate a load component $F_x$ that may serve as a drive force or a brake force, an axial load component $F_y$ and/or a vertical load component $F_z$ in the following manner.

Figure 73:
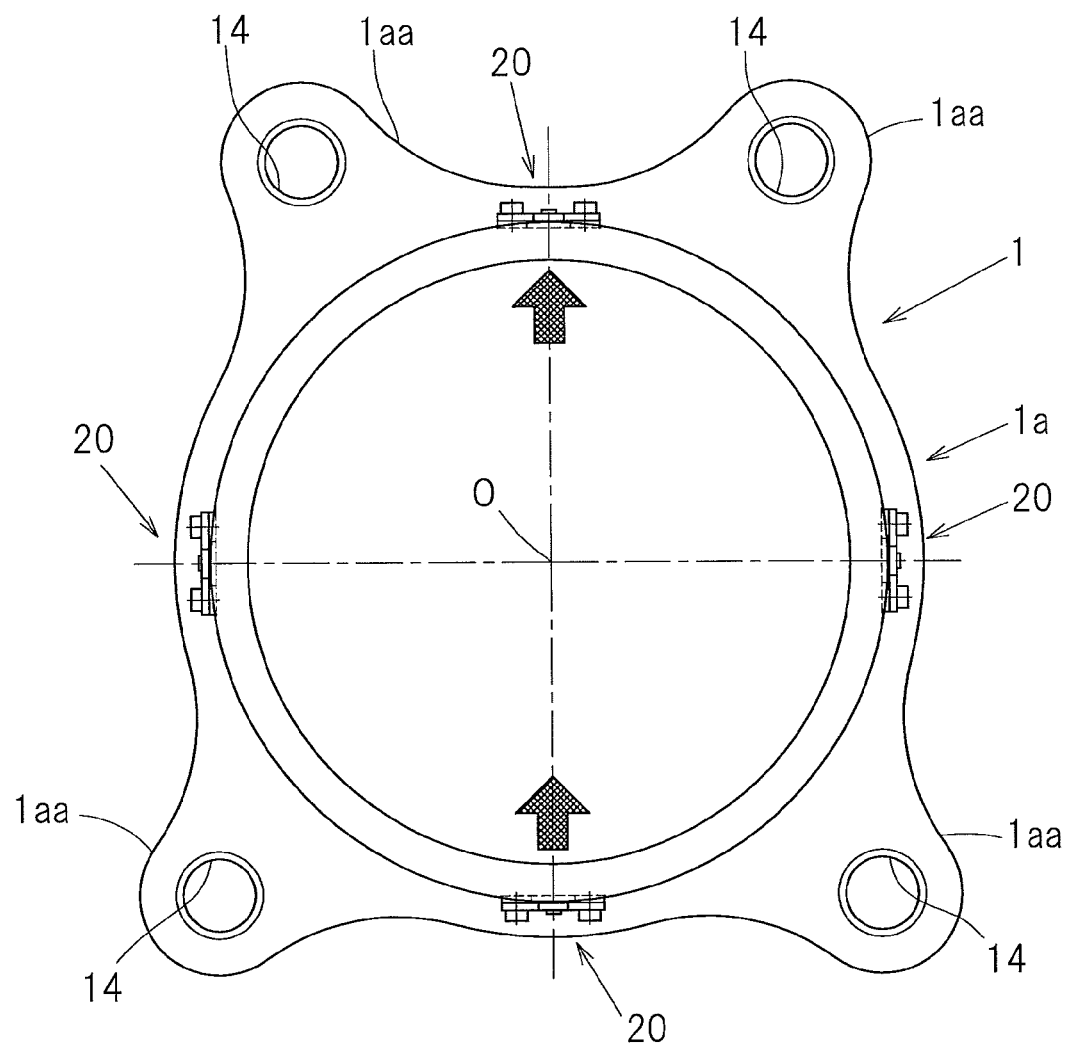
FIG. 73 is an explanatory diagram showing an example of deformation mode of an outer diametric surface of an outer member of the sensor-equipped wheel support bearing assembly.

Referring to FIG. 73, the arrows in the figure indicate a deformation mode of an outer diametric surface of the outer member 1 that may occur in response to application of a vertical load component $F_z$, assuming that a load component $F_x$ that may serve as a drive force or a brake force as well as an axial load component $F_y$ are zero. The upper part of an outer diametric surface of the outer member 1 may deform in a radially outward direction, while the lower part of an outer diametric surface of the outer member 1 may deform in a radially inward direction. In "Implementation 5," one or more of the sensor units 20 may be disposed on an outer diametric surface of the outer member 1 such that the two fixation contact segments 21a in the one or more of the sensor units 20 are spaced from each other along a circumferential direction of an outer diametric surface of the outer member 1 and are arranged at the same axial positions on an outer diametric surface of the outer member 1, in order to sense circumferential strain. In the aforementioned deformation mode, the strain generator member 21 of a sensor unit 20 fixedly disposed on the upper part of an outer diametric surface of the outer member 1 may deform in a tensile direction with larger strain, while the strain generator member 21 of a sensor unit 20 fixedly disposed on the lower part of an outer diametric surface of the outer member 1 may deform in a compressive direction with smaller strain. In contrast, deformation in the right and left parts of an outer diametric surface of the outer member 1 may be negligible. Thus, a difference in sensor output signal between two sensor units 20 in the sensor unit part 19A—disposed on upper and lower parts of an outer diametric surface of the outer member 1—may be a primary factor in estimation of a vertical load component $F_z$.

Figure 74:
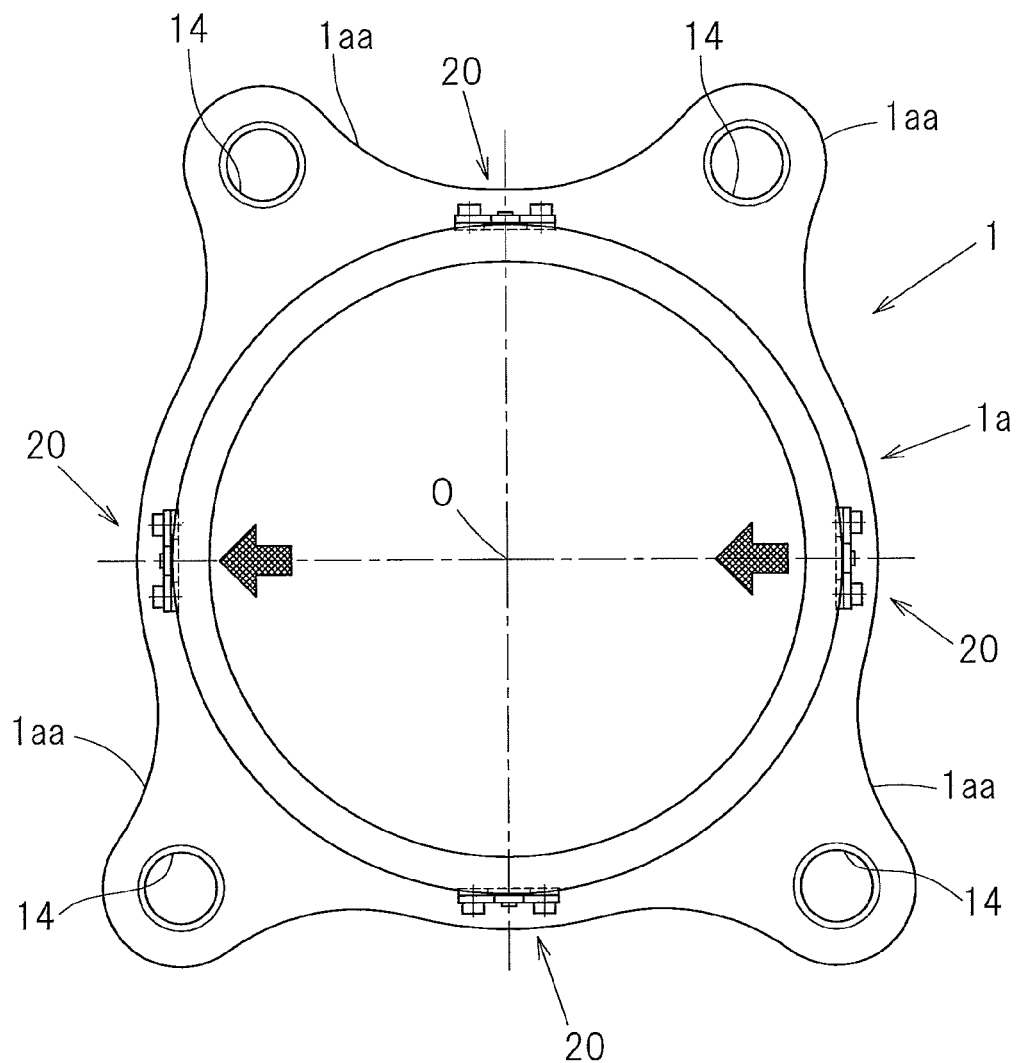
FIG. 74 is an explanatory diagram showing another example of deformation mode of an outer diametric surface of an outer member of the sensor-equipped wheel support bearing assembly.

Referring to FIG. 74, the arrows in the figure indicate another deformation mode of an outer diametric surface of the outer member 1 that may occur in response to application of a load component $F_x$ in a leftward direction on the page of the figure that may serve as a drive force or a brake force, assuming that an axial load component $F_y$ as well as a vertical load component $F_z$ are zero. The left part of an outer diametric surface of the outer member 1 may deform in a radially outward direction, while the right part of an outer diametric surface of the outer member 1 may deform in a radially inward direction. In this deformation mode, the strain generator member 21 of a sensor unit 20 fixedly disposed on the left part of an outer diametric surface of the outer member 1 may deform in a tensile direction with larger strain, while the strain generator member 21 of a sensor unit 20 fixedly disposed on the right part of an outer diametric surface of the outer member 1 may deform in a compressive direction with smaller strain. In contrast, deformation in the upper and lower parts of an outer diametric surface of the outer member 1 may be negligible. Thus, a difference in sensor output signal between two sensor units 20 in the sensor unit part 19B—disposed on right and left parts of an outer diametric surface of the outer member 1—may be a primary factor in estimation of a load component $F_x$ that may serve as a drive force.

Figure 75:
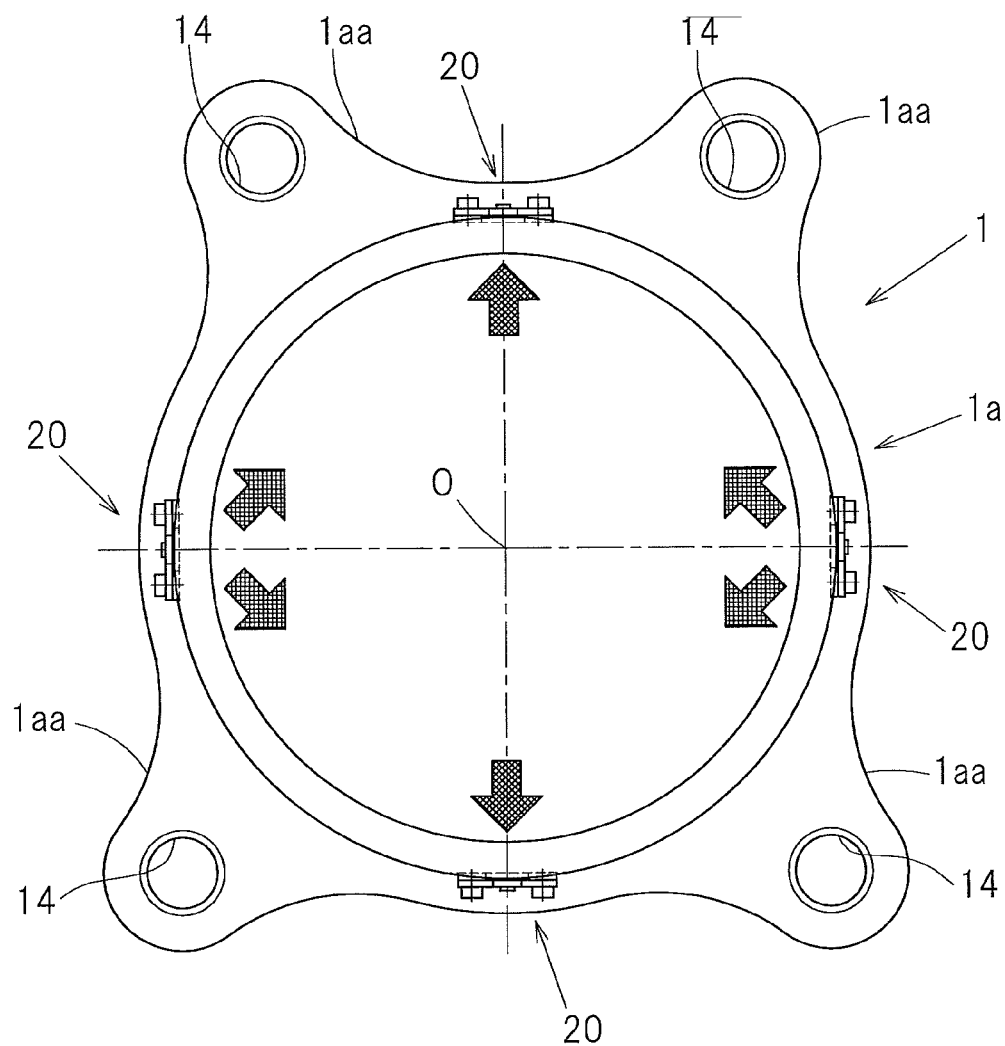
FIG. 75 is an explanatory diagram showing yet another example of deformation mode of an outer diametric surface of an outer member of the sensor-equipped wheel support bearing assembly.

Referring to FIG. 75, the arrows in the figure indicate yet another deformation mode of an outer diametric surface of the outer member 1 that may occur in response to application of an axial load component $F_y$, assuming that a load component $F_x$ that may serve as a drive force or a brake force as well as a vertical load component $F_z$ are zero. The upper and lower parts of an outer diametric surface of the outer member 1 may deform in a radially outward direction, while the right and left parts of an outer diametric surface of the outer member 1 may deform in a radially inward direction. Hence, in this defor-mation mode, the strain generator member 21 of a sensor unit 20 fixedly disposed on the upper part of an outer diametric surface of the outer member 1 as well as the strain generator member 21 of a sensor unit 20 fixedly disposed on the lower part of an outer diametric surface of the outer member 1 may deform in a tensile direction with larger strain. In contrast, the strain generator member 21 of a sensor unit 20 fixedly disposed on the right part of an outer diametric surface of the outer member 1 as well as the strain generator member 21 of a sensor unit 20 fixedly disposed on the left part of an outer diametric surface of the outer member 1 may deform in a compressive direction with smaller strain. Thus, a sum of sensor output signals of two sensor units 20 in the sensor unit part 19A—disposed on upper and lower parts of an outer diametric surface of the outer member 1—may be a primary factor in estimation of an axial load component $F_y$.

In this way, an outer diametric surface of the outer member 1 may have different deformation modes, in response to application of a load component $F_x$ that may serve as a drive force or a brake force, application of an axial load component $F_y$, or application of a vertical load component $F_z$. Furthermore, an outer diametric surface of the outer member 1 may cause a combined deformation mode of the aforementioned deformation modes, in response to application of a combination of the aforementioned load components.

As such, the radial load estimator 32C and the axial load estimator 32D may employ the following matrix equation:

$$F = (M1 \ M2 \ \ldots \ Mn \ m1 \ m2 \ \ldots \ mn) \begin{pmatrix} S1 \\ S2 \\ \vdots \\ Sn \\ s1 \\ s2 \\ \vdots \\ sn \end{pmatrix}$$

In this matrix equation, each of the elements S1, S2, ... Sn represents a DC component of a sensor output signal of a sensor unit 20, as separated by the output signal separator 34. Each of the elements s1, s2, ... sn represents an amplitude value of an AC component of a sensor output signal of a sensor unit 20, as separated by the output signal separator 34. Each of the elements M1, M2, ... Mn represents a correction coefficient M to correct a value of the corresponding DC component. Each of the elements m1, m2, ... mn represents a correction coefficient m to correct an amplitude value of the corresponding AC component. These correction coefficients M, m may not only vary for each of the load components $F_x$, $F_y$, $F_z$ to be estimated, but may also vary for each of wheels to which the wheel support bearing assembly is associable. The correction coefficients M, m may be pre-derived by a calibration process as noted earlier and may be registered to the memory 62A that may be included in the radial load estimator 32C and to the memory 62B that may be included in the axial load estimator 32D. In the aforementioned matrix equation, the subscript n on the DC component S, the AC component s, and the correction coefficients M, m refers to the total number of sensor units 20 (i.e., the total number of sensor output signals). In the example under discussion, n is 4.

Hence, the radial load estimator 32C may be configured to employ a linear equation that uses the aforementioned DC component S and AC component s (i.e., amplitude value) as variables and that multiplies each one of the variables with the corresponding one of the correction coefficients M, m defined for each of the load components $F_x$, $F_z$ to be estimated, to estimate a load component $F_x$ and/or a load component $F_z$. Similarly, the axial load estimator 32D may be configured to employ a linear equation that uses the aforementioned DC component S and AC component s (i.e., amplitude value) as variables and that multiplies each one of the variables with the corresponding one of the correction coefficients M, m defined for the load components $F_y$ to be estimated, to estimate a load component $F_y$.

The radial load estimator 32C and/or the axial load estimator 32D may be configured to be caused to select correction coefficients M, m to be used in computation to estimate a load, in response to a command sent from the higher-level ECU 60 that may be included in the vehicle body, such as shown in FIG. 69. In a variant, the lower-level ECU 50 may be configured to receive information as to which wheel the wheel support bearing assembly is associated to, and the radial load estimator 32C as well as the axial load estimator 32D may be configured to select, based on this information, relevant correction coefficients M, m.

In the example under discussion, the DC component and the AC component (i.e., amplitude value) of sensor output signals of all sensor units 20 may be included as factors in estimation of any one of load components $F_x$, $F_y$, $F_z$. As noted earlier, in "Implementation 5," two sensor units 20 in a sensor unit pair 19A may be disposed on upper and lower parts of an outer diametric surface of the outer member 1, and another two sensor units 20 in a sensor unit pair 19B may be disposed on right and left parts of an outer diametric surface of the outer member 1. And deformation modes such as shown in FIG. 73 to FIG. 75 may occur in response to application of a load.

Hence, a difference in sensor output signal between two sensor units 20 in the sensor unit pair 19A—disposed on upper and lower parts of an outer diametric surface of the outer member 1—may be a primary factor when the radial load estimator 32C estimates a vertical load component $F_z$ according to the aforementioned matrix equation. Thus, in estimation of the vertical load component $F_z$, sensor output signals of two sensor units 20 in the sensor unit pair 19B may be disregarded. A substantially similar load estimate may still be obtained.

A difference in sensor output signal between two sensor units 20 in the sensor unit pair 19B—disposed on right and left parts of an outer diametric surface of the outer member 1—may be a primary factor when the radial load estimator 32C estimates a load component $F_x$ that may serve as a drive force or a brake force according to the aforementioned matrix equation. Thus, in estimation of the load component $F_x$, sensor output signals of two sensor units 20 in the sensor unit pair 19A may be disregarded. A substantially similar load estimate may still be obtained.

A sum of sensor output signals of two sensor units 20 in the sensor unit part 19A—disposed on upper and lower parts of an outer diametric surface of the outer member 1—may be a primary factor when the axial load estimator 32D estimates an axial load component $F_y$ according to the aforementioned matrix equation. Thus, in estimation of the axial load component $F_y$, sensor output signals of two sensor units 20 in the sensor unit pair 19B may be disregarded. A substantially similar load estimate may still be obtained.

Figure 78:
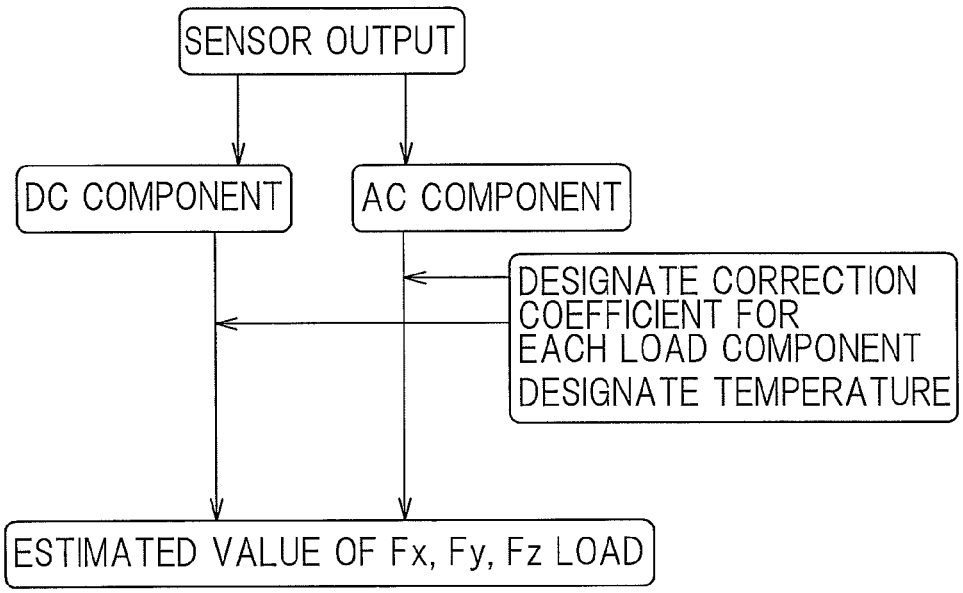
FIG. 78 is an explanatory diagram showing a possible processing of output signals of sensor(s)

FIG. 78 illustrates the general flow of a possible processing of sensor output signal(s) of one or more of the sensor units 20, up to a point where load component(s) $F_x$, $F_y$, $F_z$ may be estimated based on these sensor output signal(s) by an estimator (e.g., the radial load estimator 32C and/or the axial load estimator 32D).

The deformation of the outer member 1 that occurs in response to a radial load acting on the wheel support bearing assembly—which is not limited to a radial load component $F_z$ but may also encompass a load component $F_x$ that may serve as a drive force or a brake force—may be quite small as compared with the deformation of the outer member 1 that occurs in response to application of an axial load component $F_y$. As such, the estimate of a radial load may be easily affected by an axial load component $F_y$. To address this, in "Implementation 5," the radial load estimator 32C may be configured to correct an estimate of a radial load (e.g., a radial load component $F_z$ and/or a load component $F_x$ that may serve as a drive force or a brake force) that may be produced in the aforementioned manner, with an estimate of an axial load component $F_y$ that may be produced by the axial load estimator 32D. In this way, a load estimate that may be produced by the radial load estimator 32C may be corrected with an estimate of an axial load component $F_y$ that may be produced by the axial load estimator 32D, thus enabling accurate estimation of a radial load (e.g., a radial load component $F_z$ and/or a load component $F_x$ that may serve as a drive force or a brake force). The radial load estimator 32C may include a corrector 32Aa which may be configured to perform such correction.

In "Implementation 5," two sensor units 20 in the sensor unit pair 19A may be disposed on upper and lower parts of an outer diametric surface of the outer member 1 (i.e., a stationary member of the sensor-equipped bearing assembly), with the upper and lower parts corresponding to vertical regions relative to a tire tread. These two sensor units 20 may be positioned on respective axial locations that are in the vicinity of an outboard side raceway surface 3 of the outer member 1—out of a plurality of raceway surfaces 3 of the outer member 1. In such a case, while there is a rotation in the wheel support bearing assembly, output signal(s) of strain sensor(s) 22 may exhibit periodic fluctuations such as shown in a waveform diagram of FIG. 76. More specifically, with such a configuration, deformation of a strain generator member 21 of a sensor unit 20 may vary depending on whether or not the rolling elements 5 rolling on the raceway surface 3 are present in the vicinity of the location of the sensor unit 20. In this way, a fluctuation of output signal(s) of strain sensor(s) 22 is caused at every passing-by of a rolling element 5. In other words, the amplitude of output signal(s) of strain sensor(s) 22 represents deformation of the outer member 1 that may occur in response to a load transmitted from each one of the rolling elements 5 passing by the vicinity of the location of the corresponding sensor unit 20. Thus, the amplitude value may vary according to the magnitude of an axial load component $F_y$ (e.g., a moment force).

Figure 77A:
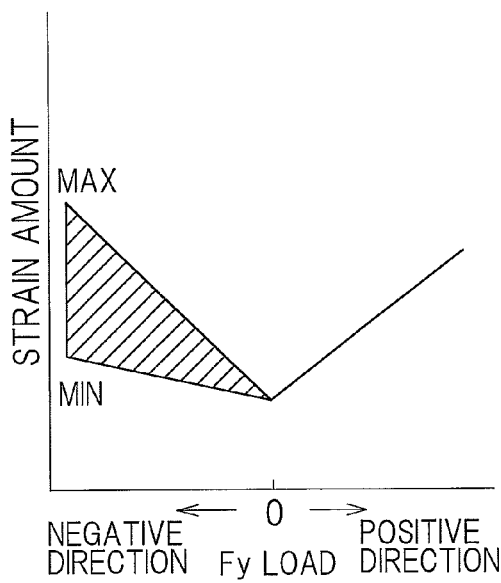
FIG. 77A is a graph showing the difference between a maximum value and a minimum value of amplitude of an output signal that may be produced by a sensor located at an upper part of an outer diametric surface of an outer member, as a function of the direction and magnitude of an axial load component.
Figure 77B:
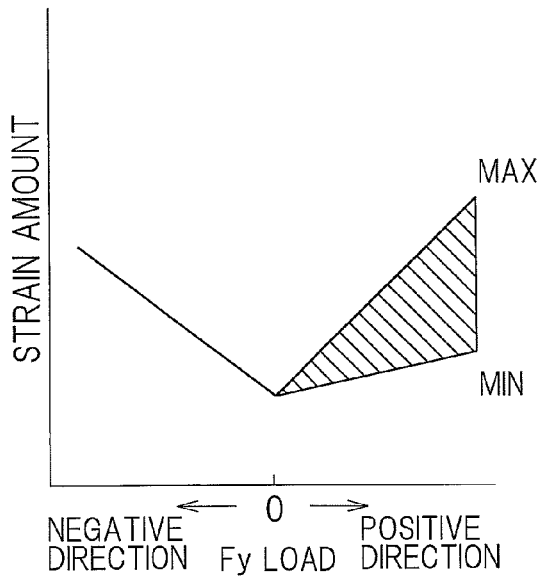
FIG. 77B is a graph showing the difference between a maximum value and a minimum value of amplitude of an output signal that may be produced by a sensor located at a lower part of an outer diametric surface of an outer member, as a function of the direction and magnitude of an axial load component.

FIG. 77A shows a sensor output of a sensor unit 20 disposed on an upper part of an outer diametric surface of the outer member 1, while FIG. 77B shows a sensor output of a sensor unit 20 disposed on a lower part of an outer diametric surface of the outer member 1. In these figures, the horizontal axis represents an axial load component $F_y$, while the vertical axis represents strain in the outer member 1 (e.g., an output signal of a strain sensor 22). The symbols MAX, MIN indicate a maximum amplitude and a minimum amplitude, respectively. As can be seen from these figures, when the axial load component $F_y$ is acting in a positive direction, smaller load is transmitted from each one of the rolling elements 5 to an upper part of an outer diametric surface of the outer member 1—in other words, the difference between a maximum value and a minimum value of the signal is smaller—and greater load is transmitted from each one of the rolling elements 5 to a lower part of an outer diametric surface of the outer member 1—in other words, the difference between a maximum value and a minimum value of the signal is greater. In contrast, when the axial load component $F_y$ is acting in a negative direction, greater load is transmitted from each one of the rolling elements 5 to an upper part of an outer diametric surface of the outer member 1, and smaller load is transmitted from each one of the rolling elements 5 to a lower part of an outer diametric surface of the outer member 1.

An axial load direction determiner 32E may be provided which may be configured to determine respective amplitudes of sensor output signals of sensor units disposed on upper and lower parts of an outer diametric surface of the outer member 1 and to determine a direction of an axial load component $F_y$ based on comparison between these values. More specifically, the axial load direction determiner 32E may be configured to determine that an axial load component $F_y$ is acting in a positive direction, if a difference between a maximum value and a minimum value of a sensor output signal of a sensor unit 20 disposed on an upper part of an outer diametric surface of the outer member is smaller. In contrast, the axial load direction determiner 32E may be configured to determine that an axial load component $F_y$ is acting in a negative direction, if a difference between a maximum value and a minimum value of a sensor output signal of a sensor unit 20 disposed on an upper part of an outer diametric surface of the outer member is greater.

Figure 79:
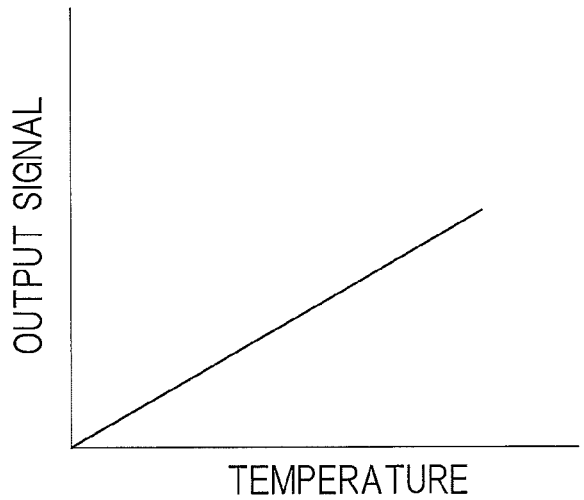
FIG. 79 is a graph showing the relationship between an output signal of a sensor and temperature.

FIG. 79 is a graph showing the relationship between a sensor output signal of a sensor unit 20 and the temperature of the outer member 1. As can be seen from the graph, a temperature-dependent drift appears in a sensor output signal. Thus, temperature-responsive correction of a sensor output signal may be desirable to improve the accuracy with which load component(s) $F_x$, $F_y$, $F_z$, may be estimated by the corresponding radial load estimator 32C or axial load estimator 32D. In "Implementation 5," the computational processor circuitry 18 may include a temperature corrector 63 that may be configured to correct sensor output signal(s) of one or more of the sensor units 20 according to a temperature of the wheel support bearing assembly or according to an ambient temperature. Referring to FIG. 70, a temperature sensor 38 that may be configured to sense a temperature of an outer diametric surface of the outer member 1 may be mounted to an outer diametric surface of the outer member 1 in the vicinity of the location of one or more of the sensor units 20. In particular, such a temperature sensor 38 may be provided for each one of sensor units 20. The temperature sensor 38 may include a thermister or a platinum resistor element. The temperature corrector 63 may be configured to correct sensor output signal(s) of one or more of the sensor units 20, based on output signal(s) of corresponding one(s) of the temperature sensor(s) 38. In this way, sensor output signal(s) corrected by the temperature corrector 63 may be sent to the input of the radial load estimator 32C and/or to the input of the axial load estimator 32D. In a variant, a temperature sensor 38 may be mounted to a strain generator member 21 of a sensor unit 20, such as indicated by an imaginary line in FIG. 71.

In "Implementation 5," correction coefficients M, m for each of wheels to which the wheel support bearing assembly is associable may be pre-derived by a calibration process and may be registered to the memories 62A and 62B of the radial load estimator 32C and the axial load estimator 32D, respectively. The radial load estimator 32C and the axial load estimator 32D may be configured to estimate a load based on output signal(s) S, s of one or more of the sensor units 20 as well as on corresponding one(s) of the correction coefficients M, m. In this way, it may be possible to perform simplified calibration during association of the wheel support bearing assembly with a vehicle to designate correction coefficient(s) M, m for load estimation and to enable accurate determination of a load that acts on a bearing structure for rotatably supporting a wheel.

In "Implementation 5," four sensor units 20 may be disposed on an outer diametric surface of the outer member 1 (i.e., a stationary member). Furthermore, a load estimator (e.g., the radial load estimator 32C) that may estimate a radial load (a load component $F_x$, that may serve as a drive force or a brake force, and/or a vertical load component $F_z$) that acts on the wheel support bearing assembly in a radial direction based on sensor output signal(s) of these sensor unit(s) 20, as well as a load estimator (e.g., the axial load estimator 32D) that may estimate an axial load component $F_y$ that acts on the wheel support bearing assembly in an axial direction based on sensor output signal(s) of one or more of these sensor units 20 may be provided. This may enable estimation of a radial load component $F_x$, a radial load component $F_y$, and/or an axial load component $F_z$ with enhanced sensitivity, regardless of any loading conditions, and with fewer sensors.

In "Implementation 5," an output signal separator 34 may be provided which may be configured to separate sensor output signal(s) of one or more of the sensor units 20 into an AC component and a DC component, and to send the AC and DC components to the input of the aforementioned load estimator (e.g., the radial and axial load estimators 32C and 32D). The load estimator (e.g., the radial and axial load estimators 32C and 32D) may employ a linear equation that uses the aforementioned DC component S and AC component s (i.e., amplitude value) as variables and that multiplies each one of the variables with the corresponding one of the correction coefficients M, m defined for each of the load components $F_x$, $F_y$, $F_z$ to be estimated, to estimate a load component $F_x$ a load component $F_y$, and/or a load component $F_z$. In this way, sensor output signal(s) may be separated into AC and DC components, so that correction of the sensor output signal(s) may be performed in the load estimator. This may enable finer correction of sensor output signal(s), thus enabling more accurate estimation of a load.

In "Implementation 5," two sensor units 20 in a sensor unit pair 19A may be at least disposed on upper and lower parts of an outer diametric surface of the outer member 1, with the upper and lower parts corresponding to vertical regions relative to a tire tread. An axial load direction determiner 32E may be provided which may be configured to determine a direction of the axial load component $F_y$, based on respective amplitudes of sensor output signals within the sensor unit pair 19A. Such a configuration may enable determining a direction of an axial load component $F_y$, without the need to provide an extra sensor to determine such a direction.

In the preceding discussions, it is assumed that the subject of interest is determination or estimation of a force acting between a tire of a wheel and a road surface. However, the subject of interest is not limited to such a force, but may also be a force (e.g., preload) acting on a wheel support bearing assembly.

Figure 80:
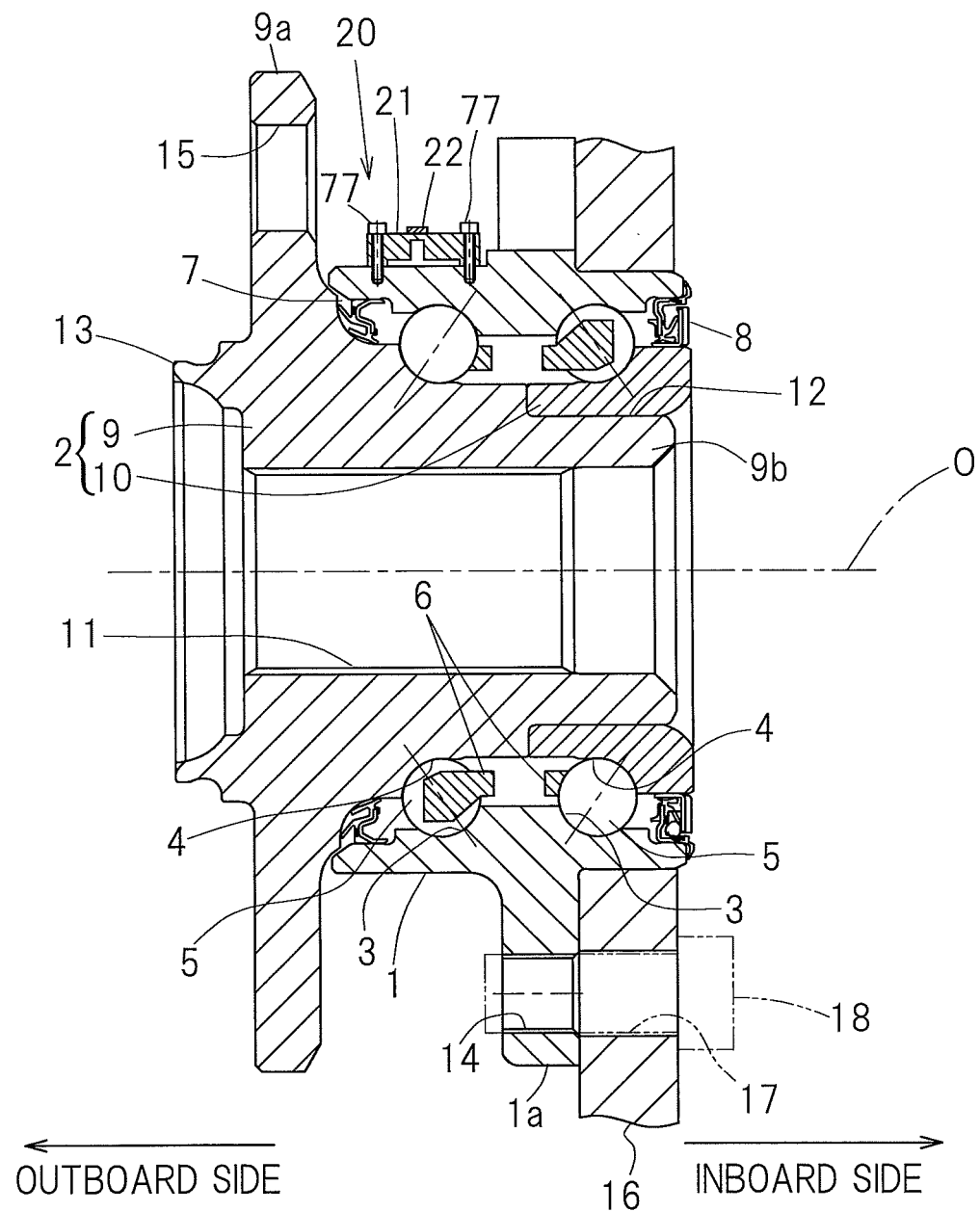
FIG. 80 is a longitudinal cross sectional view of a sensor-equipped wheel support bearing assembly according to a variant of "Implementation 5"
Figure 81:
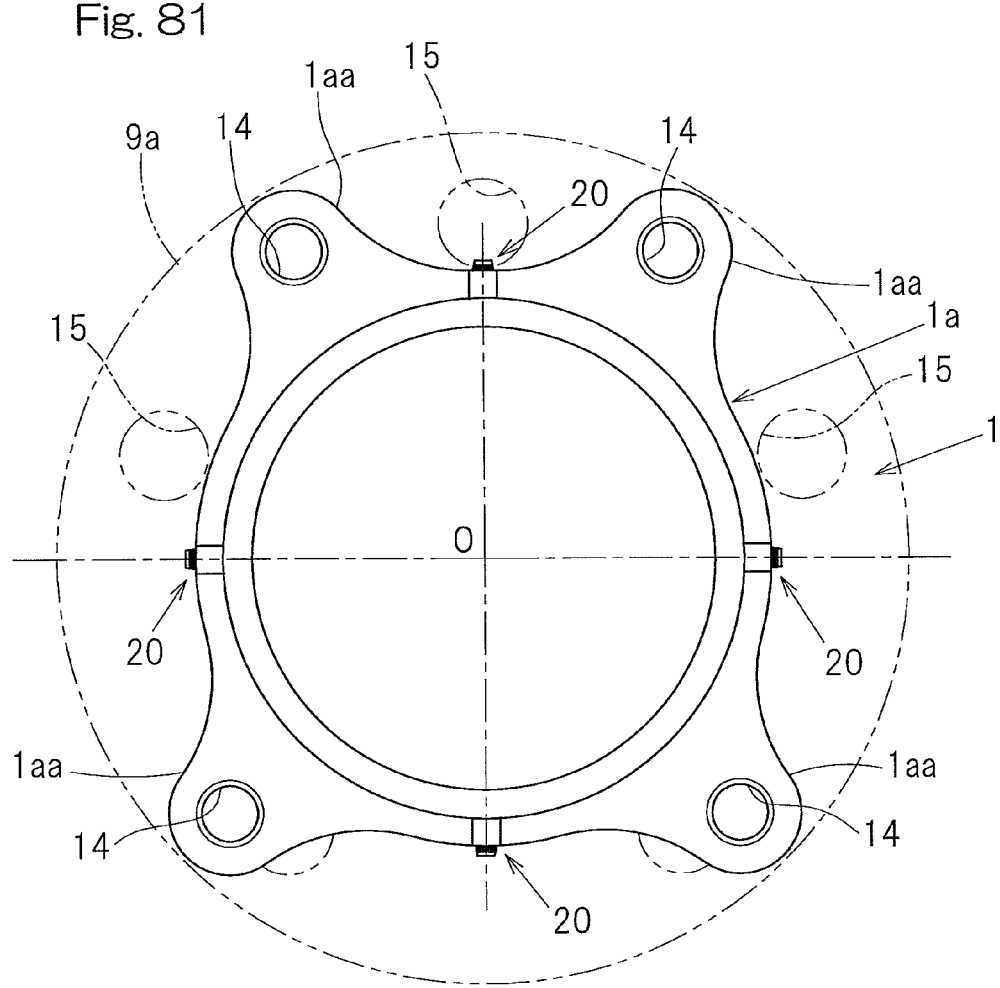
FIG. 81 is a front elevational view of an outer member of the sensor-equipped wheel support bearing assembly, as viewed from an outboard direction.
Figure 82:
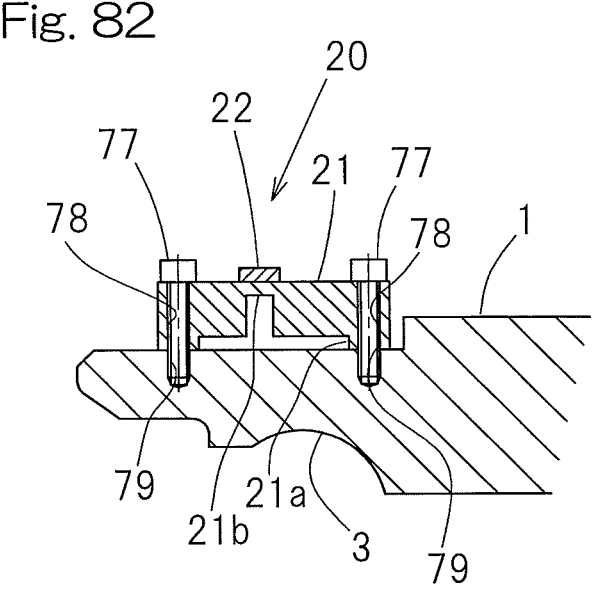
FIG. 82 is an enlarged longitudinal cross sectional view of a sensor unit for the sensor-equipped wheel support bearing assembly.

FIG. 80 to FIG. 82 show a variant of "Implementation 5." A sensor-equipped wheel support bearing assembly according to this variant may include sensor unit(s) 20 having the following configuration.

Referring to an enlarged longitudinal cross sectional view of FIG. 82, sensor unit(s) 20 may include a strain generator member 21 and strain sensor(s) 22 mounted on the strain generator member 21 to sense strain in the strain generator member 21. The strain generator member 21 may have an underside surface that faces an outer diametric surface of the outer member 1, and the underside surface may project towards the outer diametric surface of the outer member at opposite ends of the strain generator member 21, to form two fixation contact segments 21a. The fixation contact segments 21a may be fixedly in contact with an outer diametric surface of the outer member so as to fix the strain generator member 21 to an outer diametric surface of the outer member 1. One of the two fixation contact segments 21a may be positioned at an axial location that is in the vicinity of an outboard side raceway surface 3 of the outer member 1. The other of the two fixation contact segments 21a may be positioned at a location that is outboard with respect to the location of the aforementioned one of the two fixation contact segments 21a. These two fixation contact segments 21a may also be aligned in terms of mounting phase angle in a circumferential direction of the outer member 1. Thus, sensor unit(s) 20 may be disposed on an outer diametric surface of the outer member 1 such that two fixation contact segments 21a of a strain generator member 21 of the sensor unit(s) 20 are spaced from each other along an axial direction of an outer diametric surface of the outer member 1 (i.e., a stationary member) and are aligned with each other along a circumferential direction of an outer diametric surface of the outer member 1. Preferably, an outer diametric surface of the outer member 1 includes flat segment(s) 1b with which fixation contact segments 21a of a strain generator member 21 of the sensor unit(s) 20 may be fixedly in contact. This may enable sensor unit(s) 20 to be fixed with increased stability to an outer diameter of the outer member 1.

The strain generator member 21 has a center that may be formed therein with a single cutout 21b that opens at an underside surface of the strain generator member 21. The strain sensor(s) 22 may be affixed on the strain generator member 21 at location(s) where larger strain occurs in response to application of load components of various directions. In particular, the strain sensor(s) 22 may be positioned in the vicinity of the cutout 21b to sense strain that occurs in the vicinity of the cutout 21b. More specifically, the strain sensor(s) 22 may be placed on an outer face of the strain generator member 21 at location(s) that is/are at an opposite side of the cutout 21b.

Two fixation contact segments 21a of a strain generator member 21 may be fixed, through fastening of respective bolts 77, to an outer diametric surface of the outer member 1. More specifically, each of the bolts 77 may be inserted into a bolt insertion radial through hole 78 that may be formed in each of those fixation contact segments 21a, and may be screwed into the corresponding one of bolt holes 79 that may be formed in an outer periphery of the outer member 1. As a variant to fastening of the bolts 77 for fixation of the fixation contact segments 21a, the fixation contact segments 21a may be glued or fixedly adhered to an outer diametric surface of the outer member 1. Note that, at portion(s) of the strain generator member 21 other than the fixation contact segments 21a thereof, there may be a gap between the strain generator member 21 and an outer diametric surface of the outer member 1. The rest of the features in this variant are the same as those of "Implementation 5" that is described in connection with FIG. 69 to FIG. 79. FIG. 81 is a front elevational view of the outer member 1 of a sensor-equipped wheel support bearing assembly according to this variant, as viewed from an outboard direction. FIG. 80 is a cross sectional view of FIG. 81, taken along the line XXXXXXXX-XXXXXXXX in FIG. 81.

Figure 76:
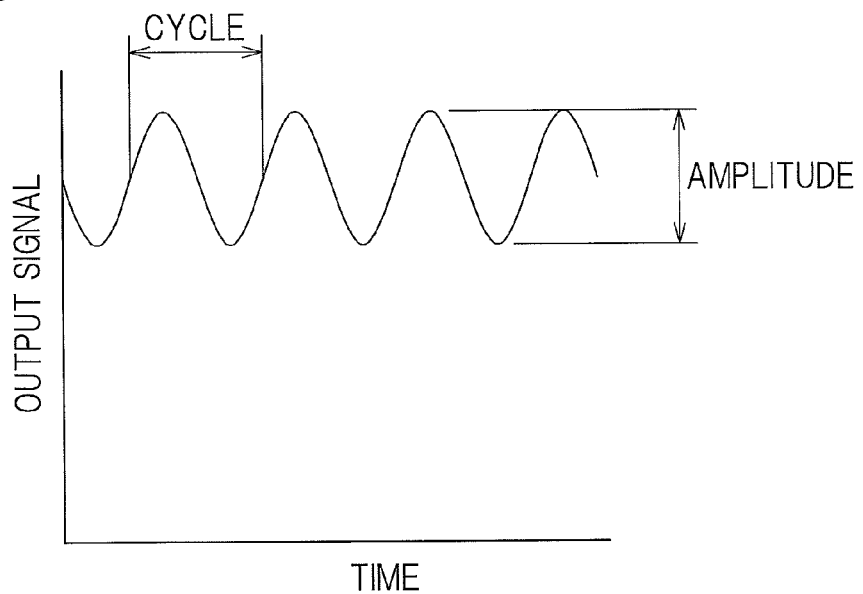
FIG. 76 is a waveform diagram of an output signal that may be generated by a sensor unit of the sensor-equipped wheel support bearing assembly.

In the preceding discussion of "Implementation 5" and a variant thereof that are described in connection with FIG. 69 to FIG. 82, it is assumed that sensor output signal(s) of one or more of the sensor units 20 may be separated by an output signal separator 34 into an AC component and a DC component, and that the AC and DC components may be corrected with the corresponding correction coefficients to enable estimation of load component(s) $F_x$, $F_y$, $F_z$. A sensor output signal of a sensor unit 20 may exhibit periodic fluctuations such as shown in FIG. 76. To address this, in a variant, at least two values selected from a group consisting of an average value of, an amplitude value of, an absolute value of, and etc of a sensor output signal may be used as variables to be corrected with the correction coefficient(s), in a manner similar to that of "Implementation 5" and a variant thereof, to enable estimation of load component(s) $F_x$, $F_y$, $F_z$. Such values may further include the aforementioned DC component and/or the AC component (i.e., amplitude value).

Figure 83:
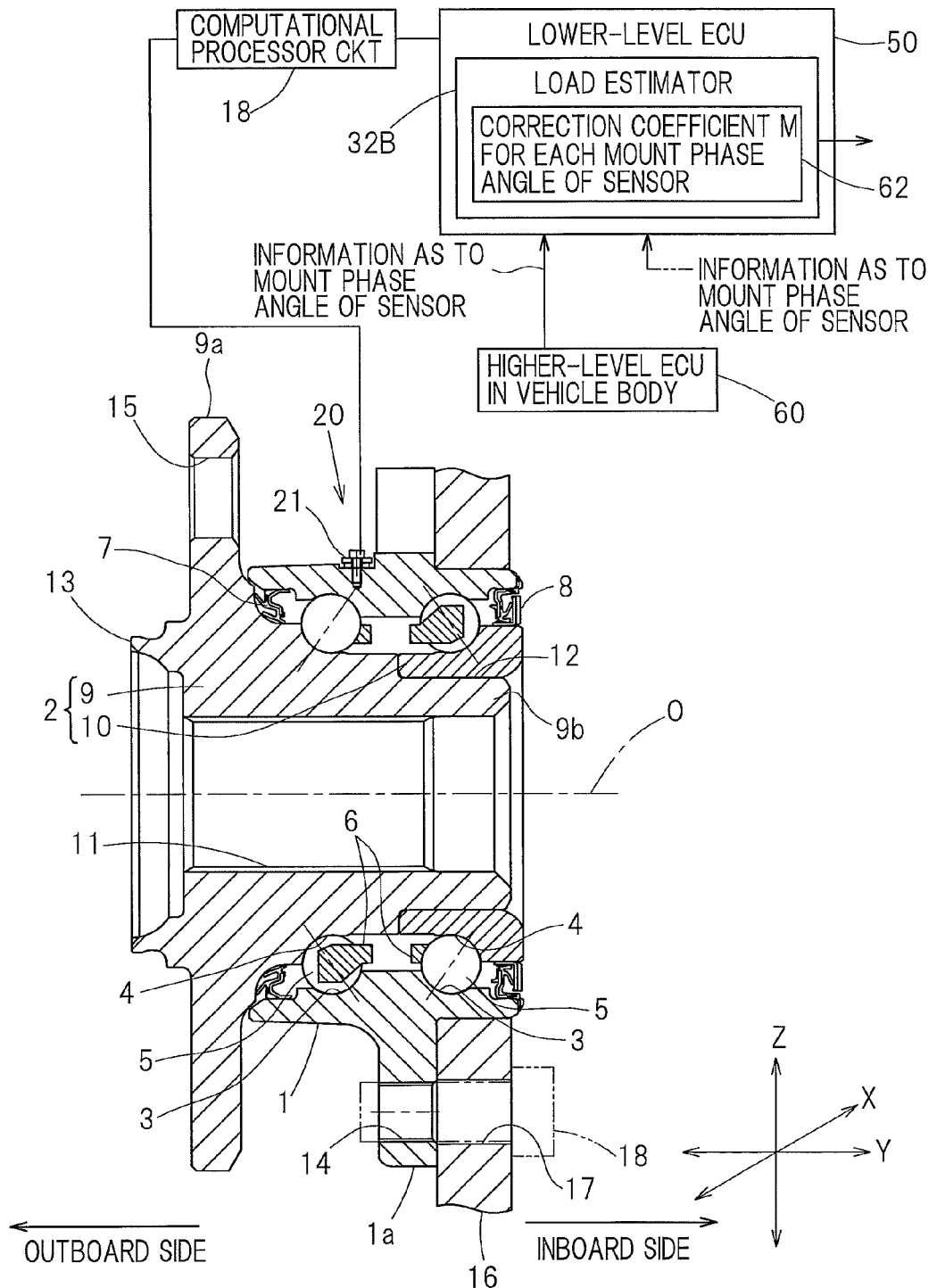
FIG. 83 illustrates a longitudinal cross sectional view of a sensor-equipped wheel support bearing assembly according to "Implementation 6," together with a block diagram of a schematic configuration of a sensing system for the sensor-equipped wheel support bearing assembly.

FIG. 83 shows "Implementation 6." A sensor-equipped wheel support bearing assembly according to "Implementation 6" differs from a sensor-equipped wheel support bearing assembly according to "Implementation 4" that is described in connection with FIG. 61 to FIG. 68, in that correction coefficient(s) M to be used in computation to estimate a load may be pre-derived by a calibration process for each of mounting phase angles at which sensor units 20 are mountable to the wheel support bearing assembly and may be registered to the memory 62 of the estimator 32B. A calibration process may include incorporating a sensor-equipped wheel support bearing assembly into a calibration device, applying the same load (e.g., only an axial load component $F_y$ of the same magnitude) to each one of sensor units 20, and adjusting a reference value and a sensitivity of the each one of sensor units 20 to be equal to each other. The calibration process may be performed for only one of a front left wheel, a front right wheel, a rear left wheel and a rear right wheel. Assuming, for example, that the calibration process is performed for a front left wheel, the following correction coefficients ML1, ML2, ML3, ML4 may be derived and may be registered to the memory 62: a correction coefficient ML1 for an output S1 of a sensor unit 20 mounted at a mounting phase angle that corresponds to an upper part of the sensor-equipped wheel support bearing assembly; a correction coefficient ML2 for an output S2 of a sensor unit 20 mounted at a mounting phase angle that corresponds to a left part (i.e., a front part) of the wheel support bearing assembly; a correction coefficient ML3 for an output S3 of a sensor unit 20 mounted at a mounting phase angle that corresponds to a lower part of the wheel support bearing assembly; and a correction coefficient ML4 for an output S4 of a sensor unit 20 mounted at a mounting phase angle that corresponds to a right part (i.e., a rear part) of the wheel support bearing assembly. These correction coefficients may have the following relation with respect to a given load F:

$$F=ML1\times S1+ML2\times S2+ML3\times S3+ML4\times S4+\text{Offset}$$

In this relation, the index L indicates that these correction coefficients ML1 to ML4 are obtained based on a sensor-equipped wheel support bearing assembly associated to a left wheel. The estimator 32B may be configured to, after a sensor-equipped wheel support bearing assembly according to "implementation 6" is equipped to a vehicle, receive information as to which mounting phase angle one or more of the sensor units 20 is/are mounted at.

As is described in connection with FIG. 65A, FIG. 65B, FIG. 66A and FIG. 66B in the discussion of "Implementation 4," a sensor-equipped wheel support bearing assembly when associated to a left wheel and a sensor-equipped wheel support bearing assembly when associated to a right wheel may be symmetric with each other, in terms of an X-Z planar coordinate system that defines a vehicle's longitudinal direction as an X-axis and defines a vehicle's vertical direction as a Z-axis. More specifically, a sensor unit 20 may be mounted to a sensor-equipped wheel support bearing at a certain mounting phase angle that corresponds to a left part of the wheel support bearing assembly when the wheel support bearing assembly is associated to a left wheel. The same sensor unit 20 will, if the corresponding wheel support bearing assembly is associated to a right wheel, be situated in a right part of the wheel support bearing assembly.

For example, a sensor-equipped wheel support bearing assembly might, despite the fact that a calibration process of this wheel support bearing assembly was performed for a left wheel, end up being equipped to a right wheel. In such a case, mounting phase angle information indicating that a sensor unit 20 with an output S1 is mounted at a mounting phase angle that corresponds to an upper part, that a sensor unit 20 with an output S2 is mounted at a mounting phase angle that corresponds to a left part (i.e., this time, a rear part), that a sensor unit 20 with an output S3 is mounted at a mounting phase angle that corresponds to a lower part, and that a sensor unit 20 with an output S4 is mounted at a mounting phase angle that corresponds to a right part (i.e., this time, a front part), may be received by the estimator 32B. Such mounting phase angle information may be supplied from the higher-level ECU 60 that may be included in the vehicle body, or may be supplied from an outside of the wheel support bearing assembly. As such, the estimator 32B may employ an equation that may be modified in the following way, to estimate a given load F through computation:

$$F=ML1 \times S1+ML4 \times S2+ML3 \times S3+ML2 \times S4+\text{Offset}$$

More specifically, the estimator 32B may rearrange, based on the supplied mounting phase angle information, the correction coefficients ML1 to ML4 for outputs S1 to S4 of the sensor units 20 in the aforementioned relation or equation.

In "Implementation 4" which is described in connection with FIG. 61 to FIG. 68, a calibration process that may involve incorporating a sensor-equipped wheel support bearing assembly into a calibration device may have to be performed, for example, four times—i.e., a calibration process for each one of a front left wheel, a front right wheel, a rear left wheel, and a rear right wheel—to derive correction coefficient(s) for each of wheels to which the wheel support bearing assembly is associable. In contrast, in "Implementation 6," a calibration process may be further simplified because, for example, performing a calibration process for only a front left wheel may suffice. In this way, it may be possible to perform simplified calibration during association of the wheel support bearing assembly with a vehicle, as in "Implementation 4" and "Implementation 5."

Figure 84:
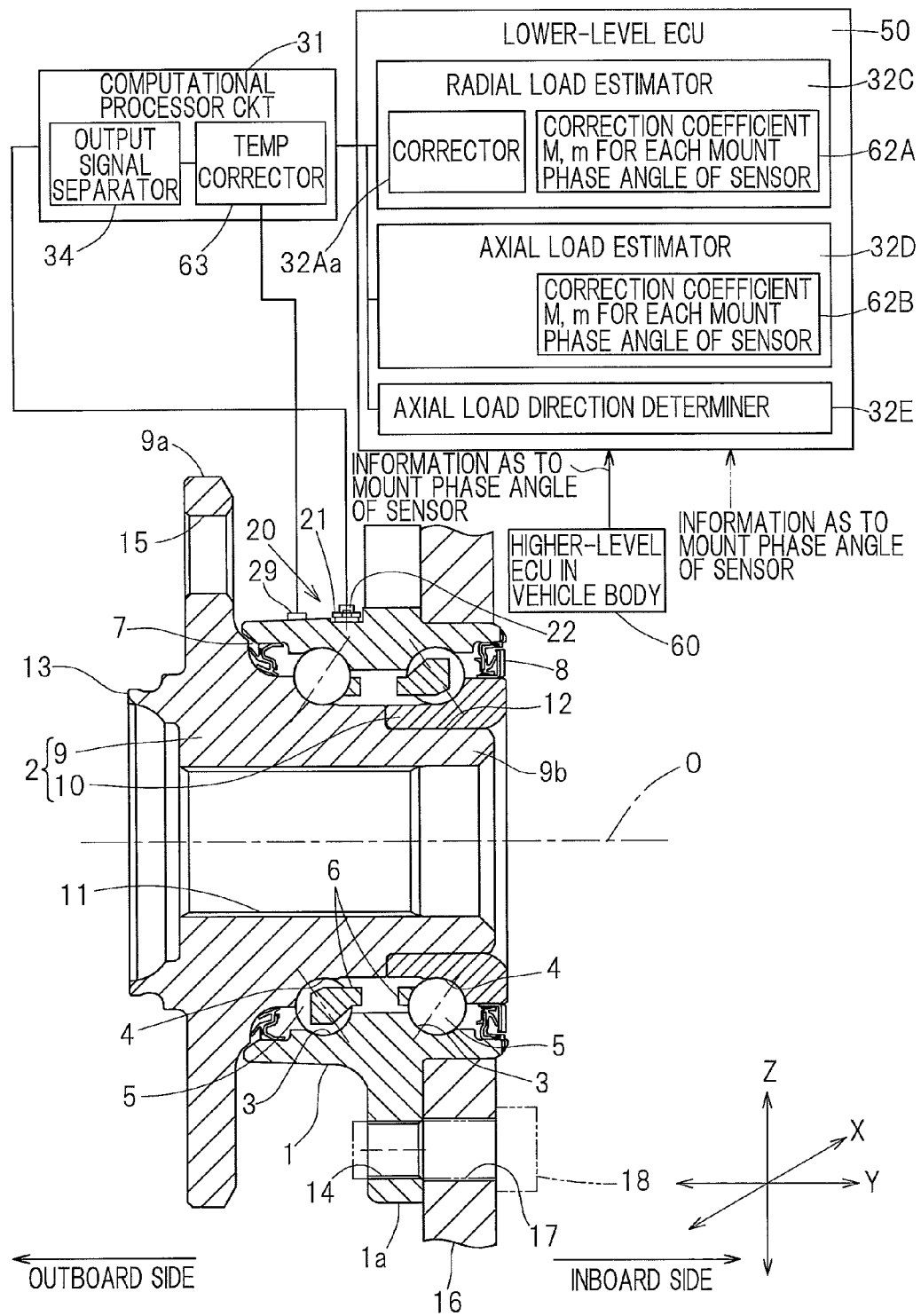
FIG. 84 illustrates a longitudinal cross sectional view of a sensor-equipped wheel support bearing assembly according to "Implementation 7," together with a block diagram of a schematic configuration of a sensing system for the sensor-equipped wheel support bearing assembly.
Figure 87:
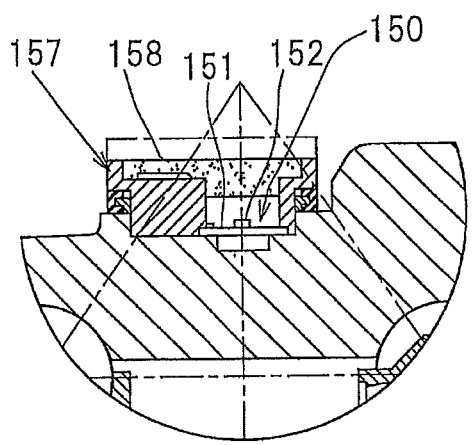
FIG. 87 is a longitudinal cross sectional view of a mounting configuration of a protective covering in the conventional apparatus of FIG. 86A and FIG. 86B.
Figure 88A:
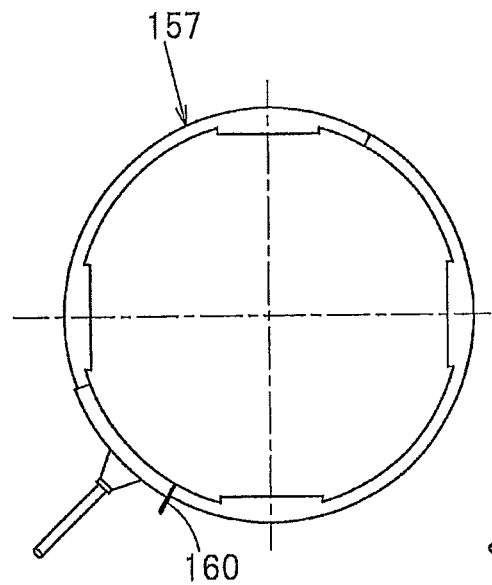
FIG. 88A is a plan view of an opened configuration of the protective covering.
Figure 88B:
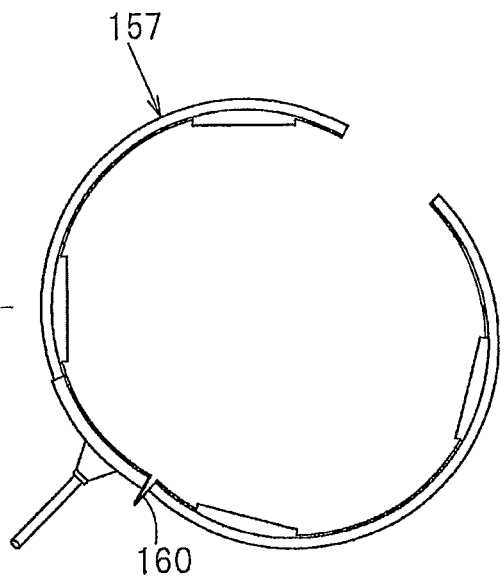
FIG. 88B is a plan view of a closed configuration of the protective covering.

FIG. 84 shows "Implementation 7." A sensor-equipped wheel support bearing assembly according to "Implementation 7" differs from a sensor-equipped wheel support bearing assembly according to "Implementation 5" or a variant thereof that is described in connection with FIG. 69 to FIG. 82, in that, as is the case with "Implementation 6" such as shown in FIG. 83, correction coefficients M, m that may be used by the radial load estimator 32C and/or the axial load estimator 32D to estimate a load may be pre-derived by a calibration process for each of mounting phase angles at which sensor units 20 are mountable to the wheel support bearing assembly and may be registered to the memories 62A and 62B of the radial load estimator 32C and the axial load estimator 32D, respectively.

As is the case with "Implementation 6" such as shown in FIG. 83, a calibration process may include incorporating a sensor-equipped wheel support bearing assembly into a calibration device, applying the same load to each one of sensor units 20, and adjusting a reference value and a sensitivity of the each one of sensor units 20 to be equal to each other. Also, as is the case with "Implementation 6" such as shown in FIG. 83, the calibration process may be performed for only one of a front left wheel, a front right wheel, a rear left wheel and a rear right wheel. Furthermore, as is the case with "Implementation 6" such as shown in FIG. 83, the radial load estimator 32C and/or the axial load estimator 32D may be configured to, after a sensor-equipped wheel support bearing assembly is equipped to a vehicle, receive information as to which mounting phase angle one or more of the sensor units 20 is/are mounted at.

In "Implementation 7," a calibration process that may involve incorporating a sensor-equipped wheel support bearing assembly into a calibration device may be further simplified because the calibration process may be performed for only one of a front left wheel, a front right wheel, a rear left wheel and a rear right wheel. In this way, it may be possible to perform simplified calibration during association of the wheel support bearing assembly with a vehicle, as in "Implementation 4," "Implementation 5" and "Implementation 6."

Although the present invention has been described in connection with preferred embodiments with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

1: Outer member
1a: Vehicle body mounting flange
2: Inner member
3, 4: Raceway surface
5: Rolling element
20: Sensor unit
21: Strain generator member
21a: Fixation contact segment
21b: Cutout
21d: Bent portion
22, 22A, 22B: Strain sensor
31: Sensor assembly
32, 32A, 32B, 32C, 32D: Estimator
33: Mold material
35, 35A: Seal lip (seal member)
38: Temperature sensor
39, 39A: Non-contact seal gap
40: Protective cover
42: Surface treatment layer
61: O-ring (seal member)

What is claimed is:

1. A sensor-equipped wheel support bearing assembly for rotatably supporting a wheel relative to a vehicle body, the wheel support bearing assembly comprising:

an outer member having an inner periphery formed with a plurality of raceway surfaces;

an inner member having an outer periphery formed with a plurality of raceway surfaces opposed to the raceway surfaces of the outer member, one of the outer member and the inner member serving as a stationary member;

a plurality of rows of rolling elements interposed between the raceway surfaces of the outer member and the raceway surfaces of the inner member;

a plurality of sensor units, each of the sensor units including a strain generator member and at least two sensors mounted on the strain generator member to sense strain in the strain generator member, the strain generator member being in the form of a thin sheet plate member made of an elastically deformable metal and including at least two fixation contact segments fixedly in contact with the stationary member; and an estimator configured to estimate a load that acts on the wheel support bearing assembly, based on output signals of the at least two sensors;

the strain generator members of the plurality of sensor units being formed of a single band-shaped strain generator body continuously joining the plurality of sensor units with each other, the at least two fixation contact segments of the band-shaped strain generator body being arranged at same axial positions on an outer diametric surface and spaced from each other along a circumferential direction of the outer diametric surface of the stationary member.

2. The sensor-equipped wheel support bearing assembly as claimed in claim 1, wherein the single band-shaped strain generator body has, along a longitudinal direction thereof, a plurality of portions between neighboring sensor units of the sensor units, where the single band-shaped strain generator body is bent, and wherein the single band-shaped strain generator body is fixed with a fastener to the stationary member.

3. The sensor-equipped wheel support bearing assembly as claimed in claim 1, wherein the single band-shaped strain generator body is coated with a mold material.

4. The sensor-equipped wheel support bearing assembly as claimed in claim 1, wherein an outer diametric surface of the stationary member includes a segment in contact with the plurality of sensor units, and wherein at least the segment is subjected to a surface treatment of anti-corrosion or corrosion prevention.

5. The sensor-equipped wheel support bearing assembly as claimed in claim 1, further comprising a tubular protective cover that covers the plurality of sensor units, the protective cover being fitted to an outer diametric surface of the stationary member.

6. The sensor-equipped wheel support bearing assembly as claimed in claim 1, wherein the estimator is configured to compute, based on a difference between output signals of the at least two sensors, an amplitude value of the output signals or a value that corresponds to the amplitude value.

7. The sensor-equipped wheel support bearing assembly as claimed in claim 6, wherein the estimator is configured to generate an absolute value of a signal of a difference between output signals of the at least two sensors, and to define a peak value or a DC component of the absolute value as the value that corresponds to the amplitude value.

8. The sensor-equipped wheel support bearing assembly as claimed in claim 6, wherein the estimator is configured to compute an effective value of a signal of a difference between output signals of the at least two sensors, and to define the effective value as the value that corresponds to the amplitude value.

9. The sensor-equipped wheel support bearing assembly as claimed in claim 1, wherein each of the sensor units includes neighboring first, second and third fixation contact segments and two neighboring sensors, each of the sensors mounted on a portion between the first and the second fixation contact segments and a portion between the second and the third fixation contact segments.

10. The sensor-equipped wheel support bearing assembly as claimed in claim 9, wherein a space between the neighboring fixation contact segments or a space between the neighboring sensors defined along a circumferential direction of an outer diametric surface of the stationary member, is equal to or approximate to ($\frac{1}{2}$+n) times as much as arrangement pitch of the rolling elements, with n being an integer.

11. The sensor-equipped wheel support bearing assembly as claimed in claim 1, wherein the strain generator member comprises a sheet plate having a general shape of a band or a band having a uniform width, and the sheet plate has a side formed with a cutout therein.

12. The sensor-equipped wheel support bearing assembly as claimed in claim 1, wherein the sensor units are disposed on upper, lower, right and left parts, respectively, of an outer diametric surface of the stationary member, wherein the upper and lower parts correspond to vertical regions relative to a tire tread, and wherein the right and left parts correspond to horizontal regions relative to a tire tread.

13. The sensor-equipped wheel support bearing assembly as claimed in claim 1, wherein the estimator is configured to additionally use a sum of output signals of the at least two sensors to estimate a load that acts on the wheel support bearing assembly.

14. The sensor-equipped wheel support bearing assembly as claimed in claim 1, further comprising a tubular protective cover surrounding an outer periphery of the stationary member and covering the plurality of sensor units, the protective cover having opposite axial ends, one of which is fitted to an outer periphery of the stationary member and the other of which has an opening rim provided with an annular seal member made of an elastic material, the seal member being in contact with a surface of the stationary member or with a surface of one of the inner member and the outer member that serves as a rotational member.

15. The sensor-equipped wheel support bearing assembly as claimed in claim 14, wherein the protective cover has an outboard end and an inboard end, wherein the stationary member includes a flange, wherein the outboard end of the protective cover is fitted to an outer peripheral surface of the stationary member, wherein the inboard end of the protective cover has an opening rim that includes the annular seal member made of elastic material and extending along the opening rim, and wherein the seal member is in contact with an outboard oriented side surface of the flange of the stationary member or with an outer peripheral surface of the stationary member.

16. The sensor-equipped wheel support bearing assembly as claimed in claim 15, wherein the inboard end of the protective cover includes a hole through which a signal cable is drawn from the protective cover to form a signal cable drawn segment, and a seal material is applied to a portion of the signal cable drawn segment that is located at the hole.

17. The sensor-equipped wheel support bearing assembly as claimed in claim 15, wherein the outboard end of the protective cover extends beyond the stationary member in an outboard direction such that the outboard end and the rotational member cooperatively define a non-contact seal gap therebetween.

18. The sensor-equipped wheel support bearing assembly as claimed in claim 15, further comprising:
electronic components including: the sensor units; a signal processor IC configured to process output signals of the sensor units; and a signal cable configured to send the processed output signals to an outside of the wheel support bearing assembly, the electronic components being connected with each other in a ring shape to form a sensor assembly, the sensor assembly being mounted to an outer peripheral surface of the stationary member coaxially with the stationary member, and the protective cover that covers the sensor assembly.

19. A wheel support bearing assembly with an in-wheel motor integration, comprising a sensor-equipped wheel support bearing assembly as claimed in claim 1.

* * * * *

UNITED STATES PATENT AND TRADEMARK OFFICE
CERTIFICATE OF CORRECTION

PATENT NO. : 9,011,013 B2  
APPLICATION NO. : 14/115668  
DATED : April 21, 2015  
INVENTOR(S) : Takayuki Norimatsu et al.

It is certified that error appears in the above-identified patent and that said Letters Patent is hereby corrected as shown below:

ON THE TITLE PAGE

Column 1, Item [73] (Assignee), Line 1, Delete "Osaska" and insert -- Osaka --, therefor.

Signed and Sealed this  
Twenty-third Day of February, 2016

Michelle K. Lee  
*Director of the United States Patent and Trademark Office*